US009494218B2

(12) United States Patent
Honda

(10) Patent No.: US 9,494,218 B2
(45) Date of Patent: Nov. 15, 2016

(54) POWER PLANT

(71) Applicant: HONDA MOTOR CO., LTD., Tokyo (JP)

(72) Inventor: Kenji Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/418,335

(22) PCT Filed: Jun. 10, 2013

(86) PCT No.: PCT/JP2013/065947

§ 371 (c)(1),
(2) Date: Jan. 29, 2015

(87) PCT Pub. No.: WO2014/020992

PCT Pub. Date: Feb. 6, 2014

(65) Prior Publication Data

US 2015/0192192 A1 Jul. 9, 2015

(30) Foreign Application Priority Data

Aug. 1, 2012 (JP) ................................ 2012-170972

(51) Int. Cl.
*F16H 3/72* (2006.01)
*B60K 6/365* (2007.10)
(Continued)

(52) U.S. Cl.
CPC ............... *F16H 3/727* (2013.01); *B60K 6/365* (2013.01); *B60K 6/40* (2013.01); *B60K 6/445* (2013.01);
(Continued)

(58) Field of Classification Search
CPC .. F16H 3/727; F16H 48/36; F16H 2048/364; F16H 2200/2025; F16H 2037/103; B60K 6/40; B60K 6/445; B60K 6/547; B60K 6/52; B60K 6/48
See application file for complete search history.

(56) References Cited

U.S. PATENT DOCUMENTS

| | | | | |
|---|---|---|---|---|
| 2010/0234158 A1* | 9/2010 | Kato | .................... | B60K 17/165 475/1 |
| 2012/0165149 A1* | 6/2012 | Morimoto | ............. | B60K 6/445 475/5 |

(Continued)

FOREIGN PATENT DOCUMENTS

| | | |
|---|---|---|
| DE | 10 2010 005 789 A1 | 7/2011 |
| JP | 02-229945 A | 9/1990 |

(Continued)

OTHER PUBLICATIONS

International Search Report dated Jul. 16, 2013 corresponding to International Patent Application No. PCT/JP2013/065947 and English translation thereof.

*Primary Examiner* — David J Hlavka
(74) *Attorney, Agent, or Firm* — Squire Patton Boggs (US) LLP

(57) ABSTRACT

In a power plant, the rotational speeds of four rotary elements, formed by a rotatable carrier that rotatably supports first and second pinion gears which are in mesh with each other, first and second gears which are in mesh with one of the two pinion gears, and a third gear, which is in mesh with the other of the two pinion gears, satisfy a collinear relationship in which the rotational speeds are aligned in a single straight line in a collinear chart. The first and second outer rotary elements, which are positioned at opposite outer sides of the straight line in the collinear chart, respectively, are connected to first and second energy input/output units, respectively. First and second quasi-outer rotary elements positioned adjacent to the first and second outer rotary elements, respectively, are connected to one and the other of two driven parts.

18 Claims, 89 Drawing Sheets

(51) Int. Cl.

| | |
|---|---|
| ***B60K 6/48*** | (2007.10) |
| ***B60K 6/52*** | (2007.10) |
| ***B60L 11/14*** | (2006.01) |
| ***B60L 15/20*** | (2006.01) |
| ***B60K 6/40*** | (2007.10) |
| ***B60K 6/445*** | (2007.10) |
| ***B60K 6/547*** | (2007.10) |
| ***B60W 10/08*** | (2006.01) |
| ***B60W 20/00*** | (2016.01) |
| ***F16H 48/36*** | (2012.01) |
| *F16H 37/10* | (2006.01) |

(52) U.S. Cl.

CPC . *B60K 6/48* (2013.01); *B60K 6/52* (2013.01); *B60K 6/547* (2013.01); *B60L 11/14* (2013.01); *B60L 15/2036* (2013.01); *B60L 15/2054* (2013.01); *B60W 10/08* (2013.01); *B60W 20/00* (2013.01); *F16H 48/36* (2013.01); *B60L 2200/10* (2013.01); *B60L 2200/32* (2013.01); *B60L 2220/46* (2013.01); *B60L 2240/12* (2013.01); *B60L 2240/421* (2013.01); *B60L 2240/423* (2013.01); *B60L 2260/28* (2013.01); *F16H 2037/103* (2013.01); *F16H 2048/364* (2013.01); *F16H 2200/2025* (2013.01); *Y02T 10/6221* (2013.01); *Y02T 10/6265* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(56) References Cited

U.S. PATENT DOCUMENTS

| | | | | |
|---|---|---|---|---|
| 2012/0196716 | A1* | 8/2012 | Rosemeier | B60K 17/165<br>475/205 |
| 2013/0203543 | A1* | 8/2013 | Sten | F16H 48/36<br>475/150 |
| 2013/0234161 | A1* | 9/2013 | Shimizu | H01L 29/1608<br>257/77 |
| 2013/0283972 | A1* | 10/2013 | Yamamoto | B60K 6/405<br>74/665 B |
| 2013/0345009 | A1* | 12/2013 | Iwasa | B60K 6/365<br>475/5 |
| 2014/0243145 | A1* | 8/2014 | Iwasa | F16H 1/28<br>475/331 |

FOREIGN PATENT DOCUMENTS

| | | | |
|---|---|---|---|
| JP | 2003-032808 | A | 1/2003 |
| JP | 2008-215519 | A | 9/2008 |
| JP | 2010-116083 | A | 5/2010 |
| JP | 4637136 | B2 | 2/2011 |
| JP | 2011-237019 | A | 11/2011 |
| JP | 5153587 | B2 | 2/2013 |

* cited by examiner

F I G. 1
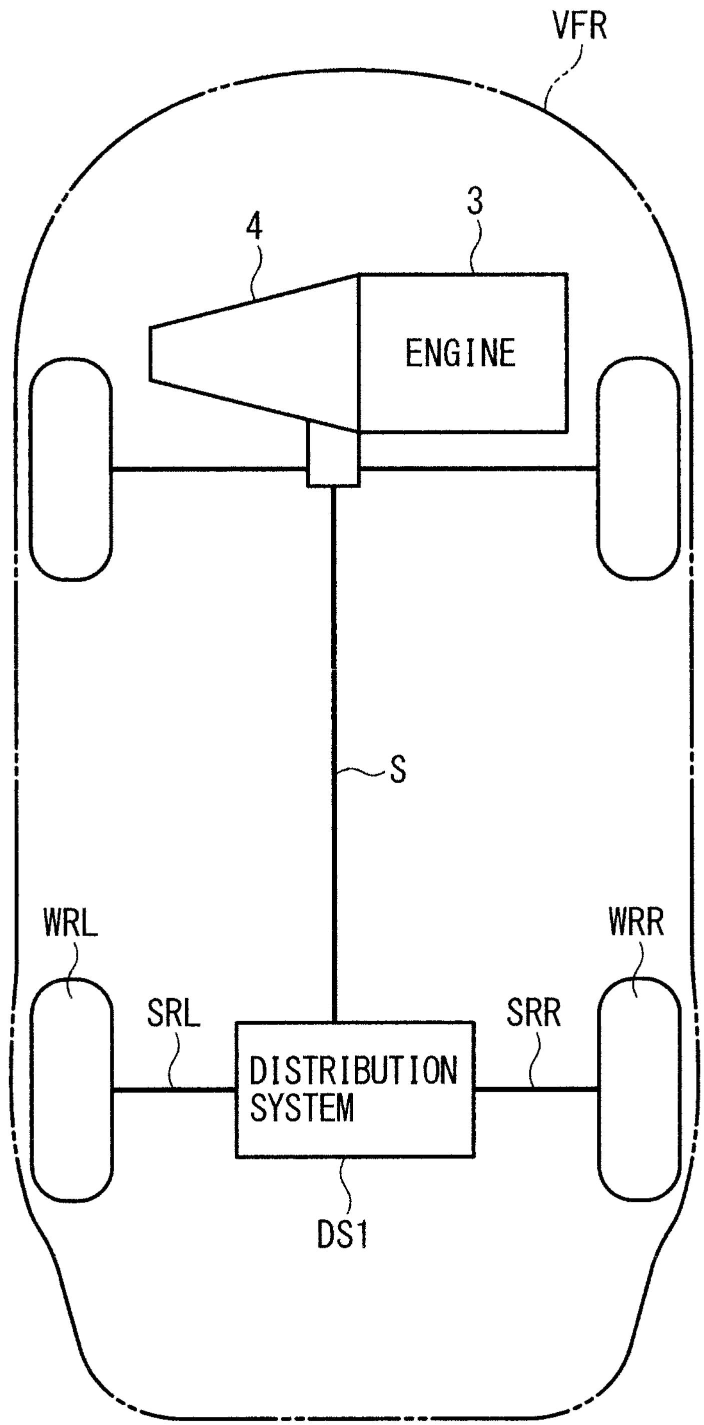

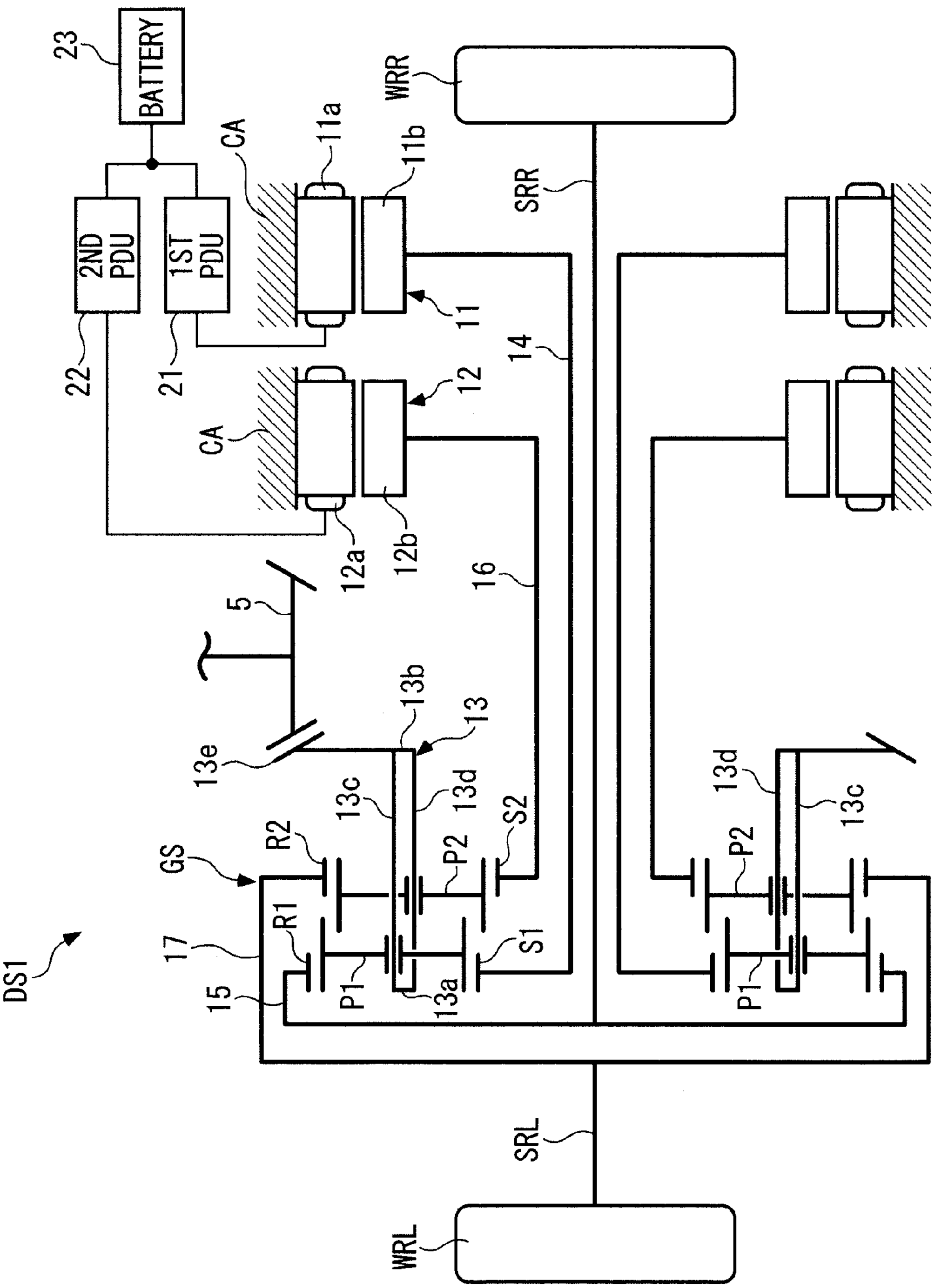
F I G. 2

F I G. 5
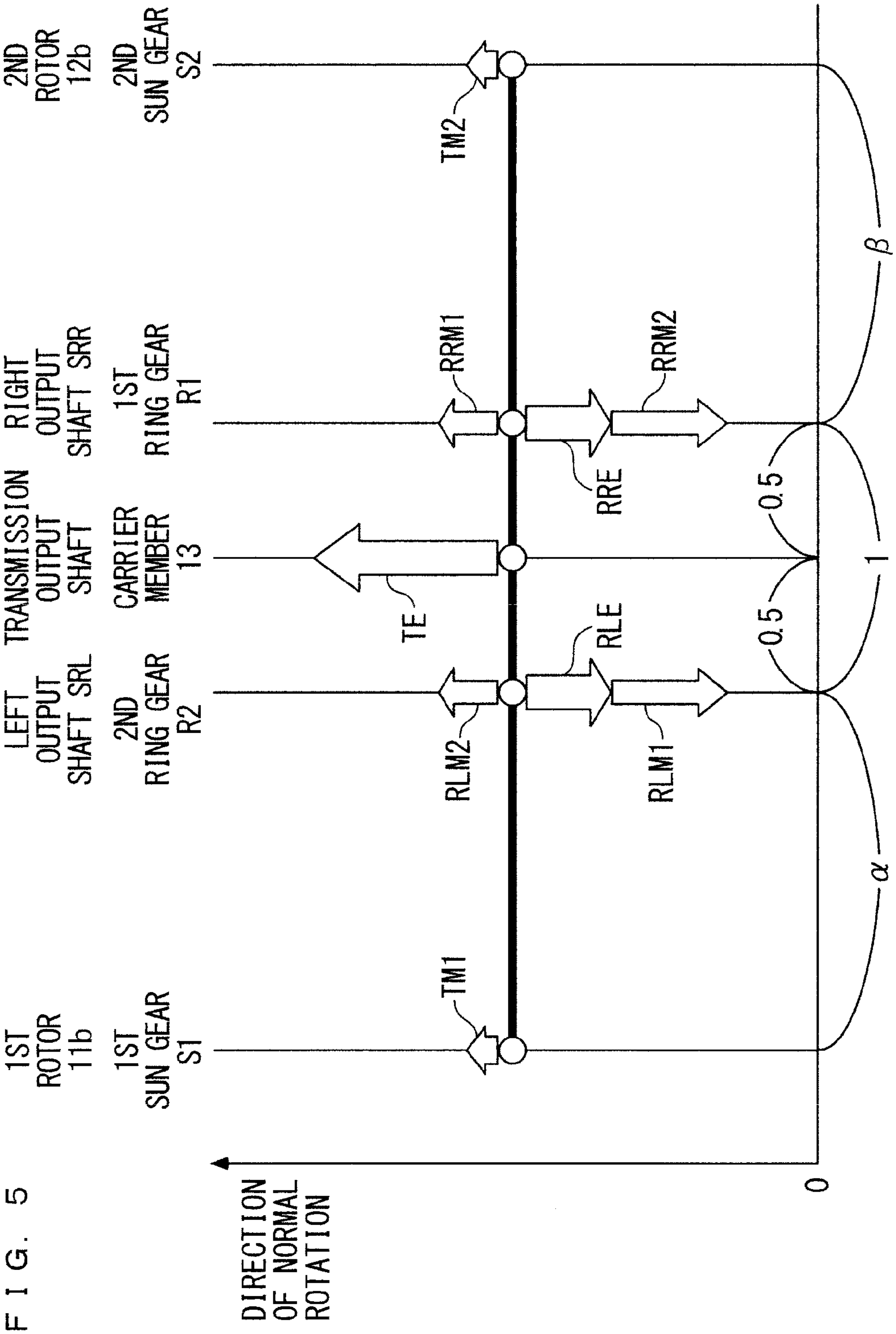

F I G. 8
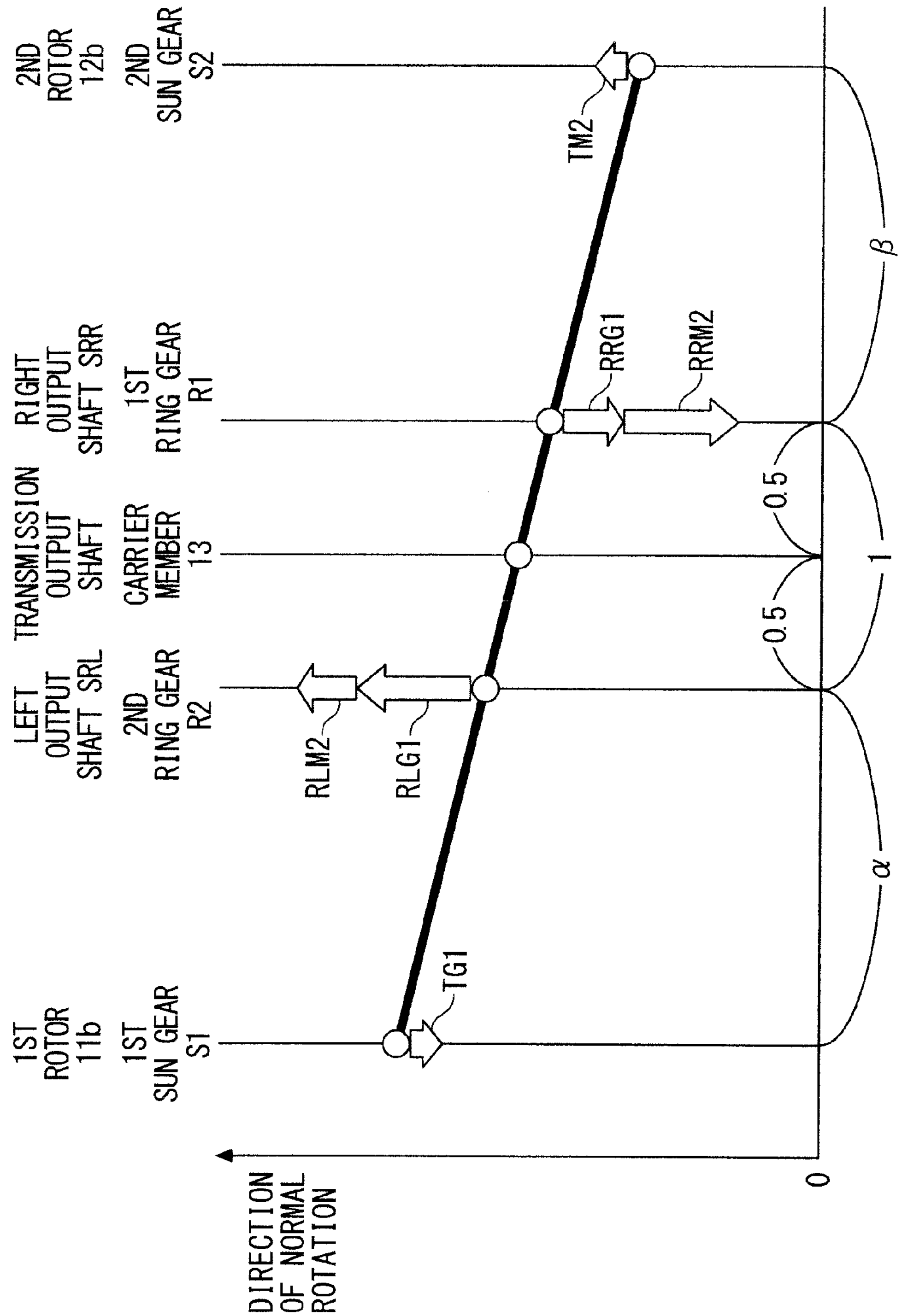

F I G. 1 0
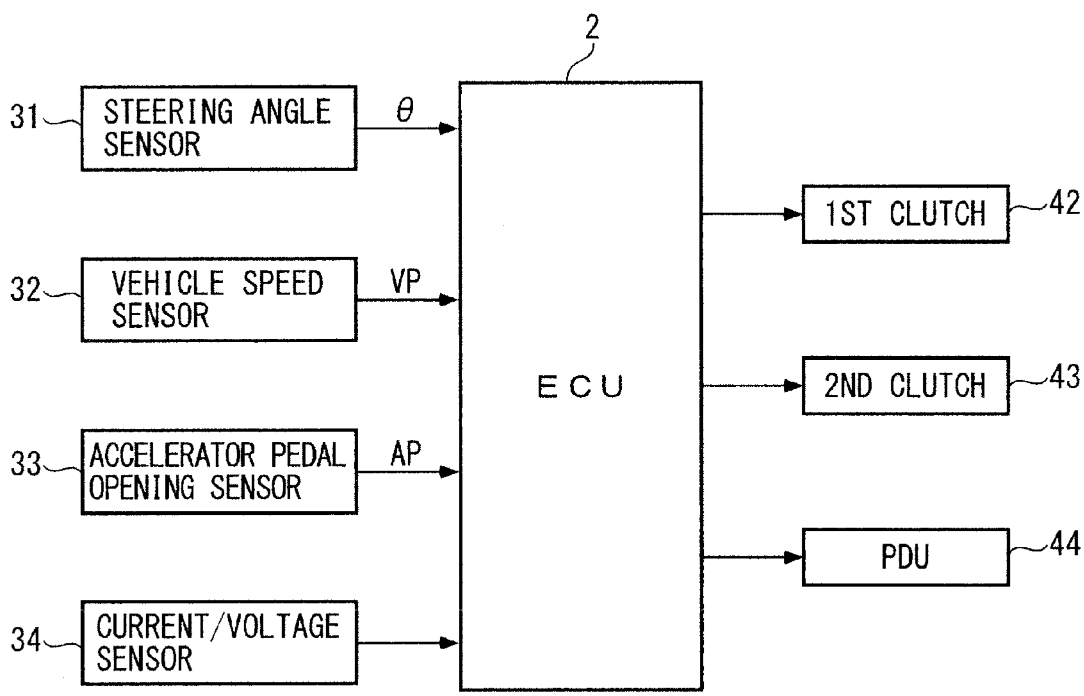

F I G. 1 4
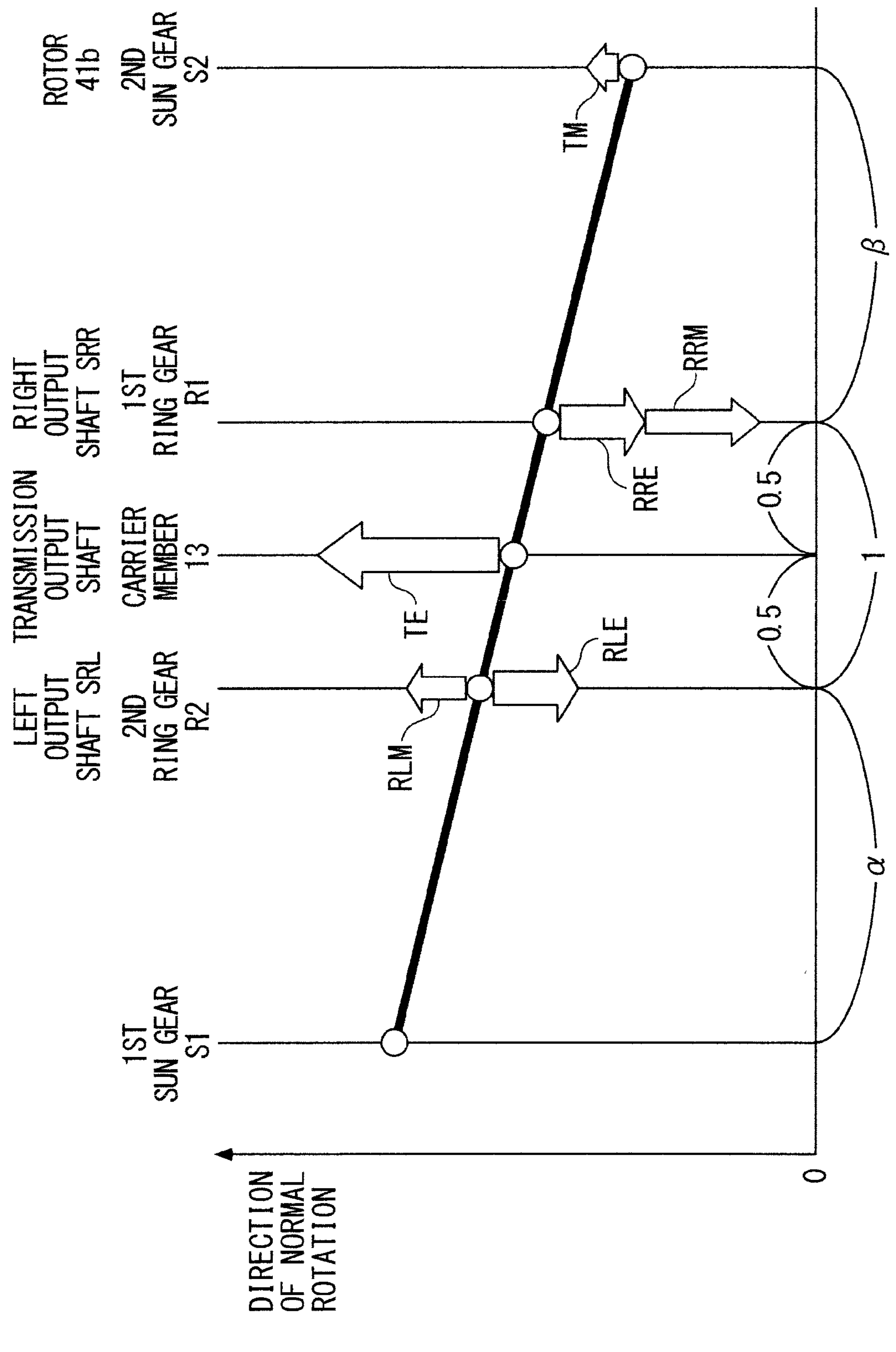

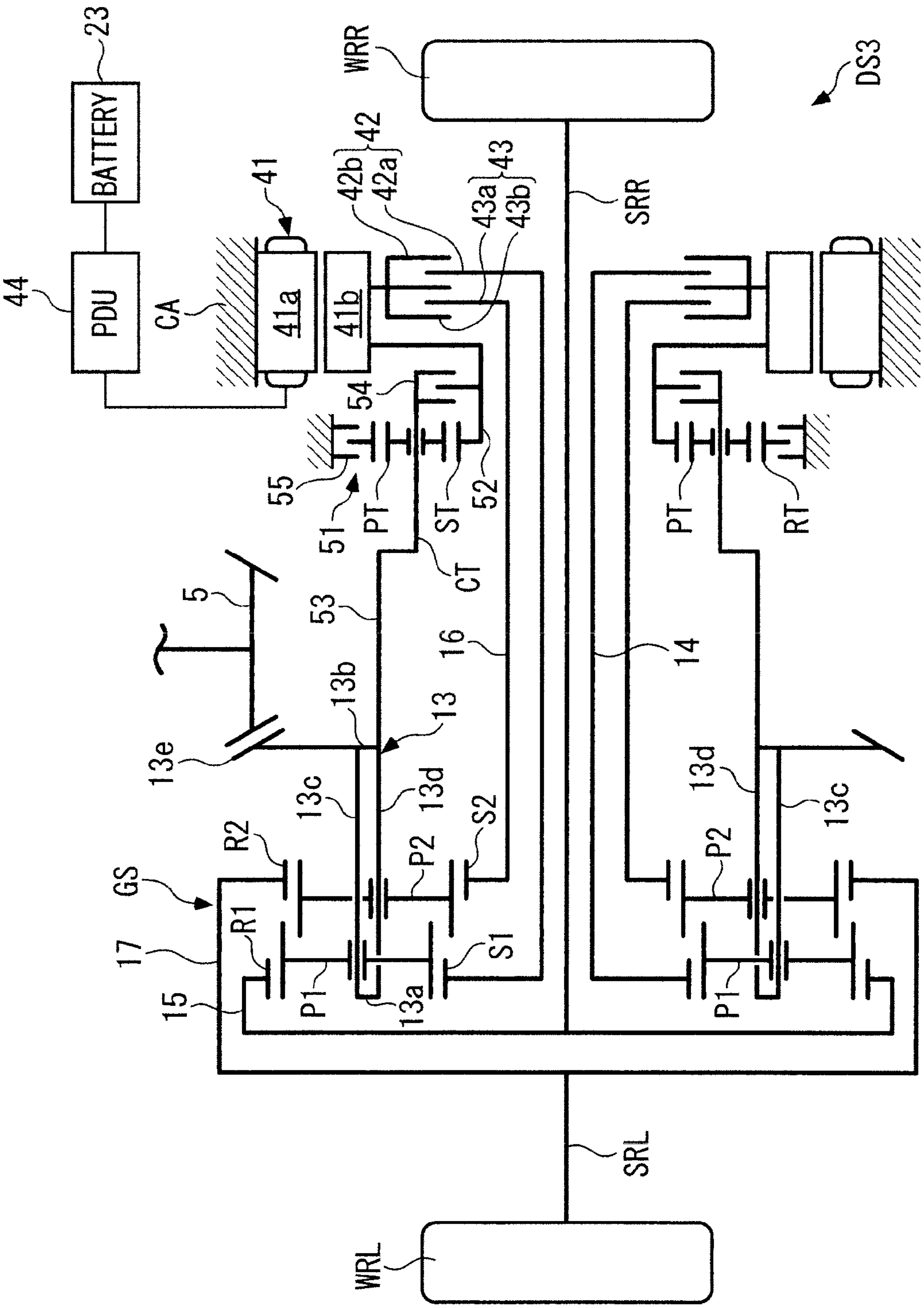
F I G. 1 6

F I G. 26
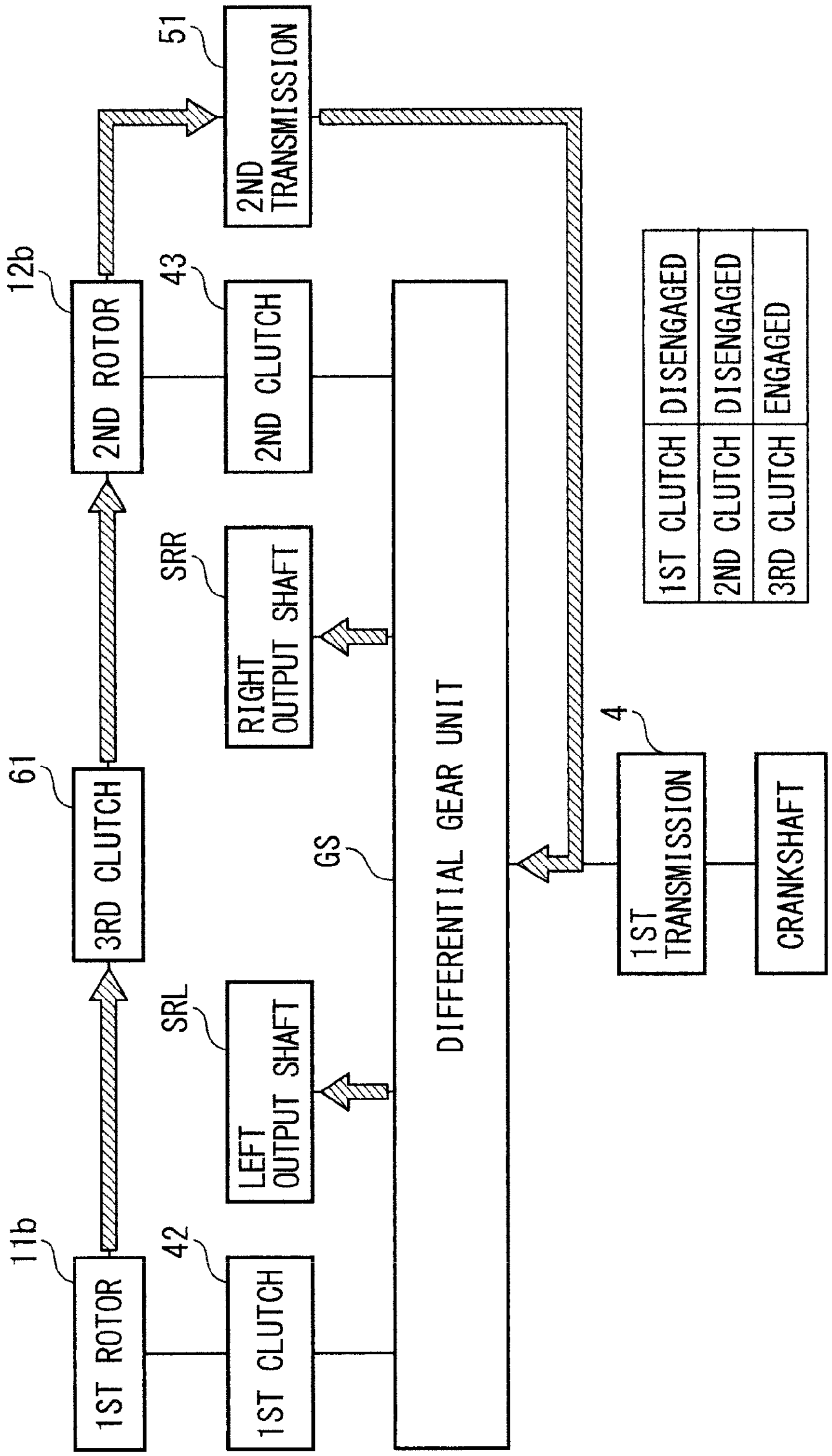
| | |
|---|---|
| 1ST CLUTCH | DISENGAGED |
| 2ND CLUTCH | DISENGAGED |
| 3RD CLUTCH | ENGAGED |

F I G. 2 7
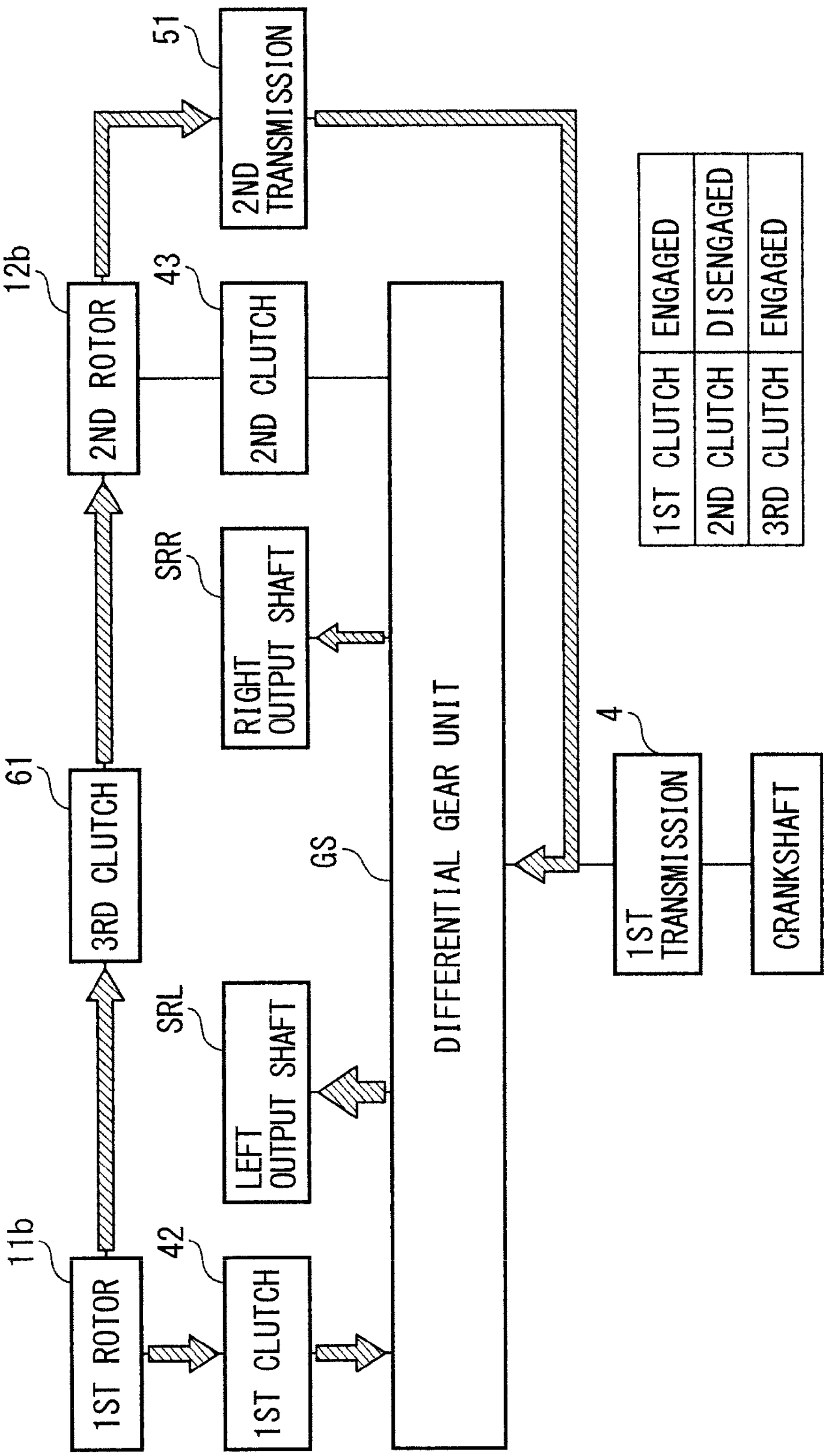

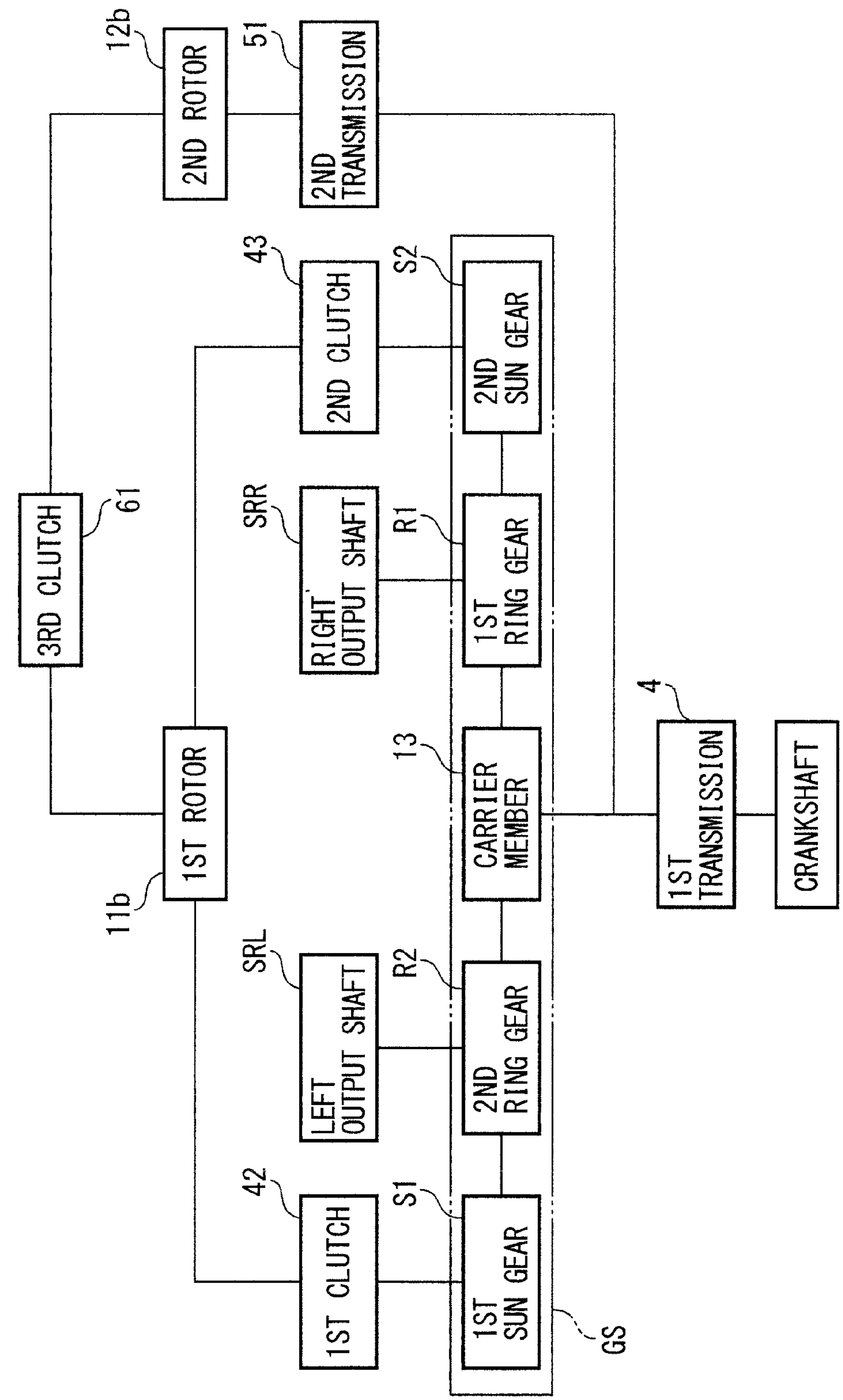
F I G. 3 0

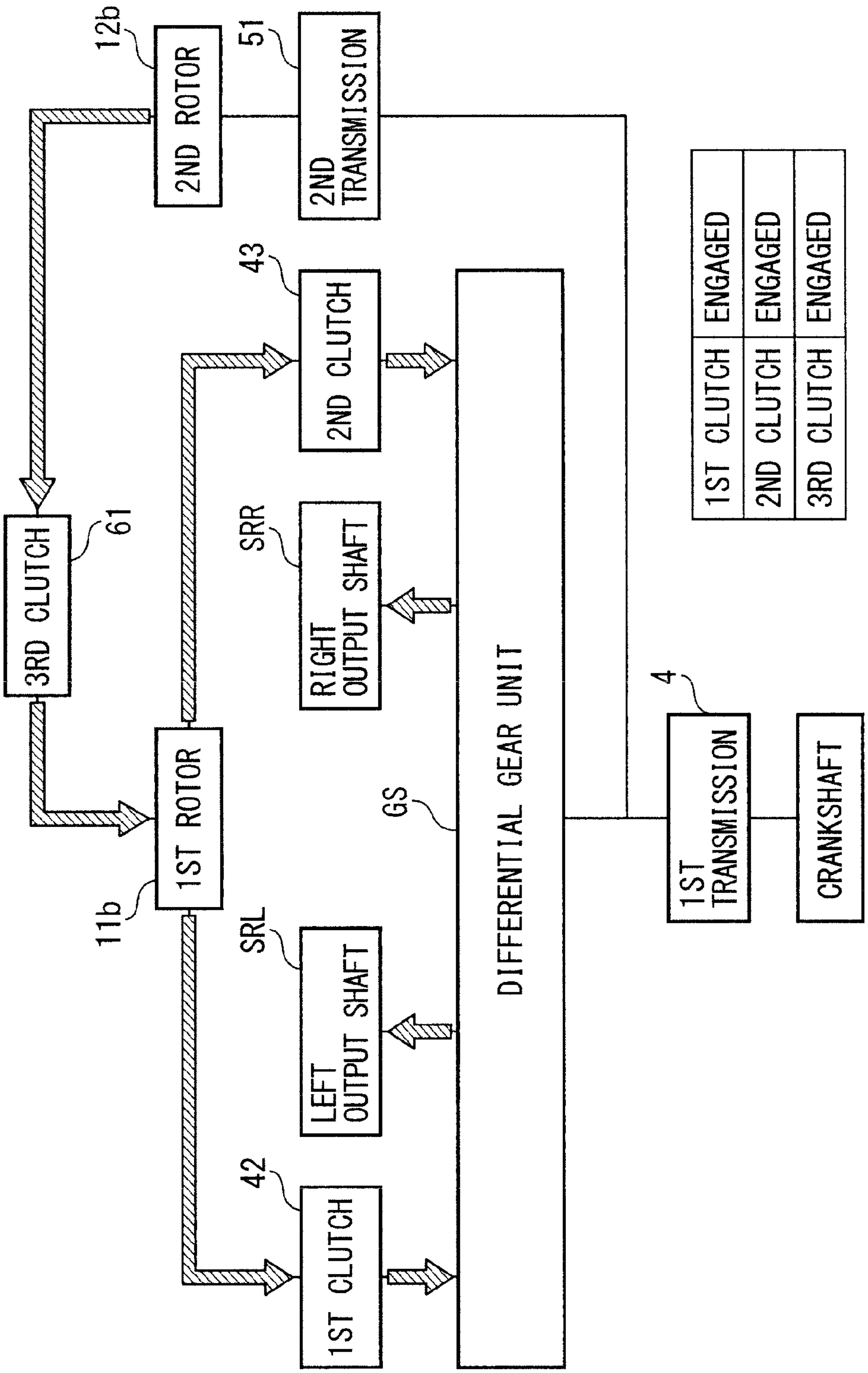
F I G. 3 7

F I G. 4 0
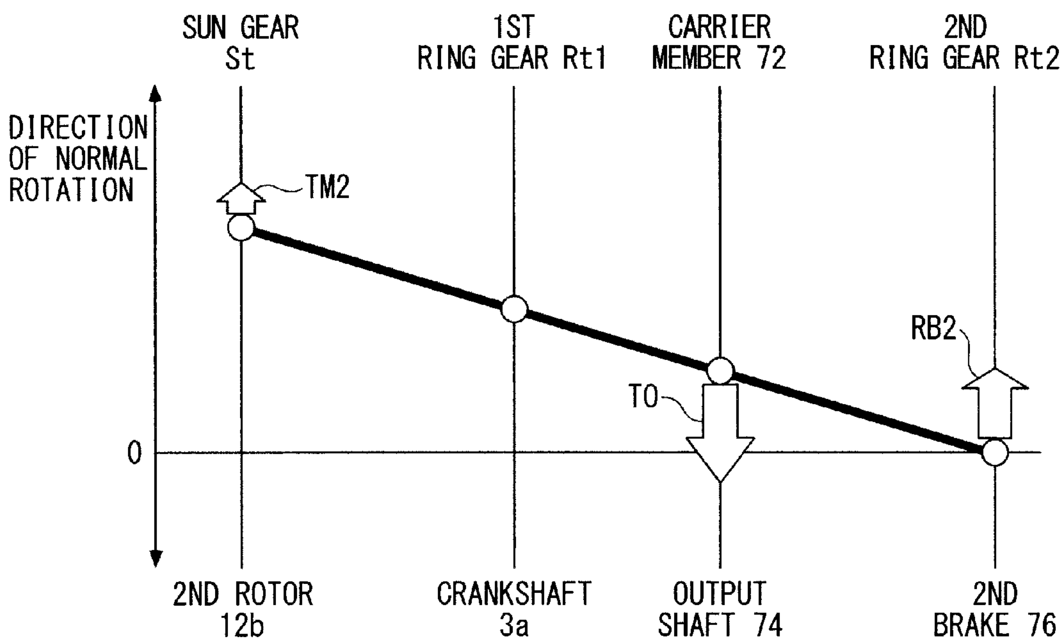

F I G. 4 4
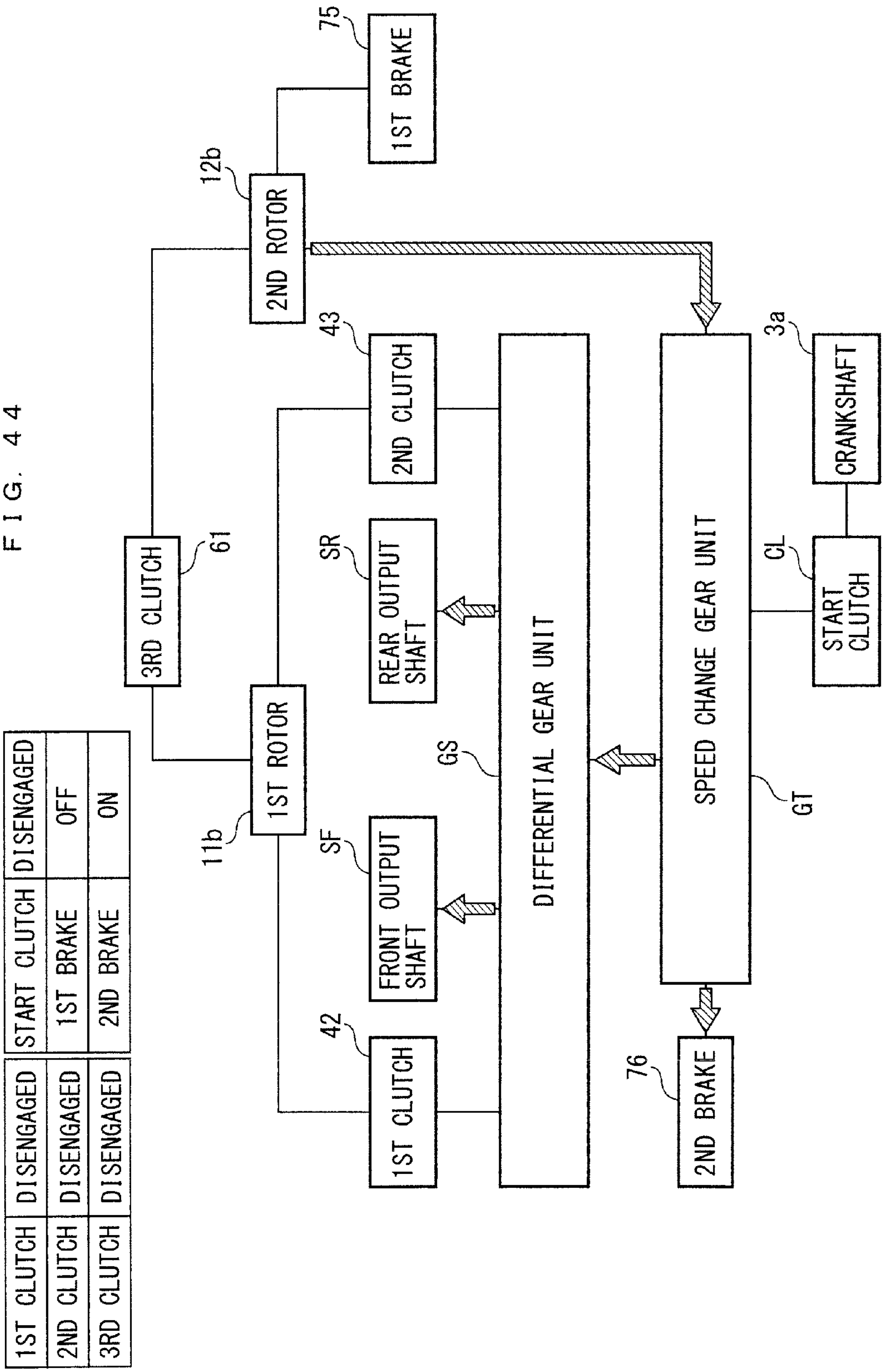
| | |
|---|---|
| 1ST CLUTCH | DISENGAGED |
| 2ND CLUTCH | DISENGAGED |
| 3RD CLUTCH | DISENGAGED |
| | |
|---|---|
| START CLUTCH | DISENGAGED |
| 1ST BRAKE | OFF |
| 2ND BRAKE | ON |

| | |
|---|---|
| 1ST CLUTCH | DISENGAGED |
| 2ND CLUTCH | ENGAGED |
| 3RD CLUTCH | DISENGAGED |

| | |
|---|---|
| START CLUTCH | DISENGAGED |
| 1ST BRAKE | OFF |
| 2ND BRAKE | ON |

F I G. 4 6
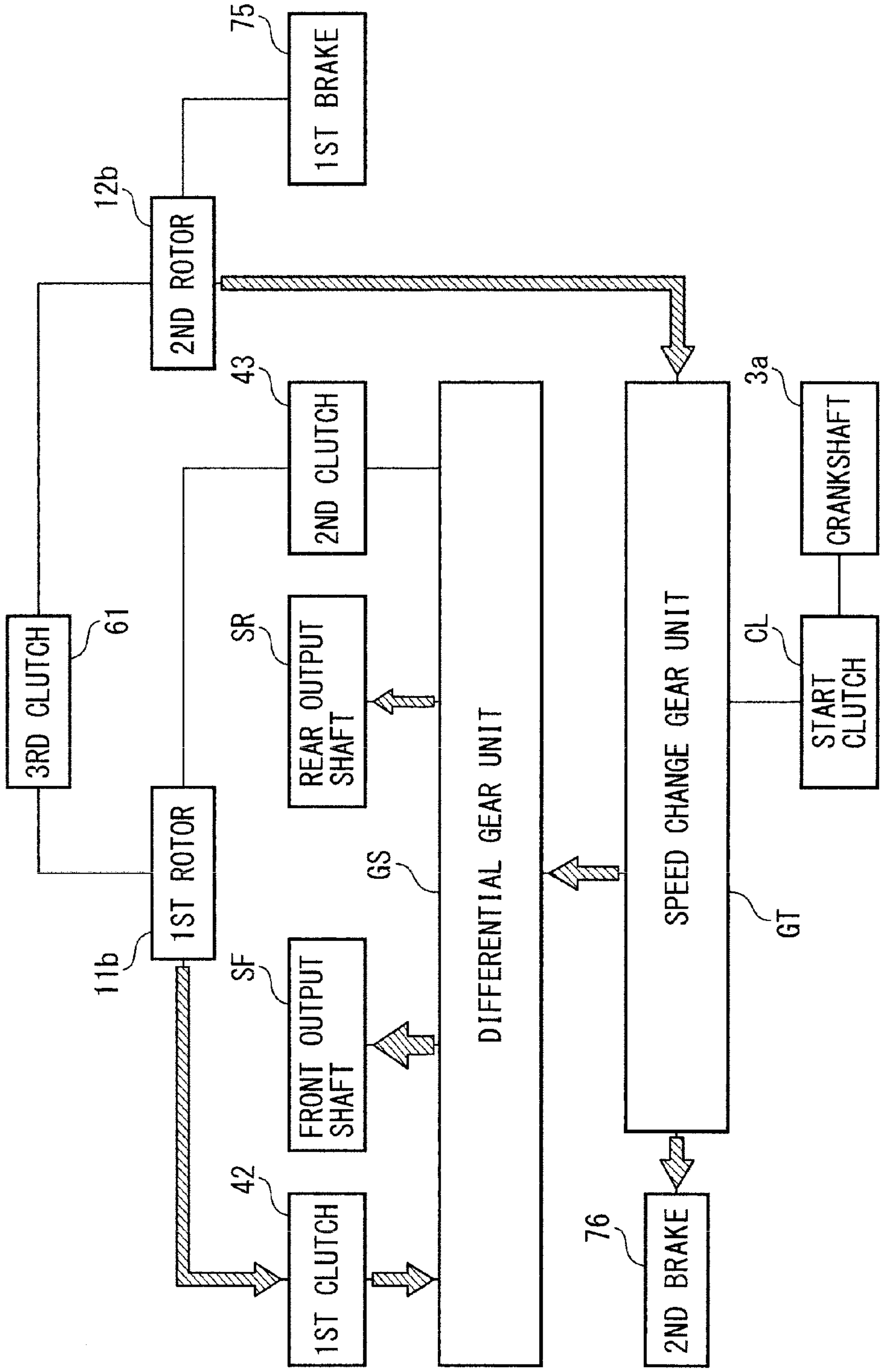
| | |
|---|---|
| 1ST CLUTCH | ENGAGED |
| 2ND CLUTCH | DISENGAGED |
| 3RD CLUTCH | DISENGAGED |
| | |
|---|---|
| START CLUTCH | DISENGAGED |
| 1ST BRAKE | OFF |
| 2ND BRAKE | ON |

| | |
|---|---|
| 1ST CLUTCH | DISENGAGED |
| 2ND CLUTCH | DISENGAGED |
| 3RD CLUTCH | ENGAGED |

| | |
|---|---|
| START CLUTCH | DISENGAGED |
| 1ST BRAKE | OFF |
| 2ND BRAKE | ON |

| | |
|---|---|
| 1ST CLUTCH | DISENGAGED |
| 2ND CLUTCH | ENGAGED |
| 3RD CLUTCH | ENGAGED |

| | |
|---|---|
| START CLUTCH | DISENGAGED |
| 1ST BRAKE | OFF |
| 2ND BRAKE | ON |

| | | | |
|---|---|---|---|
| 1ST CLUTCH | ENGAGED | START CLUTCH | DISENGAGED |
| 2ND CLUTCH | DISENGAGED | 1ST BRAKE | OFF |
| 3RD CLUTCH | ENGAGED | 2ND BRAKE | ON |

F I G. 5 0
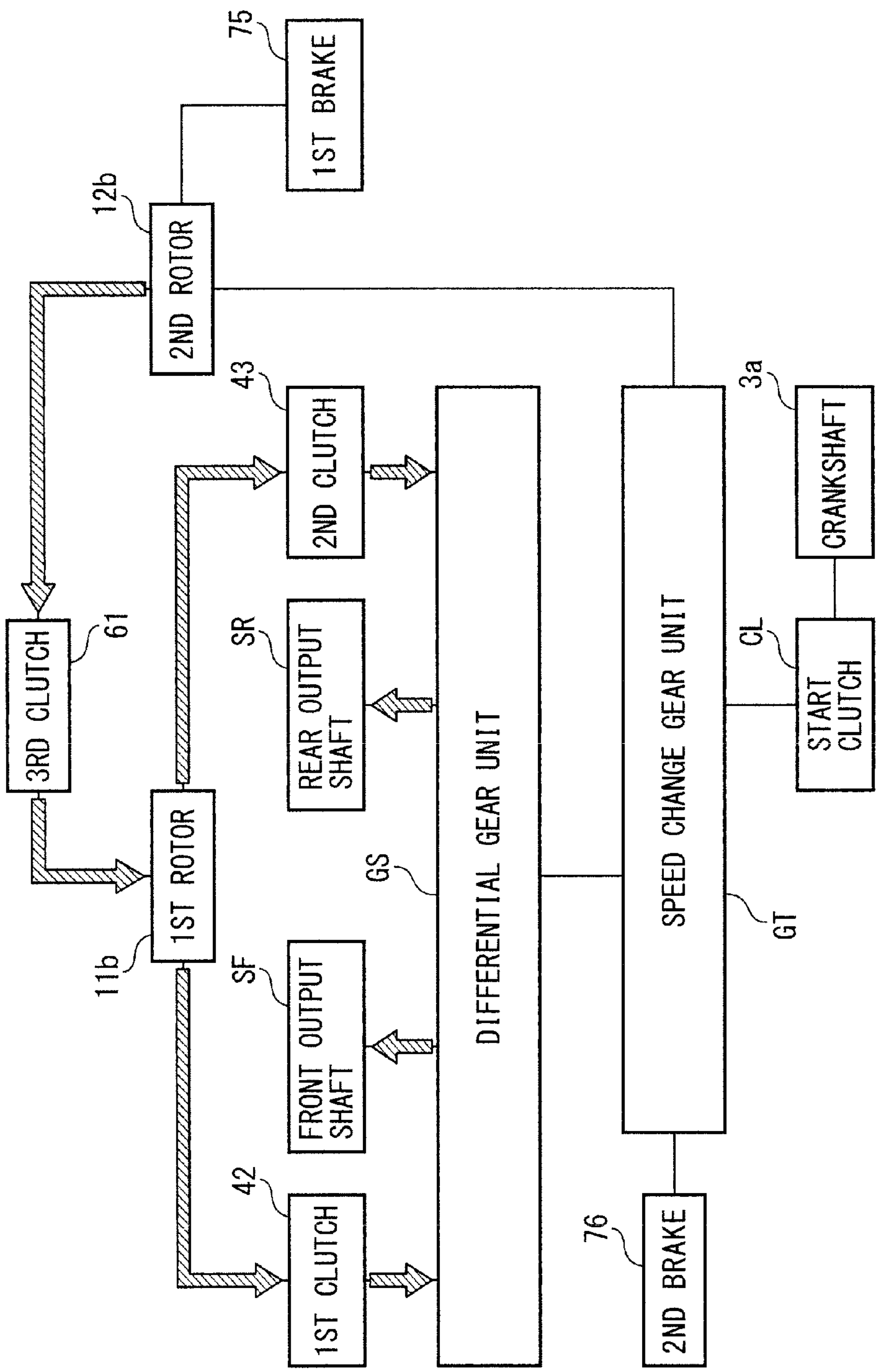
| | |
|---|---|
| 1ST CLUTCH | ENGAGED |
| 2ND CLUTCH | ENGAGED |
| 3RD CLUTCH | ENGAGED |
| | |
|---|---|
| START CLUTCH | DISENGAGED |
| 1ST BRAKE | OFF |
| 2ND BRAKE | OFF |

| | | | |
|---|---|---|---|
| 1ST CLUTCH | DISENGAGED | START CLUTCH | ENGAGED |
| 2ND CLUTCH | ENGAGED | 1ST BRAKE | OFF |
| 3RD CLUTCH | DISENGAGED | 2ND BRAKE | OFF |

| | | | |
|---|---|---|---|
| 1ST CLUTCH | ENGAGED | START CLUTCH | ENGAGED |
| 2ND CLUTCH | ENGAGED | 1ST BRAKE | OFF |
| 3RD CLUTCH | DISENGAGED | 2ND BRAKE | OFF |

| | | | |
|---|---|---|---|
| 1ST CLUTCH | DISENGAGED | START CLUTCH | ENGAGED |
| 2ND CLUTCH | DISENGAGED | 1ST BRAKE | ON |
| 3RD CLUTCH | DISENGAGED | 2ND BRAKE | OFF |

F I G. 5 4
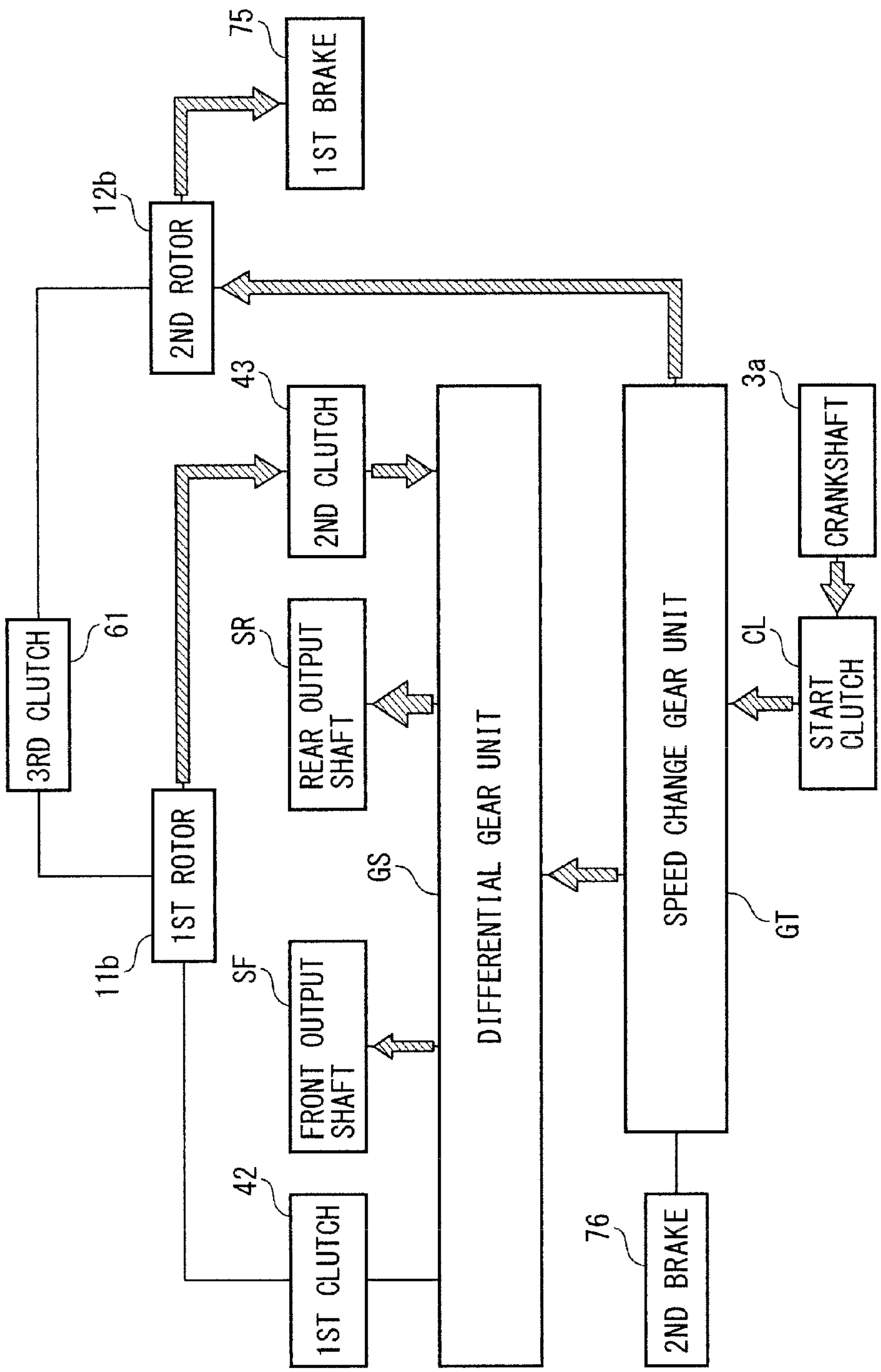
| | |
|---|---|
| 1ST CLUTCH | DISENGAGED |
| 2ND CLUTCH | ENGAGED |
| 3RD CLUTCH | DISENGAGED |
| | |
|---|---|
| START CLUTCH | ENGAGED |
| 1ST BRAKE | ON |
| 2ND BRAKE | OFF |

F I G. 5 5
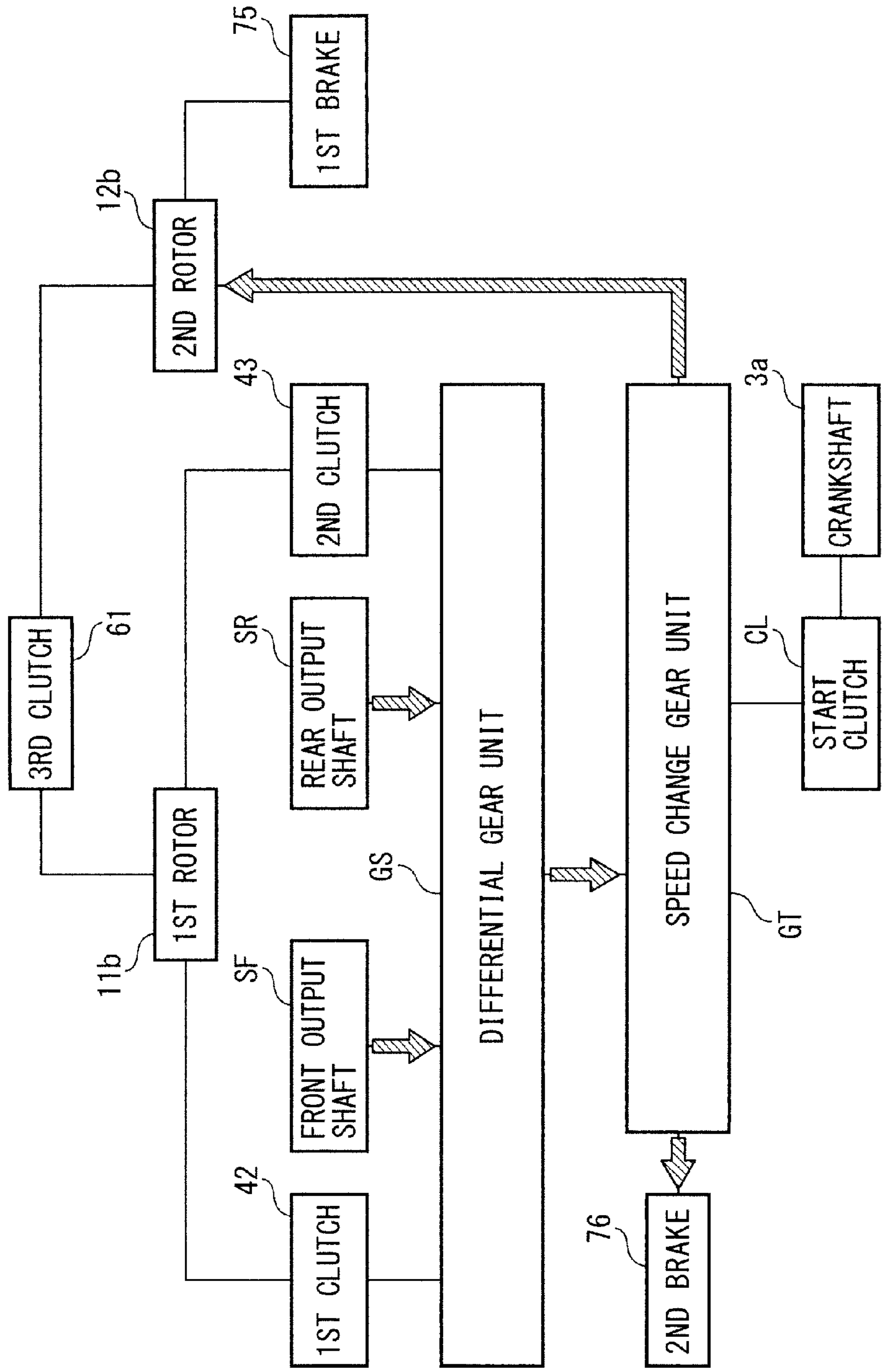
| | |
|---|---|
| 1ST CLUTCH | DISENGAGED |
| 2ND CLUTCH | DISENGAGED |
| 3RD CLUTCH | DISENGAGED |
| | |
|---|---|
| START CLUTCH | DISENGAGED |
| 1ST BRAKE | OFF |
| 2ND BRAKE | ON |

| | |
|---|---|
| 1ST CLUTCH | DISENGAGED |
| 2ND CLUTCH | ENGAGED |
| 3RD CLUTCH | DISENGAGED |
| | |
|---|---|
| START CLUTCH | DISENGAGED |
| 1ST BRAKE | OFF |
| 2ND BRAKE | ON |
F I G. 56
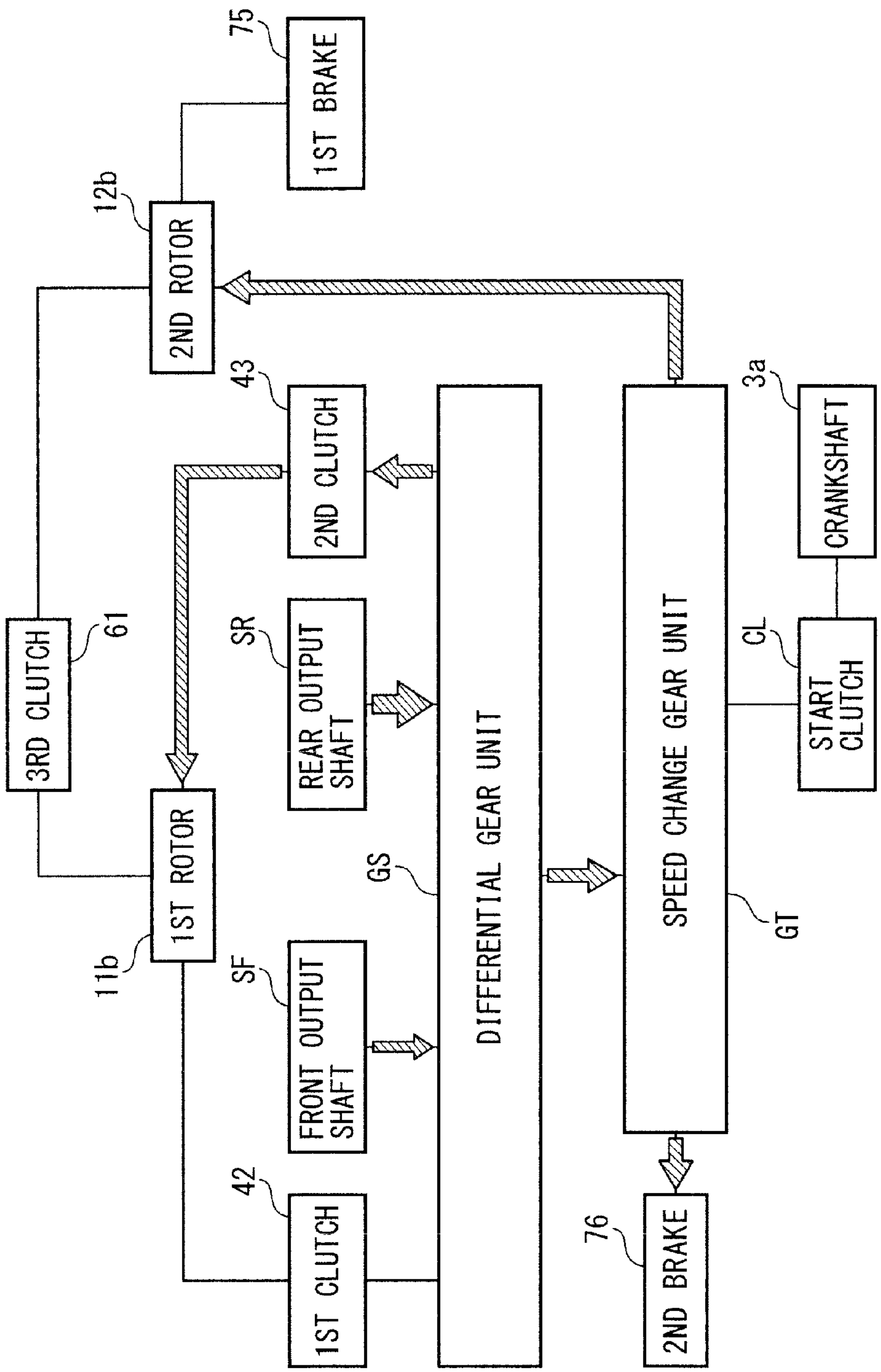

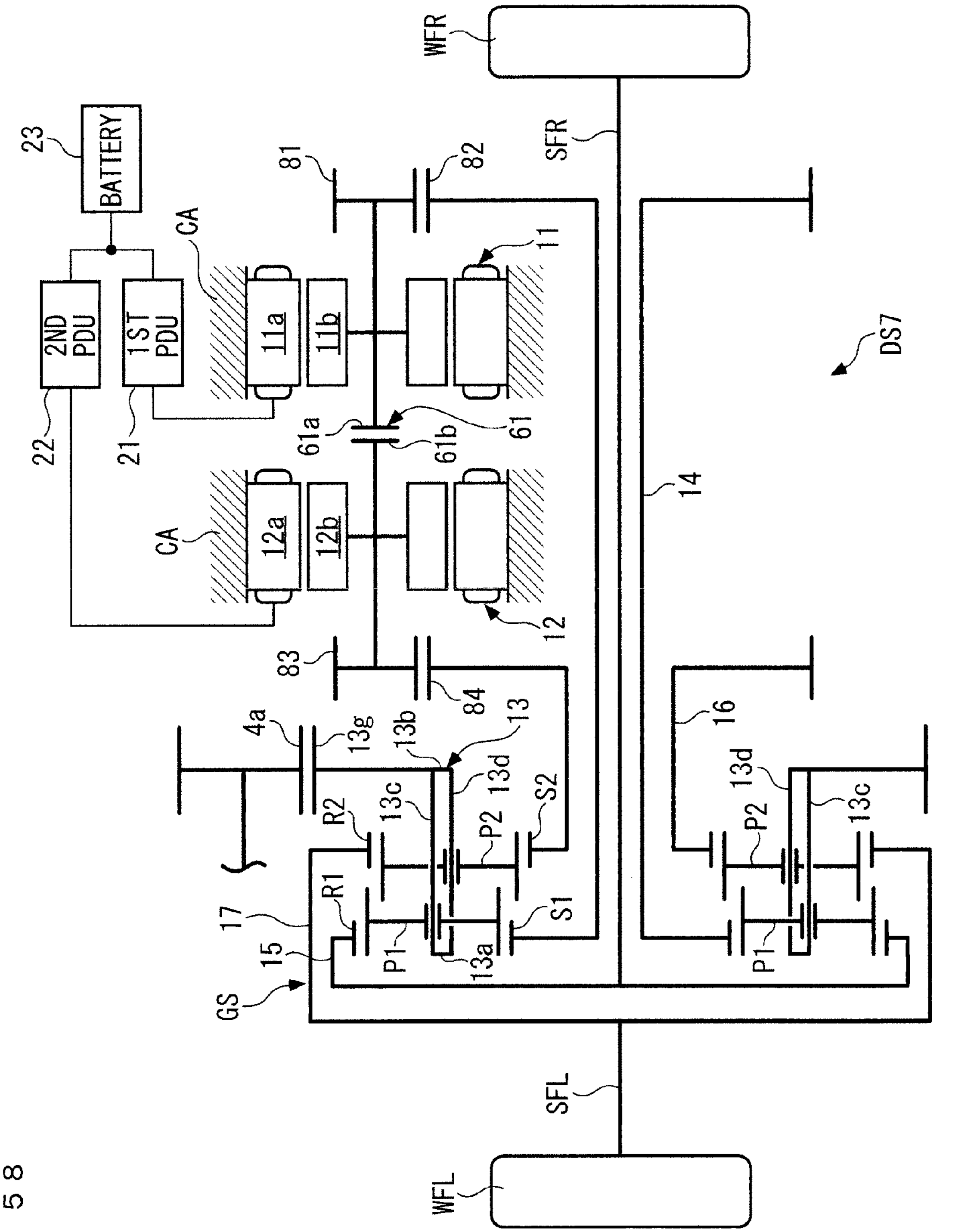
F I G. 5 8

F I G. 59
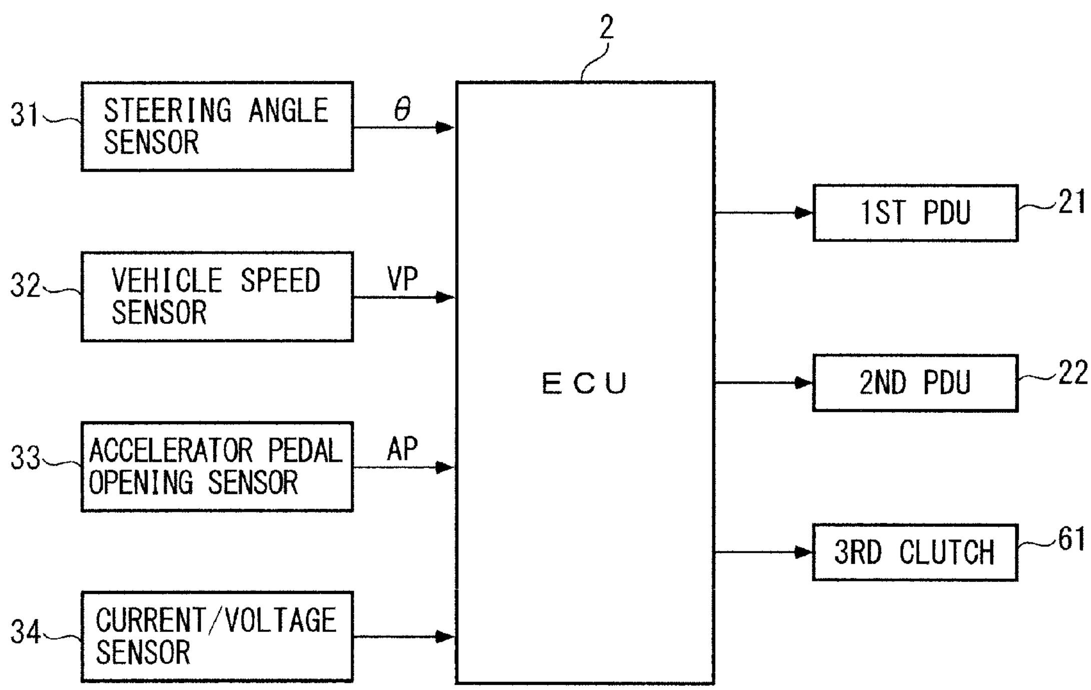

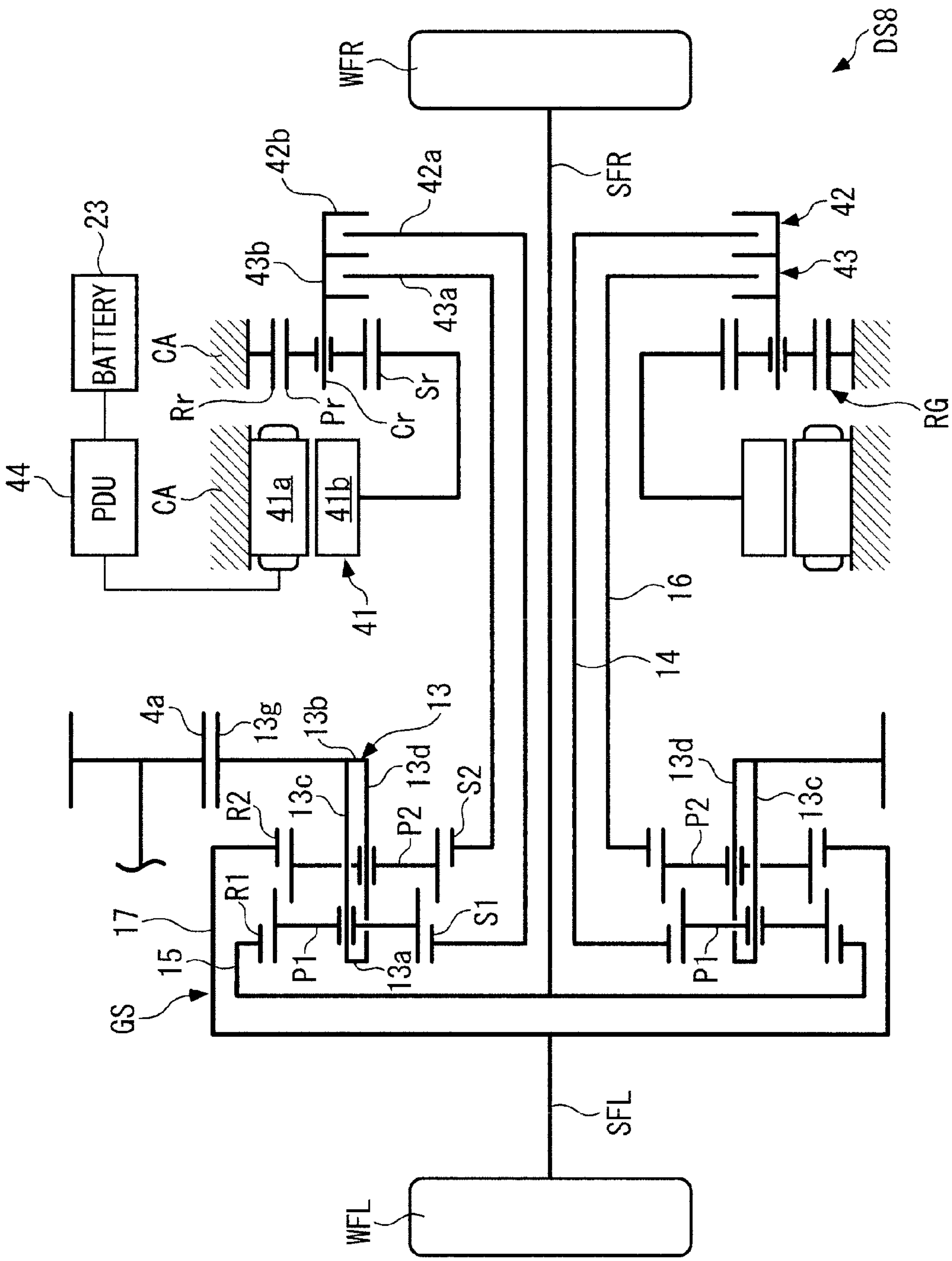
F I G. 6 0

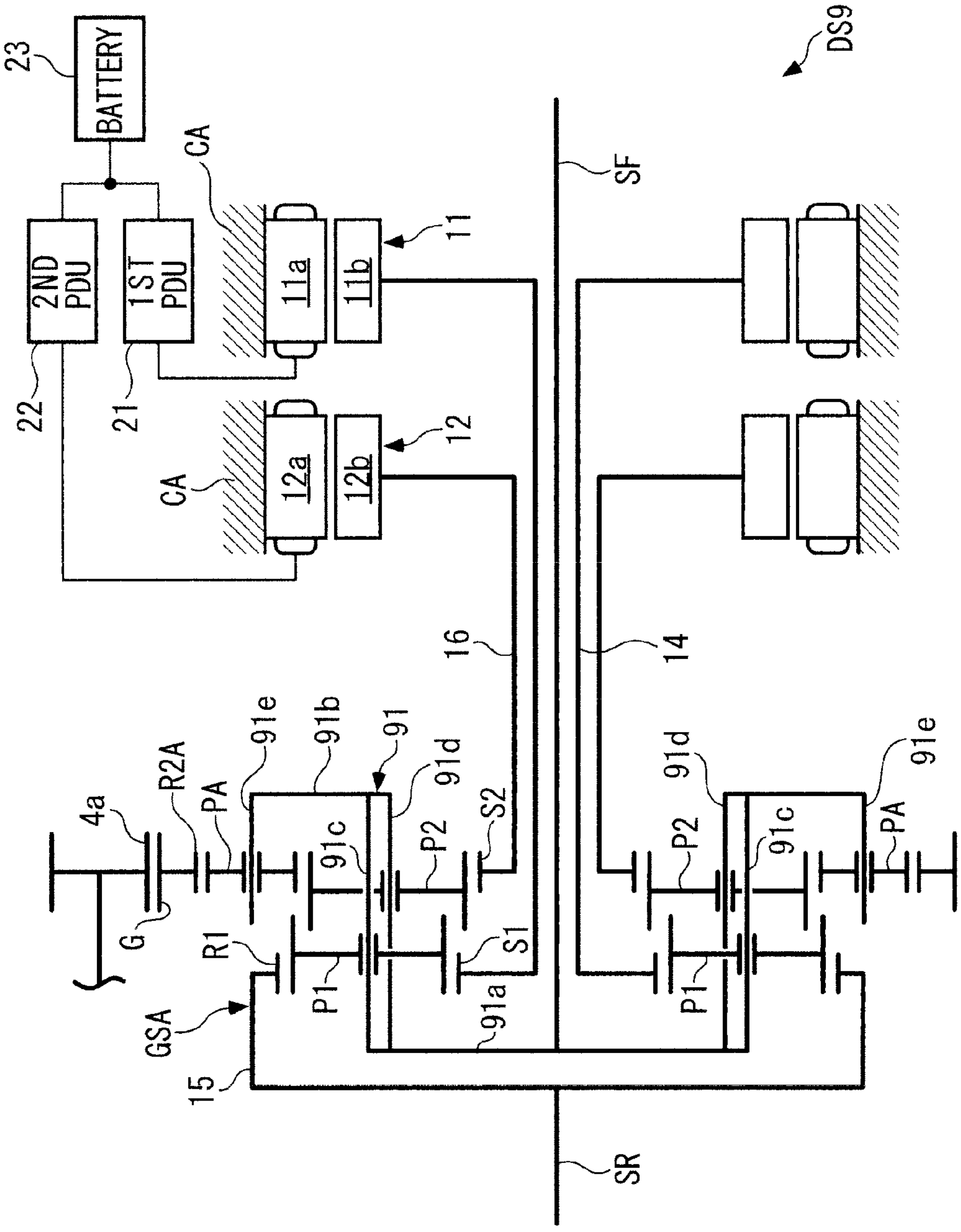
F I G. 6 1

F I G. 6 4
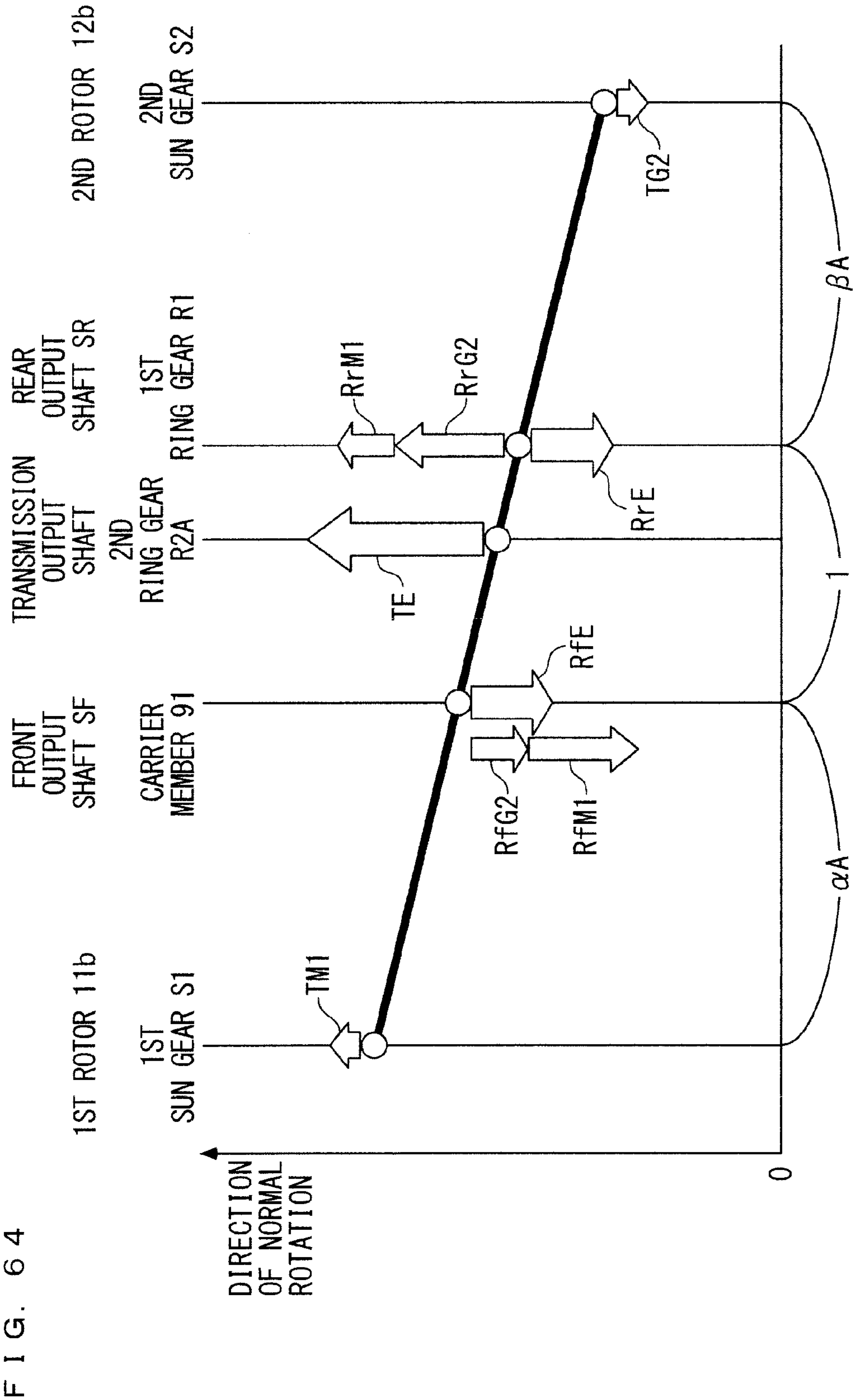

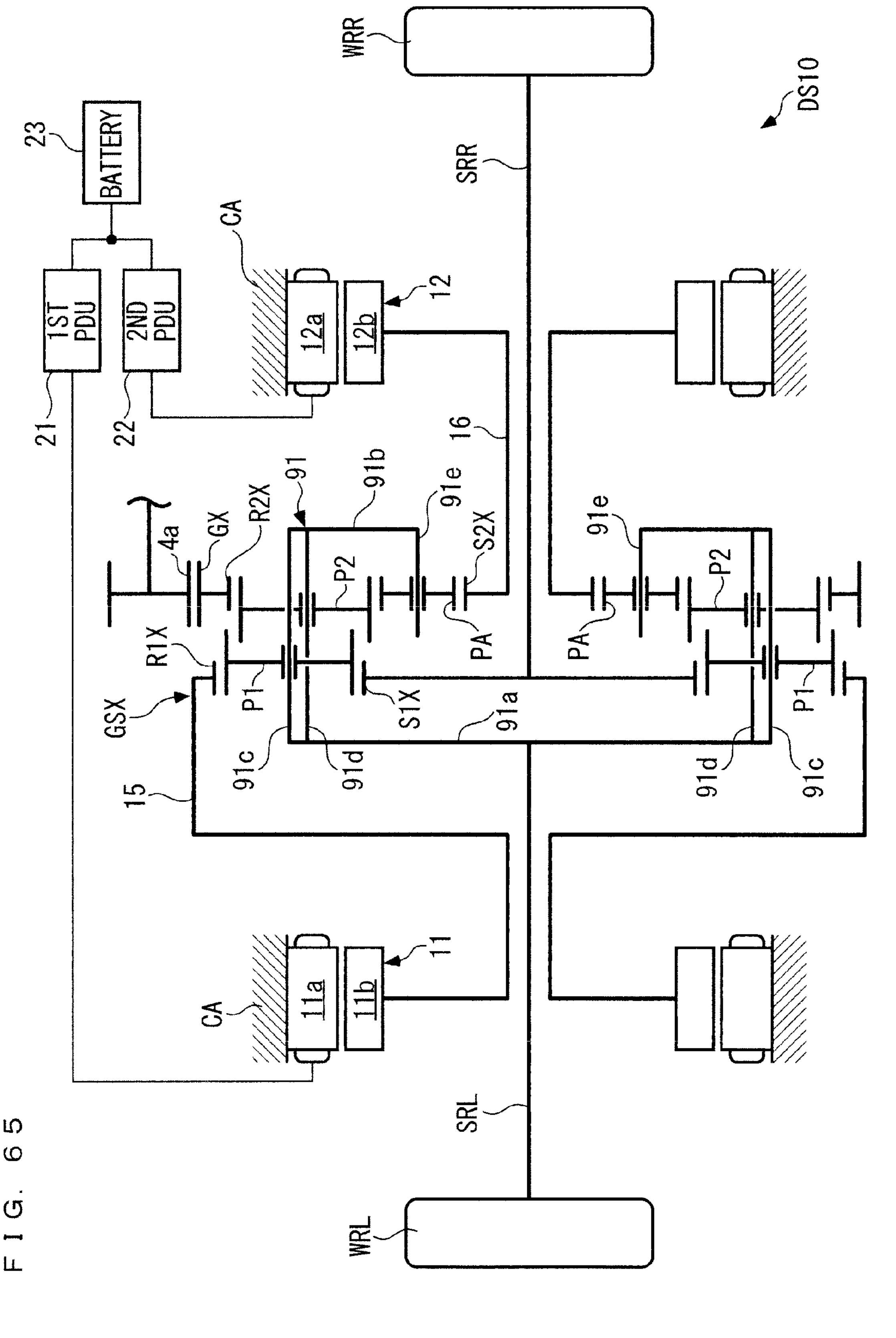
F I G. 6 5

F I G. 6 9
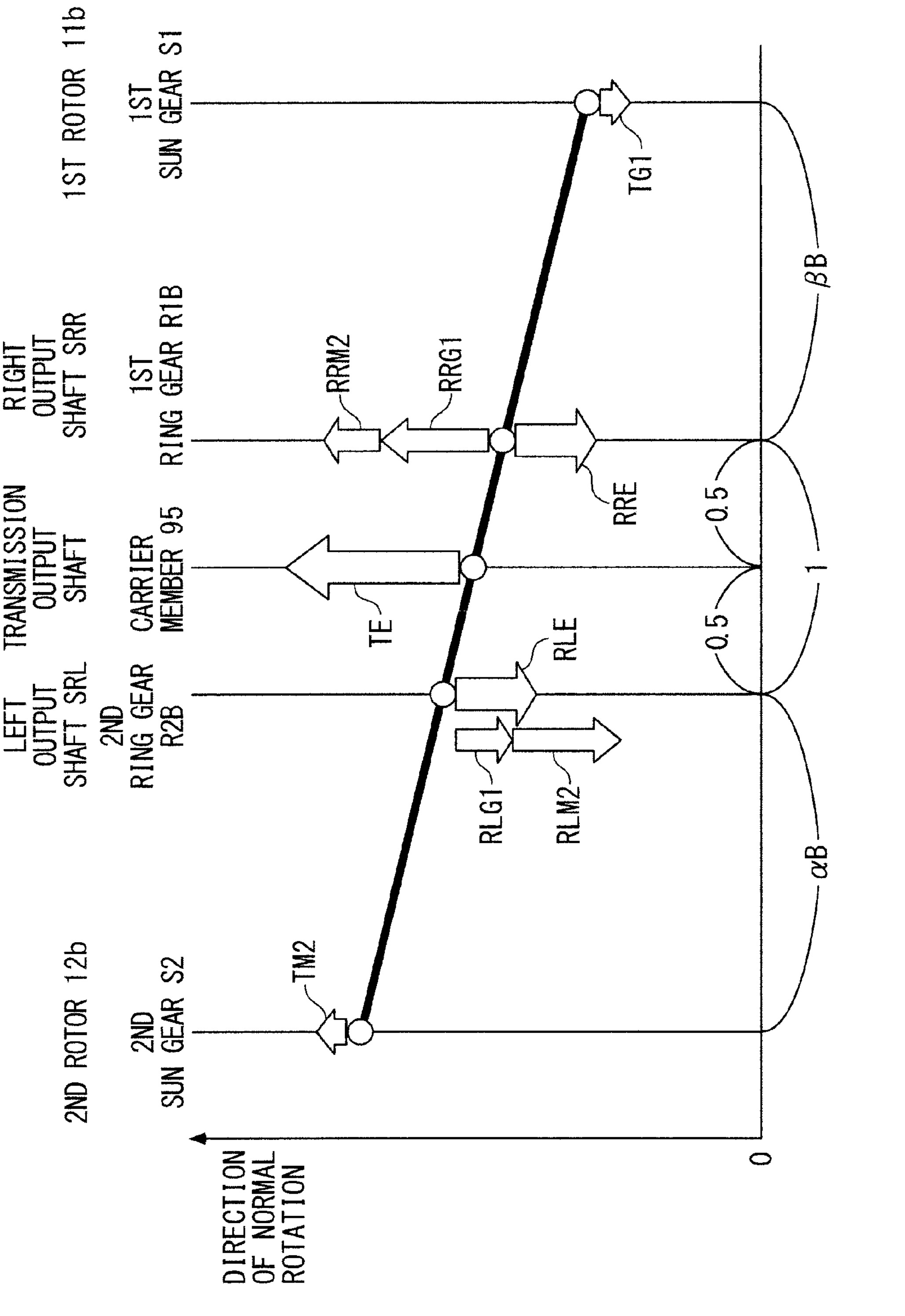

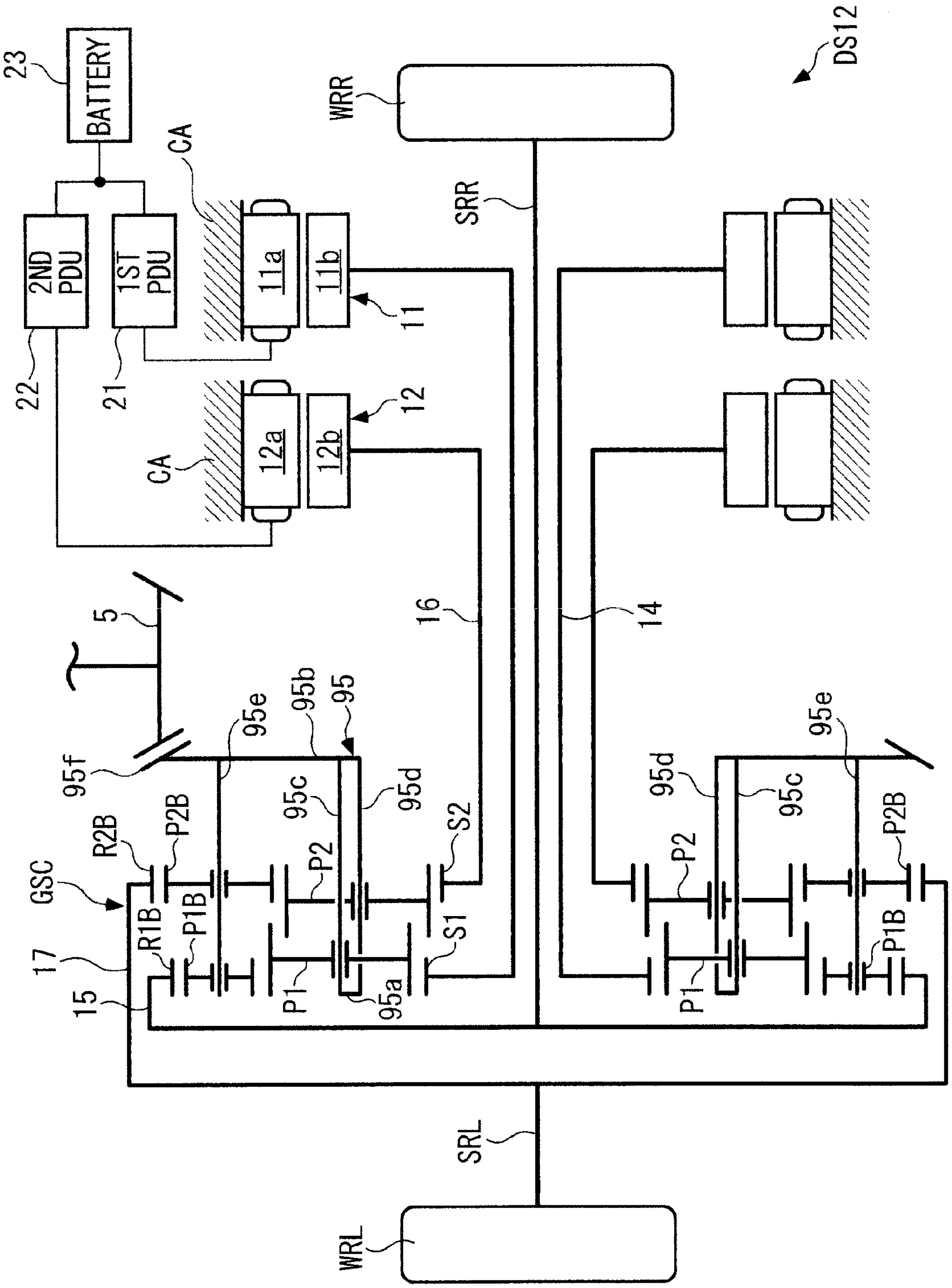
F I G. 7 0

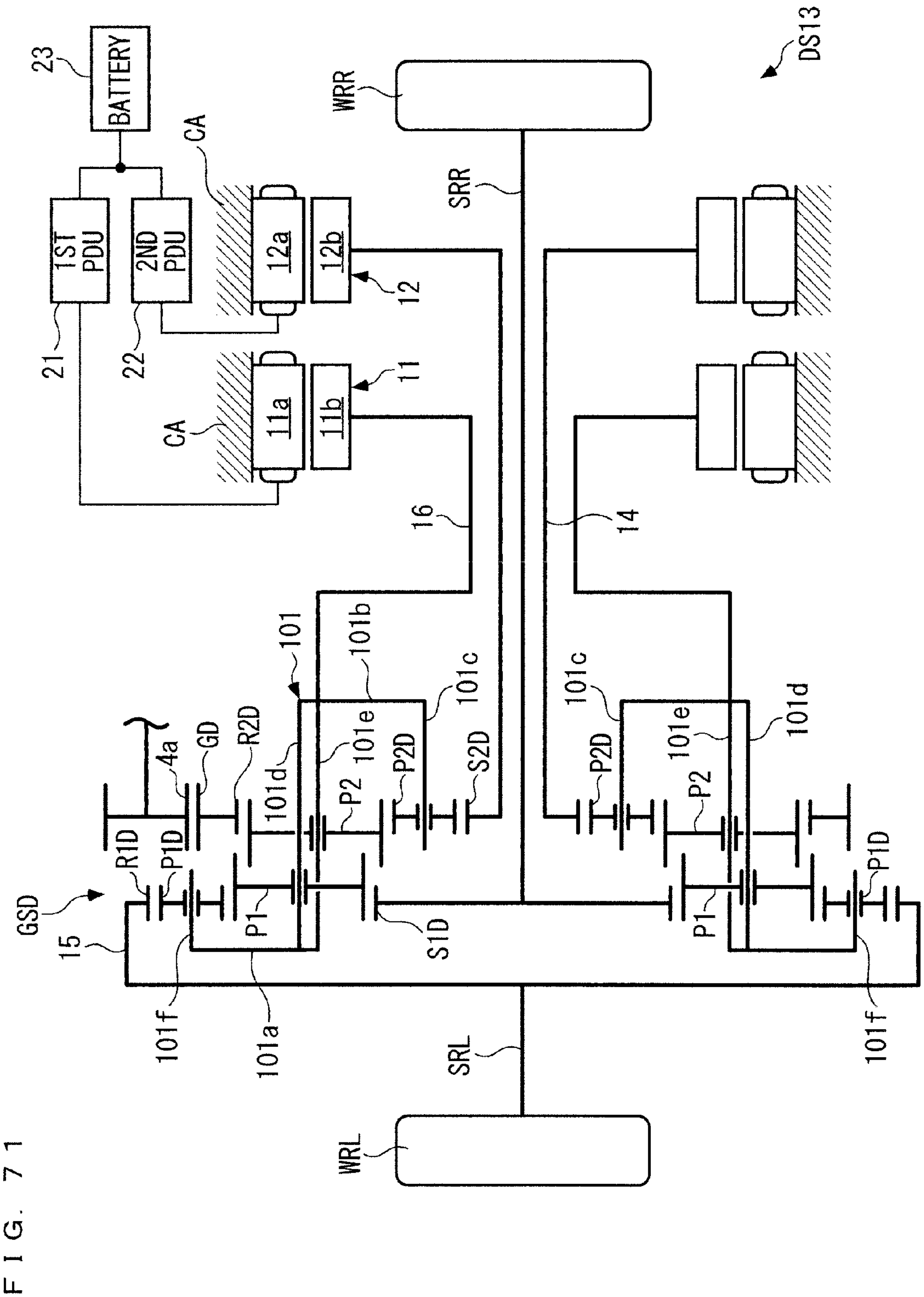
F I G. 7 1

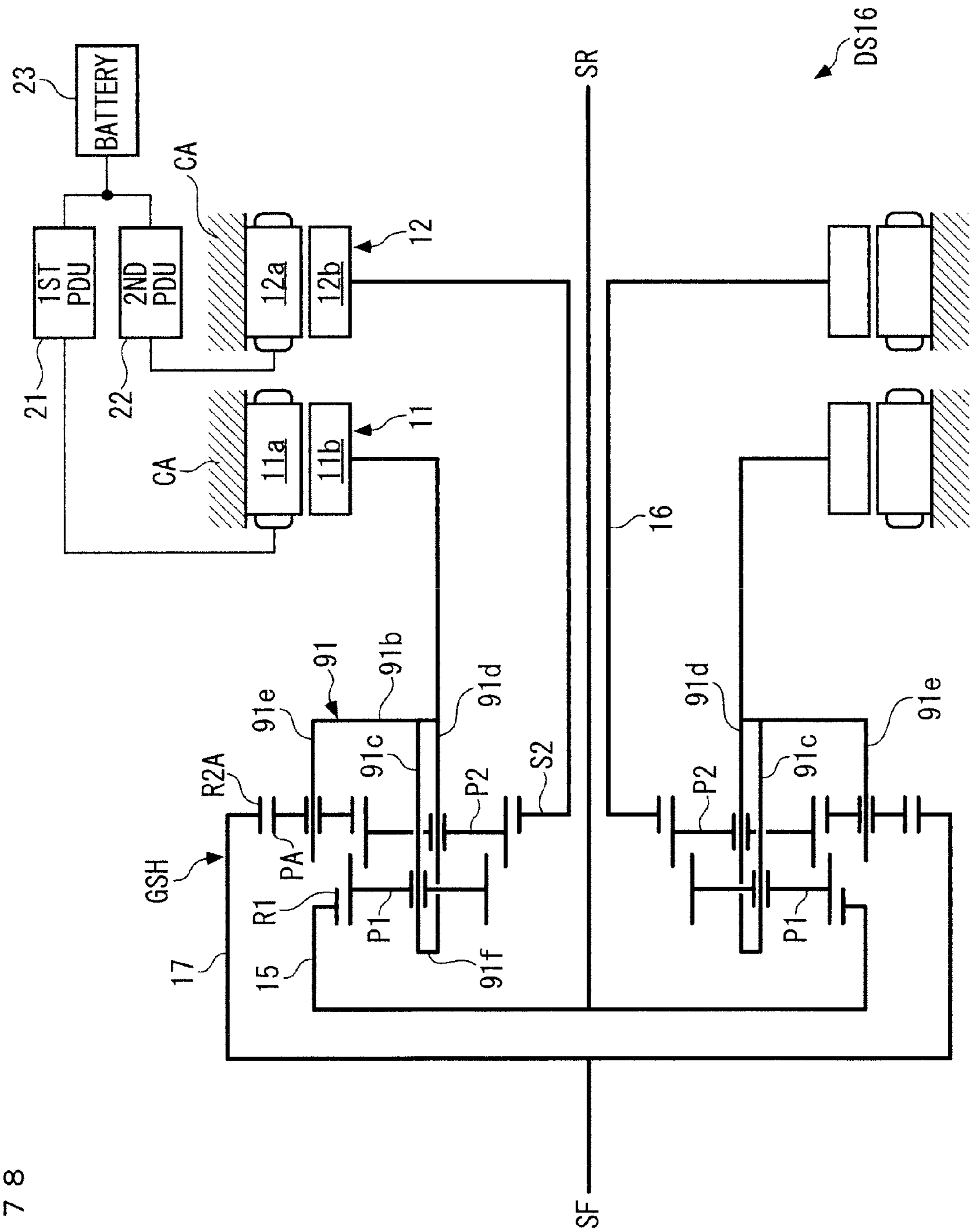
F I G. 7 8

F I G. 89
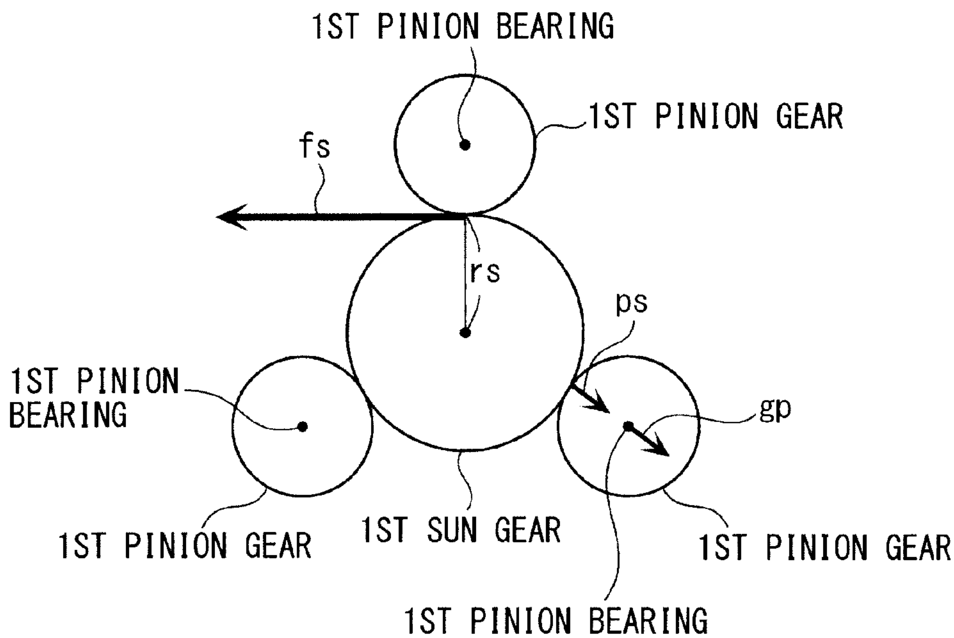
F I G. 90
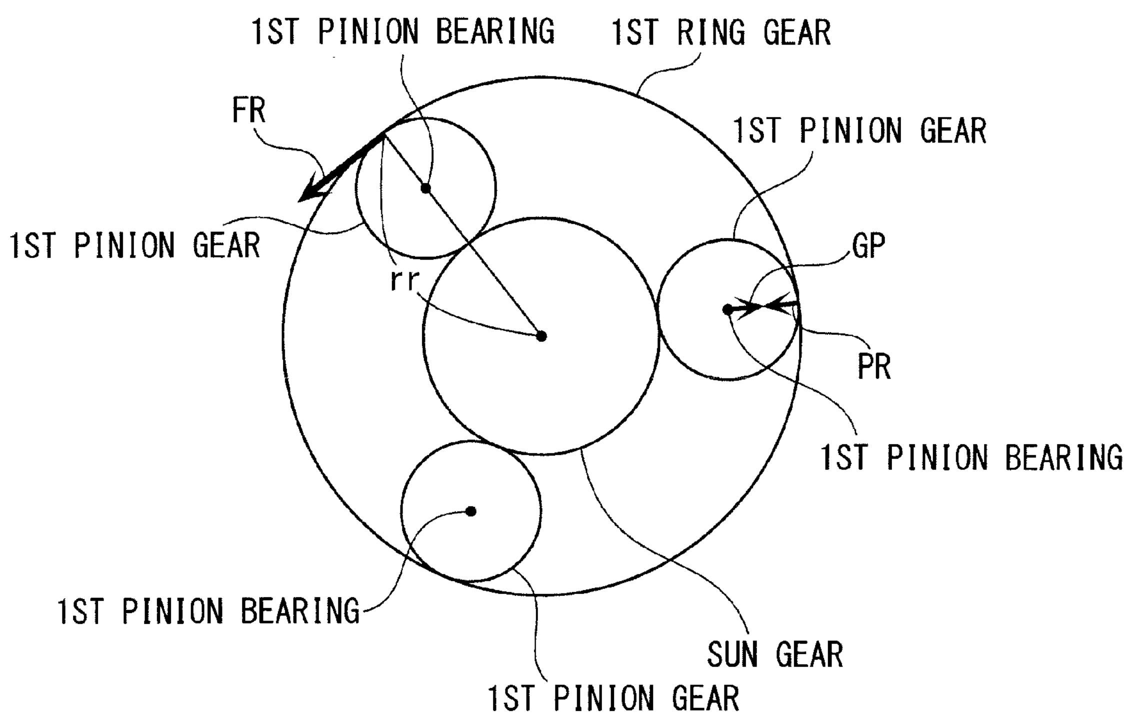

POWER PLANT

FIELD OF THE INVENTION

This invention relates to a power plant for driving driven parts for propelling a vehicle.

BACKGROUND ART

Conventionally, as a power plant of this kind, there has been known one disclosed e.g. in PTL 1. In this power plant, a differential gear unit including first to fourth rotary elements is formed by combining first and second planetary gear units of a so-called single planetary type with each other. The rotational speeds of the first to fourth rotary elements satisfy a collinear relationship in which the rotational speeds are aligned in a single straight line in a collinear chart. Specifically, the first planetary gear unit includes a first sun gear, a first carrier, and a first ring gear, and the second planetary gear unit includes a second sun gear, a second carrier, and a second ring gear. The first sun gear and the second carrier are connected to each other via a hollow cylindrical first rotating shaft, and the first carrier and the second sun gear are connected to each other via a solid second rotating shaft. The second rotating shaft is rotatably disposed inward of the first rotating shaft.

In the differential gear unit constructed as above, the first ring gear corresponds to the first rotary element, the first carrier and the second sun gear connected to each other correspond to the second rotary element, the first sun gear and the second carrier connected to each other correspond to the third rotary element, and the second ring gear corresponds to the fourth rotary element. Further, this conventional power plant is installed on a four-wheel vehicle, with the first rotary element connected to a first rotating electric machine, the second rotary element connected to a left drive wheel, the third rotary element connected to a right drive wheel, and the fourth rotary element connected to a second rotating electric machine. In the power plant, by controlling the first and second rotating electric machines, torque distributed to the left and right drive wheels is controlled.

Further, as the conventional power plant of the above-described kind, there has been known one disclosed e.g. in PTL 2. This conventional power plant is formed by combining first to third planetary gear units of the single planetary type with each other, and includes first to fifth elements that can transmit motive power therebetween. As shown in FIG. 88, these first to fifth elements are configured such that the rotational speeds thereof satisfy a collinear relationship, and in a collinear chart representing the collinear relationship, the rotational speeds of the first to fifth elements are aligned in a single straight line, in the mentioned order. Specifically, the first planetary gear unit includes a first sun gear, a first carrier, and a first ring gear, and the second planetary gear unit includes a second sun gear, a second carrier, and a second ring gear. The third planetary gear unit includes a third sun gear, a third carrier, and a third ring gear. The first carrier and the third ring gear are integrally connected to each other, the third carrier and the first and second ring gears are integrally connected to each other, and the second carrier and the third sun gear are integrally connected to each other, whereby the above-described first to fifth elements are formed.

Further, the conventional power plant is installed on a four-wheel vehicle, with the first element connected to a first rotating electric machine, the second element connected to a left drive wheel, the third element connected to an engine, the fourth element connected to a right drive wheel, and the fifth element connected to a second rotating electric machine. By controlling the first and second rotating electric machines, torque distributed to the left and right drive wheels is controlled.

CITATION LIST

Patent Literature

[PTL 1] Publication of Japanese Patent No. 4637136
[PTL 2] Publication of Japanese Patent No. 5153587

SUMMARY OF INVENTION

Technical Problem

In the above-described power plant disclosed in PTL 1, to form the first to fourth rotary elements, the six rotary elements formed by the first and second sun gears, the first and second carriers, and the first and second ring gears, and the first rotating shaft connecting the first sun gear and the second carrier to each other, and the second rotating shaft connecting the first carrier and the second sun gear to each other are required. This makes the number of the elements forming the power plant relatively large, which leads to an increased size, an increased weight, and increased manufacturing costs of the power plant.

Further, in the power plant disclosed in PTL 2, since the first to fifth elements are formed by combining the three planetary gear units comprised of the first to third planetary gear units, it is inevitable that the number of component parts is increased, which leads to an increased size, an increased weight, and increased manufacturing costs of the power plant, similarly to the case of PTL 1.

The present invention has been made to provide a solution to the above-described problems, and an object thereof is to provide a power plant which is capable of being easily constructed, and achieving downsizing, weight reduction, and manufacturing cost reduction thereof.

Solution to Problem

To attain the above object, the invention according to claim 1 is a power plant for driving two driven parts (left and right output shafts SRL, SRR, left and right output shafts SFL, SFR, front and rear output shafts SF, SR) for propelling a vehicle (vehicle VFR, VFF, VAW (hereinafter, the same applies throughout this section)), comprising a first energy input/output unit (first rotating electric machine 11) that is capable of inputting and outputting rotational energy, a second energy input/output unit (second rotating electric machine 12) that is capable of inputting and outputting rotational energy, a differential gear unit GSG to GSL that includes a carrier (FIG. 76, FIG. 78, FIG. 80, carrier member 91, FIG. 82, FIG. 84, carrier member 95, FIG. 86, carrier member 101) rotatably supporting a first pinion gear (FIG. 82, FIG. 84, pinion gear P1B, FIG. 86, pinion gears PID) and a second pinion gear (FIG. 78, pinion gears PA, FIG. 82, FIG. 84, pinion gears P2B, FIG. 86, pinion gears P2D) that are in mesh with each other, a first gear (FIG. 76, FIG. 84, first sun gear S1, FIG. 78, FIG. 82, second sun gear S2, FIG. 80, second sun gear S2X, FIG. 86, second sun gear S2D) and a second gear (FIG. 76, first ring gear R1, FIG. 78, second ring gear R2A, FIG. 80, second ring gear R2X, FIG. 82, second ring gear R2B, FIG. 84, first ring gear R1B, FIG. 86, second ring gear R2D) that are in mesh with one of the first and second pinion gears, and a third gear (FIG. 76, second sun gear S2, FIG. 78, first ring gear R1, FIG. 80, first ring gear R1X, FIG. 82, first sun gear S1, FIG. 84, second ring gear R2B, FIG. 86, first ring gear R1D) that is in mesh with the other of the first and second pinion gears, four rotary elements formed by the carrier and the first to third gears being configured such that rotational speeds of the four rotary elements satisfy a collinear relationship in which the rotational speeds are aligned in a single straight line in a collinear chart, wherein out of the four rotary elements, first and second outer rotary elements (FIG. 77, FIG. 83, first sun gear S1, second sun gear S2, FIG. 79, carrier member 91, second sun gear S2, FIG. 81, second sun gear S2X, first ring gear R1X, FIG. 85, first sun gear S1, second ring gear R2B, FIG. 87, second sun gear S2D, carrier member 101) that are positioned at opposite outer sides of the straight line in the collinear chart, respectively, are mechanically connected to the first and second energy input/output units, respectively, and first and second quasi-outer rotary elements (FIG. 77, carrier member 91, first ring gear R1, FIG. 79, second ring gear R2A, first ring gear R1, FIG. 81, second ring gear R2X, carrier member 91, FIG. 83, second ring gear R2B, carrier member 95, FIG. 85, first ring gear R1B, carrier member 95, FIG. 87, second ring gear R2D, first ring gear R1D) that are positioned adjacent to the first and second outer rotary elements, respectively, are mechanically connected to one and the other of the two driven parts, respectively.

With this arrangement, the differential gear unit that includes the four rotary elements formed by the carrier rotatably supporting the first and second pinion gears which are in mesh with each other, the first and second gears which are in mesh with one of the first and second pinion gears, and the third gear which is in mesh with the other of the first and second pinion gears. Further, the rotational speeds of the four rotary elements are in the collinear relationship in which the rotational speeds are aligned in a single straight line in the collinear chart.

As described above, differently from the above-described conventional case, simply by bringing the first and second pinion gears into mesh with each other, as well as by bringing the first and second gears into mesh with one of the first and second pinion gears, and bringing the third gear into mesh with the other of the first and second pinion gears, it is possible to easily form the four rotary elements, the rotational speeds of which are in the collinear relationship with each. Further, differently from the above-described conventional case of PTL 1, it is possible to dispense with the first rotating shaft for connecting the first sun gear and the second carrier to each other, and the second rotating shaft for connecting the first carrier and the second sun gear to each other. Further, a differential gear unit equivalent to the differential gear unit of the power plant disclosed in PTL 1 can be formed by the four rotary elements (the carrier and the first to third gears) smaller in number than the number (six) of the rotary elements of the power plant disclosed in PTL 1. Therefore, it is possible to reduce the number of component parts of the whole power plant, thereby making it possible to attain downsizing, weight reduction, and manufacturing cost reduction of the power plant.

Further, out of the four rotary elements, the first and second outer rotary elements, which are positioned on opposite outer sides of the collinear chart, respectively, are mechanically connected to the first and second energy input/output units, respectively, and the respective first and second quasi-outer rotary elements that are positioned adjacent to the first and second outer rotary elements, are mechanically connected to the one and the other of the two driven parts, respectively. This makes it possible to transmit the rotational energy output from the first and second energy input/output units to the two driven parts via the differential gear unit, and properly drive the two driven parts. In this case, as described above, the rotational speeds of the four rotary elements are in the collinear relationship with each other, and hence by controlling input and output of rotational energy to and from the first and second energy input/output units, it is possible to properly control rotational energy (torque) distributed to the two driven parts.

The invention according to claim 2 is the power plant according to claim 1, wherein the differential gear unit GS, GSA, GSX, GSB to GSD, GSF further includes a fourth gear (FIG. 2, FIG. 74, second ring gear R2, FIG. 61, first sun gear S1, FIG. 65, first sun gear S1X, FIG. 67, first ring gear R1B, FIG. 70, second sun gear S2, FIG. 71, first sun gear S1D) that is in mesh with the other of the first and second pinion gears, wherein rotational speeds of five rotary elements formed by the fourth gear, the carrier, and the first to third gears satisfy a collinear relationship in which the rotational speeds are aligned in a single straight line in a collinear chart, and wherein out of the five rotary elements, the first and second outer rotary elements (FIG. 5, FIG. 64, FIG. 69, FIG. 75, first sun gear S1, second sun gear S2, FIG. 66, first ring gear R1X, second sun gear S2X, FIG. 73, carrier member 101, second sun gear S2D) are mechanically connected to the first and second energy input/output units, respectively, and the first and second quasi-outer rotary elements (FIG. 5, FIG. 75, second ring gear R2, first ring gear R1, FIG. 64, carrier member 91, first ring gear R1, FIG. 66, carrier member 91, first sun gear S1X, FIG. 69, first ring gear R1B, second ring gear R2B, FIG. 73, first ring gear R1D, first sun gear S1D) are mechanically connected to the one and the other of the two driven parts, respectively.

With this arrangement, the differential gear unit further includes the fourth gear that is in mesh with the other of the first and second pinion gears, in addition to the first to third gears, described in the description of the invention of claim 1, and the rotational speeds of the five rotary elements formed by the carrier and the first to fourth gears satisfy the collinear relationship in which the rotational speeds are aligned in a single straight line in the collinear chart.

As described above, differently from the above-described conventional case of PTL 2, which uses the first to third planetary gear units, simply by combining two planetary gear units formed by the first and second planetary gear units, it is possible to easily form the five rotary elements, the rotational speeds of which are in the collinear relationship with each, and reduce the number of component parts of the whole power plant, whereby it is possible to attain downsizing, weight reduction, and manufacturing cost reduction of the power plant.

Further, out of the five rotary elements, the first and second outer rotary elements, which are positioned on opposite outer sides of the collinear chart, respectively, are mechanically connected to the first and second energy input/output units, respectively, and the respective first and second quasi-outer rotary elements that are positioned adjacent to the first and second outer rotary elements, are mechanically connected to the one and the other of the two driven parts, respectively. As a consequence, similarly to the invention according to claim 1, it is possible to properly control rotational energy (torque) distributed to the two driven parts.

The invention according to claim 3 is the power plant according to claim 2, further including an energy output unit (engine 3) that is capable of outputting rotational energy and is provided separately from the first and second energy input/output units, and wherein a central rotary element (FIG. 5, carrier member 13, FIG. 64, second ring gear R2A, SIG. 66, second ring gear R2X, FIG. 69, carrier member 95, FIG. 73, second ring gear R2D) which is a rotary element other than the first and second outer rotary elements and the first and second quasi-outer rotary elements of the five rotary elements is mechanically connected to the energy output unit.

With this arrangement, out of the five rotary elements, the central rotary element which is a rotary element other than the first and second outer rotary elements and the first and second quasi-outer rotary elements is mechanically connected to the energy output unit capable of outputting rotational energy, and this energy output unit is provided separately from the first and second energy input/output units. With the above, not only the rotational energy from the first and second energy input/output units but also the rotational energy from the energy output unit is transmitted to the two driven parts, and hence it is possible to reduce torque demanded of the first and second energy input/output units. This makes it possible to downsize both of the energy input/output units.

The invention according to claim 4 is the power plant according to claim 1, wherein the first gear is one of a first sun gear S1 that is provided on an inner periphery of the first pinion gear P1 and is in mesh with the first pinion gear P1, and a second sun gear that is provided on an inner periphery of the second pinion gear P2 and is in mesh with the second pinion gear P2, wherein when the first gear is the first sun gear S1, the second gear is a first ring gear R1 that is provided on an outer periphery of the first pinion gear P1 and is in mesh with the first pinion gear P1, and the third gear is one of the second sun gear S2 (FIG. 76) that is provided on the inner periphery of the second pinion gear P2 and is in mesh with the second pinion gear P2, and a second ring gear that is provided on an outer periphery of the second pinion gear P2 and is in mesh with the second pinion gear P2, and wherein when the first gear is the second sun gear, the second gear is the second ring gear, and the third gear is one of the first sun gear and the first ring gear.

With this arrangement, the first and second gears are the first (second) sun gear and the first (second) ring gear in mesh with the first (second) pinion gear, respectively. Further, the third gear is one of the second (first) sun gear and the second (first) ring gear in mesh with the second (first) pinion gear. This makes it possible to properly form the differential gear unit including the four rotary elements, the rotational speeds of which are in the collinear relationship with each, and therefore, it is possible to properly obtain the advantageous effects provided by the invention according to claim 1. Further, for example, when the first gear is the first sun gear, and also the third gear is the second sun gear, the relationship between the rotational speeds of the four rotary elements formed by the first sun gear, the carrier (carrier member), the first ring gear, and the second sun gear is expressed as in FIG. 77, referred to hereinafter.

In FIG. 77, $\alpha$A and $\beta$A represent first and second lever ratios (torque ratio·speed ratio), respectively. The former $\alpha$A represents a ratio of torque transmitted to the carrier member and the first ring gear to torque transmitted to the first sun gear, and the latter $\beta$A represents a ratio of torque transmitted to the carrier member and the first ring gear to torque transmitted to the second sun gear. Further, the first and second lever ratios $\alpha$A and $\beta$A are expressed by equations (3) and (4), referred to hereinafter, respectively.

On the other hand, FIG. 88 shows a rotational speed relationship and a torque balance relationship between various types of rotary elements of the above-described conventional power plant disclosed in PTL 2. In FIG. 88, A1 and A2 represent the first and second lever ratios (torque ratio·speed ratio), respectively. The former A1 represents a ratio of torque transmitted to the second and fourth elements via the first element to torque transmitted to the first element, and the latter A2 represents a ratio of torque transmitted to the second and fourth elements via the fifth element to torque transmitted to the fifth element. For this reason, to accurately and easily control torque distributed from the first and second rotating electric machines to the left and right drive wheels via the differential gear unit, it is preferable that the two A1 and A2 are set to the same value.

In the conventional power plant, to set the first and second lever ratios A1 and A2 to the same value, it is required that $Zr1/Zs1=(Zr2\times Zr3)/(Zs2\times Zs3)$ holds between the tooth numbers of the gears. In this equation, Zr1 represents the tooth number of the first ring gear, and Zs1 represents the tooth number of the first sun gear. Further, Zr2 represents the tooth number of the second ring gear, and Zr3 represents the tooth number of the third ring gear. Zs2 represents the tooth number of the second sun gear, and Zs3 represents the tooth number of the third sun gear. As described above, to set the first and second lever ratios A1 and A2 to the same value, it is required to set the tooth numbers of a total of six gears, i.e. the first to third sun gears and the first to third ring gears, to different values from each other, such that the above settings of A1 and A2 are satisfied. It is very difficult and troublesome to make the settings.

In contrast, according to the present invention, as is apparent from these equations (3) and (4), by setting a total of three tooth numbers, e.g. the tooth number of the first ring gear, and the tooth numbers of the first and second sun gears, to different values from each other, it is possible to easily set the first and second lever ratios $\alpha$A and $\beta$A to the same value. As a consequence, it is possible to more properly control rotational energy distributed from the first and second energy input/output units to the first and second driven parts via the differential gear unit.

Note that although FIG. 77 is a collinear chart in a case where first and second rotating electric machines 11 and 12, described hereinafter, are used as the first and second energy input/output units, and front and rear output shafts SF and SR, described hereinafter, are used as the two driven parts, this is only by way of example, and it is to be understood that any other suitable energy input/output units and driven parts may be used.

Further, as shown in FIG. 77, not the first and second sun gears but the carrier (carrier member) and the first ring gear corresponding to the first and second quasi-outer rotary elements, respectively, are connected to the one and the other of the two driven parts (front and rear output shafts SF and SR), and hence it is possible to obtain the following advantageous effects:

In a case, differently from the present invention, where the first sun gear is connected to the driven parts, relatively large torque is sometimes transmitted to the first sun gear. However, as shown in FIG. 89, a meshing radius rs of the first sun gear is relatively small, and torque transmitted from the first sun gear to the driven parts is represented by the product of the meshing radius rs and engagement reaction force fs in the tangential direction acting on the first sun gear, and hence in accordance with transmission of the large torque to the driven parts, a very large engagement reaction force fs acts on the first sun gear. For this reason, to withstand such engagement reaction force fs, it is required to set the tooth width of the first sun gear to a large value, which increases the size of the power plant.

Further, as shown in FIG. 89, a centrifugal force gp acts on a bearing supporting the first pinion gear (hereinafter referred to the "first pinion bearing") along with rotation of the first pinion gear. Further, in accordance with transmission of large torque from the first sun gear to the right output shaft, a relatively large engagement reaction force ps in the direction of normal acts on the first pinion gears from the first sun gear. This engagement reaction force ps acts on the first pinion bearing in the same direction as the direction of the above-mentioned centrifugal force gp. Note that in FIG. 89, only the centrifugal force gp and the engagement reaction force ps are illustrated which act on a pinion bearing supporting a first pinion gear located at the lower right of the figure, for convenience. As described above, a very large resultant force obtained by adding the centrifugal force gp caused by rotation of the first pinion gear and the large engagement reaction force ps from the first sun gear acts on the first pinion bearing, and hence to ensure sufficient durability of the first pinion bearing, it is inevitable to increase the size of the first pinion bearing, which also causes an increase in the size of the power plant.

According to the present invention, not the sun gears but the carrier member and the first ring gear are connected to the one and the other of the two driven parts. As shown in FIG. 90, since a meshing radius rr of the first ring gear is relatively large, and torque transmitted from the first ring gear to the other of the driven parts is represented by the product of the meshing radius rr and an engagement reaction force FR acting on the first ring gear, the engagement reaction force FR acting on the first ring gear in accordance with the transmission of the torque to the other of the driven parts becomes smaller than the case of the first sun gear described with reference to FIG. 89. Therefore, it is possible to set the tooth width of the first ring gear to a relatively small value, whereby it is possible to further downsize the power plant.

Furthermore, as shown in FIG. 90, a centrifugal force GP acts on the first pinion bearing along with rotation of the first pinion gear. Further, an engagement reaction force PR from the first ring gear acts on the first pinion gear in accordance with transmission of torque from the first ring gear to the one rotating shaft. This engagement reaction force PR acts on the first pinion bearing in a direction opposite to the direction of the above-mentioned centrifugal force GP. As a consequence, since the centrifugal force GP and the engagement reaction force PR act on the first pinion bearing such that they are offset by each other, it is possible to downsize the first pinion bearing in comparison with the above-described case in which the first sun gear is connected to the driven part, which also makes it possible to downsize the power plant. Note that in FIG. 90, only the centrifugal force GP and the engagement reaction force PR are illustrated which act on a first pinion bearing supporting a first pinion gear located on the right side, as viewed in the figure, for convenience.

The invention according to claim 5 is the power plant according to claim 2 or 3, wherein the first gear is a first sun gear S1 that is provided on an inner periphery of the first pinion gear P1 and is in mesh with the first pinion gear P1, wherein the second gear is a first ring gear R1 that is provided on an outer periphery of the first pinion gear P1 and is in mesh with the first pinion gear P1, wherein the third gear is a second sun gear S2 that is provided on an inner periphery of the second pinion gear P2 and is in mesh with the second pinion gear P2, and wherein the fourth gear is a second ring gear R2 that is provided on an outer periphery of the second pinion gear P2 and is in mesh with the second pinion gear P2 (FIG. 2).

With this arrangement, the first and second gears are the first sun gear and the first ring gear that are in mesh with the first pinion gear. The third and fourth gears are the second sun gear and the second ring gear that are in mesh with the second pinion gear. From the above, the relationship between the rotational speeds of the first sun gear, the second ring gear, the carrier, the first ring gear, and the second sun gear is expressed e.g. as in FIG. 5, referred to hereinafter.

Further, in FIG. 5, α and β represent the first and second lever ratios (torque ratio·speed ratio), respectively. The former α represents a ratio of torque transmitted to the first and second ring gears via the first sun gear to torque transmitted to the first sun gear, and the latter β represents a ratio of torque transmitted to the first and second ring gears via the second sun gear to torque transmitted to the second sun gear. Further, the first and second lever ratios α and β are expressed by equations (1) and (2), referred to hereinafter, respectively.

As is apparent from the above equations (1) and (2), for example, the tooth numbers of the first and second ring gears are set to the same value, and the tooth numbers of the first and second sun gears are set to the same value, whereby it is possible to easily set the first and second lever ratios α and β to the same value. This makes it possible to more properly control rotational energy distributed from the first and second energy input/output units to the first and second driven parts via the differential gear unit. In addition to this, due to the above-described settings of the tooth numbers of the gears, in the collinear chart, the distance from the carrier member to the second ring gear and the distance from the carrier member to the first ring gear become equal to each other. Therefore, a distribution ratio of torque transmitted (distributed) from the carrier member to the first and second ring gears can be easily set to 1:1, whereby it is possible to enhance movement stability of the means of transportation.

Note that although FIG. 5 is a collinear chart in a case where the first and second rotating electric machines 11 and 12, described hereinafter, are used as the first and second energy input/output units, left and right output shafts SRL and SRR, described hereinafter, are used as the two driven parts, and an engine 3 is used as the energy output unit, this is only by way of example, and it is to be understood that any other suitable energy input/output units, driven parts, and energy output units may be used.

Further, in the case where the tooth numbers of the first and second ring gears are set to the same value, e.g. when both the first and second ring gears are formed by spur gears, both the gears can be machined by the same cutter, whereas when they are formed by helical gears, they can be machined by cutters which are the same in specifications but different only in the direction of torsion. Therefore, the first and second ring gears are excellent in productivity. The same applies to the first and second sun gears.

Further, as shown in FIG. 5, not the first and second sun gears but the second and first ring gears corresponding to the first and second quasi-outer rotary elements, respectively, are connected to the one and the other of the two driven parts (left and right output shafts SRL and SRR). Therefore, similarly to the invention according to claim 4, it is possible to set the tooth widths of the first and second ring gears to relatively small values, and attain downsizing of the first pinion bearing and a bearing supporting the second pinion gear (hereinafter referred to as the "second pinion bearing"), which in turn makes it possible to downsize the power plant.

The invention according to claim 6 is the power plant according to claim 1, wherein the second pinion gear is a double pinion gear comprising a first split gear (second pinion gear P2) that is in mesh with the first pinion gear P1, and a second split gear (pinion gear PA) that is not in mesh with the first pinion gear P1 but is in mesh with the first split gear, wherein the first gear is one of a first sun gear that is provided on an inner periphery of the first pinion gear P1 and is in mesh with the first pinion gear P1, a second sun gear S2X that is provided on an inner periphery of the second pinion gear and is in mesh with the second split gear of the second pinion gear, and a second ring gear R2A that is provided on an outer periphery of the second pinion gear and is in mesh with the second split gear of the second pinion gear, wherein when the first gear is the first sun gear, the second gear is a first ring gear that is provided on an outer periphery of the first pinion gear and is in mesh with the first pinion gear, and the third gear is one of the second sun gear that is in mesh with the second split gear of the second pinion gear, and the second ring gear that in mesh with the second split gear, wherein when the first gear is the second sun gear S2X that is in mesh with the second split gear of the second pinion gear (FIG. 80), the second gear is a second ring gear R2X that is provided on the outer periphery of the second pinion gear and is in mesh with the first split gear of the second pinion gear, and the third gear is one of the first sun gear and the first ring gear R1X, and wherein when the first gear is the second ring gear R2A that is in mesh with the second split gear of the second pinion gear (FIG. 78), the second gear is a second sun gear S2 that is provided on the inner periphery of the second pinion gear and is in mesh with the first split gear of the second pinion gear, and the third gear is one of the first sun gear and first ring gear R1.

With this arrangement, it is possible to properly form the differential gear unit including the four rotary elements, the rotational speeds of which are in the collinear relationship with each other, using the carrier and the first to third gears, which in turns makes it possible to properly obtain the advantageous effects provided by the invention according to claim 1. Further, for example, when the first gear is the second sun gear in mesh with the second split gear of the second pinion gear, the second gear is the second ring gear in mesh with the first split gear of the second pinion gear, and the third gear is the first ring gear in mesh with the first pinion gear, the relationship between the rotational speeds of the four rotary elements formed by the second sun gear, the second ring gear, the carrier member (carrier), and the first ring gear is expressed as in FIG. 81, referred to hereinafter.

In FIG. 81, αI and βI represent the first and second lever ratios (torque ratio·speed ratio), respectively. The former αI represents a ratio of torque transmitted to the second ring gear and the carrier member to torque transmitted to the second sun gear, and the latter βI represents a ratio of torque transmitted to the second ring gear and the carrier member to torque transmitted to the first ring gear. Further, the first and second lever ratios αI and βI are expressed by equations (13) and (14), referred to hereinafter, respectively.

As is apparent from these equations (13) and (14), by setting a total of three tooth numbers, e.g. the tooth numbers of the second ring gear, the second sun gear, and the first ring gear, to different values from each other, it is possible to easily set the first and second lever ratios αI and βI to the same value. As a consequence, it is possible to more properly control rotational energy distributed from the first and second energy input/output units to the first and second driven parts via the differential gear unit.

Note that although FIG. 81 is a collinear chart in a case where the first and second rotating electric machines 11 and 12, described hereinafter, are used as the first and second energy input/output units, and the left and right output shafts SRL and SRR, described hereinafter, are used as the two driven parts, this is only by way of example, and it is to be understood that any other suitable energy input/output units and driven parts may be used.

Further, as shown in FIG. 81, not the sun gear but the second ring gear corresponding to the first quasi-outer rotary element, is connected to the driven part (left output shaft SRL). Therefore, similarly to the invention according to claim 4, it is possible to set the tooth width of the second ring gear to a relatively small value, and downsize the second pinion bearing, which in turn makes it possible to attain further downsizing of the power plant.

The invention according to claim 7 is the power plant according to claim 2 or 3, wherein the second pinion gear is a double pinion gear comprising a first split gear (second pinion gear P2) that is in mesh with the first pinion gear P1, and a second split gear (pinion gear PA) that is not in mesh with the first pinion gear P1 but is in mesh with the first split gear, wherein the first gear is a first sun gear S1, S1X that is provided on an inner periphery of the first pinion gear P1 and is in mesh with the first pinion gear P1, wherein the second gear is a first ring gear R1, R1X that is provided on an outer periphery of the first pinion gear P1 and is in mesh with the first pinion gear P1, wherein the third gear is one of a second sun gear S2X that is provided on an inner periphery of the second pinion gear and is in mesh with the second split gear of the second pinion gear, and a second ring gear R2A that is provided on an outer periphery of the second pinion gear and is in mesh with the second split gear of the second pinion gear, and wherein when the third gear is the second sun gear S2X that is in mesh with the second split gear, the fourth gear is a second ring gear R2X that is provided on the outer periphery of the second pinion gear and is in mesh with the first split gear of the second pinion gear (FIG. 65), whereas when the third gear is the second ring gear R2A that is in mesh with the second split gear, the fourth gear is a second sun gear S2 that is provided on the inner periphery of the second pinion gear and is in mesh with the first split gear of the second pinion gear (FIG. 61).

With this arrangement, it is possible to properly form the five rotary elements, the rotational speeds of which are in the collinear relationship with each other, using the carrier and the first to fourth gears, which in turns makes it possible to properly obtain the advantageous effects provided by the invention according to claim 2 or 3. Further, for example, when the first gear is the second ring gear in mesh with the second split gear of the second pinion gear, the second gear is the second sun gear in mesh with the first split gear of the second pinion gear, and the third and fourth gears are the first sun gear and the first ring gear in mesh with the first pinion gear, respectively, the relationship between the rotational speeds of the five rotary elements formed by the first sun gear, the carrier (carrier member), the second ring gear, the first ring gear, and the second sun gear is expressed as in FIG. 64, referred to hereinafter.

In FIG. 64, αA and βA represent the first and second lever ratios (torque ratio·speed ratio), respectively. The former αA represents a ratio of torque transmitted to the carrier member and the first ring gear to torque transmitted to the first sun gear, and the latter βA represents a ratio of torque transmitted to the carrier member and the first ring gear to torque transmitted to the second sun gear. Further, the first and second lever ratios αA and βA are expressed by the equations (3) and (4), referred to hereinafter, respectively.

As is apparent from these equations (3) and (4), by setting a total of three tooth numbers e.g. the tooth numbers of the first ring gear and the first and second sun gears, to different values from each other, it is possible to easily set the first and second lever ratios αA and βA to the same value. As a consequence, it is possible to more properly control rotational energy distributed from the first and second energy input/output units to the first and second driven parts via the differential gear unit.

Note that although FIG. 64 is a collinear chart in a case where the first and second rotating electric machines 11 and 12, described hereinafter, are used as the first and second energy input/output units, and the front and rear output shafts SF and SR, described hereinafter, are used as the two driven parts, this is only by way of example, and it is to be understood that any other suitable energy input/output units and driven parts may be used. Further, the positions of the first and second ring gears in the collinear chart are replaced with each other depending on the settings of the tooth numbers thereof.

Further, as shown in FIG. 64, not the sun gear but the first ring gear is connected to the driven part (rear output shaft SR). Therefore, similarly to the invention according to claim 4, it is possible to set the tooth width of the first ring gear to a relatively small value, and downsize the first pinion bearing, which in turn makes it possible to attain further downsizing of the power plant.

The invention according to claim 8 is the power plant according to claim 1, wherein the first pinion gear is a double pinion gear comprising a first split gear (first pinion gear P1), and a second split gear (pinion gear P1B, pinion gear P1D) that is not in mesh with the second pinion gear but is in mesh with the first split gear, wherein the second pinion gear is a double pinion gear comprising a third split gear (second pinion gear P2) that is in mesh with the first split gear, and a fourth split gear (pinion gear P2B, P2D) that is not in mesh with the first or second split gear but is in mesh with the third split gear, wherein the first gear is one of a first sun gear that is provided on an inner periphery of the first pinion gear and is in mesh with the second split gear of the first pinion gear, a first ring gear R1B that is provided on an outer periphery of the first pinion gear and is in mesh with the second split gear of the first pinion gear, a second sun gear S2, S2D that is provided on an inner periphery of the second pinion gear and is in mesh with the fourth split gear of the second pinion gear, and a second ring gear that is provided on an outer periphery of the second pinion gear and is in mesh with the fourth split gear of the second pinion gear, wherein when the first gear is the first sun gear that is in mesh with the second split gear of the first pinion gear, the second gear is a first ring gear that is provided on the outer periphery of the first pinion gear and is in mesh with the first split gear of the first pinion gear, and the third gear is one of the second sun gear that is in mesh with the fourth split gear of the second pinion gear, and the second ring gear that is in mesh with the fourth split gear of the second pinion gear, wherein when the first gear is the first ring gear R1B that is in mesh with the second split gear of the first pinion gear, the second gear is a first sun gear S1 that is provided on the inner periphery of the first pinion gear and is in mesh with the first split gear of the first pinion gear, and the third gear is one of the second ring gear R2B that is in mesh with the fourth split gear of the second pinion gear (FIG. 84), and the second sun gear that is in mesh with the fourth split gear of the second pinion gear, wherein when the first gear is the second sun gear S2, S2D that is in mesh with the fourth split gear of the second pinion gear, the second gear is a second ring gear R2B, R2D that is provided on the outer periphery of the second pinion gear and is in mesh with the third split gear of the second pinion gear, and the third gear is one of the first sun gear S1 that is in mesh with the second split gear of the first pinion gear (FIG. 82), and the first ring gear R1D that is in mesh with the second split gear (FIG. 86), and wherein when the first gear is the second ring gear that is in mesh with the fourth split gear of the second pinion gear, the second gear is the second sun gear that is provided on the inner periphery of the second pinion gear and is in mesh with the third split gear of the second pinion gear, and the third gear is one of the first ring gear that is in mesh with the second split gear of the first pinion gear, and the first sun gear that is in mesh with the second split gear of the first pinion gear.

With this arrangement, it is possible to properly form the four rotary elements, the rotational speeds of which are in the collinear relationship with each other, using the carrier and the first to third gears, which in turns makes it possible to properly obtain the advantageous effects provided by the invention according to claim 1. Further, for example, when the first gear is the first ring gear in mesh with the second split gear of the first pinion gears, the second gear is the first sun gear in mesh with the first split gear of the first pinion gears, and the third gear is the second ring gear in mesh with the fourth split gear of the second pinion gears, the relationship between the rotational speeds of the four rotary elements formed by the first sun gear, the first ring gear, the carrier member (carrier), and the second ring gear is expressed as in FIG. 85, referred to hereinafter.

In FIG. 85, αK and βK represent the first and second lever ratios (torque ratio·speed ratio), respectively. The former αK represents a ratio of torque transmitted to the first ring gear and the carrier member to torque transmitted to the first sun gear, and the latter βK represents a ratio of torque transmitted to the first ring gear and the carrier member to torque transmitted to the second ring gear. Further, the first and second lever ratios αK and βK are expressed by equations (17) and (18), referred to hereinafter, respectively.

As is apparent from these (17) and (18), e.g. by setting a total of three tooth numbers, i.e. the tooth numbers of the first ring gear, the first sun gear, and second ring gear, to different values from each other, it is possible to easily set the first and second lever ratios αK and βK to the same value. As a consequence, it is possible to more properly control rotational energy distributed from the first and second energy input/output units to the first and second driven parts via the differential gear unit.

Note that although FIG. 85 is a collinear chart in a case where the first and second rotating electric machines 11 and 12, described hereinafter, are used as the first and second energy input/output units, and the left and right output shafts SRL and SRR, described hereinafter, are used as the two driven parts, this is only by way of example, and it is to be understood that any other suitable energy input/output units and driven parts may be used.

Further, as shown in FIG. 85, not the sun gear but the first ring gear corresponding to the first quasi-outer rotary element, is connected to the driven part (left output shaft SRL). Therefore, similarly to the invention according to claim 4, it is possible to set the tooth width of the first ring gear to a relatively small value, and downsize the first pinion bearing, which in turn makes it possible to attain further downsizing of the power plant.

The invention according to claim 9 is the power plant according to claim 2 or 3, wherein the first pinion gear is a double pinion gear comprising a first split gear (first pinion gear P1), and a second split gear (pinion gear P1B, P1D) that is not in mesh with the second pinion gear but is in mesh with the first split gear, wherein the second pinion gear is a double pinion gear comprising a third split gear (second pinion gear P2) that is in mesh with the first split gear, and a fourth split gear (pinion gear P2B, P2D) that is not in mesh with the first or second split gear but is in mesh with the third split gear, wherein the first gear is one of a first sun gear S1 that is provided on an inner periphery of the first pinion gear and is in mesh with the second split gear of the first pinion gear, and a first ring gear R1B, R1D that is provided on an outer periphery of the first pinion gear and is in mesh with the second split gear of the first pinion gear, wherein when the first gear is the first sun gear S1 that is in mesh with the second split gear of the first pinion gear, the second gear is a first ring gear R1B that is provided on the outer periphery of the first pinion gear and is in mesh with the first split gear of the first pinion gear (FIG. 67), whereas when the first gear is a first ring gear R1B, R1D that is in mesh with the second split gear, the second gear is a first sun gear S1, S1D that is provided on the inner periphery of the first pinion gear and is in mesh with the first split gear of the first pinion gear (FIG. 70, FIG. 71), wherein the third gear is one of a second sun gear S2, S2D that is provided on an inner periphery of the second pinion gear and is in mesh with the fourth split gear of the second pinion gear, and a second ring gear R2B that is provided on an outer periphery of the second pinion gear and is in mesh with the fourth split gear of the second pinion gear, and wherein when the third gear is the second sun gear S2, S2D that is in mesh with the fourth split gear of the second pinion gear, the fourth gear is a second ring gear R2B, R2D that is provided on the outer periphery of the second pinion gear and is in mesh with the third split gear of the second pinion gear (FIG. 67, FIG. 71), whereas when the third gear is the second ring gear R2B that is in mesh with the fourth split gear, the fourth gear is a second sun gear S2 that is provided on the inner periphery of the second pinion gear and is in mesh with the third split gear of the second pinion gear (FIG. 70).

With this arrangement, it is possible to properly form the five rotary elements, the rotational speeds of which are in the collinear relationship with each other, using the carrier and the first to fourth gears, which in turns makes it possible to properly obtain the advantageous effects provided by the invention according to claim 2 or 3. Further, for example, when the first and third gears are the first sun gear and the first ring gear in mesh with the second and first split gears of the first pinion gear, respectively, and the second and fourth gears are the second sun gear and the second ring gear in mesh with the fourth and third split gears of the second pinion gear, respectively, the relationship between the rotational speeds of the five rotary elements formed by the first sun gear, the first ring gear, the carrier (carrier member), the second ring gear, and the second sun gear is expressed as in FIG. 69, referred to hereinafter.

In FIG. 69, αB and βB represent the first and second lever ratios (torque ratio·speed ratio), respectively. The former αB represents a ratio of torque transmitted to the first and second ring gears to torque transmitted to the second sun gear, and the latter βB represents a ratio of torque transmitted to the first and second ring gears to torque transmitted to the first sun gear. Further, the first and second lever ratios αB and βB are expressed by equations (7) and (8), referred to hereinafter, respectively.

As is apparent from these equations (7) and (8), for example, the tooth numbers of the first and second ring gears are set to the same value, and the tooth numbers of the first and second sun gears are set to the same value, whereby it is possible to easily set the first and second lever ratios αB and βB to the same value. This makes it possible to more properly control rotational energy distributed from the first and second energy input/output units to the first and second driven parts. In addition to this, due to the above-described settings of the tooth numbers of the gears, in the collinear chart, the distance from the carrier member to the second ring gear and the distance from the carrier member to the first ring gear become equal to each other. Therefore, a distribution ratio of torque transmitted (distributed) from the carrier member to the first and second ring gears can be easily set to 1:1, whereby it is possible to enhance movement stability of the means of transportation.

Further, in the case where the tooth numbers of the first and second ring gears are set to the same value, e.g. when both the first and second ring gears are formed by spur gears, both the gears can be machined by the same cutter, whereas when they are formed by helical gears, they can be machined by cutters which are the same in specifications but different only in the direction of torsion. Therefore, the first and second ring gears are excellent in productivity. The same applies to the first and second sun gears.

Note that although FIG. 69 is a collinear chart in a case where the first and second rotating electric machines 11 and 12, described hereinafter, are used as the first and second energy input/output units, and the left and right output shafts SRL and SRR, described hereinafter, are used as the two driven parts, this is only by way of example, and it is to be understood that any other suitable energy input/output units and driven parts may be used.

Further, as shown in FIG. 69, not the first and second sun gears but the second and first ring gears corresponding to the first and second quasi-outer rotary elements, respectively, are connected to the one and the other of the two driven parts (left and right output shafts SRL and SRR). Therefore, similarly to the invention according to claim 4, it is possible to set the tooth widths of the first and second ring gears to a relatively small value, and downsize the first and second pinion bearings, which in turn makes it possible to attain further downsizing of the power plant.

BRIEF DESCRIPTION OF THE DRAWINGS

FIG. 1 A diagram schematically showing a power plant according to a first embodiment of the present invention together with a vehicle to which the power plant is applied.

FIG. 2 A skeleton diagram of the power plant etc. shown in FIG. 1.

FIG. 5 A collinear chart showing a rotational speed relationship and a torque balance relationship between various types of rotary elements of the power plant shown in FIG. 1, as to a state of the vehicle during straight forward traveling and at the same time during other than decelerating traveling.

FIG. 8 A collinear chart showing a rotational speed relationship and a torque balance relationship between the various types of rotary elements of the power plant shown in FIG. 1, as to during third torque distribution control for reducing the right yaw moment.

FIG. 10 A block diagram of an ECU etc. of the power plant shown in FIG. 9.

FIG. 14 A collinear chart showing a rotational speed relationship and a torque balance relationship between the various types of rotary elements of the power plant shown in FIG. 9, as to during second torque distribution control for reducing the right yaw moment.

FIG. 16 A skeleton diagram of a power plant etc. according to a third embodiment of the present invention.

FIG. 26 A diagram showing a state of transmission of torque between the various types of rotary elements of the power plant shown in FIG. 20, as to during a 2-MOT drive mode.

FIG. 27 A diagram showing a state of transmission of torque between the various types of rotary elements of the power plant shown in FIG. 20, as to during torque distribution control in the 2-MOT drive mode.

FIG. 30 A diagram showing a relationship of connections between various types of rotary elements of the power plant shown in FIG. 29.

FIG. 37 A diagram showing a state of transmission of torque between the various types of rotary elements of the power plant shown in FIG. 29, as to during differential limit control in the 2-MOT drive mode.

FIG. 40 A collinear chart showing a rotational speed relationship and a torque balance relationship between various types of rotary elements of the power plant shown in FIG. 38, as to during a MOT speed-changing mode.

FIG. 44 A diagram showing a state of transmission of torque between the various types of rotary elements of the power plant shown in FIG. 38, as to during the 1-MOT drive mode.

FIG. 46 A diagram showing a state of transmission of torque between the various types of rotary elements of the power plant shown in FIG. 38, as to an operation different from FIG. 45 during the torque distribution control in the 1-MOT drive mode.

FIG. 50 A diagram showing a state of transmission of torque between the various types of rotary elements of the power plant shown in FIG. 38, as to during differential limit control in the 2-MOT drive mode.

FIG. 54 A diagram showing a state of transmission of torque between the various types of rotary elements of the power plant shown in FIG. 38, as to during torque distribution control in the ENG drive mode.

FIG. 55 A diagram showing a state of transmission of torque between the various types of rotary elements of the power plant shown in FIG. 38, as to during a speed-reducing regeneration mode.

FIG. 56 A diagram showing a state of transmission of torque between the various types of rotary elements of the power plant shown in FIG. 38, as to during braking torque distribution control in the speed-reducing regeneration mode.

FIG. 58 A skeleton diagram of the power plant etc. shown in FIG. 57.

FIG. 59 A block diagram of an ECU etc. of the power plant shown in FIG. 57.

FIG. 60 A skeleton diagram of a power plant etc. according to an eighth embodiment of the present invention.

FIG. 61 A skeleton diagram of a power plant etc. according to a ninth embodiment of the present invention.

FIG. 64 A collinear chart showing a rotational speed relationship and a torque balance relationship between various types of rotary elements of the power plant shown in FIG. 61.

FIG. 65 A skeleton diagram of a power plant etc. according to a tenth embodiment of the present invention.

FIG. 69 A collinear chart showing a rotational speed relationship and a torque balance relationship between various types of rotary elements of the power plant shown in FIG. 67.

FIG. 70 A skeleton diagram of a power plant etc. according to a twelfth embodiment of the present invention.

FIG. 71 A skeleton diagram of a power plant etc. according to a thirteenth embodiment of the present invention.

FIG. 78 A skeleton diagram of a power plant etc. according to a sixteenth embodiment of the present invention.

FIG. 89 A diagram useful in explaining advantageous effects provided by the present invention.

FIG. 90 A diagram different from FIG. 89, which is useful in explaining the advantageous effects provided by the present invention.

MODE FOR CARRYING OUT INVENTION

Figure 3:
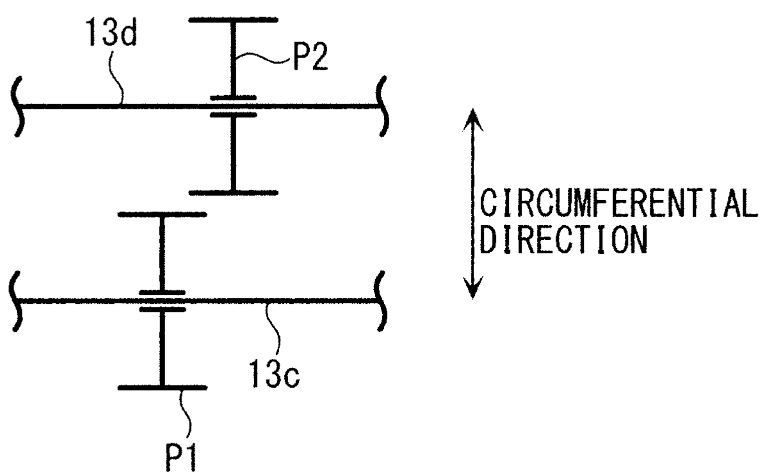
FIG. 3 A skeleton diagram of first pinion gears, second pinion gears, and a carrier member of a differential gear unit shown in FIG. 2, in plan view.

The invention will now be described in detail with reference to drawings showing preferred embodiments thereof. A power plant according to a first embodiment shown in FIGS. 1 and 2 is for driving left and right output shafts SRL and SRR of a four-wheel vehicle VFR. These left and right output shafts SRL and SRR are arranged coaxially with each other, and are connected to left and right rear wheels WRL and WRR, respectively.

The power plant is comprised of an internal combustion engine (hereinafter referred to as the "engine") 3 as a motive power source and a first transmission 4 for changing the speed of motive power from the engine 3. The two 3 and 4 are arranged in the front part of the vehicle VFR. The engine 3 is a gasoline engine, and a crankshaft (not shown) thereof is connected to an input shaft (not shown) of the first transmission 4. The first transmission 4 is a stepped automatic transmission, and changes the speed of motive power transmitted from the engine 3 to the above-mentioned input shaft, to output the motive power to a transmission output shaft (not shown) thereof. The transmission output shaft is connected to a propeller shaft S extending in a front-rear direction, and a gear 5 (see FIG. 2) is connected to the propeller shaft S.

Further, the power plant includes a distribution system DS1 for controlling motive power distributed to the left and right output shafts SRL and SRR. The distribution system DS1 is comprised of a differential gear unit GS, a first rotating electric machine 11, and a second rotating electric machine 12, and is disposed in the rear part of the vehicle VFR. The differential gear unit GS is used for transmitting motive power between the engine 3, the first and second rotating electric machines 11 and 12, and the left and right output shafts SRL and SRR. The differential gear unit GS is formed by combining two first and second planetary gear mechanisms of a single planetary type with each other, such that a carrier is shared therebetween and pinion gears of the two planetary gear mechanisms are brought into mesh with each other.

Specifically, the differential gear unit GS includes a carrier member 13, a first sun gear S1, first pinion gears P1, a first ring gear R1, a second sun gear S2, second pinion gears P2, and a second ring gear R2. The first sun gear S1, the first pinion gears P1, the first ring gear R1, and the carrier member 13 form the above-mentioned first planetary gear mechanism, and the second sun gear S2, the second pinion gears P2, the second ring gear R2, and the carrier member 13 form the above-mentioned second planetary gear mechanism. The differential gear unit GS is arranged coaxially with the left and right output shafts SRL and SRR, and is positioned between the left rear wheel WRL and the right rear wheel WRR.

The carrier member 13 is comprised of a first root portion 13*a* and a second root portion 13*b* each having an annular plate shape, and four first support shafts 13*c* (only two of which are shown) and four second support shafts 13*d* (only two of which are shown), which are integrally formed with the root portions 13*a* and 13*b*. Further, the carrier member 13 is rotatably supported by a bearing (not shown), and a first rotating shaft 14, referred to hereinafter, and a third rotating shaft 16, referred to hereinafter, are relatively rotatably disposed inward of the carrier member 13.

The above-mentioned first and second root portions 13*a* and 13*b* are arranged coaxially with the left and right output shafts SRL and SRR, and are opposed to each other in an axial direction of the left and right output shafts SRL and SRR. Further, the second root portion 13*b* is disposed on a side closer to the right rear wheel WRR than the first root portion 13*a*, and an annular gear 13*e* is integrally provided on the second root portion 13*b*. This gear 13*e* is in mesh with the above-mentioned gear 5. The first and second support shafts 13*c* and 13*d* are arranged between the first and second root portions 13*a* and 13*b*, and extend in the axial direction of the left and right output shafts SRL and SRR. Further, the first and second support shafts 13*c* and 13*d* are arranged alternately at equally-spaced intervals in a circumferential direction of the first root portion 13*a*.

Further, the above-mentioned first sun gear S1, first pinion gears P1, and first ring gear R1 are radially arranged from inside in this order. The first sun gear S1 is integrally mounted on one end of the first rotating shaft 14 which is hollow cylindrical. The first rotating shaft 14 is rotatably supported by bearings (not shown). A first rotor 11*b*, referred to hereinafter, of the first rotating electric machine 11 is integrally mounted on the other end of the first rotating shaft 14. This causes the first sun gear S1 to be rotatable in unison with the first rotor 11*b*. Further, the right output shaft SRR is relatively rotatably disposed inward of the first rotating shaft 14.

The number of the first pinion gears P1 is 4 (only two of which are shown) which is equal to the number of the above-mentioned first support shafts 13*c* of the carrier member 13. Each first pinion gear P1 is rotatably supported on an associated one of the first support shafts 13*c* via a bearing (not shown), and is in mesh with both the first sun gear S1 and the first ring gear R1. Note that the number of the first pinion gears P1 and the number of the first support shafts 13*c* are not limited to four but they can be set as desired. Further, the first ring gear R1 is connected to the right output shaft SRR via a second rotating shaft 15 which is hollow cylindrical and a flange, and is rotatable in unison with the right output shaft SRR.

The above-mentioned second sun gear S2, second pinion gears P2, and second ring gear R2 are radially arranged from inside in this order. A gear set of these gears is arranged between a gear set of the above-described first sun gear S1, first pinion gears P1, and first ring gear R1, and the right rear wheel WRR. The second sun gear S2 is integrally mounted on one end of the third rotating shaft 16 which is hollow cylindrical. The third rotating shaft 16 is rotatably supported by bearings (not shown), and a second rotor 12_b_, referred to hereinafter, of the second rotating electric machine 12 is integrally mounted on the other end of the third rotating shaft 16. This causes the second sun gear S2 to be rotatable in unison with the second rotor 12_b_. Further, the above-mentioned first rotating shaft 14 is relatively rotatably disposed inward of the third rotating shaft 16.

The number of the second pinion gears P2 is four (only two of which are shown) which is equal to the number of the above-mentioned second support shafts 13_d_ of the carrier member 13. Each second pinion gear P2 is rotatably supported on an associated one of the second support shafts 13_d_ via a bearing (not shown), and is in mesh with both the second sun gear S2 and the second ring gear R2. Further, as shown in FIG. 3, the second pinion gears P2 are disposed such that they partially overlap associated ones of the first pinion gears P1 in a circumferential direction of the second sun gear S2, and are in mesh with the same. Note that the number of the second pinion gears P2 and the number of the second support shafts 13_d_ are not limited to four but they can be set as desired. In FIG. 3, the first and second sun gears S1 and S2, and the first and second ring gears R1 and R2 are omitted, for convenience.

Further, the second ring gear R2 is connected to the left output shaft SRL via a fourth rotating shaft 17 which is hollow cylindrical and a flange, and is rotatable in unison with the left output shaft SRL. The carrier member 13 and the second rotating shaft 15 are relatively rotatably disposed inward of the fourth rotating shaft 17.

Furthermore, the first pinion gears P1 and the second pinion gears P2 have the same diameter and the same number of gear teeth. In accordance therewith, the diameter of the first sun gear S1 and the diameter of the second sun gear S2, and the diameter of the first ring gear R1 and the diameter of the second ring gear R2 are set to the same values, respectively. Further, the gear teeth of the first pinion gears P1 and the gear teeth of the second pinion gears P2 have the same tooth shape and the same tooth width. As described above, the diameters, the numbers of gear teeth, the tooth shapes, and the tooth widths of the first and second pinion gears P1 and P2 are equal to each other. In short, the gears P1 and P2 are set to be the same in specifications.

The above-mentioned first rotating electric machine 11 is an AC motor, and includes a first stator 11_a_ formed e.g. by a plurality of iron cores and coils, and the first rotor 11_b_ formed e.g. by a plurality of magnets. The first rotating electric machine 11 is disposed coaxially with the left and right output shafts SRL and SRR, and is located between the differential gear unit GS and the right rear wheel WRR. The first stator 11_a_ is fixed to an immovable casing CA. The first rotor 11_b_ is disposed in a manner opposed to the first stator 11_a_, and is rotatable in unison with the first sun gear S1, as mentioned above. In the first rotating electric machine 11, when electric power is supplied to the first stator 11_a_, the supplied electric power is converted to motive power, and is output to the first rotor 11_b_. Further, when the motive power is input to the first rotor 11_b_, this motive power is converted to electric power (power generation), and is output to the first stator 11_a_.

Figure 4:
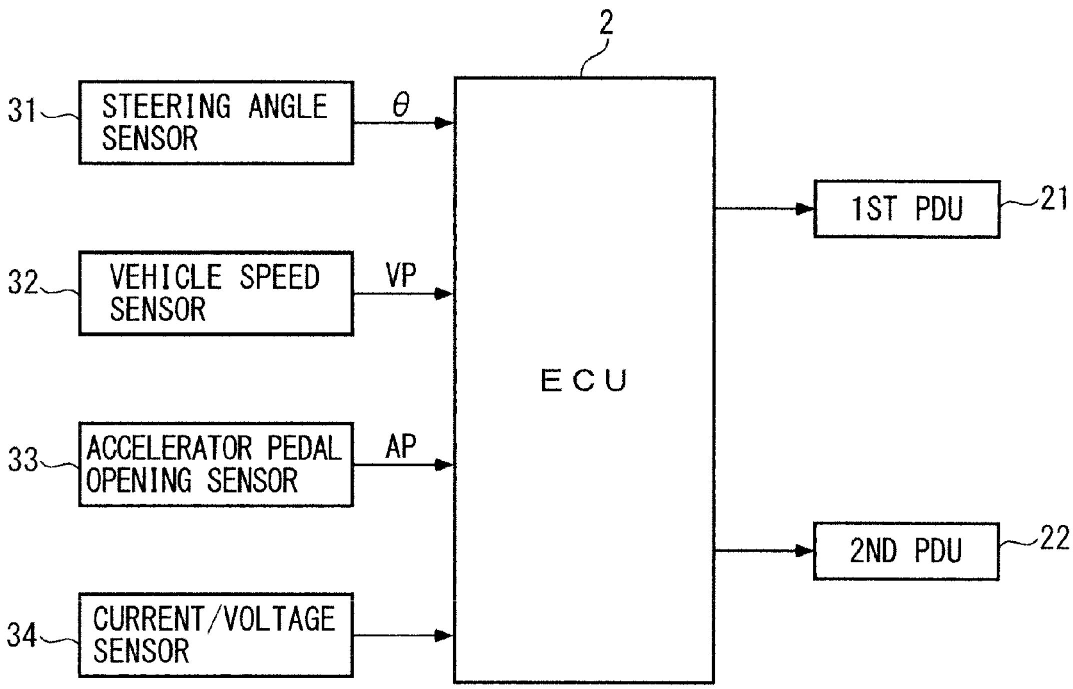
FIG. 4 A block diagram of an ECU etc. of the power plant shown in FIG. 1.

Further, the first stator 11_a_ is electrically connected to a battery 23 capable of being charged and discharged, via a first power drive unit (hereinafter referred to as the "first PDU") 21, and is capable of supplying and receiving electric energy to and from the battery 23. The first PDU 21 is formed by an electric circuit comprised e.g. of an inverter. As shown in FIG. 4, an ECU 2, described hereinafter, is electrically connected to the first PDU 21. The ECU 2 controls the first PDU 21 to thereby control electric power supplied to the first stator 11_a_, electric power generated by the first stator 11_a_, and the rotational speed of the first rotor 11_b_.

Similarly to the first rotating electric machine 11, the second rotating electric machine 12 is an AC motor, and includes a second stator 12_a_ and the second rotor 12_b_. Further, the second rotating electric machine 12 is disposed coaxially with the left and right output shafts SRL and SRR, and is located between the first rotating electric machine 11 and the differential gear unit GS. The second stator 12_a_ and the second rotor 12_b_ are constructed similarly to the first stator 11_a_ and the first rotor 11_b_, respectively. Further, the second rotor 12_b_ is rotatable in unison with the sun gear S2, as mentioned above. Furthermore, similarly to the first rotating electric machine 11, the second rotating electric machine 12 is capable of converting electric power supplied to the second stator 12_a_ to motive power and outputting the motive power to the second rotor 12_b_, and is capable of converting the motive power input to the second rotor 12_b_ to electric power and outputting the electric power to the second stator 12_a_.

Further, the second stator 12_a_ is electrically connected to the battery 23 via a second power drive unit (hereinafter referred to as the "second PDU") 22, and is capable of supplying and receiving electric energy to and from the battery 23. Similarly to the first PDU 21, the second PDU 22 is formed by an electric circuit comprised e.g. of an inverter. The ECU 2 is electrically connected to the second PDU 22. The ECU 2 controls the second PDU 22 to thereby control electric power supplied to the second stator 12_a_, electric power generated by the second stator 12_a_, and the rotational speed of the second rotor 12_b_.

Hereinafter, converting electric power supplied to the first stator 11_a_ (second stator 12_a_) to motive power and outputting the motive power from the first rotor 11_b_ (second rotor 12_b_) is referred to as "powering", as deemed appropriate. Further, generating electric power by the first stator 11_a_ (second stator 12_a_) using motive power input to the first rotor 11_b_ (second rotor 12_b_) to thereby convert the motive power to electric power is referred to as "regeneration", as deemed appropriate.

In the power plant constructed as above, since the differential gear unit GS is constructed as described above, the first sun gear S1, the second ring gear R2, the carrier member 13, the first ring gear R1, and the second sun gear S2 can transmit motive power therebetween, and the rotational speeds thereof are in a collinear relationship. Here, the term "collinear relationship" refers to a relationship in which the rotational speeds thereof are aligned in a single straight line in a collinear chart.

Further, when the first sun gear S1 is caused to perform normal rotation in a state in which the carrier member 13 is fixed, the first ring gear R1 and the second sun gear S2 perform reverse rotation, and the second ring gear R2 performs normal rotation. In this case, from the relationship between the numbers of gear teeth of the gears, the rotational speed of the first sun gear S1 becomes higher than that of the second ring gear R2, and the rotational speed of the second sun gear S2 becomes lower than that of the first ring gear R1. From the above, in a collinear chart indicating the relationship between the rotational speeds, the first sun gear S1, the second ring gear R2, the carrier member 13, the first ring gear R1, and the second sun gear S2 are depicted in this order.

Further, since the first sun gear S1 and the first rotor 11*b* are connected to each other via the first rotating shaft 14, the rotational speed of the first sun gear S1 and that of the first rotor 11*b* are equal to each other. Further, since the second ring gear R2 is connected to the left output shaft SRL via the fourth rotating shaft 17 and the flange, the rotational speed of the second ring gear R2 and that of the left output shaft SRL are equal to each other. Further, the gear 13*e* of the carrier member 13 is in mesh with the gear 5 connected to a transmission output shaft of the first transmission 4, and hence the rotational speed of the carrier member 13 and that of the transmission output shaft are equal to each other, provided that a change in speed by the gear 13*e* and the gear 5 is ignored. Further, the first ring gear R1 is connected to the right output shaft SRR via the second rotating shaft 15 and the flange, and hence the rotational speed of the first ring gear R1 and that of the right output shaft SRR are equal to each other. Furthermore, the second sun gear S2 and the second rotor 12*b* are connected to each other via the third rotating shaft 16, and hence the rotational speed of the second sun gear S2 and that of the second rotor 12*b* are equal to each other.

From the above, the relationship between the rotational speeds of various rotary elements of the power plant is expressed e.g. in a collinear chart shown in FIG. 5. In FIG. 5 and other collinear charts, described hereinafter, the distance from a horizontal line indicative of 0 to a white circle shown on each vertical line corresponds to the rotational speed of each of the rotary elements. As is apparent from FIG. 5, the left and right output shafts SRL and SRR can be differentially rotated with each other.

In FIG. 5, $\alpha$ and $\beta$ represent a first lever ratio and a second lever ratio (torque ratio, speed ratio) respectively, and are expressed by the following equations (1) and (2):

$$\alpha=\{ZR1(ZR2-ZS1)\}/\{ZS1(ZR2+ZR1\} \quad (1)$$

$$\beta=\{ZR2(ZR1-ZS2)\}/\{ZS2(ZR2+ZR1\} \quad (2)$$

wherein ZR1 represents the number of the gear teeth of the first ring gear R1, ZR2 represents the number of the gear teeth of the second ring gear R2, ZS1 represents the number of the gear teeth of the first sun gear S1, and ZS2 represents the number of the gear teeth of the second sun gear S2.

In the present embodiment, the number ZR1 of the gear teeth of the first ring gear R1, the number ZR2 of the gear teeth of the second ring gear R2, the number ZS1 of the gear teeth of the first sun gear S1, and the number ZS2 of the gear teeth of the second sun gear S2 (hereinafter referred to as the "the tooth numbers of the gears") are set as follows: The tooth numbers of the gears are set such that the first and second lever ratios $\alpha$ and $\beta$ take relatively large values on condition that one of the first and second rotors 11*b* and 12*b* does not perform reverse rotation within a range in which the left and right rear wheels WRL and WRR can be differentially rotated with each other.

Further, the tooth numbers ZR1 and ZR2 of the first and second ring gears R1 and R2 are set to the same value, the tooth numbers ZS1 and ZS2 of the first and second sun gears S1 and S2 are set to the same value, and the tooth numbers of the first and second pinion gears P1 and P2 are set to the same value. As a consequence, as is apparent from the above-mentioned equations (1) and (2), the first and second lever ratios $\alpha$ and $\beta$ are set to the same value. In addition, in the collinear chart (FIG. 5), the distance from the carrier member 13 to the left output shaft SRL and the distance from the carrier member 13 to the right output shaft SRR are equal to each other.

Further, as shown in FIG. 4, input to the ECU 2 are a detection signal indicative of a steering angle $\theta$ of a steering wheel (not shown) of the vehicle VFR from a steering angle sensor 31, a detection signal indicative of a vehicle speed VP of the vehicle VFR from a vehicle speed sensor 32, and a detection signal indicative of an operation amount of an accelerator pedal (not shown) of the vehicle VFR (hereinafter referred to as the "accelerator pedal opening") AP from an accelerator pedal opening sensor 33. Further, detection signals indicative of current and voltage values of electric current flowing into and out of the battery 23 are input from a current/voltage sensor 34 to the ECU 2. The ECU 2 calculates a state of charge of the battery 23 based on the detection signals from the current/voltage sensor 34.

The ECU 2 is implemented by a microcomputer comprised of an I/O interface, a CPU, a RAM, and a ROM. The ECU 2 controls the first and second rotating electric machines 11 and 12 based on the detection signals from the aforementioned sensors 31 to 34, according to control programs stored in the ROM. With this control, various operations of the distribution system DS1 are performed. Hereafter, a description will be given of the operations of the distribution system DS1 during straight forward traveling and during left or right turning of the vehicle VFR.

[During Straight Forward Traveling]

During straight and constant-speed traveling or straight and accelerating traveling of the vehicle VFR, powering is performed by both the first and second rotating electric machines 11 and 12, and electric power supplied from the battery 23 to the first and second stators 11*a* and 12*a* is controlled. FIG. 5 shows a rotational speed relationship and a torque balance relationship between various types of rotary elements in this case.

In FIGS. 5, TM1 and TM2 represent output torques generated by the first and second rotors 11*b* and 12*b* along with the powering by the first and second rotating electric machines 11 and 12 (hereinafter referred to as the "first motor output torque" and the "second motor output torque"), respectively. Further, RLM1 and RRM1 represent reaction force torques acting on the left output shaft SRL and the right output shaft SRR along with the powering by the first rotating electric machine 11, respectively, and RLM2 and RRM2 represent reaction force torques acting on the left output shaft SRL and the right output shaft SRR along with the powering by the second rotating electric machine 12, respectively. Furthermore, TE represents torque transmitted from the engine 3 to the carrier member 13 via the first transmission 4 (hereinafter referred to as the "post-speed-change engine torque"), and RLE and RRE represent reaction force torques which act on the left output shaft SFL and the right output shaft SFR along with transmission of the post-speed-change engine torque TE to the carrier member 13, respectively.

Further, torque transmitted to the left output shaft SRL (hereinafter referred to as the "left output shaft-transmitted torque") is expressed by RLE+RLM1−RLM2 (RLM1>RLM2), and torque transmitted to the right output shaft SRR (hereinafter referred to as the "right output shaft-transmitted torque") is expressed by RRE+RRM2−RRM1 (RRM2>RRM1). The left and right output shafts SRL and SRR are driven in the direction of normal rotation together with the left and right rear wheels WRL and WRR. In this case, in the collinear chart (FIG. 5), the distance from the carrier member 13 to the left output shaft SRL and the distance from the carrier member 13 to the right output shaft SRR are equal to each other, and hence a torque distribution ratio of torque distributed from the carrier member 13 to the left and right output shafts SRL and SRR is 1:1, so that the torques distributed to the left and right output shafts SRL and SRR are equal to each other. Further, electric power supplied to the first and second stators 11*a* and 12*a* are controlled such that the left output shaft-transmitted torque and the right output shaft-transmitted torque become the same demanded torque. This demanded torque is calculated by searching a predetermined map (not shown) according to the detected accelerator pedal opening AP.

Further, RLM1−RLM2 of the above-mentioned left output shaft-transmitted torque is represented by TM1×(α+1)−TM2×β, and RRM2−RRM1 of the above-mentioned right output shaft-transmitted torque is represented by TM2×(β+1)−TM1×α. As is apparent from the above equations, the first lever ratio α represents a ratio of torque transmitted from the first rotating electric machine 11 to the left and right output shafts SRL and SRR via the differential gear unit GS, to the first motor output torque TM1. Further, the second lever ratio β represents a ratio of torque transmitted from the second rotating electric machine 12 to the left and right output shafts SRL and SRR via the differential gear unit GS, to the second motor output torque TM2. On the other hand, the first and second lever ratios α and β are set to the same value, as described above, so that only by controlling the first and second motor output torques TM1 and TM2 to the same magnitude, it is possible to accurately and easily control torque distributed from the first and second rotating electric machines 11 and 12 to the left and right output shafts SRL and SRR to the same magnitude.

Furthermore, an execution condition for executing the above-described powering by the first and second rotating electric machines 11 and 12 is e.g. a condition that the engine 3 is being assisted by the first and second rotating electric machines 11 and 12 (hereinafter referred to as "during the motor assist"), or a condition that the vehicle VFR is being driven only by the first and second rotating electric machines 11 and 12 without using the engine 3 (hereinafter referred to as "during the EV traveling") and also a calculated state of charge of the battery 23 is higher than a lower limit value. In this case, the fact that the state of charge of the battery 23 is higher than the lower limit value indicates that the battery 23 is capable of being discharged. Note that although FIG. 5 shows the rotational speed relationship and the torque balance relationship between the various types of rotary elements during the motor assist, the engine 3 is at rest during the EV traveling, and hence the post-speed-change engine torque TE, and the reaction force torque RLE, and the reaction force torque RRE are not generated.

Figure 6:
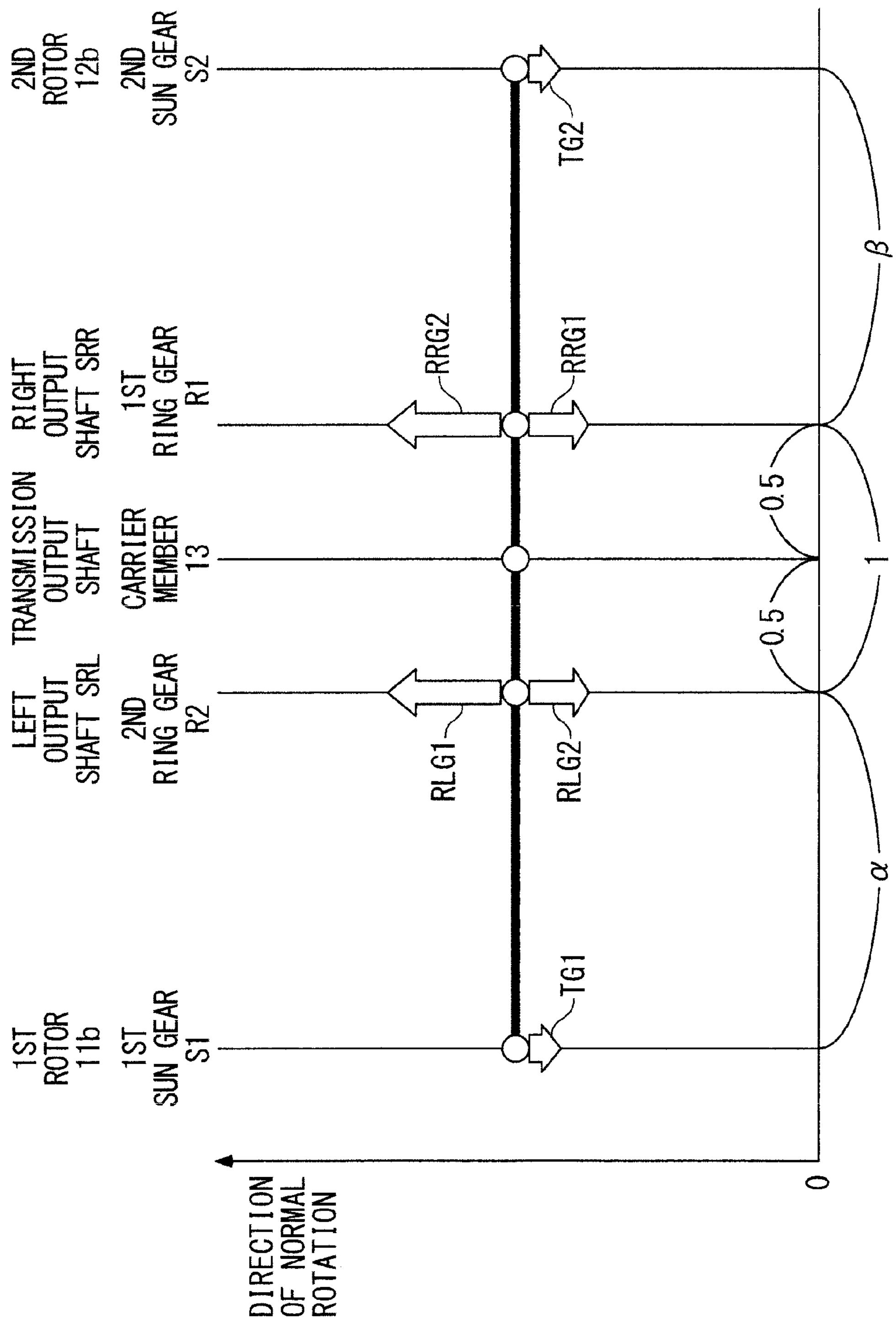
FIG. 6 A collinear chart showing a rotational speed relationship and a torque balance relationship between the various types of rotary elements of the power plant shown in FIG. 1, as to a state of the vehicle during straight forward traveling and at the same time during decelerating traveling.

Further, during straight forward traveling and decelerating traveling of the vehicle VFR (during a fuel cut operation of the engine 3), regeneration is performed by both the first and second rotating electric machines 11 and 12 using inertia energy of the vehicle VFR, and regenerated electric power is charged into the battery 23 and is controlled. FIG. 6 shows a rotational speed relationship and a torque balance relationship between the various types of rotary elements in this case. In FIGS. 6, TG1 and TG2 represent braking torques generated by the first and second rotors 11*b* and 12*b* along with the regeneration by the first and second rotating electric machines 11 and 12 (hereinafter referred to as the "first motor braking torque" and the "second motor braking torque"), respectively. Further, RLG1 and RRG1 represent reaction force torques acting on the left output shaft SRL and the right output shaft SRR along with the regeneration by the first rotating electric machine 11, and RLG2 and RRG2 represent reaction force torques acting on the left output shaft SRL and the right output shaft SRR along with the regeneration by the second rotating electric machine 12.

In this case, the left output shaft-transmitted torque is expressed by −RLG1+RLG2 (RLG1>RLG2), and the right output shaft-transmitted torque is expressed by −RRG2+RRG1 (RRG2>RRG1). The braking torque acts on the left and right output shafts SRL and SRR, whereby the vehicle VFR is decelerated. Further, the electric power regenerated by the first and second rotating electric machines 11 and 12 is controlled such that the braking torque acting on the left output shaft SRL and the braking torque acting on the right output shaft SRL are equal to each other.

Further, −RLG1+RLG2 of the above-mentioned left output shaft-transmitted torque is represented by −TG1×(α+1)+TG2×β, and −RRG2+RRG1 of the above-mentioned right output shaft-transmitted torque is represented by −TG2×(β+1)+TG1×α. As described above, the first and second lever ratios α and β are set to the same value, whereby a torque ratio of torque transmitted from the first rotating electric machine 11 to the left and right output shafts SRL and SRR, and a torque ratio of torque transmitted from the second rotating electric machine 12 to the left and right output shafts SRL and SRR are set to the same value. Therefore, only by controlling the first and second motor braking torques TG1 and TG2 to the same magnitude, it is possible to accurately and easily control braking torque distributed from the first and second rotating electric machines 11 and 12 to the left and right output shafts SRL and SRR to the same magnitude.

Furthermore, an execution condition for executing the above-described regeneration by the first and second rotating electric machines 11 and 12 is e.g. a condition that the state of charge of the battery 23 is lower than an upper limit value. In this case, the fact that the state of charge of the battery 23 is lower than the upper limit value indicates that the battery 23 is capable of being charged.

[During Right Turning]

When the vehicle VFR turns to the right during forward traveling, to increase a clockwise yaw moment for causing the vehicle VFR to perform right turning (hereinafter referred to as the "right yaw moment"), torque distribution control for increasing the right yaw moment is performed. First torque distribution control to fourth torque distribution control are provided for the torque distribution control. Hereafter, a description will be sequentially given of the first torque distribution control to the fourth torque distribution control for increasing the right yaw moment. During the first torque distribution control, powering is performed by both the first and second rotating electric machines 11 and 12, and the electric power supplied to the first and second stators 11*a* and 12*a* is controlled such that the first motor output torque TM1 becomes larger than the second motor output torque TM2.

With this control, as is apparent from the above-described torque balance relationship shown in FIG. 5, the left output shaft-transmitted torque becomes larger than the right output shaft-transmitted torque, whereby the right yaw moment of the vehicle VFR is increased. In this case, the electric power supplied to the first and second stators 11*a* and 12*a* is controlled according to the detected steering angle θ, vehicle speed VP, and accelerator pedal opening AP. Note that an execution condition for executing the first torque distribution control for increasing the right yaw moment is e.g. a condition that it is during the motor assist (the engine 3 is being assisted by the first and second rotating electric machines 11 and 12) or a condition that it is during the EV traveling (the vehicle VFR is being driven only by the first and second rotating electric machines 11 and 12) and also the state of charge of the battery 23 is higher than the lower limit value.

Next, a description will be given of the second torque distribution control for increasing the right yaw moment. During the second torque distribution control, regeneration is performed by both the first and second rotating electric machines 11 and 12, and the electric power regenerated by the first and second rotating electric machines 11 and 12 is charged into the battery 23. In this case, the electric power regenerated by the first and second rotating electric machines 11 and 12 is controlled such that the second motor braking torque TG2 becomes larger than the first motor braking torque TG1.

With this control, as is apparent from the above-described torque balance relationship shown in FIG. 6, the braking torque acting on the right output shaft SRR becomes larger than that acting on the left output shaft SRL, so that the right yaw moment of the vehicle VFR is increased. In this case, the electric power regenerated by the first and second rotating electric machines 11 and 12 is controlled according to the steering angle θ and the vehicle speed VP, etc. Note that an execution condition for executing the second torque distribution control for increasing the right yaw moment is e.g. a condition that it is during deceleration traveling of the vehicle VFR, and also the state of charge of the battery 23 is lower than the upper limit value.

Figure 7:
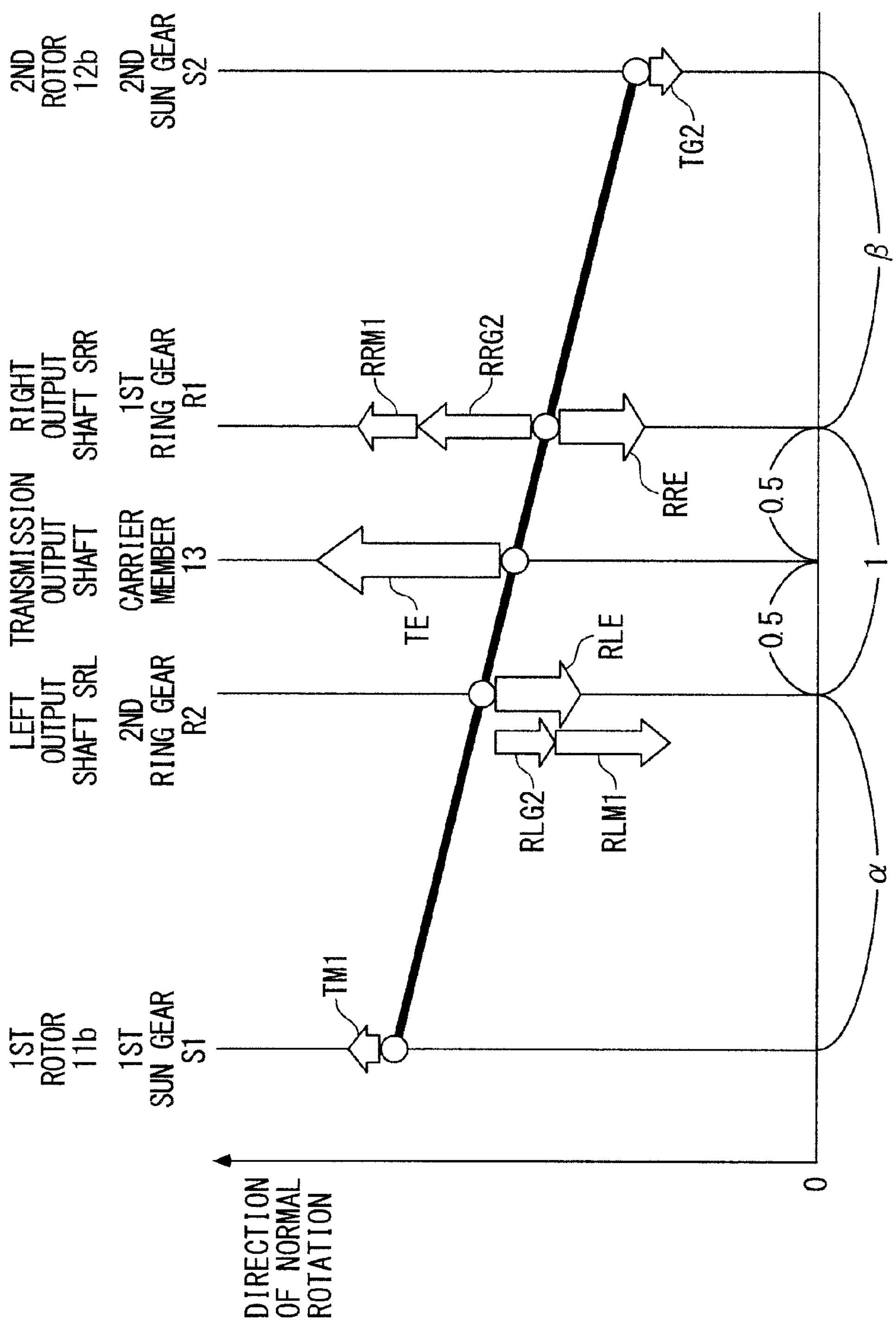
FIG. 7 A collinear chart showing a rotational speed relationship and a torque balance relationship between the various types of rotary elements of the power plant shown in FIG. 1, as to during third torque distribution control for increasing right yaw moment.

Next, a description will be given of the third torque distribution control for increasing the right yaw moment. During the third torque distribution control, powering is performed by the first rotating electric machine 11, and regeneration is performed by the second rotating electric machine 12. FIG. 7 shows a rotational speed relationship and a torque balance relationship between the various types of rotary elements in this case. As described above with reference to FIG. 5, in FIG. 7, TM1 represents the first motor output torque, and RLM1 and RRM1 represent the reaction force torques acting on the left output shaft SRL and the right output shaft SRR along with the powering by the first rotating electric machine 11, respectively. Further, TE represents the post-speed-change engine torque, and RLE and RRE represent the reaction force torques acting on the left output shaft SFL and the right output shaft SFR along with the transmission of the post-speed-change engine torque TE to the carrier member 13, respectively. Furthermore, as described above with reference to FIG. 6, in FIG. 7, TG2 represents the second motor braking torque, and RLG2 and RRG2 represent the reaction force torques acting on the left output shaft SRL and the right output shaft SRR along with the regeneration by the second rotating electric machine 12, respectively.

In this case, the left output shaft-transmitted torque is expressed by RLE+RLM1+RLG2, and the right output shaft-transmitted torque is expressed by RRE−(RRM1+RRG2). As described above, drive torque acts on the left output shaft SRL, and the braking torque acts on the right output shaft SRR, so that the right yaw moment of the vehicle VFR is increased. In this case as well, electric power supplied to the first stator 11*a* and electric power regenerated by the second rotating electric machine 12 are controlled according to the steering angle θ, the vehicle speed VP, and the accelerator pedal opening AP.

Further, RLM1+RLG2 of the above-mentioned left output shaft-transmitted torque is represented by TM1×(α+1)+TG2×β, and −(RRM2+RRM1) of the above-mentioned right output shaft-transmitted torque is represented by −{TG2×(β+1)+TM1×α}. Since the first and second lever ratios α and β are set to the same value, it is possible to accurately and easily control torque distributed from the first and second rotating electric machines 11 and 12 to the left and right output shafts SRL and SRR via the first motor output torque TM1 and the second motor braking torque TG2.

Note that an execution condition for executing the third torque distribution control for increasing the right yaw moment is e.g. the following first increasing condition or second increasing condition:

The first increasing condition: The vehicle VFR is being driven by the engine 3, and also the state of charge of the battery 23 is not lower than an upper limit value.

The second increasing condition: The vehicle VFR is being driven by the engine 3, the state of charge of the battery 23 is lower than the upper limit value, and also braking torque demanded of the second rotating electric machine 12 is not smaller than a predetermined first upper limit torque.

In this case, when the first increasing condition is satisfied, i.e. when the state of charge of the battery 23 is not lower than the upper limit value, the battery 23 cannot be charged, and hence all the electric power regenerated by the second rotating electric machine 12 is supplied to the first stator 11*a* without being charged into the battery 23. On the other hand, when the second increasing condition is satisfied, part of the electric power regenerated by the second rotating electric machine 12 is charged into the battery 23, and the remainder is supplied to the first stator 11*a*. In this case, the first motor output torque TM1 is controlled such that an insufficient amount of the second motor braking torque TG2 with respect to the demanded braking torque is compensated for.

Next, a description will be given of the fourth torque distribution control for increasing the right yaw moment. During the fourth torque distribution control, the zero torque control is performed on the first rotating electric machine 11, and regeneration is performed by the second rotating electric machine 12 to charge electric power regenerated by the second rotating electric machine 12 into the battery 23. The zero torque control prevents dragging losses from being caused by regeneration by the first rotating electric machine 11. In this case, only the second motor braking torque TG2 is generated, so that as is apparent from FIG. 7, the left output shaft-transmitted torque is represented by RLE+RLG2, and the right output shaft-transmitted torque is represented by RRE−RRG2. Thus, the drive torque acts on the left output shaft SRL, and the braking torque acts on the right output shaft SRR, so that the right yaw moment of the vehicle VFR is increased. In other words, part of the torque of the right output shaft SRR is transmitted to the left output shaft SRL using the second motor braking torque TG2 as a reaction force. In this case as well, the electric power regenerated by the second rotating electric machine 12 is controlled according to the steering angle θ, the vehicle speed VP, and the accelerator pedal opening AP.

Note that an execution condition for executing the fourth torque distribution control for increasing the right yaw moment is e.g. a condition that the vehicle VFR is being driven by the engine 3, the state of charge of the battery 23 is lower than the upper limit value, and also the braking torque demanded of the second rotating electric machine 12 is smaller than the above-mentioned first upper limit torque.

Note that to increase the right yaw moment, the zero torque control may be performed on the second rotating electric machine 12, and the powering may be performed by the first rotating electric machine 11. In this case, only the first motor output torque TM1 is generated, so that as is apparent from FIG. 7, the left output shaft-transmitted torque is represented by RLE+RLM1, and the right output shaft-transmitted torque is represented by RRE−RRM1. Thus, the drive torque acts on the left output shaft SRL, and the braking torque acts on the right output shaft SRR, so that the right yaw moment of the vehicle VFR is increased. In other words, part of the torque of the right output shaft SRR is transmitted to the left output shaft SRL using the first motor output torque TM1 as a reaction force. In this case as well, the electric power supplied to the first stator 11*a* is controlled according to the steering angle θ, the vehicle speed VP, and the accelerator pedal opening AP.

During the right turning of the vehicle VFR, when the right yaw moment of the vehicle VFR is reduced, torque distribution control for reducing the right yaw moment is executed. First torque distribution control to fourth torque distribution control are provided for the torque distribution control for reducing the right yaw moment. Hereafter, a description will be sequentially given of the first torque distribution control to the fourth torque distribution control for reducing the right yaw moment. During the first torque distribution control, powering is performed by both the first and second rotating electric machines 11 and 12, and the electric power supplied to the first and second stators 11*a* and 12*a* is controlled such that the second motor output torque TM2 becomes larger than the first motor output torque TM1.

With this control, as is apparent from the above-described torque balance relationship shown in FIG. 5, the right output shaft-transmitted torque becomes larger than the left output shaft-transmitted torque, so that the right yaw moment of the vehicle VFR is reduced. In this case, the electric power supplied to the first and second stators 11*a* and 12*a* is controlled according to the steering angle θ, the vehicle speed VP, and the accelerator pedal opening AP. Note that an execution condition for executing the first torque distribution control for reducing the right yaw moment is e.g. a condition that it is during the motor assist or a condition that it is during the EV traveling and also the state of charge of the battery 23 is higher than the lower limit value.

Next, a description will be given of the second torque distribution control for reducing the right yaw moment. During the second torque distribution control, regeneration is performed by both the first and second rotating electric machines 11 and 12, and the electric power regenerated by the first and second rotating electric machines 11 and 12 is charged into the battery 23. In this case, the electric power regenerated by the first and second rotating electric machines 11 and 12 is controlled such that the first motor braking torque TG1 becomes larger than the second motor braking torque TG2.

With this control, as is apparent from the above-described torque balance relationship shown in FIG. 6, the braking torque acting on the left output shaft SRL becomes larger than the braking torque acting on the right output shaft SRR, so that the right yaw moment of the vehicle VFR is reduced. In this case, the electric power regenerated by the first and second rotating electric machines 11 and 12 is controlled according to the steering angle θ and the vehicle speed VP. Note that an execution condition for executing the second torque distribution control for reducing the right yaw moment is e.g. a condition that it is during deceleration traveling of the vehicle VFR, and also the state of charge of the battery 23 is lower than the upper limit value.

Next, a description will be given of the third torque distribution control for reducing the right yaw moment. During the third torque distribution control, regeneration is performed by the first rotating electric machine 11, and powering is performed by the second rotating electric machine 12. FIG. 8 shows a rotational speed relationship and a torque balance relationship between the various types of rotary elements in this case. As described above with reference to FIG. 6, in FIG. 8, TG1 represents the first motor braking torque, and RLG1 and RRG1 represent the reaction force torques acting on the left output shaft SRL and the right output shaft SRR along with the regeneration by the first rotating electric machine 11, respectively. Further, as described above with reference to FIG. 5, in FIG. 8, TM2 represents the second motor output torque, and RLM2 and RRM2 represent the reaction force torques acting on the left output shaft SRL and the right output shaft SRR along with the powering by the second rotating electric machine 12, respectively.

In this case, the left output shaft-transmitted torque is expressed by −(RLG1+RLM2), and the right output shaft-transmitted torque is expressed by RRM2+RRG1. Thus, the braking torque acts on the left output shaft SRL, and the drive torque acts on the right output shaft SRR, so that the right yaw moment of the vehicle VFR is reduced. In this case as well, the electric power regenerated by the first rotating electric machine 11, and the electric power supplied to the second stator 12*a* are controlled according to the steering angle θ and the vehicle speed VP.

Further, −(RLG1+RLM2) of the above-mentioned left output shaft-transmitted torque is represented by $-\{TG1\times(\alpha+1)+TM2\times\beta\}$, and RRM2+RRG1 of the above-mentioned right output shaft-transmitted torque is represented by $TM2\times(\beta+1)+TG1\times\alpha$. Since the first and second lever ratios α and β are set to the same value, it is possible to accurately and easily control torque distributed from the first and second rotating electric machines 11 and 12 to the left and right output shafts SRL and SRR via the first motor braking torque TG1 and the second motor output torque TM2.

Note that an execution condition for executing the third torque distribution control for reducing the right yaw moment is e.g. the following first reducing condition or second reducing condition:

The first reducing condition: It is during deceleration traveling of the vehicle VFR (during the fuel cut operation of the engine 3), and also the state of charge of the battery 23 is not lower than the upper limit value.

The second reducing condition: It is during deceleration traveling of the vehicle VFR, the state of charge of the battery 23 is lower than the upper limit value, and also braking torque demanded of the first rotating electric machine 11 is not lower than a predetermined second upper limit torque.

In this case, when the first reducing condition is satisfied, i.e. when the state of charge of the battery 23 is not lower than the upper limit value, the battery 23 cannot be charged, and hence all the electric power regenerated by the first rotating electric machine 11 is supplied to the second stator 12*a* without being charged into the battery 23. On the other hand, when the second reducing condition is satisfied, part of the electric power regenerated by the first rotating electric machine 11 is charged into the battery 23, and the remainder is supplied to the second stator 12*a*. In this case, the second motor output torque TM2 is controlled such that an insufficient amount of the first motor braking torque TG1 with respect to the demanded braking torque is compensated for.

Next, a description will be given of the fourth torque distribution control for reducing the right yaw moment. During the fourth torque distribution control, the zero torque control is performed on the second rotating electric machine 12, and regeneration is performed by the first rotating electric machine 11. The electric power regenerated by the first rotating electric machine 11 is charged into the battery 23. In this case, only the first motor braking torque TG1 is generated, so that as is apparent from FIG. 8, the left output shaft-transmitted torque is represented by −RLG1, and the right output shaft-transmitted torque is represented by RRG1. Thus, the braking torque acts on the left output shaft SRL, and the drive torque acts on the right output shaft SRR, so that the right yaw moment of the vehicle VFR is reduced. In this case as well, the electric power regenerated by the first rotating electric machine 11 is controlled according to the steering angle θ and the vehicle speed VP.

Note that an execution condition for executing the fourth torque distribution control for reducing the right yaw moment is e.g. a condition that it is during deceleration traveling of the vehicle VFR, the state of charge of the battery 23 is lower than the upper limit value, and also the braking torque demanded of the first rotating electric machine 11 is smaller than the above-mentioned second upper limit torque.

Note that to reduce the right yaw moment, the zero torque control may be performed on the first rotating electric machine 11, and the powering may be performed by the second rotating electric machine 12. In this case, only the second motor output torque TM2 is generated, so that as is apparent from FIG. 8, the left output shaft-transmitted torque is represented by −RLM2, and the right output shaft-transmitted torque is represented by RRM2. Thus, the braking torque acts on the left output shaft SRL, and the drive torque acts on the right output shaft SRR, so that the right yaw moment of the vehicle VFR is reduced. In this case as well, the electric power supplied to the second stator 12*a* is controlled according to the steering angle θ, the vehicle speed VP, and the accelerator pedal opening AP.

Note that when the vehicle VFR turns to the left during forward traveling, to increase a counterclockwise yaw moment for causing the vehicle VFR to perform left turning (hereinafter referred to as the "left yaw moment"), first torque distribution control to fourth torque distribution control for increasing the left yaw moment during the left turning of the vehicle VFR is executed. To reduce the left yaw moment, first torque distribution control to fourth torque distribution control for reducing the left yaw moment during the left turning of the vehicle VFR is executed. The above first torque distribution control to fourth torque distribution control for increasing and reducing the left yaw moment during the left turning of the vehicle VFR are executed similarly to the above-described first torque distribution control to fourth torque distribution control for increasing and reducing the right yaw moment during the right turning of the vehicle VFR, respectively, and detailed description thereof is omitted.

Further, the correspondence between various elements of the first embodiment and various elements of the present invention is as follows: The vehicle VFR of the first embodiment corresponds to means of transportation of the present invention, and the left and right output shafts SRL and SRR of the first embodiment correspond to one and the other of two driven parts of the present invention, respectively. Further, the first and second rotating electric machines 11 and 12 of the first embodiment correspond to first and second energy input/output devices of the present invention, respectively.

Further, the carrier member 13 of the first embodiment corresponds to a carrier of the present invention, and the first sun gear S1, the first ring gear R1, the second sun gear S2, and the second ring gear R2 of the first embodiment correspond to a first gear, a second gear, a third gear, and a fourth gear of the present invention, respectively. Further, the engine 3 of the first embodiment corresponds to an energy output unit of the present invention. Furthermore, the first and second sun gears S1 and S2 of the first embodiment correspond to first and second outer rotary elements of the present invention, respectively. Further, the first and second ring gears R1 and R2 of the first embodiment correspond to first and second quasi-outer rotary elements of the present invention, respectively, and the carrier member 13 of the first embodiment corresponds to a central rotary element of the present invention.

As described hereinabove, according to the first embodiment, the differential gear unit GS formed by combining the first and second planetary gear mechanisms of the single planetary type with each other forms the five rotary elements formed by the first sun gear S1, the second ring gear R2, the carrier member 13, the first ring gear R1, and the second sun gear S2, the rotational speeds of which are in a collinear relationship with each other. Therefore, compared with the above-described conventional differential gear unit formed by combining the three planetary gear mechanisms of the single planetary type with each other, it is possible to reduce the number of component parts, which in turn makes it possible to downsize the differential gear unit GS.

Further, only by setting the tooth numbers ZR1 and ZR2 of the first and second ring gears R1 and R2, and the tooth numbers ZS1 and ZS2 of the first and second sun gears S1 and S2 to the same values, respectively, it is possible to easily set the first and second lever ratios α and β to the same value. This makes it possible to accurately and easily perform torque distribution control for controlling distribution of torque to the left and right output shafts SRL and SRR using the first and second rotating electric machines 11 and 12, and therefore it is possible to enhance turnability of the vehicle VFR.

Furthermore, the tooth numbers ZR1 and ZR2 of the first and second ring gears R1 and R2 are set to the same value. For this reason, for example, when both the first and second ring gears R1 and R2 are formed by spur gears, both the gears R1 and R2 can be machined by the same cutter, whereas when they are formed by helical gears, they can be machined by cutters which are the same in specifications but different only in the direction of torsion. Therefore, the first and second ring gears R1 and R2 are excellent in productivity. The same applies to the first and second sun gears S1 and S2.

Figure 88:
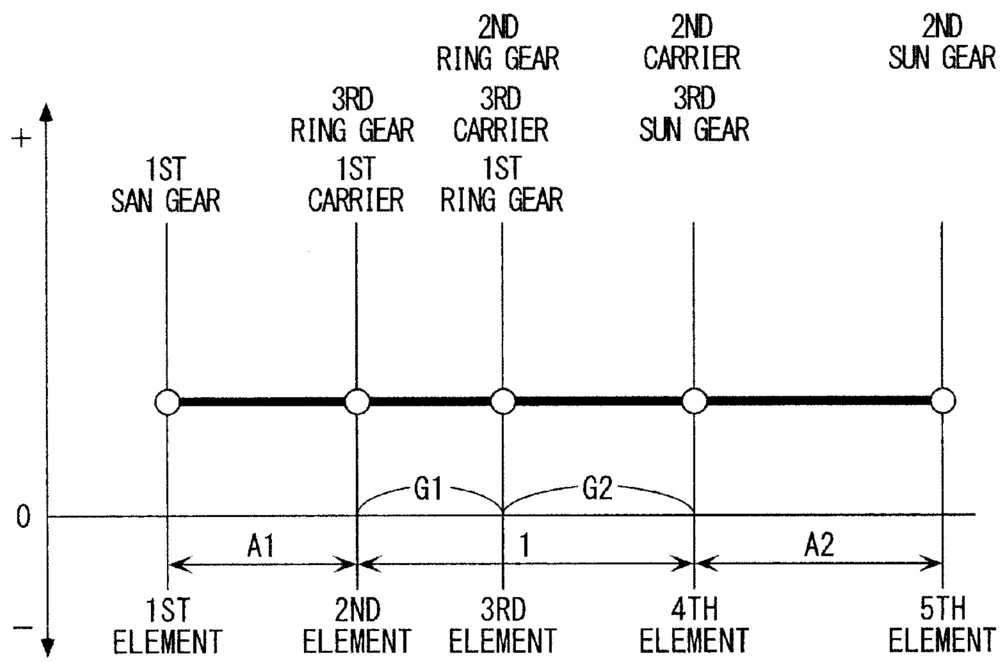
FIG. 88 A collinear chart showing a rotational speed relationship between various types of rotary elements of a conventional differential gear unit.

Further, in the above-described conventional differential gear unit, as is apparent from the collinear chart indicating the relationship between the rotational speeds of the first to fifth elements shown in FIG. 88, torque transmitted to the third element is distributed to the second and fourth elements at a distribution ratio of G2:G1 (G2>G1). On the other hand, according to the first embodiment, the distribution ratio of torque distributed from the carrier member 13 to the left and right output shafts SRL and SRR is 1:1, as described above, so that it is possible to obtain excellent straight-advancing performance of the vehicle VFR during traveling of the vehicle VFR using only the engine 3 as a motive power source.

Furthermore, the first pinion gear P1 and the second pinion gear P2 have the same diameter and the same number of gear teeth, and accordingly the diameter of the first sun gear S1 and the diameter of the second sun gear S2, and the diameter of the first ring gear R1 and the diameter of the second ring gear R2 are set to the same values, respectively. This makes it possible to reduce a radial dead space of the differential gear unit GS. Further, the diameters, the tooth numbers, the tooth shapes, and the tooth widths of the first and second pinion gears P1 and P2 are equal to each other, respectively. That is, the gears P1 and P2 are set to be the same in specifications. Therefore, since it is possible to commonly use the same mold, cutter and the like, for manufacturing the first and second pinion gears P1 and P2, productivity thereof can be improved.

Further, since the engine 3 is connected to the carrier member 13, not only the first and second motor output torques TM1 and TM2 from the first and second rotating electric machines 11 and 12 but also the post-speed-change engine torque TE from the engine 3 are transmitted to the left and right output shafts SRL and SRR. This makes it possible to reduce torque demanded of the first and second rotating electric machines 11 and 12, whereby it is possible to downsize the two rotating electric machines 11 and 12.

Furthermore, since general rotating electric machines are used as the first and second rotating electric machines 11 and 12, it is possible to construct the power plant easily and more inexpensively, without using a special device. Further, in the case where distribution of torque to the left and right output shafts SRL and SRR is controlled as described above, it is possible to convert motive power to electric power using the first and second rotating electric machines 11 and 12. Therefore, by supplying the electric power obtained by the conversion to an accessory for the vehicle VFR, it is possible to reduce the operating load and operating frequency of a generator (not shown) for charging a power source (not shown) of the accessory.

Further, not the first and second sun gears S1 and S2 but the first and second ring gears R1 and R2 are connected to the left and right output shafts SRL and SRR, respectively, and therefore, as described with reference to FIGS. 89 and 90, it is possible to set the tooth widths of the first and second ring gears R1 and R2 to relatively small values, whereby it is possible to further downsize the power plant. For the same reason, it is possible to downsize the bearings supporting the first and second pinion gears P1 and P2 (hereinafter referred to as the "first pinion bearings" and the "second pinion bearings", respectively), which also makes it possible to downsize the power plant.

Figure 9:
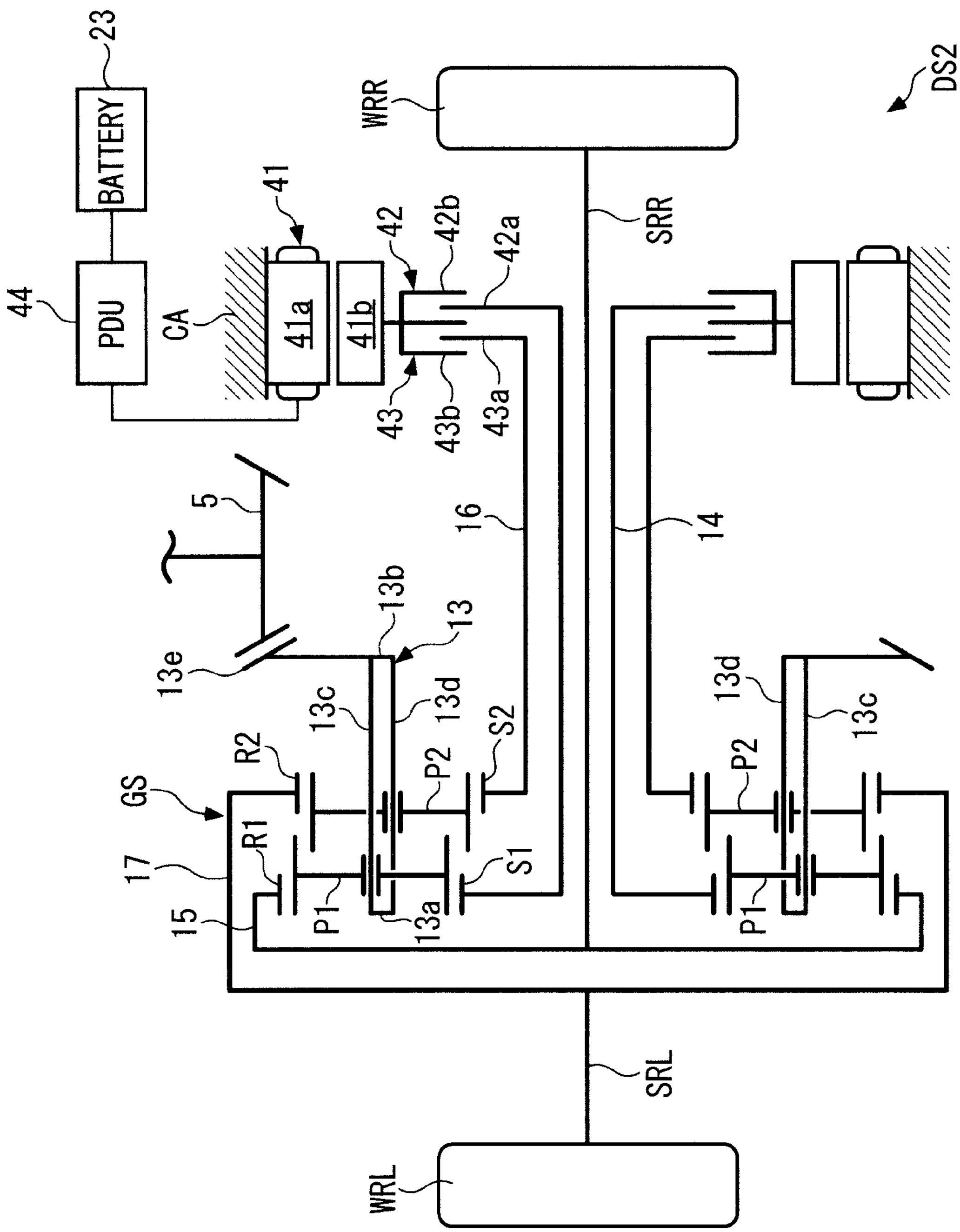
FIG. 9 A skeleton diagram of a power plant etc. according to a second embodiment of the present invention.

Next, a power plant according to a second embodiment of the present invention will be described with reference to FIG. 9. Compared with the first embodiment, a distribution system DS2 of this power plant is mainly different in that it includes a single rotating electric machine 41 in place of the first and second rotating electric machines 11 and 12, and includes a first clutch 42 and a second clutch 43 for connecting and disconnecting the rotating electric machine 41 to and from the above-described first and second sun gears S1 and S2, respectively. In FIG. 9, the same component elements as those of the first embodiment are denoted by the same reference numerals. The following description is given mainly of different points from the first embodiment.

The rotating electric machine 41 shown in FIG. 9 is an AC motor, similarly to the first and second rotating electric machines 11 and 12, and includes a stator 41*a* comprised of a plurality of iron cores and coils, and a rotor 41*b* comprised of a plurality of magnets. The rotating electric machine 41 is disposed coaxially with the left and right output shafts SRL and SRR, and is located between the differential gear unit GS and the right rear wheel WRR. The stator 41*a* is fixed to the immovable casing CA. The rotor 41*b* is disposed in a manner opposed to the stator 41*a*. In the rotating electric machine 41, when electric power is supplied to the stator 41*a*, the supplied electric power is converted to motive power, and is output to the rotor 41*b* (powering). Further, when the motive power is input to the rotor 41*b*, this motive power is converted to electric power, and is output to the stator 41*a* (regeneration).

Further, the stator 41*a* is electrically connected to the above-described battery 23 via a power drive unit (hereinafter referred to as the "PDU") 44, and is capable of supplying and receiving electric energy to and from the battery 23. The PDU 44 is formed by an electric circuit comprised e.g. of an inverter, similarly to the above-described first and second PDUs 21 and 22. As shown in FIG. 10, the ECU 2, described above, is electrically connected to the PDU 44. The ECU 2 controls the PDU 44 to thereby control electric power supplied to the stator 41*a*, electric power generated by the stator 41*a*, and the rotational speed of the rotor 41*b*.

The first clutch 42 is formed by a hydraulic friction clutch, and includes an inner 42*a* and an outer 42*b* each having an annular plate shape. The inner 42*a* and the outer 42*b* are arranged coaxially with the left and right output shafts SRL and SRR. The inner 42*a* is integrally mounted on the other end of the above-described first rotating shaft 14, and the outer 42*b* is integrally mounted on the rotor 41*b*. The degree of engagement of the first clutch 42 is controlled by the ECU 2 (see FIG. 10), whereby the first rotating shaft 14 and the rotor 41*b*, i.e. the first sun gear S1 and the rotor 41*b* are connected to and disconnected from each other.

Further, similarly to the first clutch 42, the second clutch 43 is formed by a hydraulic friction clutch, and includes an inner 43*a* and an outer 43*b* each having an annular plate shape. The inner 43*a* and the outer 43*b* are arranged coaxially with the left and right output shafts SRL and SRR. The inner 43*a* is integrally mounted on the other end of above-described third rotating shaft 16, and the outer 43*b* is integrally mounted on the rotor 41*b*. The degree of engagement of the second clutch 43 is controlled by the ECU 2 (see FIG. 10), whereby the third rotating shaft 16 and the rotor 41*b*, i.e. the second sun gear S2 and the rotor 41*b* are connected to and disconnected from each other.

In the power plant constructed as above, by controlling the degree of the engagement of the first and second clutches 42 and 43, the rotor 41*b* and one of the first and second sun gears S1 and S2 are selectively connected, and by performing powering or regeneration by the rotating electric machine 41, it is possible to control distribution of torque to the left and right output shafts SRL and SRR, similarly to the first embodiment, whereby it is possible to increase or decrease the left and right yaw moment of the vehicle VFR. Hereinafter, a description will be given of torque distribution control performed by the power plant according to the second embodiment.

[Torque Distribution Control]

Figure 11:
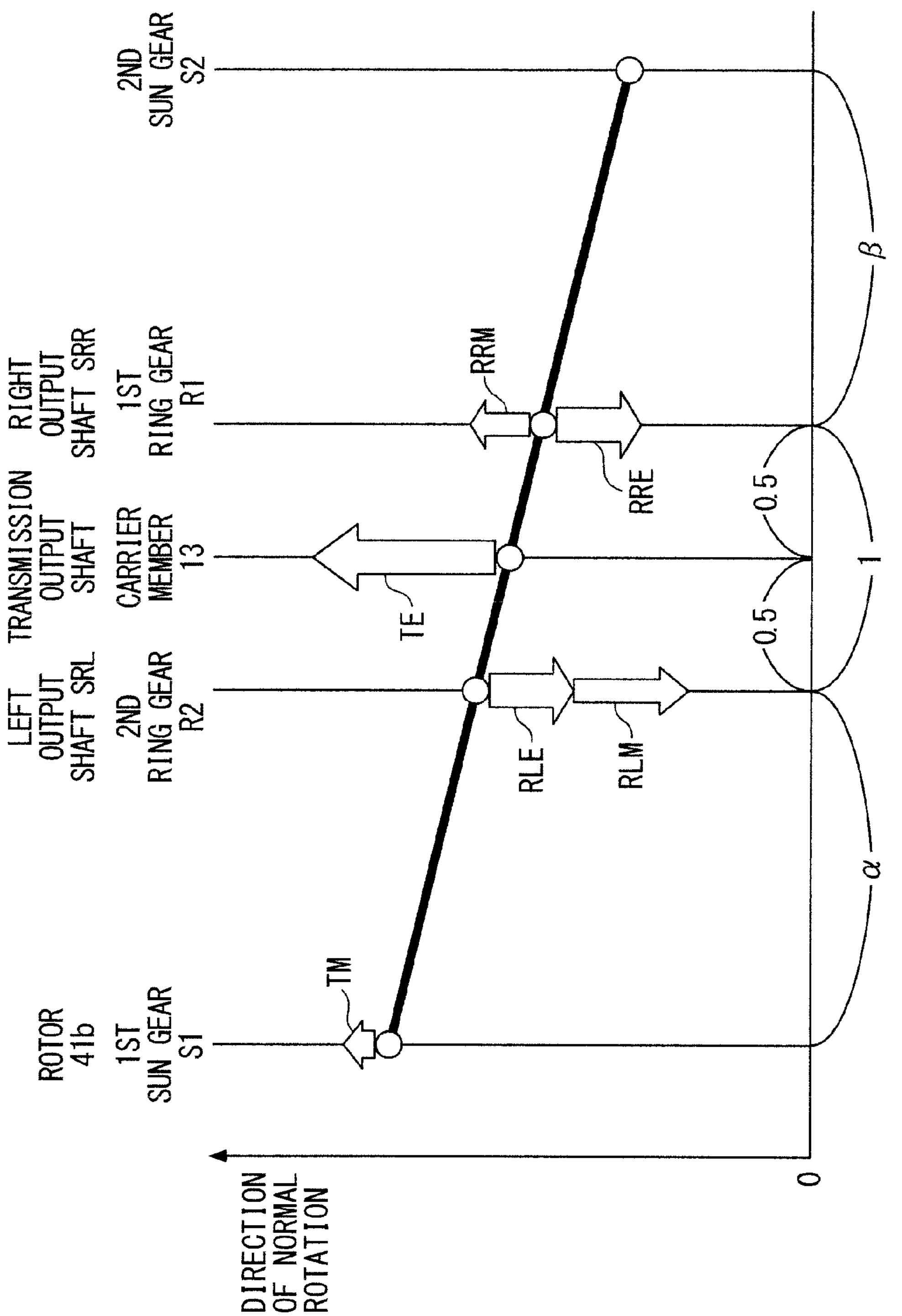
FIG. 11 A collinear chart showing a rotational speed relationship and a torque balance relationship between various types of rotary elements of the power plant shown in FIG. 9, as to during first torque distribution control for increasing right yaw moment.

During the right turning of the vehicle VFR, when the right yaw moment is increased, first torque distribution control and second torque distribution control for increasing the right yaw moment during the right turning of the vehicle VFR are executed. In the first torque distribution control, the first clutch 42 is engaged to thereby connect between the rotor 41*b* to the first sun gear S1, the second clutch 43 is disengaged to thereby disconnect the rotor 41*b* from the second sun gear S2, and the rotating electric machine 41 performs the powering. FIG. 11 shows a rotational speed relationship and a torque balance relationship between various types of rotary elements, during the first torque distribution control for increasing the right yaw moment.

In FIG. 11, TM represents output torque generated by the rotor 41*b* along with the powering by the rotating electric machine 41 (hereinafter referred to as the "motor output torque"). RLM and RRM represent reaction force torques acting on the left output shaft SRL and the right output shaft SRR along with the powering by the rotating electric machine 41, respectively. The other parameters are as described above in the first embodiment. In this case, the left output shaft-transmitted torque is represented by RLE+RLM, and the right output shaft-transmitted torque is represented by RRE−RRM. Thus, the drive torque acts on the left output shaft SRL, and the braking torque acts on the right output shaft SRR, so that the right yaw moment of the vehicle VFR is increased.

Figure 12:
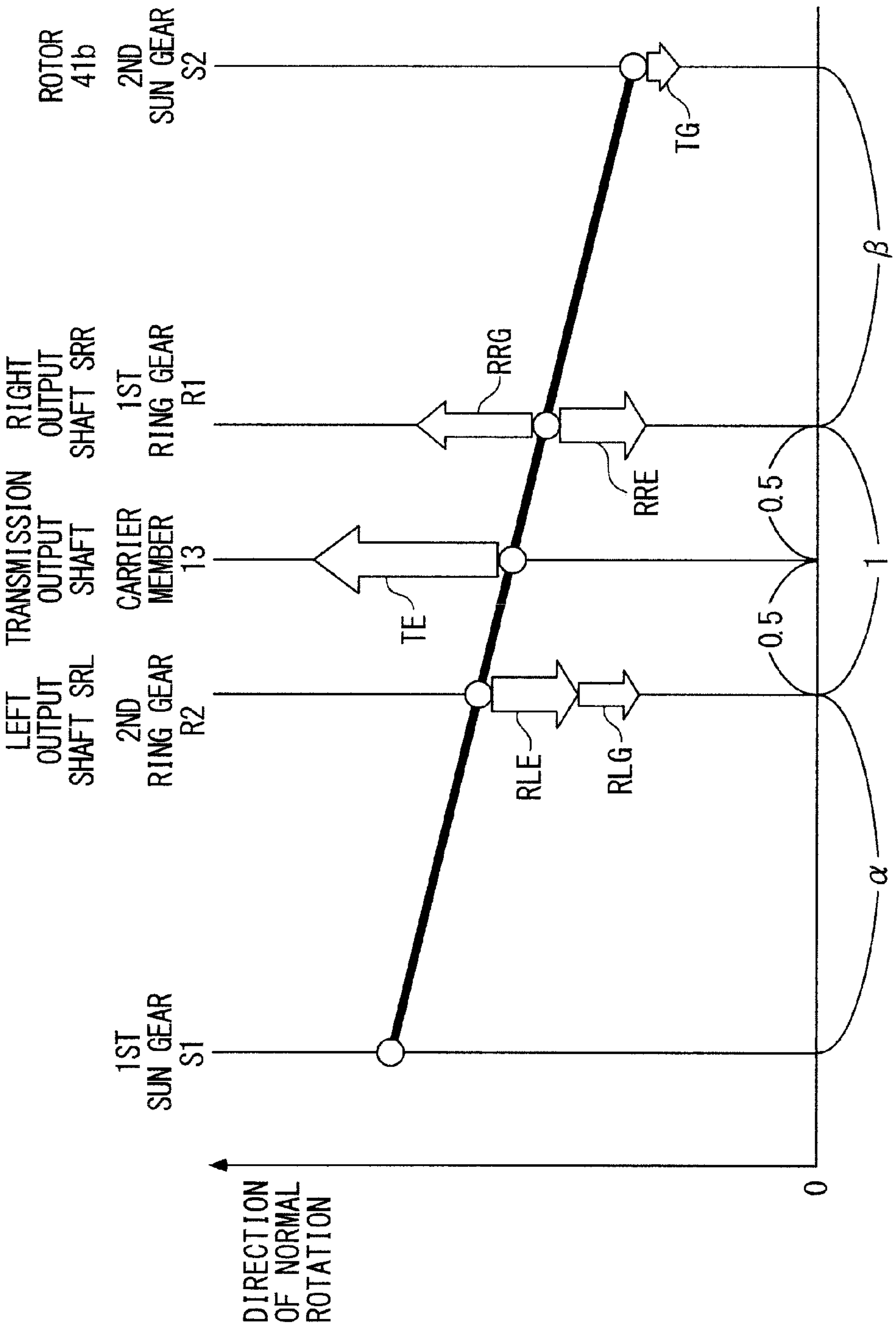
FIG. 12 A collinear chart showing a rotational speed relationship and a torque balance relationship between the various types of rotary elements of the power plant shown in FIG. 9, as to during second torque distribution control for increasing the right yaw moment.

Further, in the above-mentioned second torque distribution control for increasing the right yaw moment, the first clutch 42 is disengaged to thereby disconnect the rotor 41*b* from the first sun gear S1, the second clutch 43 is engaged to thereby connect the rotor 41*b* to the second sun gear S2, and the rotating electric machine 41 performs the regeneration. FIG. 12 shows a rotational speed relationship and a torque balance relationship between the various types of rotary elements, during the second torque distribution control for increasing the right yaw moment.

In FIG. 12, TG represents braking torque generated by the rotor 41*b* along with the regeneration by the rotating electric machine 41 (hereinafter referred to as the "motor braking torque"). RLG and RRG represent the reaction force torques acting on the left output shaft SRL and the right output shaft SRR along with the regeneration by the rotating electric machine 41, respectively. The other parameters are as described above in the first embodiment. In this case, the left output shaft-transmitted torque is represented by RLE+RLG, and the right output shaft-transmitted torque is represented by RRE−RRG. Thus, the drive torque acts on the left output shaft SRL, and the braking torque acts on the right output shaft SRR, so that the right yaw moment of the vehicle VFR is increased.

Figure 13:
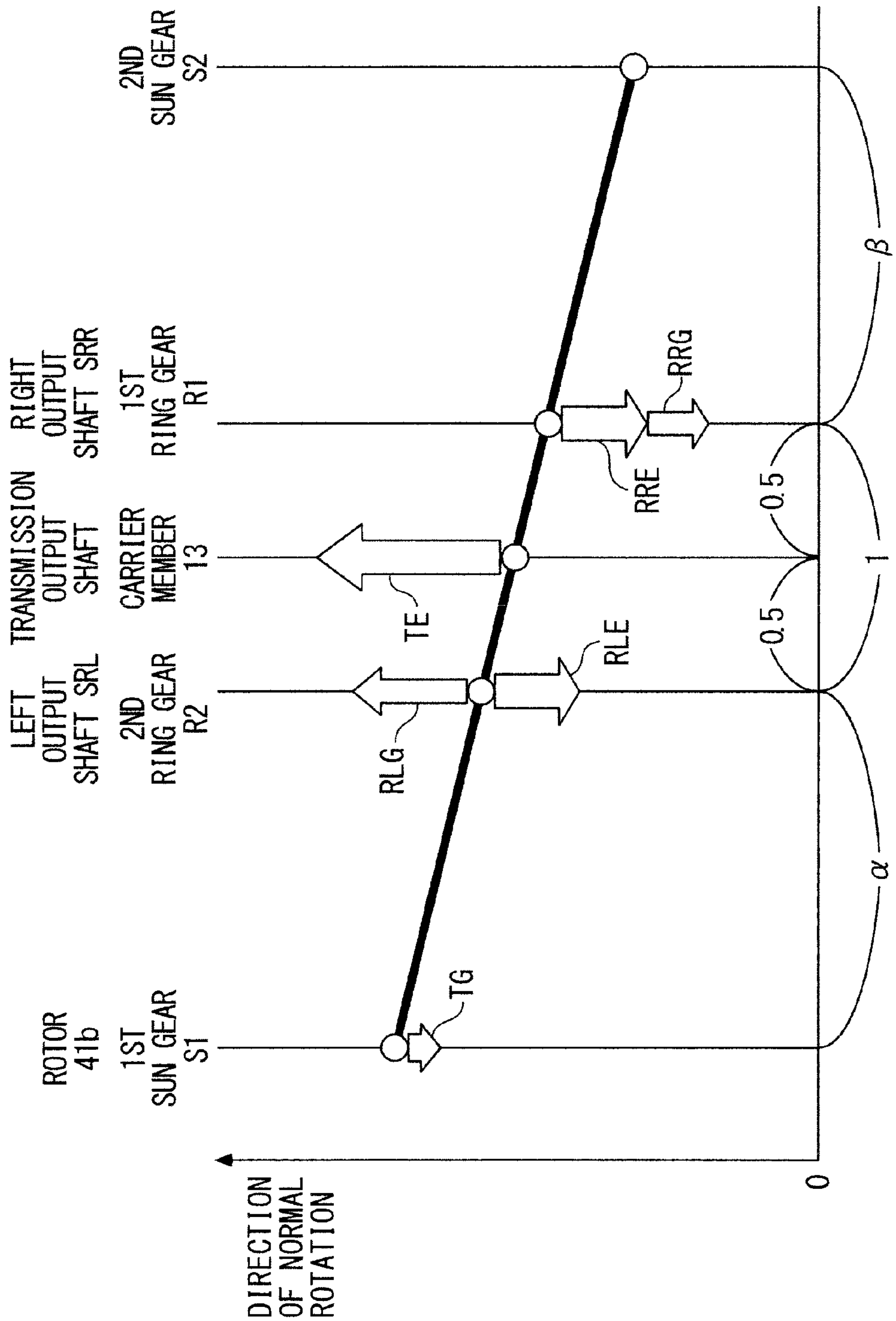
FIG. 13 A collinear chart showing a rotational speed relationship and a torque balance relationship between the various types of rotary elements of the power plant shown in FIG. 9, as to during first torque distribution control for reducing the right yaw moment.

Further, during the right turning of the vehicle VFR, when the right yaw moment is reduced, first torque distribution control and second torque distribution control for reducing the right yaw moment during the right turning of the vehicle VFR are executed. In the first torque distribution control for reducing the right yaw moment, the first clutch 42 is engaged to thereby connect the rotor 41*b* to the first sun gear S1, the second clutch 43 is disengaged to thereby disconnect the rotor 41*b* from the second sun gear S2, and the rotating electric machine 41 performs the regeneration. FIG. 13 shows a rotational speed relationship and a torque balance relationship between the various types of rotary elements, during the first torque distribution control for reducing the right yaw moment. In this case, the left output shaft-transmitted torque is represented by RLE−RLG, and the right output shaft-transmitted torque is represented by RRE+RRG. Thus, the braking torque acts on the left output shaft SRL, and the drive torque acts on the right output shaft SRR, so that the right yaw moment of the vehicle VFR is reduced.

Further, in the second torque distribution control for reducing the right yaw moment, the first clutch 42 is disengaged to thereby disconnect the rotor 41*b* from the first sun gear S1, the second clutch 43 is engaged to thereby connect the rotor 41*b* to the second sun gear S2, and the rotating electric machine 41 performs the powering. FIG. 14 shows a rotational speed relationship and a torque balance relationship between the various types of rotary elements, during the second torque distribution control for reducing the right yaw moment. In this case, the left output shaft-transmitted torque is represented by RLE−RLM, and the right output shaft-transmitted torque is represented by RRE+RRM. Thus, the braking torque acts on the left output shaft SRL, and the drive torque acts on the right output shaft SRR, so that the right yaw moment of the vehicle VFR is reduced.

Furthermore, when the left yaw moment is increased or reduced during the left turning of the vehicle VFR, there are executed the first torque distribution control and the second torque distribution control for increasing or decreasing the left yaw moment during the left turning of the vehicle VFR. The first torque distribution control and the second torque distribution control for increasing and reducing the left yaw moment during the left turning of the vehicle VFR are executed similarly to the above-described respective first torque distribution control and second torque distribution control for increasing and reducing the right yaw moment during the right turning of the vehicle VFR, and detailed description thereof is omitted.

As described hereinabove, according to the second embodiment, torque distribution control for controlling distribution of torque to the left and right output shafts SRL and SRR can be performed using only the single rotating electric machine 41, and hence it is possible to reduce the manufacturing costs of the power plant. Further, when the vehicle VFR is driven using only the engine 3 as a motive power source, the first and second clutches 42 and 43 disconnect the rotor 41*b* from the first and second sun gears S1 and S2, whereby it is possible to prevent motive power from being wastefully transmitted from the engine 3 to the rotating electric machine 41, and therefore it is possible to prevent losses from being caused by dragging the rotating electric machine 41.

Further, according to the power plant of the second embodiment, during rapid turning or high-speed straight forward traveling of the vehicle VFR, the differential rotation between the left and right output shafts SRL and SRR can be limited, whereby it is possible enhance the stability of the behavior of the vehicle VFR. Hereinafter, a control operation for limiting the differential rotation between the left and right output shafts SRL and SRR is referred to as the "differential limit control", as deemed appropriate, and a description will be given of this differential limit control.

[Differential Limit Control]

During the differential limit control, basically, the zero torque control is performed on the rotating electric machine 41, and the degree of the engagement of the first and second clutches 42 and 43 is controlled, whereby the rotor 41*b* and the first and second sun gears S1 and S2 are connected to each other. With this control, the first and second sun gears S1 and S2 are connected to each other via the rotor 41*b*, so that when a differential rotation occurs between the two S1 and S2, reaction forces from the first and second clutches 42 and 43 act on the first and second sun gears S1 and S2, respectively. These reaction forces act on the first and second sun gears S1 and S2 such that they are caused to rotate in unison with each other. In this case, the rotational speeds of the five rotary elements formed by the first sun gear S1, the second ring gear R2, the carrier member 13, the first ring gear R1, and the second sun gear S2 are in a collinear relationship with each other, and therefore the reaction forces from the first and second clutches 42 and 43 act such that these five rotary elements are caused to rotate in unison with each other, whereby the differential rotation between the left and right output shafts SRL and SRR, which are connected to the second and first ring gears R2 and R1, respectively, is limited.

Figure 15:
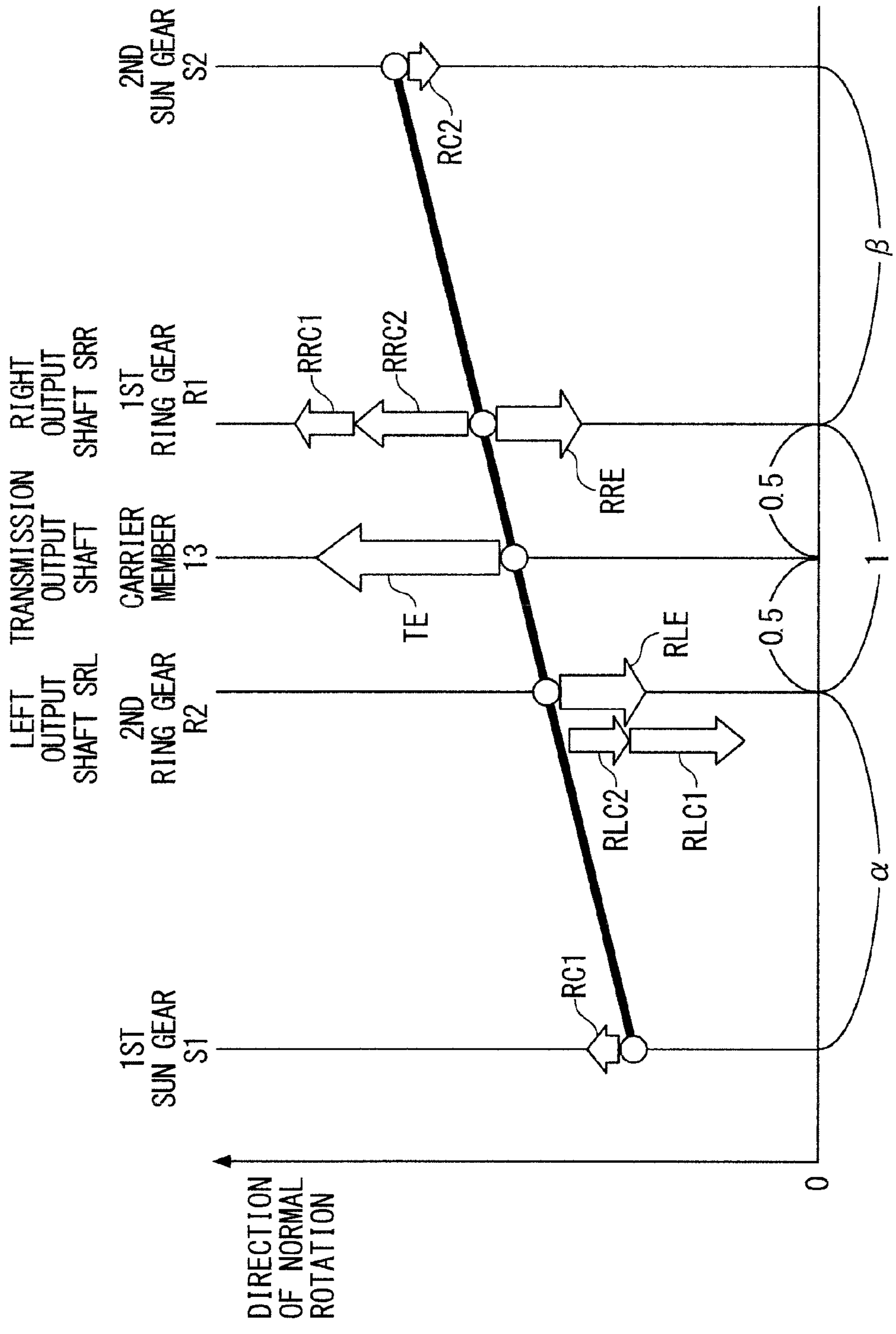
FIG. 15 A collinear chart showing a rotational speed relationship and a torque balance relationship between the various types of rotary elements of the power plant shown in FIG. 9, as to during differential limit control of left and right output shafts.

FIG. 15 shows a rotational speed relationship and a torque balance relationship between the various types of rotary elements, exhibited when the first and second clutches 42 and 43 are both engaged in a case where the rotational speed of the left output shaft SRL is lower than the rotational speed of the right output shaft SRR. In FIG. 15, RC1 represents a reaction force torque acting from the first clutch 42 on the first sun gear S1 along with engagement of both the first and second clutches 42 and 43, and RLC1 and RRC1 represent reaction force torques acting on the left and right output shafts SRL and SRR, respectively, as the reaction force torque RC1 acts on the first sun gear S1. Further, RC2 represents a reaction force torque acting from the second clutch 43 on the second sun gear S2 along with engagement of both the first and second clutches 42 and 43, and RLC2 and RRC2 represent reaction force torques acting on the left and right output shafts SRL and SRR, respectively, as the reaction force torque RC2 acts on the carrier member.

In this case, torque transmitted to the left output shaft SRL along with the engagement of the first and second clutches 42 and 43 is represented by $RLC1+RLC2=RC1\times(\alpha+1)+RC2\times\beta$, and torque transmitted to the right output shaft SRR along therewith is represented by $-(RRC1+RRC2)=-\{RC1\times\alpha+RC2\times(\beta+1)\}$. Thus, the drive torque acts on the left output shaft SRL which is lower in rotational speed, and the braking torque acts on the right output shaft SRR which is higher in rotational speed, so that the differential rotation between the left and right output shafts SRL and SRR is reduced and limited. But inversely to the above, when the rotational speed of the right output shaft SRR is lower than the rotational speed of the left output shaft SRL, the drive torque acts on the right output shaft SRR which is lower in rotational speed, and the braking torque acts on the left output shaft SRL which is higher in rotational speed, so that the differential rotation between the left and right output shafts SRL and SRR is reduced and limited. Further, as is apparent from the fact that the first and second sun gears S1 and S2 are connected, the reaction force torques RC1 and RC2, which act on the first and second sun gears S1 and S2 from the first and second clutches 42 and 43, respectively, are different only in that the directions thereof are opposite, but they are equal in magnitude to each other.

From the above, the sum total of differential limiting torques, which are caused by engagement of the first and second clutches 42 and 43 and act on the left and right output shafts SRL and SRR, respectively, such that the differential rotation between the left and right output shafts SRL and SRR is limited (hereinafter referred to as the "total differential limiting torque"), is represented —by $RC1\times(\alpha+1)+RC1\times\beta+\{RC1\times\alpha+RC1\times(\beta+1)\}=2\times RC1\times(\alpha+\beta+1)$, when RC1 is used as a representative of the reaction force torques RC1 and RC2. The total differential limiting torque in this case becomes larger than in a case where a combination of two rotary elements other than the combination of the first and second sun gears S1 and S2, which are selected from the five rotary elements formed by the first sun gear S1, the second ring gear R2, the carrier member 13, the first ring gear R1, and the second sun gear S2, are connected to each other by the first and second clutches 42 and 43. For details thereof, refer to Japanese Patent Application No. 2012-074211.

As described above, by connecting the first and second sun gears S1 and S2 of the five rotary elements (the first sun gear S1, the second ring gear R2, the carrier member 13, the first ring gear R1, and the second sun gear S2), which are rotary elements positioned at opposite outermost ends in the collinear chart, to each other, it is possible to obtain the largest total differential limiting torque. This makes it possible to reduce reaction force torque which is required of the first and second clutches 42 and 43 to limit the differential rotation between the left and right output shafts SRL and SRR, and hence it is possible to downsize the first and second clutches 42 and 43.

In this case, as is apparent from the aforementioned equation, as the reaction force torques RC1 and RC2 are larger, the total differential limiting torque becomes larger. Therefore, by adjusting the reaction force torques of the first and second clutches 42 and 43 through controlling the degrees of engagement of the first and second clutches 42 and 43, it is possible to control the total differential limiting torque, and hence it is possible to control the degree of limiting the differential rotation between the left and right output shafts SRL and SRR.

Further, by performing the powering using the rotating electric machine 41 in a state in which both the first and second clutches 42 and 43 are completely engaged, it is possible to transmit torque having the same magnitude from the rotating electric machine 41 to the left and right output shafts SRL and SRR via the differential gear unit GS. This makes it possible to cause the vehicle VFR to properly travel straight forward, using only the rotating electric machine 41 as a motive power source.

Note that in the case where both the first and second clutches 42 and 43 are engaged as described above, when the powering or regeneration is performed by the rotating electric machine 41, it is possible to control the torques distributed to the left and right output shafts SRL and SRR, through controlling the degrees of engagement of the first and second clutches 42 and 43, whereby it is possible to increase or decrease the left or right turning moment of the vehicle VFR.

In this case, e.g. when powering is performed by the rotating electric machine 41, and the degree of engagement of the first clutch 42 is controlled such that it becomes larger than that of the second clutch 43 (e.g. when the first clutch 42 is completely engaged, and the second clutch 43 is caused to slide), torque transmitted from the rotating electric machine 41 to the first sun gear S1 of the differential gear unit GS becomes accordingly larger than torque transmitted to the second sun gear S2, whereby the left output shaft-transmitted torque becomes larger than the right output shaft-transmitted torque. Inversely to the above, when the degree of engagement of the second clutch 43 is controlled such that it becomes larger than that of the first clutch 42, the torque transmitted from the rotating electric machine 41 to the second sun gear S2 becomes accordingly larger than that to the first sun gear S1, whereby the right output shaft-transmitted torque becomes larger than the left output shaft-transmitted torque.

Next, a power plant according to a third embodiment of the present invention will be described with reference to FIG. 16. Compared with the second embodiment, a distribution system DS3 of this power plant is mainly different in that the rotating electric machine 41 is connected to the above-described carrier member 13 via a second transmission 51. In FIG. 16, the same component elements as those of the first and second embodiments are denoted by the same reference numerals. The following description is given mainly of different points from the first and second embodiments.

The second transmission 51 is a two-speed transmission of a planetary gear type, and changes the speed of motive power from the rotating electric machine 41 to transmit the same to the above-described carrier member 13. The second transmission 51 includes a sun gear ST, a ring gear RT which is rotatably provided around an outer periphery of the sun gear ST, a plurality of pinion gears PT (only two of which are shown) in mesh with the two gears ST and RT, and a carrier CT rotatably supporting the pinion gears PT. The sun gear ST is connected to the rotor 41*b* of the rotating electric machine 41 via a hollow cylindrical rotating shaft 52, and is rotatable in unison with the rotor 41*b*. Further, the above-described third rotating shaft 16 is relatively rotatably disposed inward of the rotating shaft 52. Furthermore, the carrier CT is connected to the carrier member 13 via a hollow cylindrical rotating shaft 53, and is rotatable in unison with the carrier member 13. The third rotating shaft 16 is relatively rotatably disposed inward of the rotating shaft 53.

Figure 17:
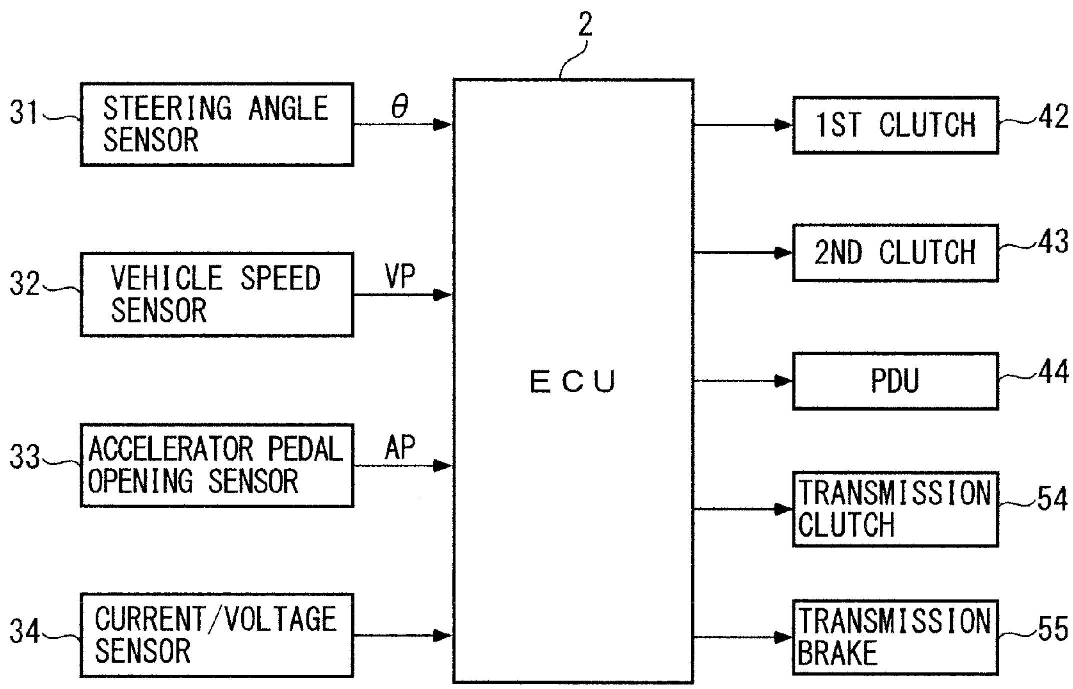
FIG. 17 A block diagram of an ECU etc. of the power plant shown in FIG. 16.

Further, the second transmission 51 includes a transmission clutch 54 and a transmission brake 55. The transmission clutch 54 is formed by a hydraulic friction clutch, similarly to the above-described first and second clutches 42 and 43. The degree of engagement of the transmission clutch 54 is controlled by the ECU 2 (see FIG. 17), whereby the carrier CT and the rotating shaft 52, i.e. the carrier CT and the sun gear ST are connected to and disconnected from each other. The transmission brake 55 is an electromagnetic brake, and is attached to the above-mentioned ring gear RT. The transmission brake 55 is turned on or off by the ECU 2 (see FIG. 17). In an ON state, the transmission brake 55 holds the ring gear RT unrotatable, whereas in an OFF state, the transmission brake 55 permits rotation of the ring gear RT.

In the second transmission 51 constructed as above, the motive power from the rotating electric machine 41 is transmitted to the carrier member 13 in a state changed in speed, in the following manner: The transmission clutch 54 is disengaged to thereby disconnect the carrier CT from the sun gear ST, and the transmission brake 55 is turned on to thereby hold the ring gear RT unrotatable. As a consequence, the motive power of the rotating electric machine 41 transmitted to the sun gear ST is transmitted to the carrier CT in a state reduced in speed, and is further transmitted to the carrier member 13 via the rotating shaft 53. Hereafter, an operation mode of the second transmission 51, in which the motive power input to the sun gear ST is output to the carrier member 13 in the state reduced in speed, is referred to as the "speed reduction mode".

Further, the transmission clutch 54 is engaged to thereby connect the carrier CT to the sun gear ST, and the transmission brake 55 is turned off to thereby permit rotation of the ring gear RT. As a consequence, the sun gear ST, the carrier CT, and the ring gear RT are rotated in unison therewith, whereby the motive power of the rotating electric machine 41 is directly transmitted to the carrier member 13 with the speed thereof unchanged.

Furthermore, the transmission clutch 54 is disengaged to thereby disconnect the carrier CT from the sun gear ST, and the transmission brake 55 is turned off to thereby permit rotation of the ring gear RT. In this case, even when the motive power of the rotating electric machine 41 is transmitted to the sun gear ST, or even when the motive power of the carrier member 13 is transmitted to the carrier CT, the ring gear RT is idly rotated, and hence transmission of motive power between the rotating electric machine 41 and the carrier member 13 via the second transmission 51 is interrupted. Hereinafter, an operation mode for interrupting the transmission of motive power via the second transmission 51 is referred to as the "motive power interruption mode".

The power plant according to the third embodiment constructed as above has the same functions as those of the power plant according to the second embodiment, and controls the rotating electric machine 41 and the first and second clutches 42 and 43 as described in the second embodiment, whereby it is possible to control distribution of torque to the left and right output shafts SRL and SRR, and limit the differential rotation between the left and right output shafts SRL and SRR. Therefore, it is possible to obtain the same advantageous effects as provided by the second embodiment, that is, the reduction of the manufacturing costs of the power plant and the like, obtained by performing the distribution control of torque using only the single rotating electric machine 41. Note that when the torque distribution control for controlling distribution of torque to the left and right output shafts SRL and SRR is performed similarly to the second embodiment, and when the differential rotation between the left and right output shafts SRL and SRR is limited, the second transmission 51 is driven in the above-mentioned motive power interruption mode (the transmission clutch 54: disengaged; the transmission brake 55: off), whereby the transmission of motive power between the rotating electric machine 41 and the carrier member 13 via the second transmission 51 is interrupted.

Further, by driving the second transmission 51 by the above-mentioned speed reduction mode (the transmission clutch 54: disengaged; the transmission brake 55: on), the motive power of the rotating electric machine 41 is transmitted to the differential gear unit GS in a state changed in speed by the second transmission 51, and is further transmitted to the left and right output shafts SRL and SRR, so that it is possible to drive the two SRL and SRR, together with the left and right rear wheels WRL and WRR, in the direction of normal rotation. This makes it possible to reduce the torque of the rotating electric machine 41, required for driving the left and right output shafts SRL and SRR, so that it is possible to downsize the rotating electric machine 41.

Hereinafter, an operation mode for transmitting the motive power of the rotating electric machine 41 to the left and right output shafts SRL and SRR in a state reduced in speed by the second transmission 51, and driving the two SRL and SRR will be referred to as the "MOT drive mode". The MOT drive mode is executed when only the rotating electric machine 41 is used, without using the engine 3, as a motive power source of the vehicle VFR, or when the engine 3 is assisted by the rotating electric machine 41. Further, during the MOT drive mode and at the same time during straight forward traveling of the vehicle VFR, basically, the rotor 41*b* and the first and second sun gears S1 and S2 are disconnected from each other by the first and second clutches 42 and 43.

Furthermore, during the MOT drive mode and at the same time during left or right turning of the vehicle VFR, by controlling the degrees of engagement of the first and second clutches 42 and 43, the rotor 41*b* and the first and second sun gears S1 and S2 are selectively connected to each other, whereby it is possible to control the torques distributed to the left and right output shafts SRL and SRR. Hereinafter, torque distribution control during the MOT drive mode will be described with reference to FIGS. 18 and 19.

[Torque Distribution Control During MOT Drive Mode]

Figure 18:
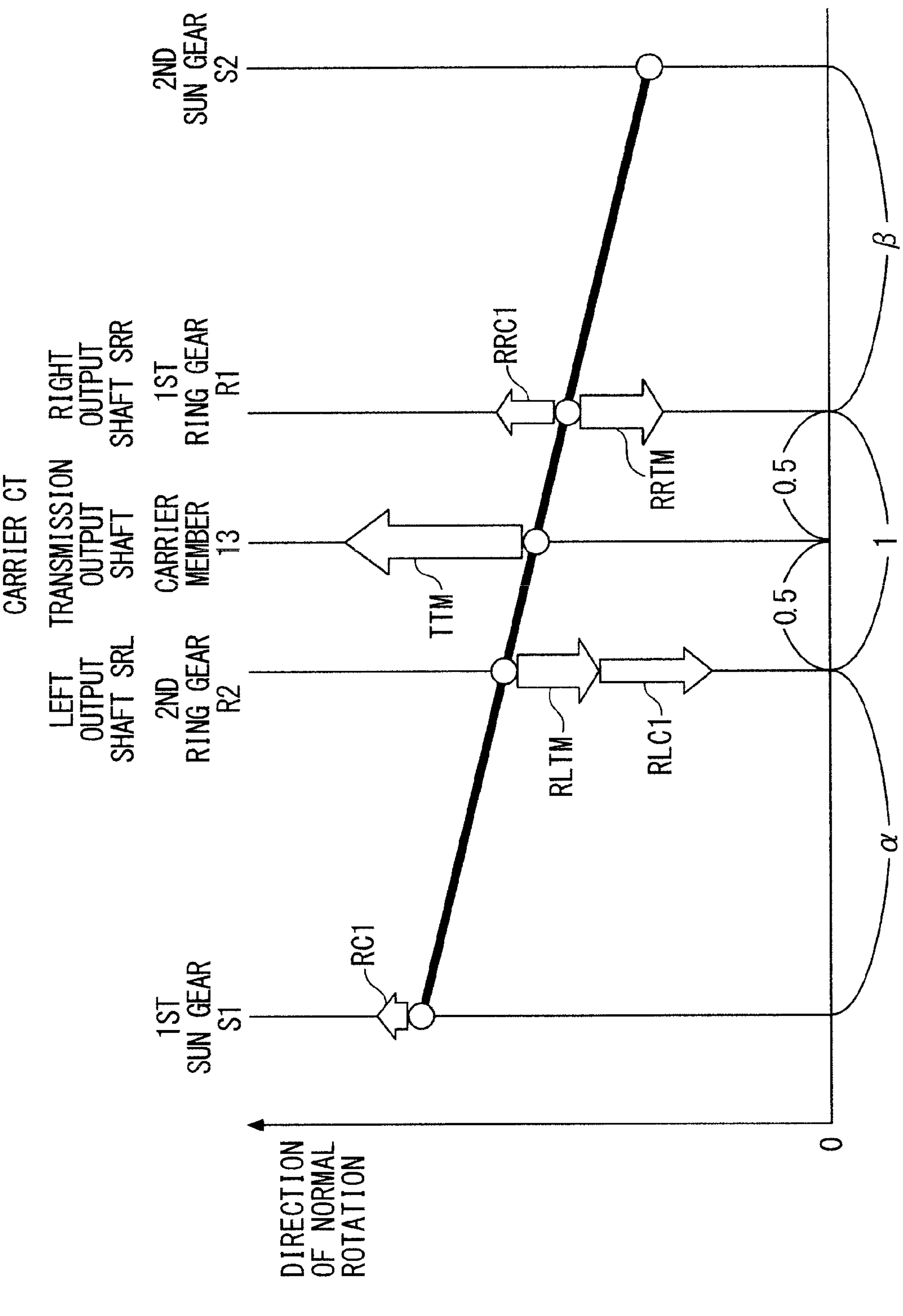
FIG. 18 A collinear chart showing a rotational speed relationship and a torque balance relationship between various types of rotary elements of the power plant shown in FIG. 16, as to a case when right yaw moment of the vehicle is increased during a MOT drive mode and at the same time during right turning of the vehicle.

FIG. 18 shows a rotational speed relationship and a torque balance relationship between various types of rotary elements, exhibited when right yaw moment of the vehicle VFR is increased during the MOT drive mode and at the same time during right turning of the vehicle VFR. In this case, the degree of engagement of the first clutch 42 is controlled to cause the first clutch 42 to slide, and the second clutch 43 is disengaged to thereby disconnect the rotor 41*b* from the second sun gear S2.

In FIG. 18, TTM represents torque transmitted from the rotating electric machine 41 to the carrier member 13 via the second transmission 51 (hereinafter referred to as the "post-speed-change motor torque"), and RLTM and RRTM represent reaction force torques which act on the respective left and right output shafts SRL and SRR along with transmission of the post-speed-change motor torque to the carrier member 13. In this case, in the collinear chart, the distance from the carrier member 13 to the left output shaft SRL and the distance from the carrier member 13 to the right output shaft SRR are equal to each other, and hence the reaction force torque RLTM and the reaction force torque RRTM are equal to each other. Further, as described with reference to FIG. 15 in the second embodiment, RC1 represents reaction force torque acting from the first clutch 42 on the first sun gear S1 as the first clutch 42 is caused to slide, and RLC1 and RRC1 represent reaction force torques acting on the left and right output shafts SRL and SRR, respectively, as the reaction force torque RC1 acts on the first sun gear S1.

Figure 19:
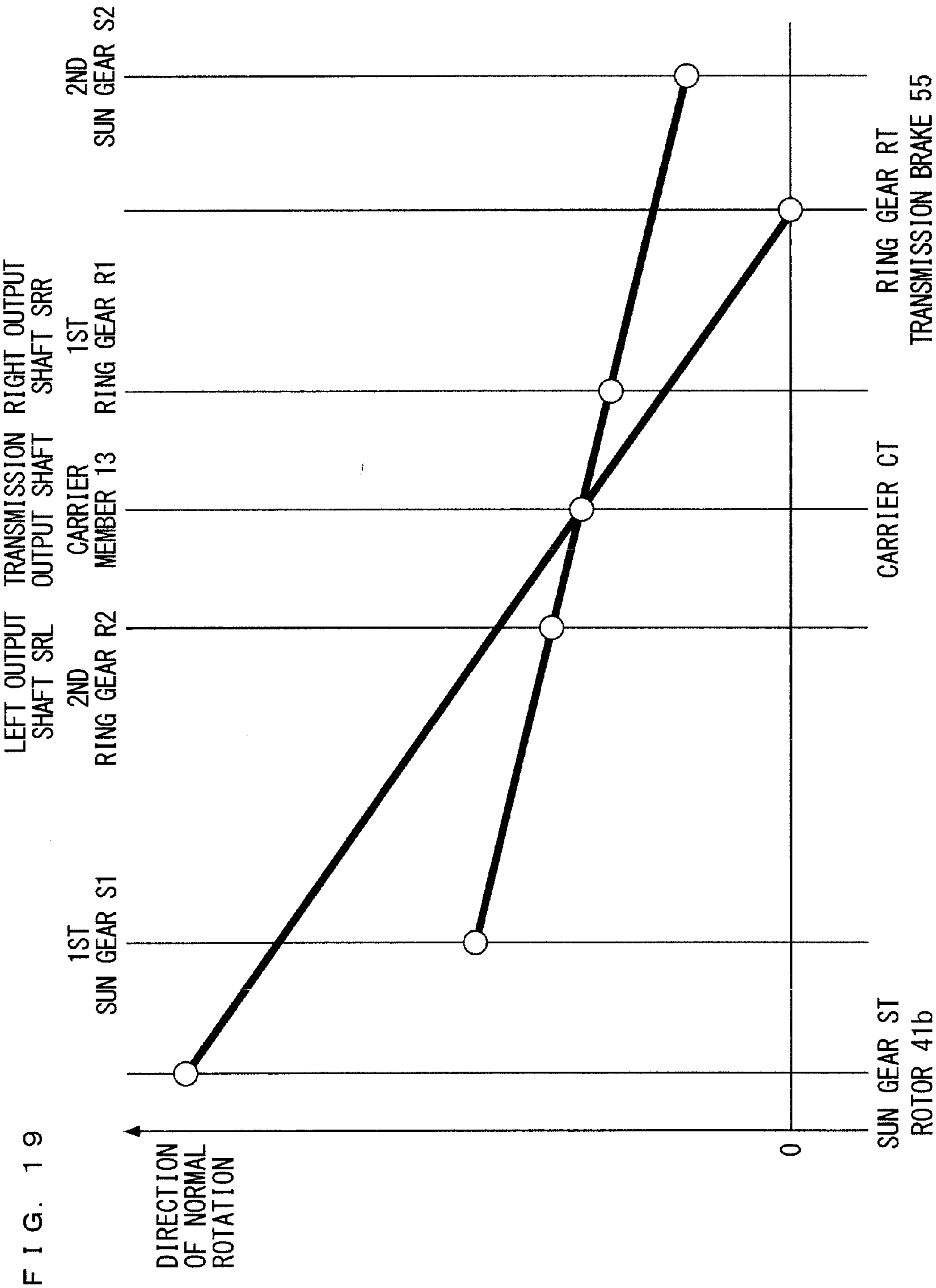
FIG. 19 A collinear chart showing a rotational speed relationship between the various types of rotary elements of the power plant shown in FIG. 16, as to during the MOT drive mode.

During the MOT drive mode, since the motive power of the rotating electric machine 41 is transmitted to the carrier member 13 in a state largely reduced in speed by the second transmission 51, the rotational speed of the rotor 41*b* has become higher than the rotational speed of the carrier member 13, as shown in FIG. 19, and further has also become higher than the rotational speed of the first sun gear S1. Note that a speed reducing ratio of the second transmission 51 (the number of the gear teeth of the sun gear ST and that of the ring gear RT) is set such that the rotational speed of the rotor 41*b* becomes higher than the rotational speed of one rotary element of the first and second sun gears S1 and S2, which is the higher in rotational speed, when the differential rotation between the left and right output shafts SRL and SRR is largest.

For this reason, as shown in FIG. 18, the reaction force torque RC1, which acts from the first clutch 42 on the first sun gear S1 as the first clutch 42 is caused to slide, acts such that the rotational speed of the first sun gear S1 is increased. Further, the left output shaft-transmitted torque is represented by RLTM+RLC1, and the right output shaft-transmitted torque is represented by RRTM−RRC1. Thus, the reaction force torque RC1 acts on the first sun gear S1 whereby the drive torque acts on the left output shaft SRL, and the braking torque acts on the right output shaft SRR. As a consequence, the left output shaft-transmitted torque becomes larger than the right output shaft-transmitted torque, so that the right yaw moment of the vehicle VFR is increased. As is apparent from the above, during left or right turning of the vehicle VFR in the MOT drive mode, the one rotary element of the first and second sun gears S1 and S2, which is the higher in rotational speed, is connected to the rotor 41*b* by engaging the first or second clutch 42 or 43, whereby it is possible to increase the left or right yaw moment of the vehicle VFR.

Inversely to the above, during the left or right turning of the vehicle VFR in the MOT drive mode, when the first or second clutch 42 or 43 connected to the one rotary element of the first and second sun gears S1 and S2, which is the lower in rotational speed, is caused to slide, respective reaction force torques acting from the first and second clutches 42 and 43 on the first and second sun gears S1 and S2 act such that the rotational speed of the one rotary element, which is the lower in rotational speed, is increased. Therefore, in this case, it is possible to reduce the left and right yaw moment of the vehicle VFR. Note that as described above, when distribution of the torque to the left and right output shafts SRL and SRR is controlled in the MOT drive mode, if the first and second clutches 42 and 43 are completely engaged, the difference between the left and right output shaft-transmitted torques is made too large by the engagement, and hence the two clutches 42 and 43 are controlled such that they are caused to slide without being completely engaged.

Figure 20:
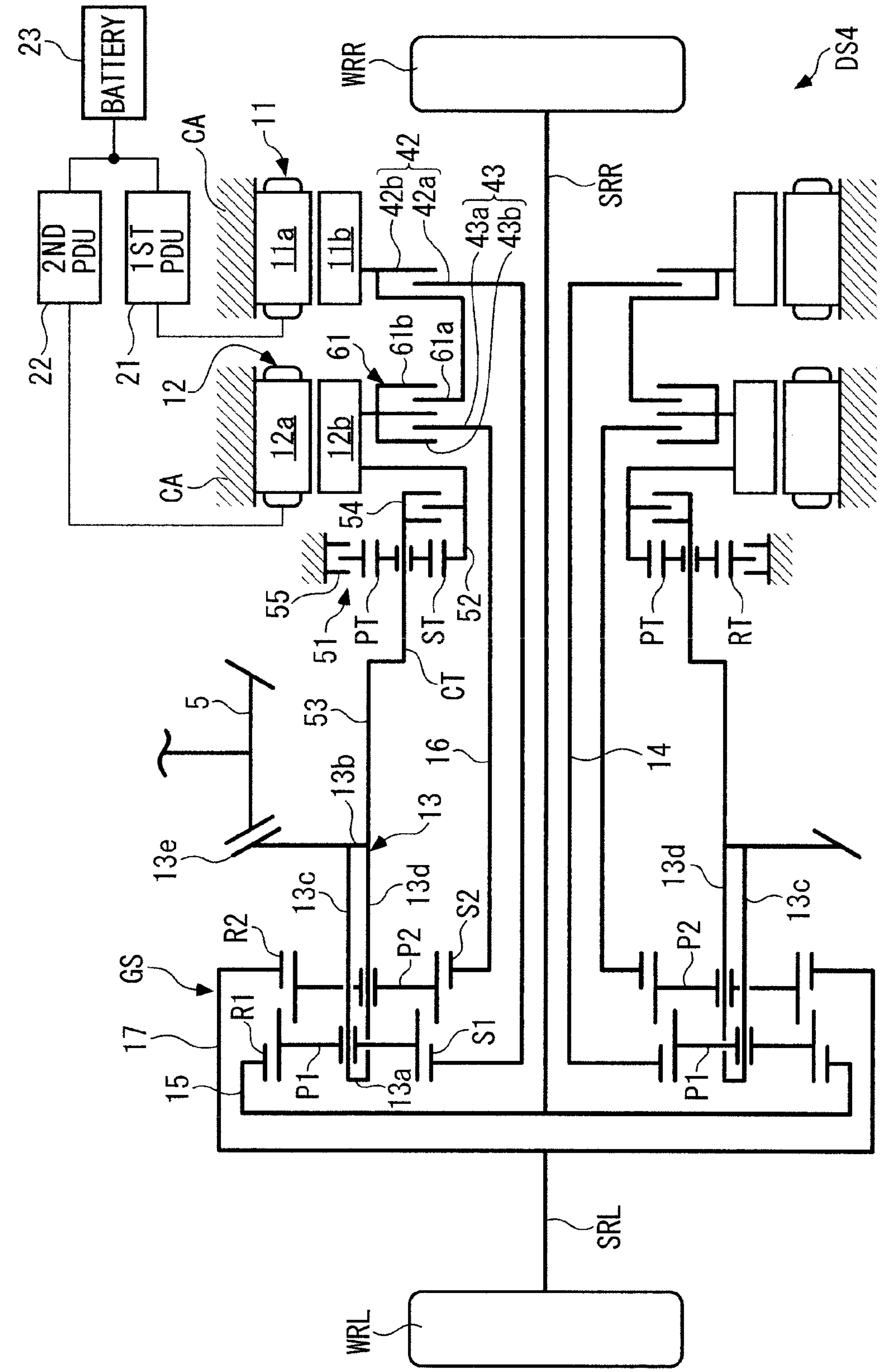
FIG. 20 A skeleton diagram of a power plant etc. according to a fourth embodiment of the present invention.

Next, a power plant according to a fourth embodiment of the present invention will be described with reference to FIG. 20. Compared with the third embodiment, a distribution system DS4 of this power plant is mainly different in that it includes the first and second rotating electric machines 11 and 12 in place of the rotating electric machine 41. In FIG. 20, the same component elements as those of the first to third embodiments are denoted by the same reference numerals. The following description is given mainly of different points from the first to third embodiments.

Figure 21:
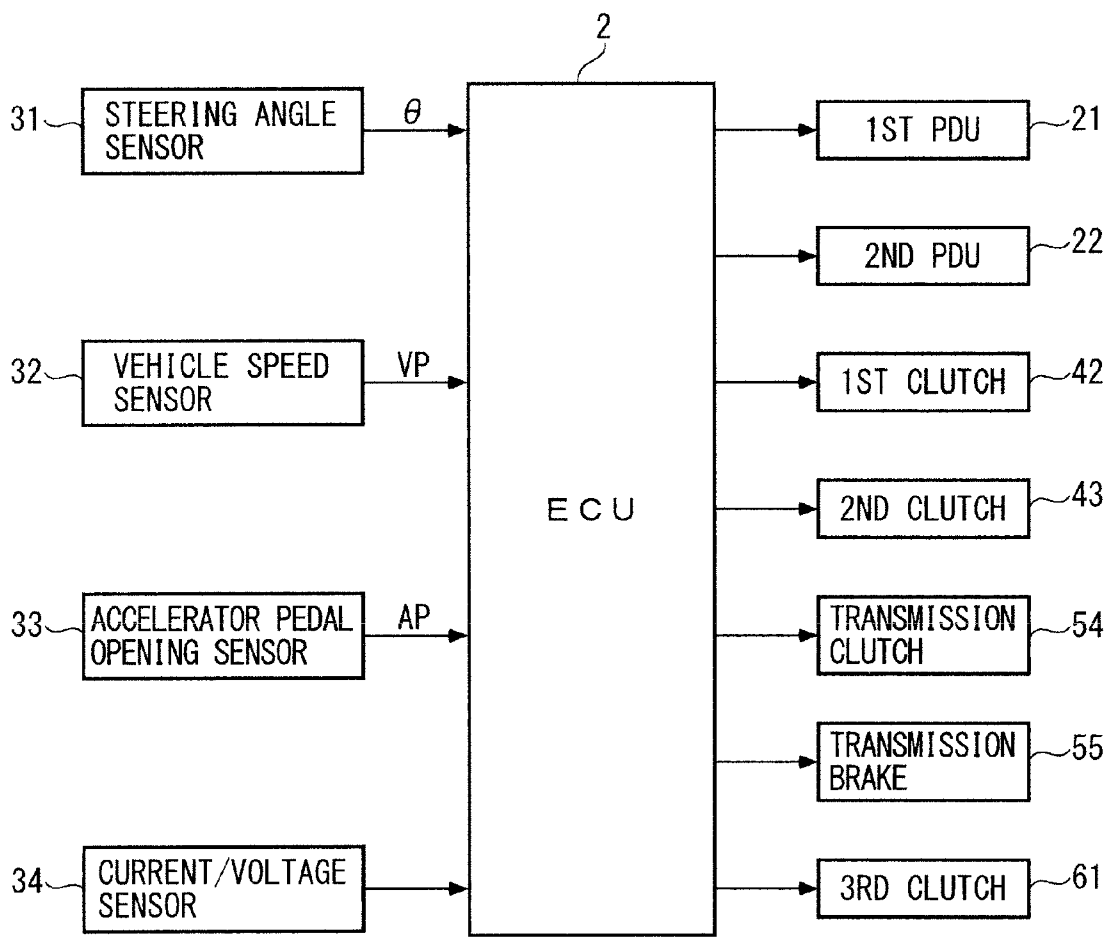
FIG. 21 A block diagram of an ECU etc. of the power plant shown in FIG. 20.

Similarly to the second and third embodiments, the inner 42*a* of the first clutch 42 is integrally mounted on the other end of the first rotating shaft 14. On the other hand, differently from the second and third embodiments, the outer 42*b* of the first clutch 42 is integrally mounted on the first rotor 11*b* of the first rotating electric machine 11. The degree of engagement of the first clutch 42 is controlled by the ECU 2 (see FIG. 21), whereby the first rotating shaft 14 and the first rotor 11*b*, i.e. the first sun gear S1 and the first rotor 11*b* are connected to and disconnected from each other.

Further, similarly to the second and third embodiments, the inner 43*a* of the second clutch 43 is integrally mounted on the other end of the third rotating shaft 16. On the other hand, the outer 43*b* of the second-clutch 43 is integrally mounted on the second rotor 12*b* of the second rotating electric machine 12. The degree of engagement of the second clutch 43 is controlled by the ECU 2 (see FIG. 21), whereby the third rotating shaft 16 and the second rotor 12*b*, i.e. the second sun gear S2 and the second rotor 12*b* are connected to and disconnected from each other.

Furthermore, similarly to the third embodiment, the carrier CT of the second transmission 51 is connected to the carrier member 13 via the rotating shaft 53, and is rotatable in unison with the carrier member 13. On the other hand, differently from the third embodiment, the sun gear ST of the second transmission 51 is connected to the second rotor 12*b* of the second rotating electric machine 12 via the rotating shaft 52, and is rotatable in unison with the second rotor 12*b*.

Further, the distribution system DS4 according to the fourth embodiment includes a third clutch 61. Similarly to the first and second clutches 42 and 43, the third clutch 61 is formed by a hydraulic friction clutch, and includes an inner 61*a* and an outer 61*b* each having an annular plate shape. The inner 61*a* and the outer 61*b* are integrally mounted on the first and second rotors 11*b* and 12*b*, respectively. The degree of engagement of the third clutch 61 is controlled by the ECU 2 (see FIG. 21), whereby the first rotor 11*b* and the second rotor 12*b* are connected to and disconnected from each other.

Figure 22:
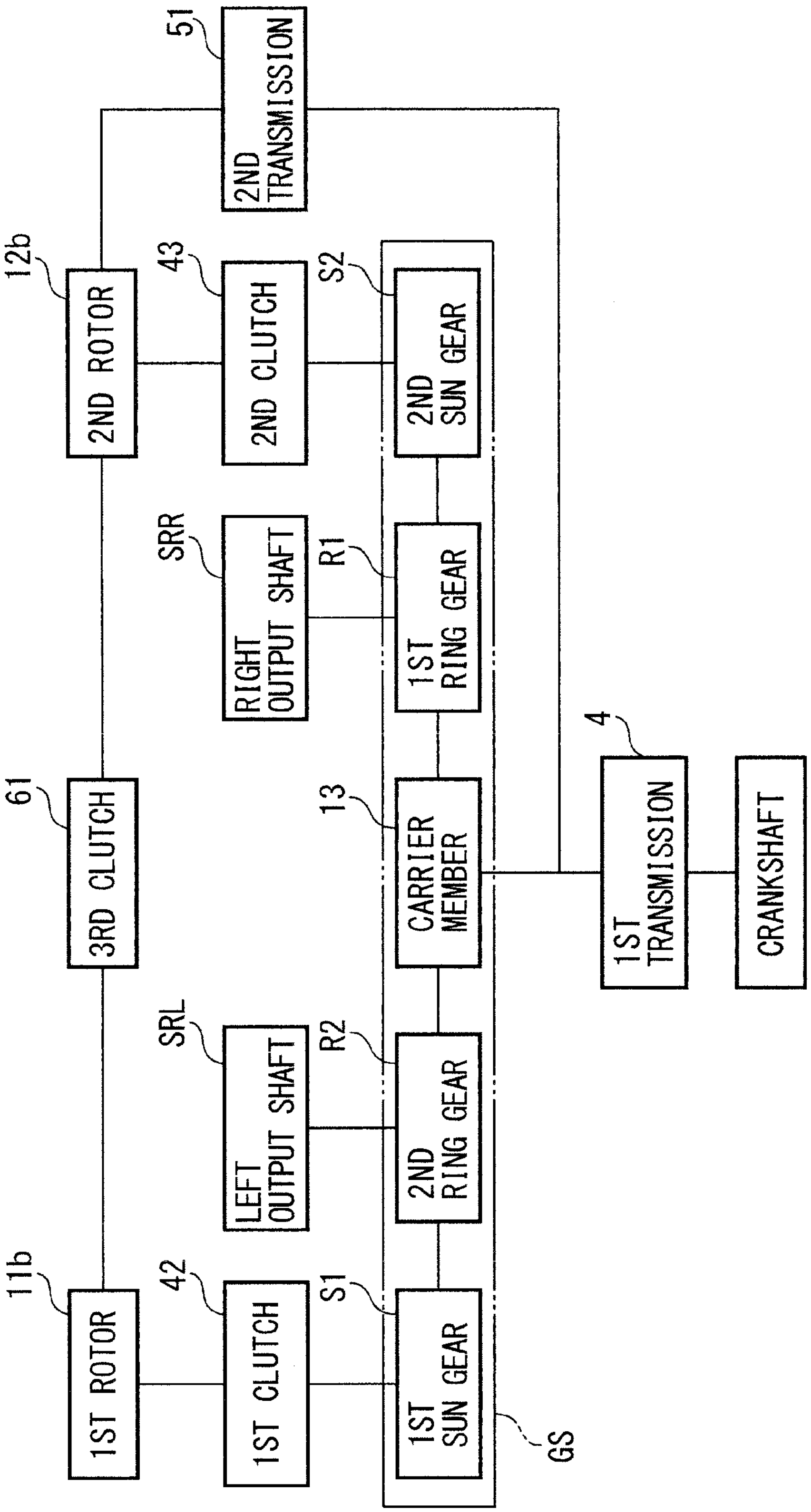
FIG. 22 A diagram showing a relationship of connections between various types of rotary elements of the power plant shown in FIG. 20.

With the above arrangement, the relationship of connections between various types of rotary elements of the power plant according to the fourth embodiment is shown e.g. in FIG. 22. This power plant is equipped with all the functions of the power plants according to the first to third embodiments. Hereafter, the operations of the power plant according to the fourth embodiment will be described with reference to FIGS. 22 to 28.

To cause the power plant to perform the same operation as performed by the power plant according to the first embodiment, various types of clutches are controlled as follows: The first and second clutches 42 and 43 are engaged to thereby connect the first rotor 11*b* to the first sun gear S1, and the second rotor 12*b* to the second sun gear S2, respectively, and the third clutch 61 is disengaged to thereby disconnecting the first rotor 11*b* from the second rotor 12*b*. Further, the second transmission 51 is driven in the motive power interruption mode (the transmission clutch 54: disengaged; the transmission brake 55: off, see the third embodiment), to thereby interrupt transmission of motive power between the second rotor 12*b* (second rotating electric machine 12) and the carrier member 13 via the second transmission 51. From the above, as is apparent from FIG. 22, the relationship of connections between the various types of rotary elements of the power plant according to the fourth embodiment becomes the same as that of the power plant according to the first embodiment. Therefore, in this case, it is possible to perform the same operations as performed by the power plant according to the first embodiment.

Further, the motive power of the second rotating electric machine 12 is transmitted to the left and right output shafts SRL and SRR in the state reduced in speed by the second transmission 51, whereby it is possible to drive the two output shafts SRL and SRR together with the left and right rear wheels WRL and WRR. Hereafter, this operation mode is referred to as the "1-MOT drive mode", and a description will be given of the 1-MOT drive mode.

[1-MOT Drive Mode]

Figure 23:
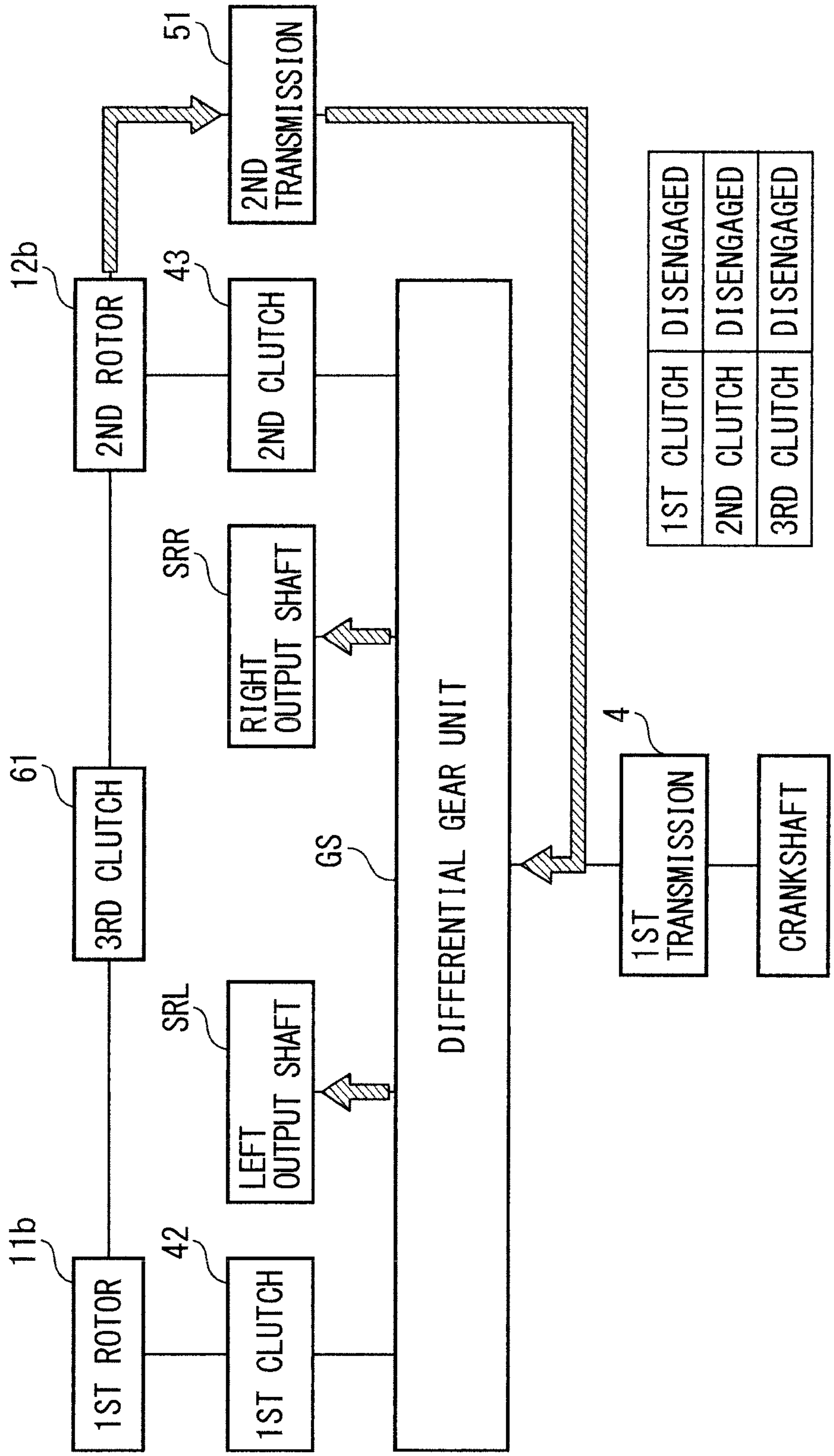
FIG. 23 A diagram showing a state of transmission of torque between the various types of rotary elements of the power plant shown in FIG. 20, as to during a 1-MOT drive mode.

FIG. 23 shows a state of transmission of torque between the various types of rotary elements in the 1-MOT drive mode. In FIG. 23 and figures, referred to hereinafter, showing states of transmission of torque, flows of torque are indicated by thick lines with arrows. During the 1-MOT drive mode, basically, all the first to third clutches 42, 43, and 61 are disengaged to thereby disconnect the first rotor 11*b* from the first sun gear S1, the second rotor 12*b* from the second sun gear S2, and the first rotor 11*b* from the second rotor 12*b*. Further, the second transmission 51 is driven in the speed reduction mode (the transmission clutch 54: disengaged; the transmission brake 55: on, see the third embodiment).

With the above operations, as shown in FIG. 23, the second motor output torque TM2 is transmitted to the differential gear unit GS (carrier member 13) via the second transmission 51, and is further transmitted to the left and right output shafts SRL and SRR. In this case, the motive power of the second rotating electric machine 12 is transmitted to the left and right output shafts SRL and SRR in a state reduced in speed by the second transmission 51. Further, in the collinear chart (see FIG. 5), the distance from the carrier member 13 of the differential gear unit GS to the left output shaft SRL and the distance from the carrier member 13 to the right output shaft SRR are equal to each other, and hence the torque distribution ratio of torque distributed from the carrier member 13 to the left and right output shafts SRL and SRR is 1:1, and the left and right output shaft-transmitted torques are equal to each other.

[Torque Distribution Control During 1-MOT Drive Mode]

Figure 24:
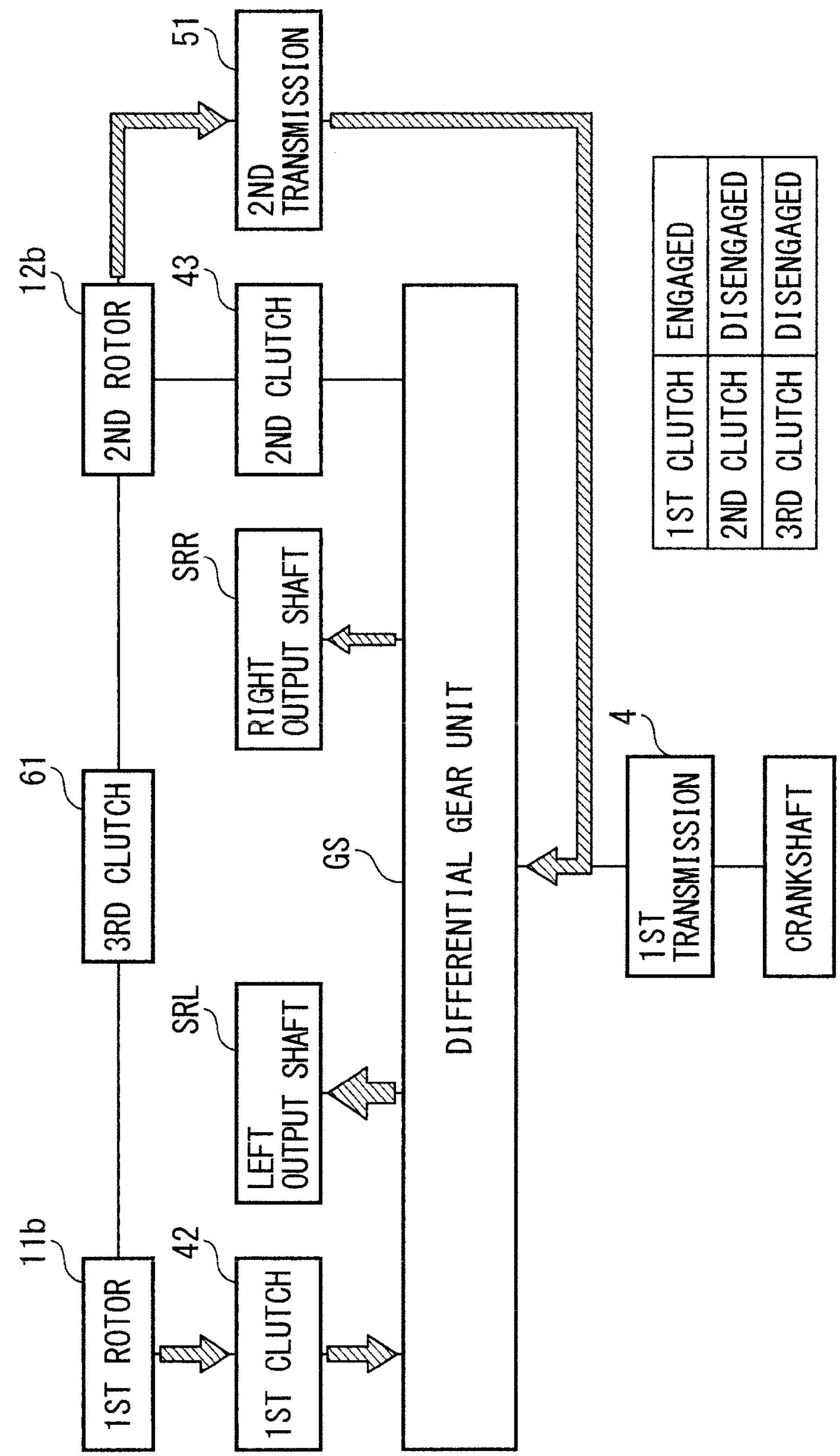
FIG. 24 A diagram showing a state of transmission of torque between the various types of rotary elements of the power plant shown in FIG. 20, as to during torque distribution control in the 1-MOT drive mode.

Further, during the 1-MOT drive mode, it is possible to control the torques distributed to the left and right output shafts SRL and SRR using the first rotating electric machine 11. In this case, the first clutch 42 which has been disengaged by that time is engaged to thereby connect the first rotor 11*b* to the first sun gear S1, and the second clutch 43 is held disengaged to thereby hold the second rotor 12*b* and the second sun gear S2 in a disconnected state. Further, the powering or the regeneration is executed by the first rotating electric machine 11. FIG. 24 shows a state of transmission of torque between the various types of rotary elements in the case where the powering is executed by the first rotating electric machine 11. The first motor output torque TM1 is transmitted to the first sun gear S1 by controlling the above-described first clutch 42 and first rotating electric machine 11, whereby as is apparent from the description of the torque distribution control for increasing the right yaw moment in the first embodiment, the drive torque acts on the left output shaft SRL, and the braking torque acts on the right output shaft SRR. As a consequence, as shown in FIG. 24, the left output shaft-transmitted torque becomes larger than the right output shaft-transmitted torque, whereby the right yaw moment is increased during right turning of the vehicle VFR, and the left yaw moment is reduced during left turning of the vehicle VFR.

Figure 25:
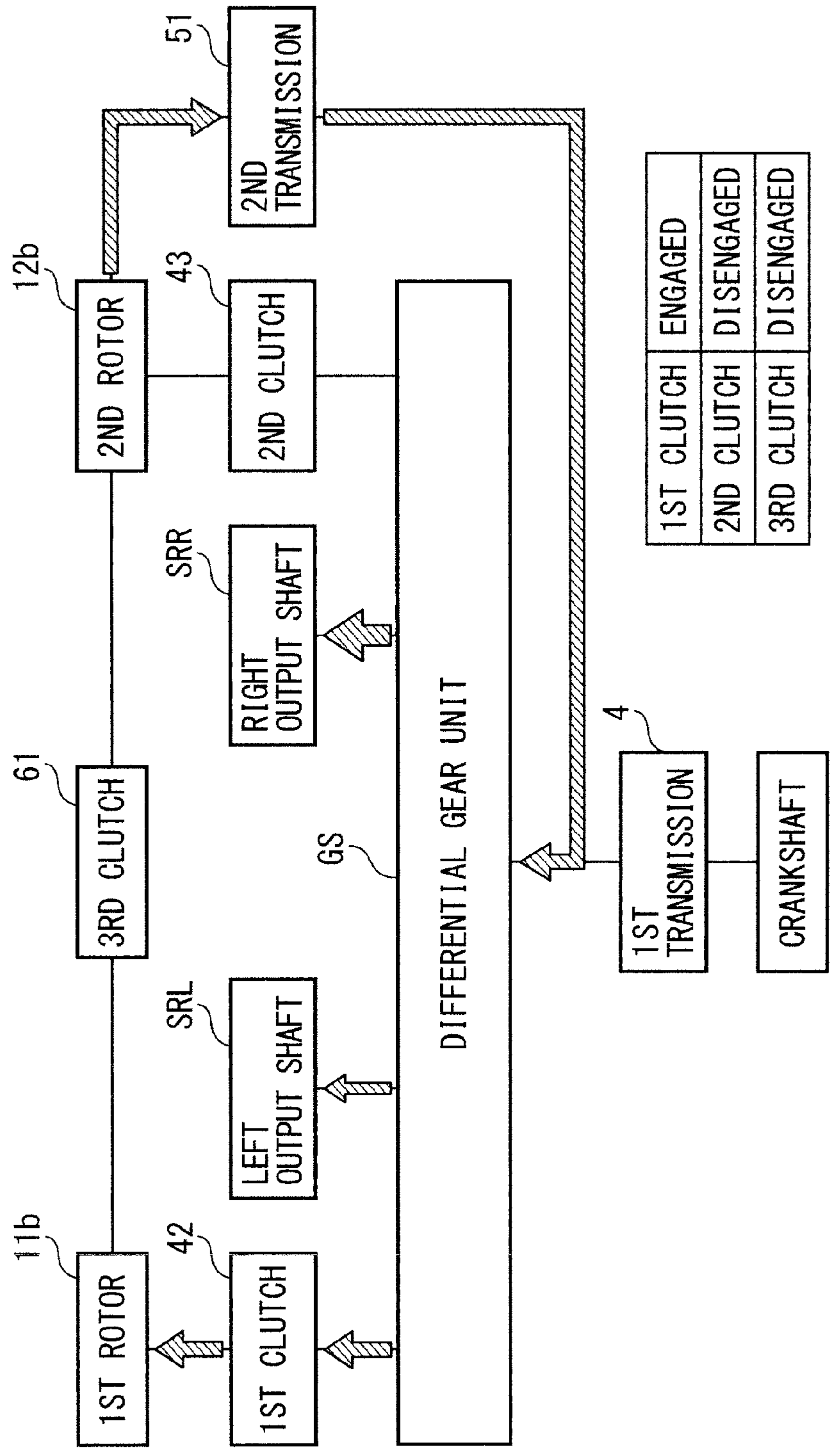
FIG. 25 A diagram showing a state of transmission of torque between the various types of rotary elements of the power plant shown in FIG. 20, as to an operation different from FIG. 24 during the torque distribution control in the 1-MOT drive mode.

Further, although FIG. 24 shows an example of a case where powering is performed by the first rotating electric machine 11, when regeneration is performed by the first rotating electric machine 11, the state of transmission of torque between the various types of rotary elements is as shown in FIG. 25. As shown in FIG. 25, torque is transmitted from the differential gear unit GS to the first rotor 11*b*, that is, the first motor braking torque TG1 is transmitted to the first sun gear S1, whereby as is apparent from the description of the torque distribution control for reducing the right yaw moment in the first embodiment, the braking torque acts on the left output shaft SRL, and the drive torque acts on the right output shaft SRR. As a consequence, as shown in FIG. 25, the right output shaft-transmitted torque becomes larger than the left output shaft-transmitted torque, whereby the right yaw moment is reduced during right turning of the vehicle VFR, and the left yaw moment is increased during left turning of the vehicle VFR.

Further, the motive powers of the first and second rotating electric machine 11 and 12 are transmitted to the left and right output shafts SRL and SRR in the state reduced in speed by the second transmission 51, whereby it is possible to drive the two output shafts SRL and SRR together with the left and right rear wheels WRL and WRR. Hereafter, this operation mode is referred to as the "2-MOT drive mode", and a description will be given of the 2-MOT drive mode.

[2-MOT Drive Mode]

FIG. 26 shows a state of transmission of torque during the 2-MOT drive mode. During the 2-MOT drive mode, basically, both the first and second clutches 42 and 43 are disengaged to thereby disconnect the first rotor 11*b* from the first sun gear S1, and the second rotor 12*b* from the second sun gear S2. Further, the third clutch 61 is engaged, whereby the first rotor 11*b* and the second rotor 12*b* are connected to drive the second transmission 51 in the speed reduction mode, and the powering is executed by the first and second rotating electric machines 11 and 12.

With the above operations, as shown in FIG. 26, the first and second motor output torques TM1 and TM2 are transmitted to the differential gear unit GS (carrier member 13) via the second transmission 51, and are further transmitted to the left and right output shafts SRL and SRR. In this case, the motive powers of the first and second rotating electric machines 11 and 12 are transmitted to the left and right output shafts SRL and SRR in a state reduced in speed by the second transmission 51. Further, a torque distribution ratio of the torque distributed from the carrier member 13 to the left and right output shafts SRL and SRR is 1:1, and the left and right output shaft-transmitted torques are equal to each other.

[Torque Distribution Control During 2-MOT Drive Mode]

Further, during the 2-MOT drive mode, by selectively controlling the degree of engagement of one of the first and second clutches 42 and 43 which have been disengaged by that time, it is possible to control the torques distributed to the left and right output shafts SRL and SRR. FIG. 27 shows a state of transmission of torque in a case where, during the 2-MOT drive mode, the degree of engagement of the first clutch 42 is controlled to cause the first clutch 42 to slide, and the second clutch 43 is held disengaged to thereby hold the second rotor 12*b* and the second sun gear S2 in a disconnected state.

During the 2-MOT drive mode, the motive power of the first rotating electric machine 11 is transmitted to the carrier member 13 in a state largely reduced in speed by the second transmission 51. For this reason, as described in the third embodiment with reference to FIGS. 18 and 19, the rotational speed of the first rotor 11*b* has become higher than the rotational speed of the carrier member 13, and further has become higher than the rotational speed of the first sun gear S1. Therefore, the reaction force torque RC1, which acts from the first clutch 42 on the first sun gear S1 as the first clutch 42 is caused to slide as described above, acts such that the rotational speed of the first sun gear S1 is increased, and accordingly the drive torque acts on the left output shaft SRL, and the braking torque acts on the right output shaft SRR. As a consequence, as shown in FIG. 27, the left output shaft-transmitted torque becomes larger than the right output shaft-transmitted torque, whereby the right yaw moment is increased during right turning of the vehicle VFR, and the left yaw moment is reduced during left turning of the vehicle VFR.

Figure 28:
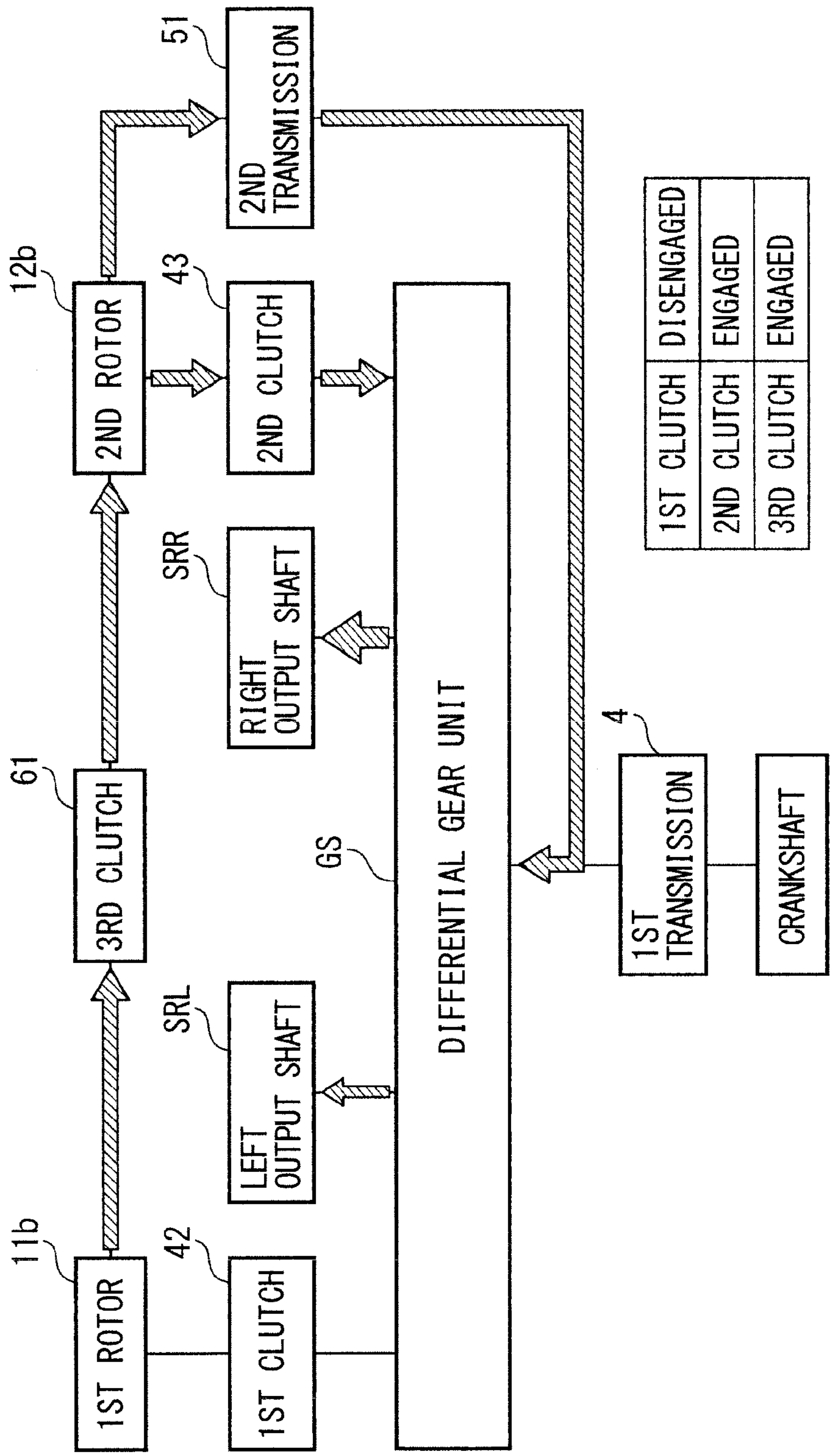
FIG. 28 A diagram showing a state of transmission of torque between the various types of rotary elements of the power plant shown in FIG. 20, as to an operation different from FIG. 27 during the torque distribution control in the 2-MOT drive mode.

FIG. 28 shows a state of transmission of torque in a case where, during the 2-MOT drive mode, inversely to the case shown in FIG. 27, the degree of engagement of the second clutch 43 that has been disengaged by that time is controlled to cause the second clutch 43 to slide, and the first clutch 42 is held disengaged to thereby hold the first rotor 11*b* and the first sun gear S1 in a disconnected state. Similarly to the above-described case shown in FIG. 27, the rotational speed of the second rotor 12*b* has become higher than the rotational speed of the carrier member 13, and further has become higher than the rotational speed of the second sun gear S2. Therefore, the reaction force torque RC2, which acts from the second clutch 43 on the second sun gear S2 as the second clutch 43 is caused to slide, acts such that the rotational speed of the second sun gear S2 is increased, and accordingly the drive torque acts on the right output shaft SRR, and the braking torque acts on the left output shaft SRL. As a consequence, as shown in FIG. 28, the right output shaft-transmitted torque becomes larger than the left output shaft-transmitted torque, whereby the left yaw moment is increased during left turning of the vehicle VFR, and the right yaw moment is reduced during right turning of the vehicle VFR.

[Differential Limit Control]

Furthermore, similarly to the second and third embodiments, the differential rotation between the left and right output shafts SRL and SRR can be limited. In this case, basically, the zero torque control is performed on the first and second rotating electric machines 11 and 12, and the second transmission 51 is driven in the motive power interruption mode (the transmission clutch 54: disengaged; the transmission brake 55: off). Further, the degrees of engagement of the first to third clutches 42, 43, and 61 are controlled to thereby connect the first rotor 11*b* to the first sun gear S1, the second rotor 12*b* to the second sun gear S2, and the first rotor 11*b* to the second rotor 12*b*.

By controlling the degrees of engagement of the first to third clutches 42, 43, and 61 as described above, similarly to the second embodiment, the first and second sun gears S1 and S2 are connected to each other via the first and second rotors 11*b* and 12*b*, and therefore when a differential rotation occurs between the two S1 and S2, reaction forces act from the first and second clutches 42 and 43 on the first and second sun gears S1 and S2, respectively. These reaction forces act such that the first and second sun gears S1 and S2 are caused to rotate in unison with each other, whereby the differential rotation between the left and right output shafts SRL and SRR is limited.

In this case as well, similarly to the second embodiment, by adjusting the reaction force torques of the first and second clutches 42 and 43 through controlling the degrees of engagement of the first to third clutches 42, 43, and 61, it is possible to control total differential limiting torque (the sum total of differential limiting torques acting on the left and right output shafts SRL and SRR), and hence it is possible to control the degree of limiting the differential rotation between the left and right output shafts SRL and SRR.

Note that in a case where all the first to third clutches 42, 43, and 61 are engaged as described above (the second transmission 51 is in the motive power interruption mode), when the powering or regeneration is performed by the first and/or second rotating electric machine(s) 11 and/or 12, it is possible to control the torques distributed to the left and right output shafts SRL and SRR, through controlling the degrees of engagement of the first and second clutches 42 and 43, whereby it is possible to increase or decrease the left or right turning moment of the vehicle VFR.

Further, in this case, e.g. when powering is performed by the first rotating electric machine 11, and the degree of engagement of the first clutch 42 is controlled such that it becomes larger than that of the second clutch 43 (e.g. when the first clutch 42 is completely engaged, and the second clutch 43 is caused to slide), torque transmitted from the first rotating electric machine 11 to the first sun gear S1 of the differential gear unit GS becomes accordingly larger than torque transmitted to the second sun gear S2, whereby the left output shaft-transmitted torque becomes larger than the right output shaft-transmitted torque. Inversely to the above, when the degree of engagement of the second clutch 43 is controlled such that it becomes larger than that of the first clutch 42, the torque transmitted from the first rotating electric machine 11 to the second sun gear S2 becomes accordingly larger than that to the first sun gear S1, whereby the left output shaft-transmitted torque becomes larger than the right output shaft-transmitted torque.

As described above, according to the fourth embodiment, it is possible to drive the left and right output shafts SRL and SRR using both the first and second rotating electric machines 11 and 12 (the 2-MOT drive mode), and distribute the torque to the left and right output shafts SRL and SRR. Therefore, compared with the second and third embodiments using the single rotating electric machine 41, it is possible to improve the power performance and the left and right distribution performance of the power plant.

Figure 29:
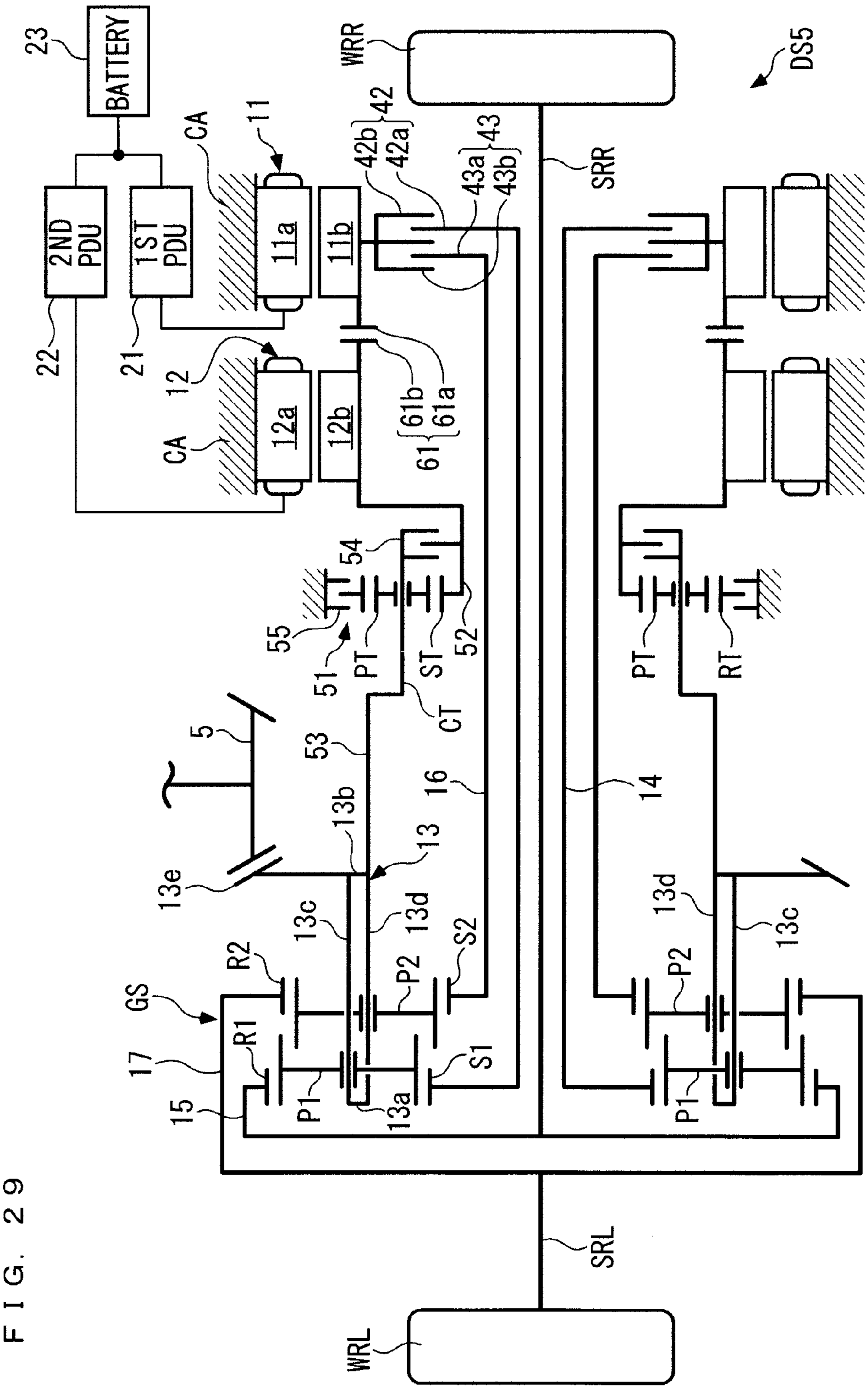
FIG. 29 A skeleton diagram of a power plant etc. according to a fifth embodiment of the present invention.

Next, a power plant according to a fifth embodiment of the present invention will be described with reference to FIG. 29. Compared with the fourth embodiment, a distribution system DS5 of this power plant is mainly different in that the outer 43*b* of the second clutch 43 is integrally mounted not on the second rotor 12*b* but on the first rotor 11*b*. In FIG. 29, the same component elements as those of the first to fourth embodiments are denoted by the same reference numerals. The following description is given mainly of different points from the first to fourth embodiments.

Similarly to the second to fourth embodiments, the inners 42*a* and 43*a* of the first and second clutches 42 and 43 are integrally mounted on the first and third rotating shaft 14 and 16, respectively. On the other hand, differently from the second to fourth embodiments, the outers 42*b* and 43*b* of the first and second clutches 42 and 43 are integrally mounted on the first rotor 11*b* of the first rotating electric machine 11. The degree of engagement of the first clutch 42 is controlled by the ECU 2, whereby the first rotating shaft 14 and the first rotor 11*b*, i.e. the first sun gear S1 and the first rotor 11*b* are connected to and disconnected from each other. Further, the degree of engagement of the second clutch 43 is controlled by the ECU 2, whereby the third rotating shaft 16 and the first rotor 11*b*, i.e. the second sun gear S2 and the first rotor 11*b* are connected to and disconnected from each other. Note that the block diagram of the ECU 2 and so forth is the same as the block diagram shown in FIG. 21, and therefore is omitted.

Further, similarly to the fourth embodiment, the carrier CT of the second transmission 51 is connected to the carrier member 13, and is rotatable in unison with the carrier member 13. The sun gear ST is connected to the second rotor 12*b* of the second rotating electric machine 12, and is rotatable in unison with the second rotor 12*b*. Furthermore, similarly to the fourth embodiment, the inner 61*a* and the outer 61*b* of the third clutch 61 are integrally mounted on the first and second rotors 11*b* and 12*b*, respectively. The degree of engagement of the third clutch 61 is controlled by the ECU 2, whereby the first rotor 11*b* and the second rotor 12*b* are connected to and disconnected from each other.

With the above arrangement, the relationship of connections between various types of rotary elements of the power plant is shown e.g. in FIG. 30. The power plant according to the fifth embodiment is equipped with all the functions of the power plants according to the second and third embodiments. Mainly, the first rotating electric machine 11 is used for distributing torque to the left and right output shafts SRL and SRR, and the second rotating electric machine 12 is used for driving the left and right output shafts SRL and SRR. Hereafter, the operations of the power plant according to the fifth embodiment will be described with reference to FIGS. 30 to 37.

To cause this power plant to perform the same operations as performed by the power plant according to the second embodiment, the various clutches are controlled as follows: The third clutch 61 is disengaged to thereby disconnect the first rotor 11*b* from the second rotor 12*b*. Further, the second transmission 51 is driven in the motive power interruption mode (the transmission clutch 54: disengaged; the transmission brake 55: off), to thereby interrupt transmission of motive power between the second rotor 12*b* (second rotating electric machine 12) and the carrier member 13 via the second transmission 51. As is apparent from FIG. 30, by controlling the above-described various type of clutches, the relationship of connections between the various types of rotary elements of the power plant according to the fifth embodiment is made the same as that of the power plant according to the second embodiment, provided that the first rotor 11*b* is replaced by the rotor 41*b*. Therefore, in this case, it is possible to perform the same operations as performed by the power plant according to the second embodiment.

Further, in the power plant according to the fifth embodiment, similarly to the fourth embodiment, the 1-MOT drive mode and the 2-MOT drive mode are provided as operation modes thereof. Hereinafter, a description will be sequentially given of the 1-MOT drive mode and the 2-MOT drive mode.

[1-MOT Drive Mode]

Figure 31:
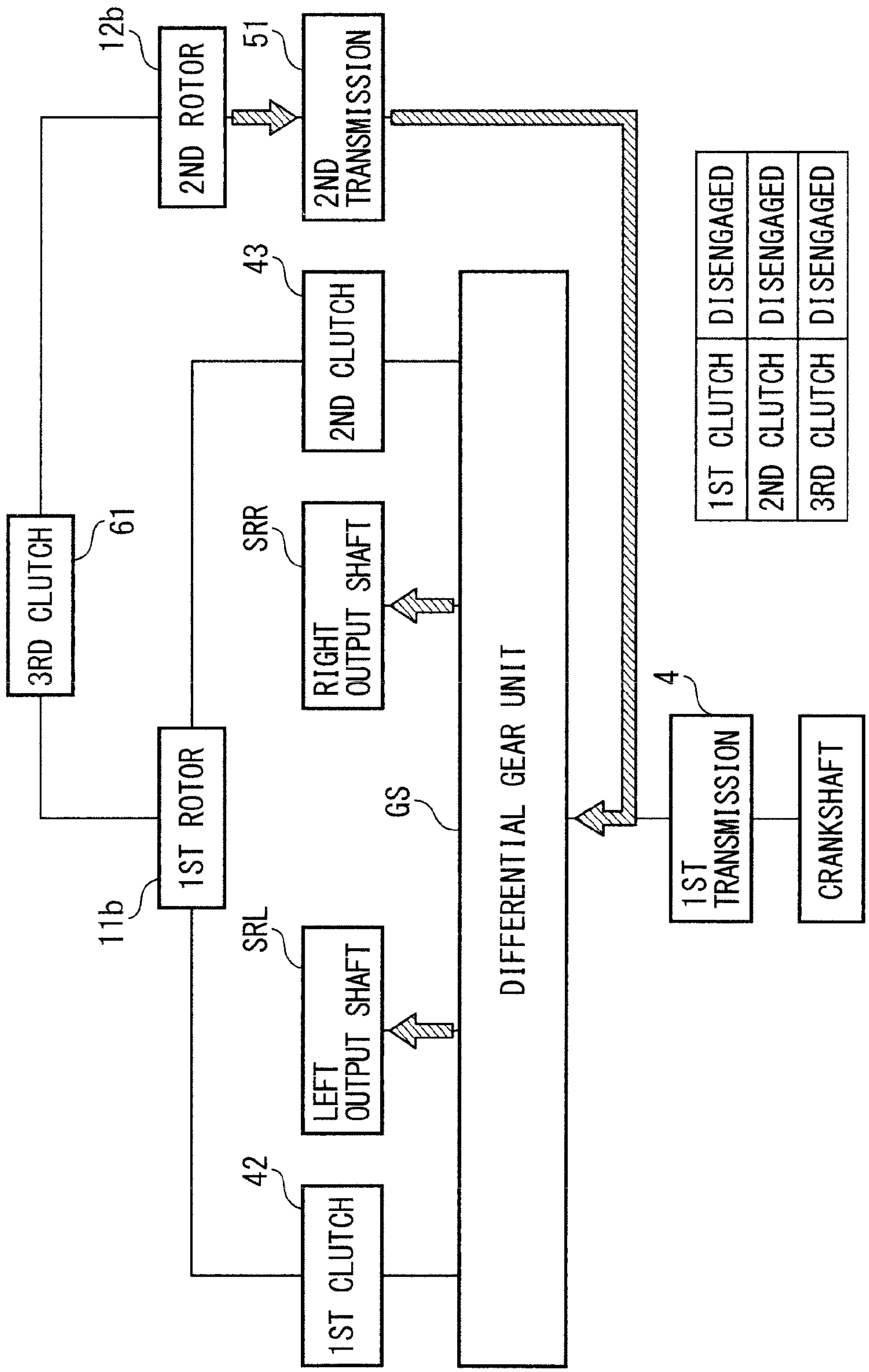
FIG. 31 A diagram showing a state of transmission of torque between the various types of rotary elements of the power plant shown in FIG. 29, as to during the 1-MOT drive mode.

FIG. 31 shows a state of transmission of torque during the 1-MOT drive mode. During the 1-MOT drive mode, basically, similarly to the fourth embodiment (FIG. 23), all the first to third clutches 42, 43, and 61 are disengaged to thereby disconnect the first rotor 11*b* from the first and second sun gears S1 and S2, and the first rotor 11*b* from the second rotor 12*b*. Further, the second transmission 51 is driven in the speed reduction mode and powering is performed by the second rotating electric machine 12. With the above operations, as shown in FIG. 31, the second motor output torque TM2 is transmitted to the differential gear unit GS (carrier member 13) via the second transmission 51, and is further transmitted to the left and right output shafts SRL and SRR. In this case, the motive power of the second rotating electric machine 12 is transmitted to the left and right output shafts SRL and SRR in a state reduced in speed by the second transmission 51. Further, in the collinear chart (see FIG. 5), the distance from the carrier member 13 of the differential gear unit GS to the left output shaft SRL and the distance from the carrier member 13 to the right output shaft SRR are equal to each other, and hence the torque distribution ratio of the torque distributed from the carrier member 13 to the left and right output shafts SRL and SRR is 1:1, and the left and right output shaft-transmitted torques are equal to each other.

[Torque Distribution Control During 1-MOT Drive Mode]

Figure 32:
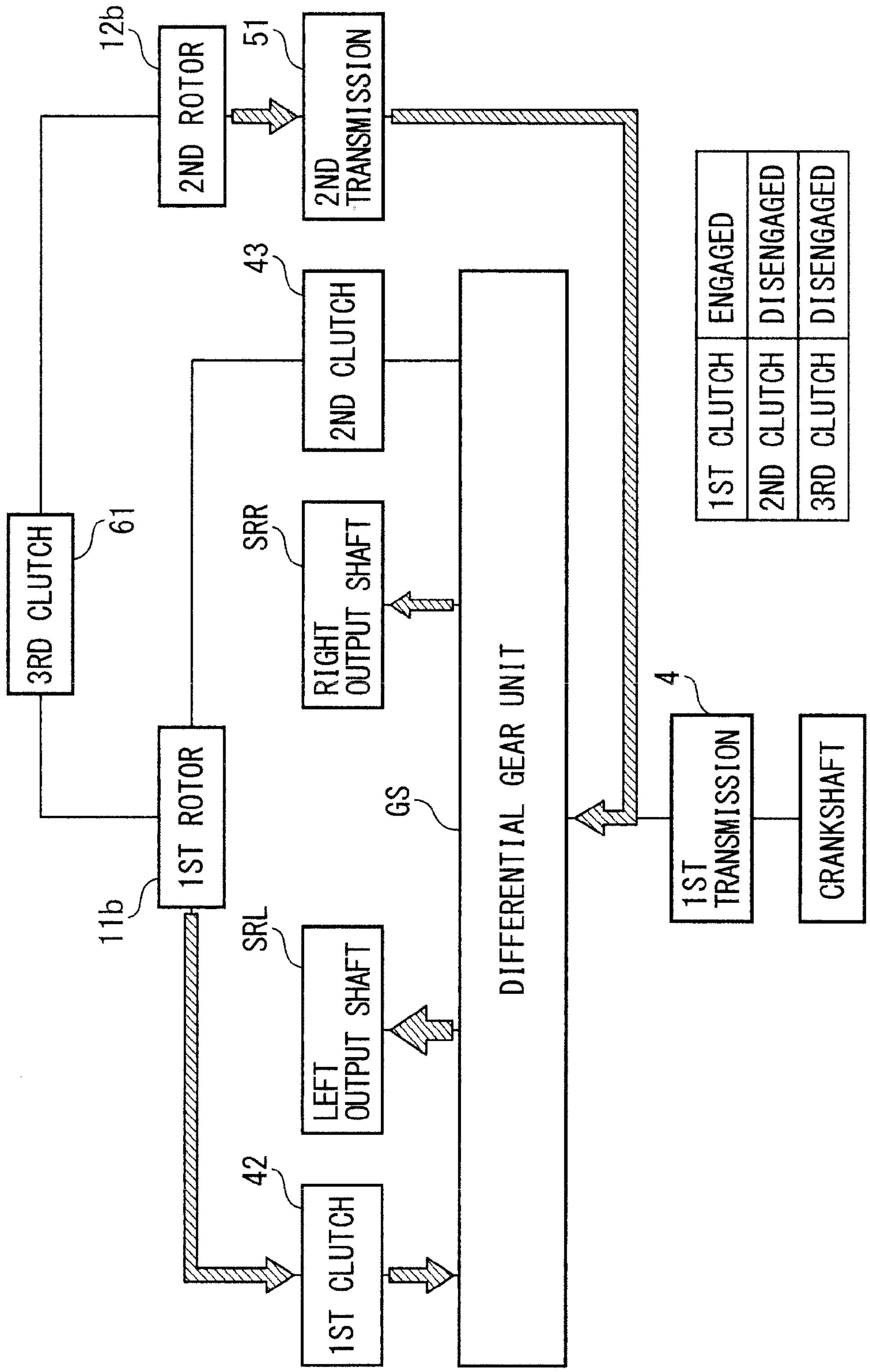
FIG. 32 A diagram showing a state of transmission of torque between the various types of rotary elements of the power plant shown in FIG. 29, as to during torque distribution control in the 1-MOT drive mode.

Further, during the 1-MOT drive mode, it is possible to control the torques distributed to the left and right output shafts SRL and SRR using the first rotating electric machine 11. In this case, one of the first and second clutches 42 and 43 which have been disengaged by that time is selectively engaged to thereby selectively connect the first rotor 11*b* to one of the first and second sun gears S1 and S2, and powering or regeneration is performed by the first rotating electric machine 11. FIG. 32 shows a state of transmission of torque between the various types of rotary elements, in a case where during the 1-MOT drive mode, the first clutch 42 is engaged to thereby connect the first rotor 11*b* to the first sun gear S1, the second clutch 43 is held disengaged to thereby hold the first rotor 11*b* and the second sun gear S2 in a disconnected state, and powering is performed by the first rotating electric machine 11. As shown in FIG. 32, the first motor output torque TM1 is transmitted to the differential gear unit GS (first sun gear S1), whereby the left output shaft-transmitted torque becomes larger than the right output shaft-transmitted torque. As a consequence, the right yaw moment is increased during right turning of the vehicle VFR, and the left yaw moment is reduced during left turning of the vehicle VFR.

Figure 33:
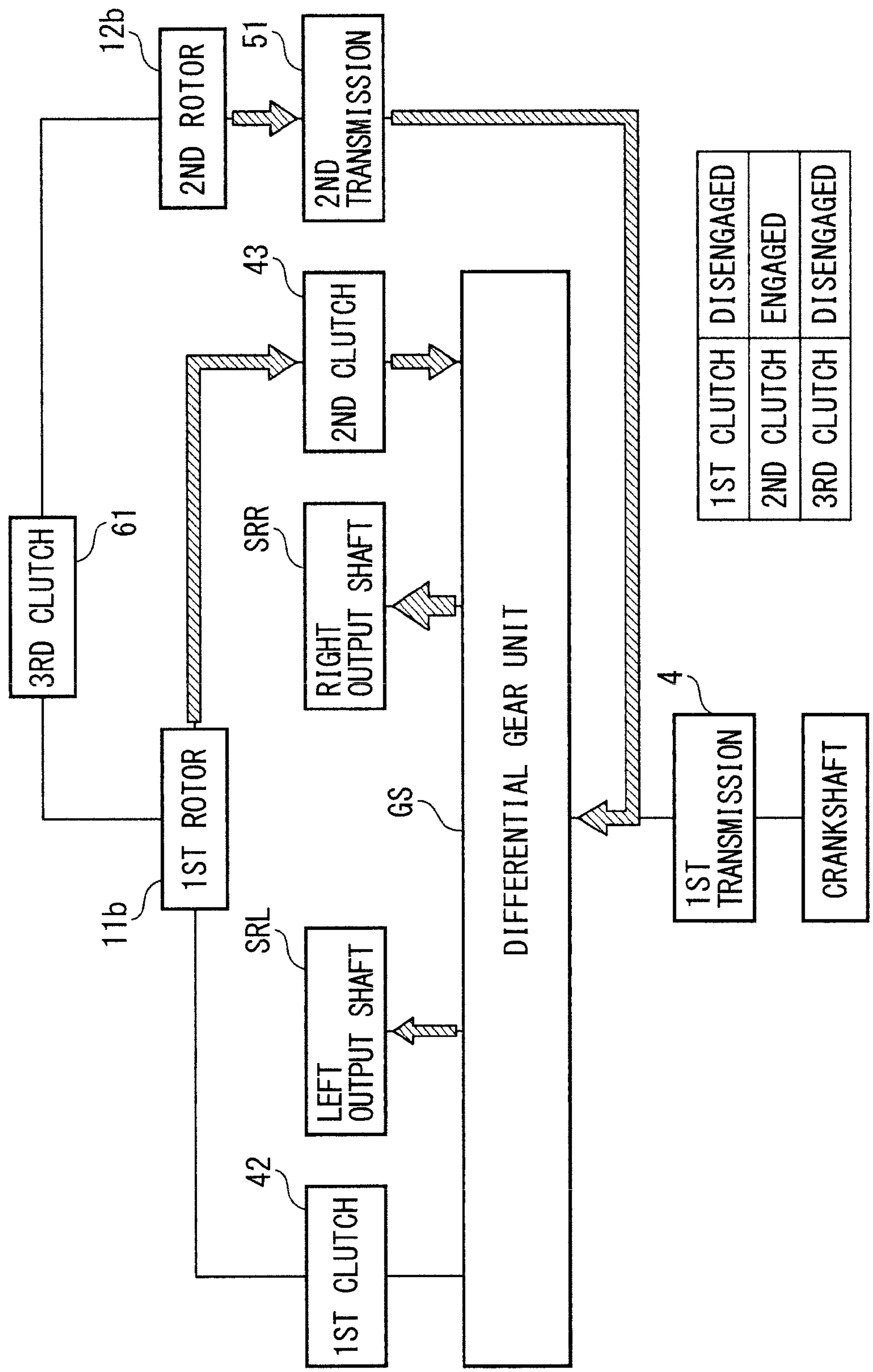
FIG. 33 A diagram showing a state of transmission of torque between the various types of rotary elements of the power plant shown in FIG. 29, as to an operation different from FIG. 32 during the torque distribution control in the 1-MOT drive mode.

Further, during the 1-MOT drive mode, differently from the case shown in FIG. 32, when the second clutch 43 that has been disengaged before that time is engaged to thereby connect the first rotor 11*b* to the second sun gear S2, and the first clutch 42 is held disengaged to thereby hold the first rotor 11*b* and the first sun gear S1 in a disconnected state, and powering is performed by the first rotating electric machine 11, a state of transmission of torque between the various types of rotary elements is as shown in FIG. 33. As shown in FIG. 33, the first motor output torque TM1 is transmitted to the differential gear unit GS (second sun gear S2), whereby the right output shaft-transmitted torque becomes larger than the left output shaft-transmitted torque. As a consequence, the left yaw moment is increased during left turning of the vehicle VFR, and the right yaw moment is reduced during right turning of the vehicle VFR.

Note that although FIGS. 32 and 33 show examples of the case where powering is performed by the first rotating electric machine 11, a case where regeneration is performed by the first rotating electric machine 11 is distinguished from the above-described case where powering is performed only in that the magnitude relationship between the left and right output shaft-transmitted torques is inverted, and approximately the same operations as in the illustrated examples are performed. Therefore, detailed description thereof is omitted. Further, the differential limit control during the 1-MOT drive mode will be described hereinafter.

[2-MOT Drive Mode]

Figure 34:
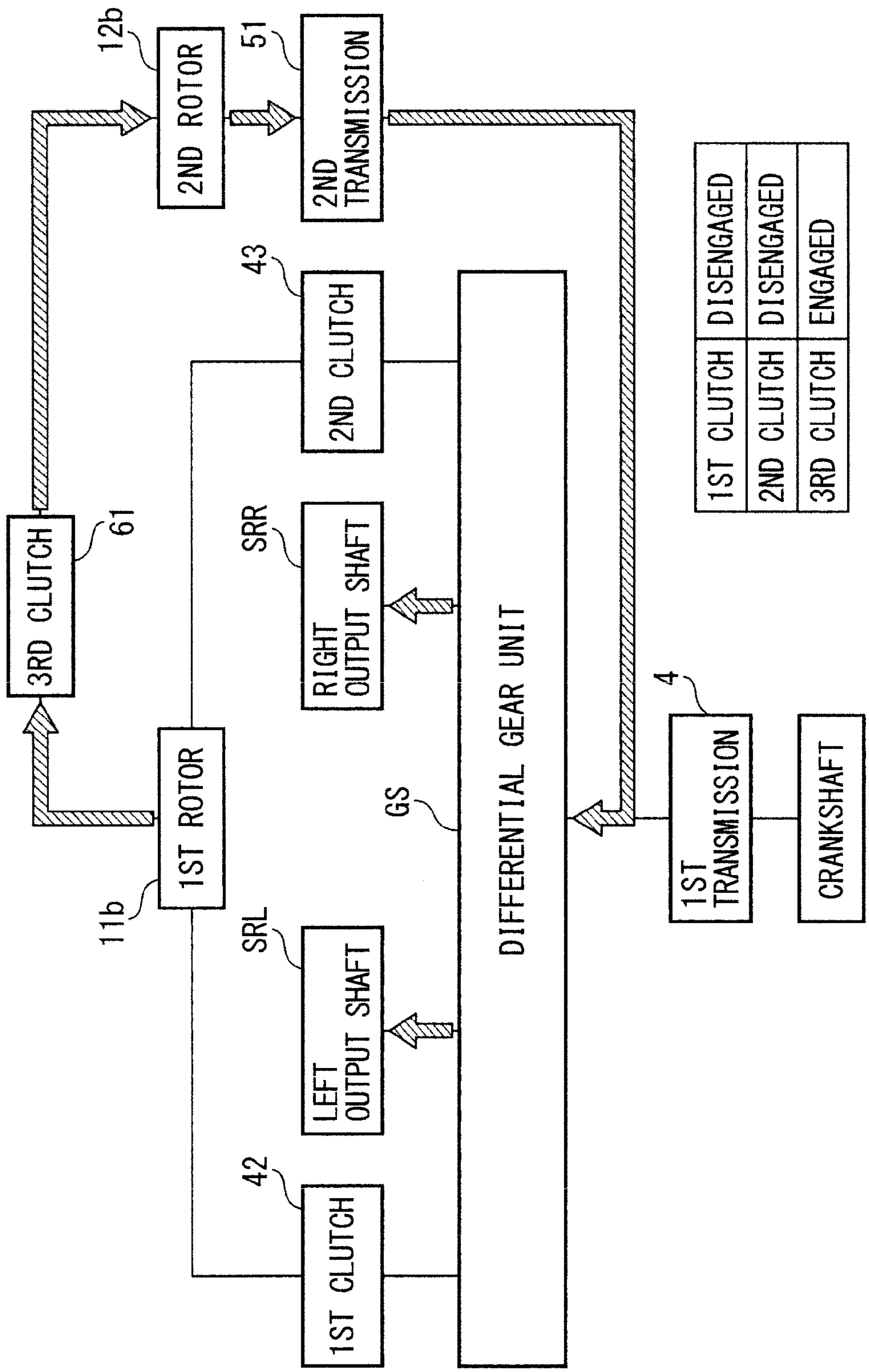
FIG. 34 A diagram showing a state of transmission of torque between the various types of rotary elements of the power plant shown in FIG. 29, as to during the 2-MOT drive mode.

FIG. 34 shows a state of transmission of torque between the various types of rotary elements in the 2-MOT drive mode. During the 2-MOT drive mode, basically, the first and second clutches 42 and 43 are disengaged to thereby disconnect the first rotor 11*b* from the first and second sun gears S1 and S2. Further, the third clutch 61 is engaged to thereby connect the first rotor 11*b* to the second rotor 12*b*, and the second transmission 51 is driven in the speed reduction mode. With the above operations, as shown in FIG. 34, the first and second motor output torques TM1 and TM2 are transmitted to the differential gear unit GS (carrier member 13) via the second transmission 51, and are further transmitted to the left and right output shafts SRL and SRR. In this case, the motive powers of the first and second rotating electric machines 11 and 12 are transmitted to the left and right output shafts SRL and SRR in a state reduced in speed by the second transmission 51. Further, the torque distribution ratio of torque distributed from the carrier member 13 to the left and right output shafts SRL and SRR is 1:1, and the left and right output shaft-transmitted torques are equal to each other.

[Torque Distribution Control During 2-MOT Drive Mode]

Figure 35:
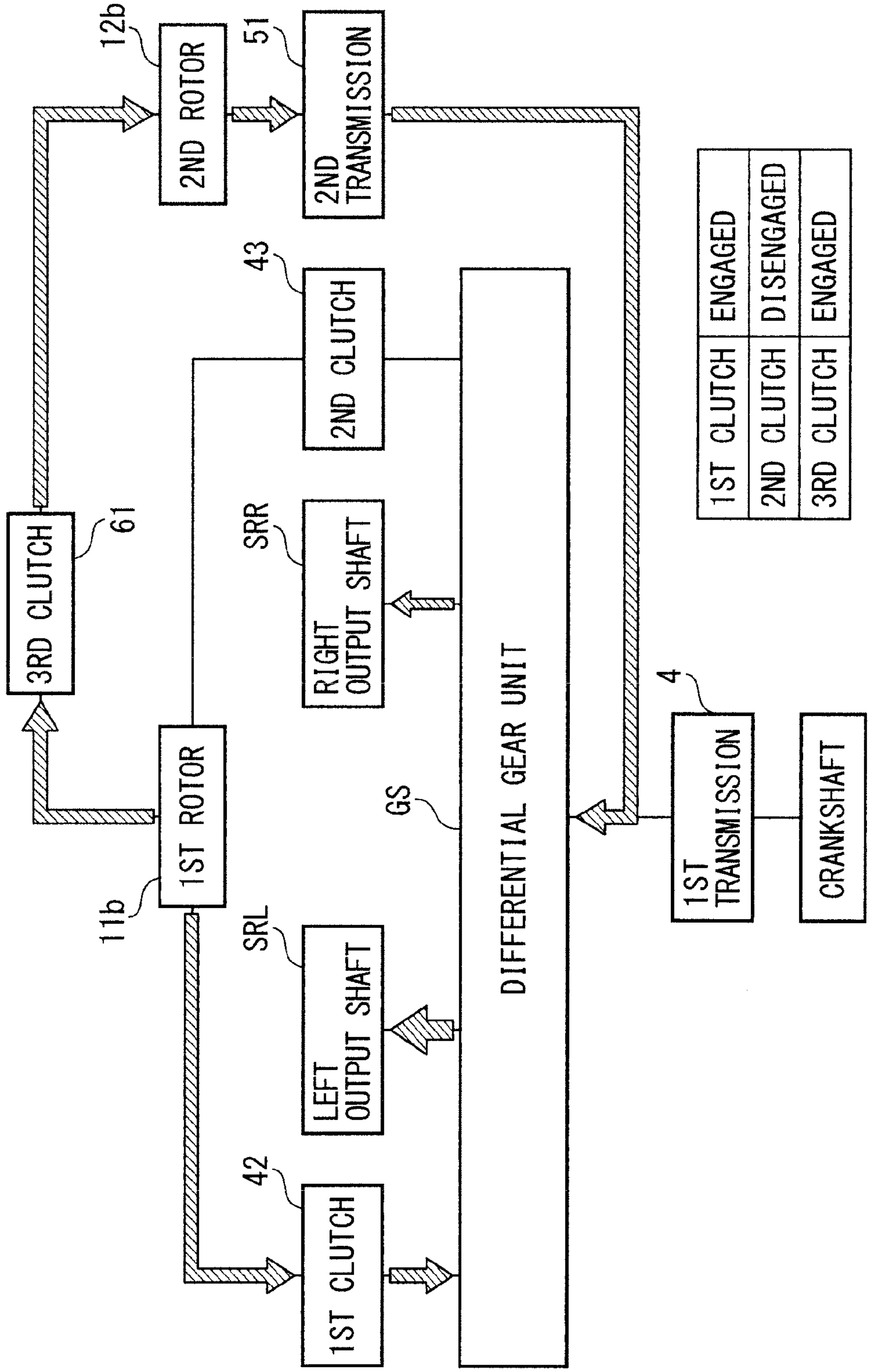
FIG. 35 A diagram showing a state of transmission of torque between the various types of rotary elements of the power plant shown in FIG. 29, as to during torque distribution control in the 2-MOT drive mode.

Further, during the 2-MOT drive mode, similarly to the fourth embodiment (FIGS. 27 and 28), by selectively controlling the degree of engagement of one of the first and second clutches 42 and 43 which have been disengaged by that time, it is possible to control the torques distributed to the left and right output shafts SRL and SRR. FIG. 35 shows a state of transmission of torque in a case where, during the 2-MOT drive mode, the degree of engagement of the first clutch 42 is controlled to cause the first clutch 42 to slide, and the second clutch 43 is held disengaged to thereby hold the second rotor 12*b* and the second sun gear S2 in a disconnected state.

In this case as well, as described in the third embodiment (see FIGS. 18 and 19), the motive powers of the first and second rotating electric machines 11 and 12 are transmitted to the carrier member 13 in a state largely reduced in speed by the second transmission 51, and hence the rotational speed of the first rotor 11*b* has become higher than the rotational speed of the carrier member 13, and further has become higher than the rotational speed of the first sun gear S1. For this reason, the reaction force torque RC1, which acts from the first clutch 42 on the first sun gear S1 as the first clutch 42 is caused to slide as described above, acts such that the rotational speed of the first sun gear S1 is increased, and accordingly the drive torque acts on the left output shaft SRL, and the braking torque acts on the right output shaft SRR. As a consequence, as shown in FIG. 35, the left output shaft-transmitted torque becomes larger than the right output shaft-transmitted torque, whereby the right yaw moment is increased during right turning of the vehicle VFR, and the left yaw moment is reduced during left turning of the vehicle VFR.

Figure 36:
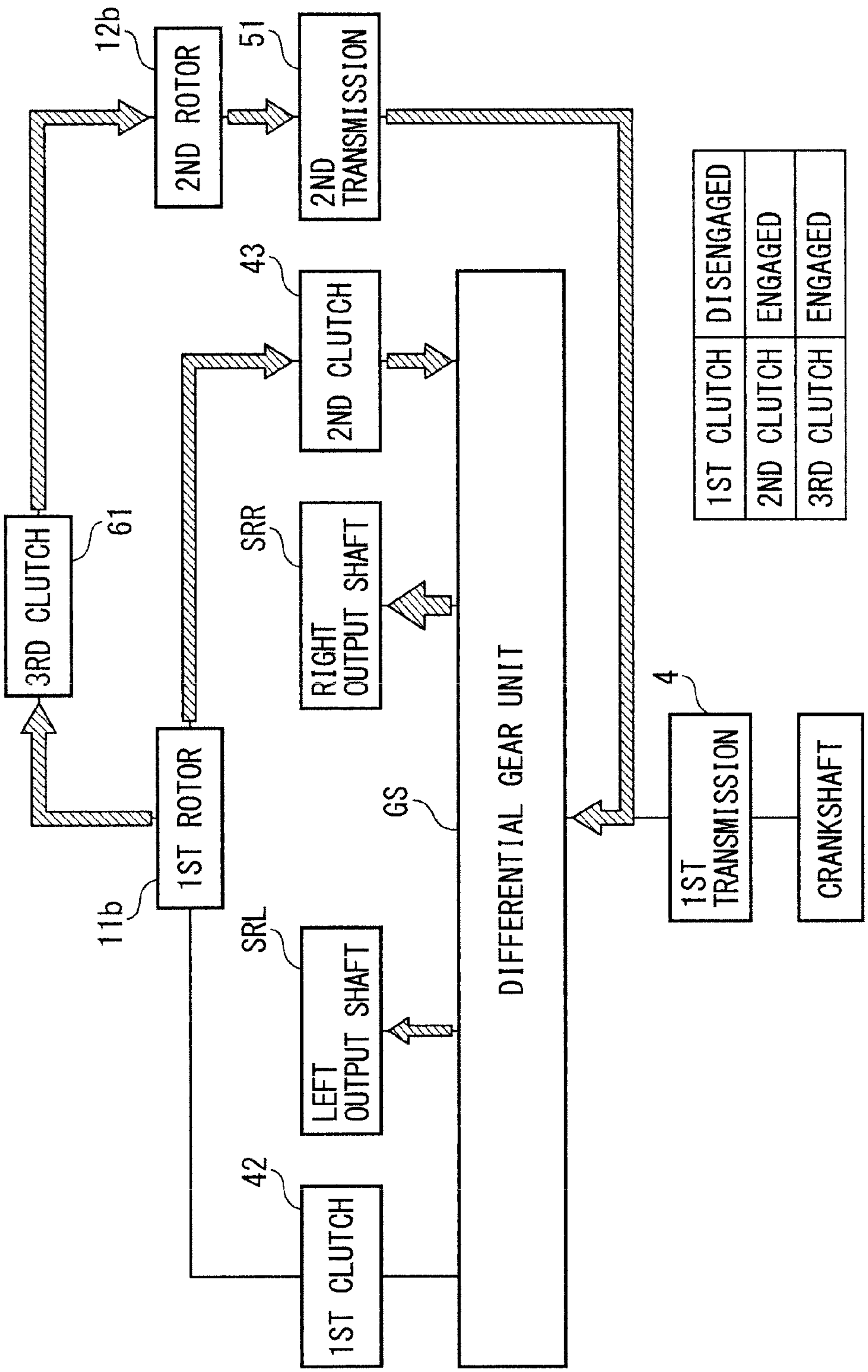
FIG. 36 A diagram showing a state of transmission of torque between the various types of rotary elements of the power plant shown in FIG. 29, as to an operation different from FIG. 35 during the torque distribution control in the 2-MOT drive mode.

Further, FIG. 36 shows a state of transmission of torque in a case where, during the 2-MOT drive mode, inversely to the case shown in FIG. 35, the degree of engagement of the second clutch 43 that has been disengaged by that time is controlled to cause the second clutch 43 to slide, and the first clutch 42 is held disengaged to thereby hold the first rotor 11*b* and the first sun gear S1 in a disconnected state. Similarly to the above-described case shown in FIG. 35, the rotational speed of the first rotor 11*b* has become higher than the rotational speed of the carrier member 13, and further has become higher than the rotational speed of the second sun gear S2. Therefore, the reaction force torque RC2, which acts from the second clutch 43 on the second sun gear S2 as the second clutch 43 is caused to slide, acts such that the rotational speed of the second sun gear S2 is increased, and accordingly the drive torque acts on the right output shaft SRR, and the braking torque acts on the left output shaft SRL. As a consequence, as shown in FIG. 36, the right output shaft-transmitted torque becomes larger than the left output shaft-transmitted torque, whereby the left yaw moment is increased during left turning of the vehicle VFR, and the right yaw moment is reduced during right turning of the vehicle VFR.

[Differential Limit Control During 2-MOT Drive Mode]

Further, during the 2-MOT drive mode, the differential rotation between the left and right output shafts SRL and SRR can be limited. In this case, basically, all the first to third clutches 42, 43, and 61 are engaged to thereby connect the first rotor 11*b* to the first and second sun gears S1 and S2, and the first rotor 11*b* to the second rotor 12*b*. In this case, the degrees of engagement of the first and second clutches 42 and 43 are controlled to the same magnitude. Further, the second transmission 51 is driven in the motive power interruption mode (the transmission clutch 54: disengaged; the transmission brake 55: off), and powering is performed by the first and second rotating electric machines 11 and 12.

With the above operations, as shown in FIG. 37, the first and second motor output torques TM1 and TM2 are transmitted to the differential gear unit GS, and is further transmitted to the left and right output shafts SRL and SRR. Further, the first and second clutches 42 and 43 are controlled, whereby the first and second sun gears S1 and S2 are connected to each other via the first rotor 11*b*, so that when a differential rotation occurs between the two S1 and S2, reaction forces act from the first and second clutches 42 and 43 on the first and second sun gears S1 and S2, respectively. These reaction forces act such that the first and second sun gears S1 and S2 are caused to rotate in unison with each other, whereby the differential rotation between the left and right output shafts SRL and SRR connected to the second and first ring gears R2 and R1 is limited.

Note that as described above, in the case where the first and second motor output torques TM1 and TM2 are transmitted to the differential gear unit GS, when the degrees of engagement of the first and second clutches 42 and 43 are not controlled to the same magnitude, but the degree of engagement of the first clutch 42 is controlled such that it becomes larger than that of the second clutch 43, torque transmitted to the first sun gear S1 of the differential gear unit GS becomes accordingly larger than torque transmitted to the second sun gear S2, whereby the left output shaft-transmitted torque becomes larger than the right output shaft-transmitted torque. Inversely, when the degree of engagement of the second clutch 43 is controlled such that it becomes larger than that of the first clutch 42, the torque transmitted to the second sun gear S2 becomes accordingly larger than that to the first sun gear S1, whereby the right output shaft-transmitted torque becomes larger than the left output shaft-transmitted torque. As described above, by controlling the degrees of engagement of the first and second clutches 42 and 43, it is possible to control the torques distributed to the left and right output shafts SRL and SRR.

[Differential Limit Control]

Further, during the 1-MOT drive mode (FIG. 31), and during traveling of the vehicle VFR using only the engine 3 as a motive power source, the differential rotation between the left and right output shafts SRL and SRR can be limited, similarly to the second to fourth embodiments. In this case, basically, the zero torque control is performed on the first rotating electric machine 11, and the third clutch 61 is disengaged to thereby disconnect the first rotor 11*b* from the second rotor 12*b*. Further, the degrees of engagement of both the first and second clutches 42 and 43 are controlled to thereby connect the first rotor 11*b* to both the first and second sun gears S1 and S2.

By controlling the degrees of engagement of the first and second clutches 42 and 43 as described above, the first and second sun gears S1 and S2 are connected to each other via the first rotor 11*b*, so that similarly to the second embodiment, when a differential rotation occurs between the two S1 and S2, the reaction force torques RC1 and RC2 act from the first and second clutches 42 and 43 on the first and second sun gears S1 and S2, respectively. These reaction force torques RC1 and RC2 act such that the first and second sun gears S1 and S2 are caused to rotate in unison with each other, whereby the differential rotation between the left and right output shafts SRL and SRR is limited.

In this case as well, similarly to the second embodiment, by adjusting the reaction force torques of the first and second clutches 42 and 43 through controlling the degrees of engagement of the first and second clutches 42 and 43, it is possible to control total differential limiting torque (the sum total of the differential limiting torques acting on the left and right output shafts SRL and SRR), and hence it is possible to control the degree of limiting the differential rotation between the left and right output shafts SRL and SRR.

Note that as described above, in the case where both the first and second clutches 42 and 43 are engaged (the third clutch 61 is disengaged), when the powering or regeneration is performed by the first rotating electric machine 11, it is possible to control the torques distributed to the left and right output shafts SRL and SRR, by controlling the degrees of engagement of the first and second clutches 42 and 43, whereby it is possible to increase or decrease the left or right turning moment of the vehicle VFR.

In this case, e.g. when powering is performed by the first rotating electric machine 11, and the degree of engagement of the first clutch 42 is controlled such that it becomes larger than that of the second clutch 43 (e.g. when the first clutch 42 is completely engaged, and the second clutch 43 is caused to slide), torque transmitted from the first rotating electric machine 11 to the first sun gear S1 of the differential gear unit GS becomes accordingly larger than torque transmitted to the second sun gear S2, whereby the left output shaft-transmitted torque becomes larger than the right output shaft-transmitted torque. Inversely, when the degree of engagement of the second clutch 43 is controlled such that it becomes larger than that of the first clutch 42, the torque transmitted from the first rotating electric machine 11 to the second sun gear S2 becomes accordingly larger than that to the first sun gear S1, whereby the left output shaft-transmitted torque becomes larger than the right output shaft-transmitted torque.

As described above, according to the fifth embodiment, similarly to the fourth embodiment, it is possible to drive the left and right output shafts SRL and SRR using both the first and second rotating electric machines 11 and 12 (the 2-MOT drive mode), and distribute the torque to the left and right output shafts SRL and SRR, so that compared with the second and third embodiments using the single rotating electric machine 41, it is possible to improve the power performance and the left and right distribution performance of the power plant.

Figure 38:
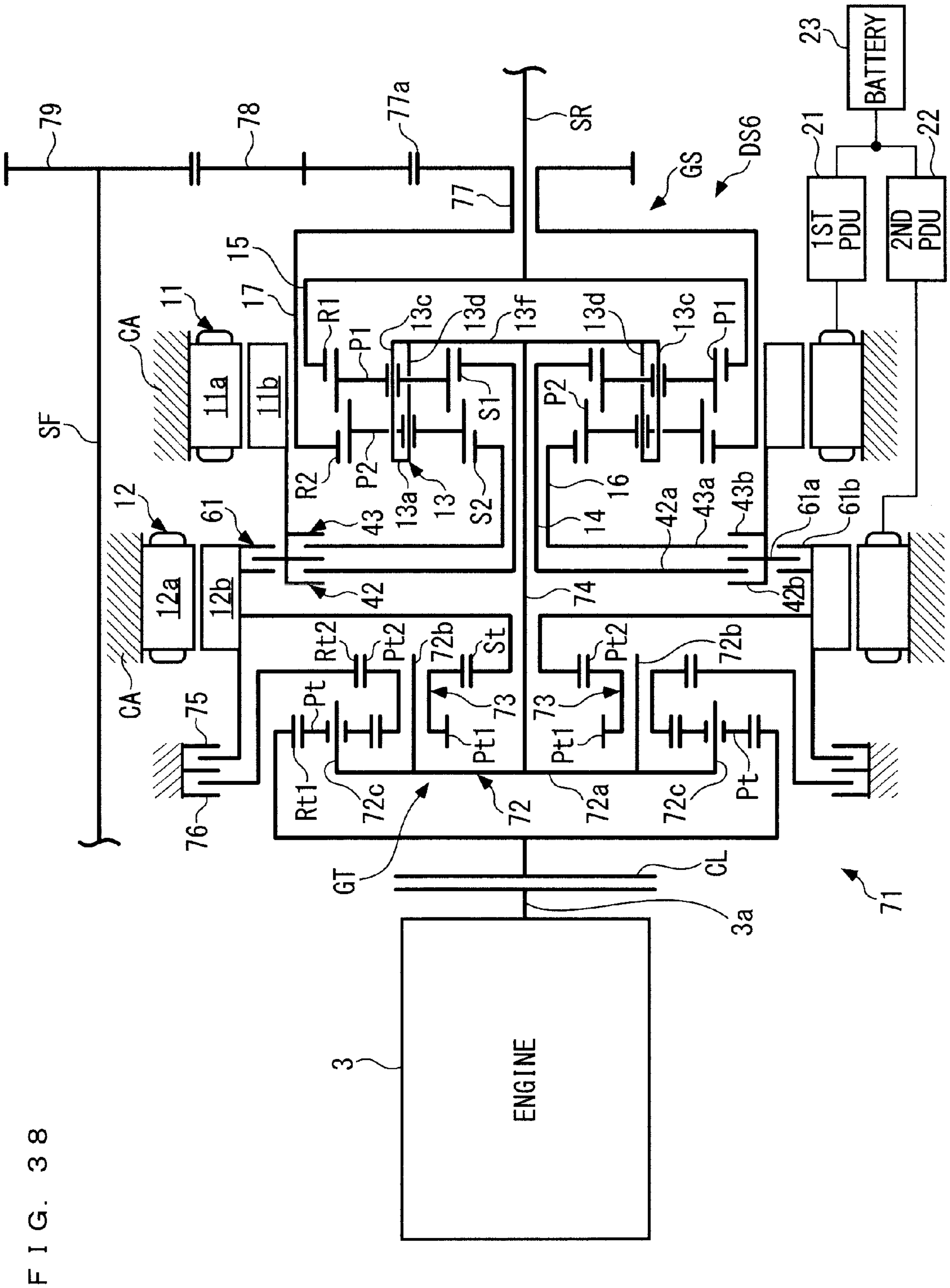
FIG. 38 A skeleton diagram of a power plant etc. according to a sixth embodiment of the present invention.

Next, a power plant according to a sixth embodiment of the present invention will be described with reference to FIG. 38. Differently from the first to fifth embodiments, this power plant drives not the left and right output shafts SRL and SRR but front and rear output shafts SF and SR of an all-wheel drive vehicle. In FIG. 38, the same component elements as those of the first to fifth embodiments are denoted by the same reference numerals. The following description is given mainly of different points from the first to fifth embodiments.

Figure 39:
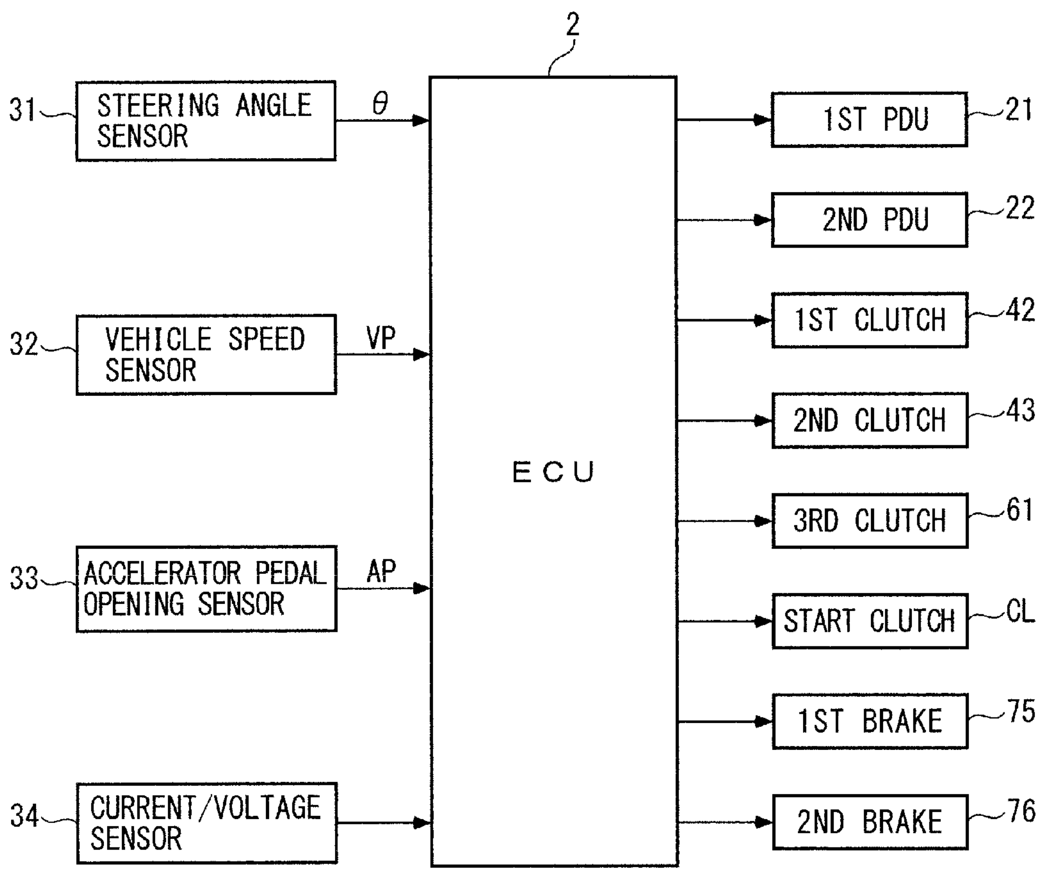
FIG. 39 A block diagram of an ECU etc. of the power plant shown in FIG. 38.

The front and rear output shafts SF and SR are arranged in parallel with each other, and are connected to the front and rear wheels (not shown) of the vehicle (not shown). Further, the rear output shaft SR is disposed coaxially with a crankshaft 3*a* of the engine 3. A transmission 71 is connected to the crankshaft 3*a* via a start clutch CL. Similarly to the first and second clutches 42 and 43, the start clutch CL is a hydraulic friction clutch, and the degree of engagement thereof is controlled by the ECU 2 (see FIG. 39).

The above-mentioned transmission 71 transmits motive power of the engine 3 and the second rotating electric machine 12 to the front and rear output shafts SF and SR in a state changed in speed. The transmission 71 includes a speed change gear unit GT comprised of a carrier member 72, double pinion gears 73, a sun gear St, pinion gears Pt, a first ring gear Rt1, and a second ring gear Rt2, and is disposed between the engine 3 and the rear output shaft SR. The carrier member 72 is comprised of a disk-shaped root portion 72*a*, four first support shafts 72*b* (only two of which are shown) and four second support shafts 72*c* (only two of which are shown), which are integrally formed with the root portion 72*a*. Further, the root portion 72*a* is integrally mounted on one end of a solid output shaft 74, and the two 72*a* and 74 are disposed coaxially with the rear output shaft SR. The output shaft 74 is used for outputting motive power changed in speed by the transmission 71 to a distribution system DS6. The output shaft 74 is rotatably supported by bearings (not shown), and is rotatable in unison with carrier member 72.

Further, the first and second support shafts 72*b* and 72*c* extend in the axial direction of the rear output shaft SR. The first support shafts 72*b* are arranged at respective locations in the radial center of the root portion 72*a*, and the second support shafts 72*c* are arranged at the radially outer end of the root portion 72*a*. Furthermore, the first and second support shafts 72*b* and 72*c* are arranged alternately at equally-spaced intervals in a circumferential direction of the root portion 72*a*.

The above-mentioned double pinion gears 73 are each comprised of a first pinion gear Pt1 and a second pinion gear Pt2 integrally formed with each other. The number of the double pinion gears 73 is four (only two of which are shown) which is equal to the number of the above-mentioned first support shafts 72*b*, and each double pinion gear 73 is rotatably supported on an associated one of the first support shafts 72*b* via a bearing (not shown). Note that the number of the double pinion gears 73 and the number of the first support shafts 72*b* are not limited to four but they can be set as desired. Further, the first pinion gears Pt1 are located at respective portions of the first support shafts 72*b* on a side closer to the engine 3, and the second pinion gears Pt2 are located at respective portions of the first support shafts 72*b* on a side closer to the rear output shaft SR. The two Pt1 and Pt2 have pitch circle diameters different from each other.

The first pinion gears Pt1, the pinion gears Pt, and the first ring gear Rt1 are radially arranged from inside in this order. The number of the pinion gears Pt is four (only two of which are shown) which is equal to the number of the second support shafts 72*c* of the carrier member 72. Each pinion gear Pt is rotatably supported on an associated one of the second support shafts 72*c* via a bearing (not shown), and is in mesh with both an associated one of the first pinion gears Pt1 and the first ring gear Rt1. Note that the number of the pinion gears Pt and the number of the second support shafts 72*c* are not limited to four but they can be set as desired. Further, the first ring gear Rt1 is connected to the start clutch CL via a hollow cylindrical rotating shaft and a flange. The degree of engagement of the start clutch CL is controlled by the ECU 2, whereby the crankshaft 3*a* of the engine 3 is connected to and disconnected from the first ring gear Rt1.

Further, the sun gear St, the second pinion gears Pt2, and the second ring gear Rt2 are radially arranged from inside in this order. The sun gear St is connected to the second rotor 12*b* of the second rotating electric machine 12 via a hollow cylindrical rotating shaft. The output shaft 74 integrally formed with the above-described carrier member 72 is relatively rotatably disposed inward of the rotating shaft. Further, the second pinion gears Pt2 are in mesh with both the sun gear St and the second ring gear Rt2.

Further, the transmission 71 includes a first brake 75 and a second brake 76 each formed by an electromagnetic brake. The first brake 75 is attached to the second rotor 12*b*, and is turned on or off by the ECU 2 (see FIG. 39). In an ON state, the first brake 75 holds the second rotor 12*b* unrotatable, whereas in an OFF state, the first brake 75 permits rotation of the second rotor 12*b*. The second brake 76 is attached to the second ring gear Rt2, and is turned on or off by the ECU 2 (see FIG. 39). In an ON state, the second brake 76 holds the second ring gear Rt2 unrotatable, whereas in an OFF state, the second brake 76 permits rotation of the second ring gear Rt2.

In the transmission 71 constructed as above, the sun gear St, the first ring gear Rt1, the carrier member 72, and the second ring gear Rt2, the rotational speeds of which are in a collinear relationship with each other, are depicted in this order in the collinear chart. Further, since the sun gear St is connected to the second rotor 12 via the hollow cylindrical rotating shaft, the rotational speed of the sun gear St and the rotational speed of the second rotor 12 are equal to each other. Furthermore, the first ring gear Rt1 is directly connected to the crankshaft 3*a* by engagement of the start clutch CL, and hence in this case, the rotational speed of the first ring gear Rt1 and the rotational speed of the engine 3 are equal to each other. Further, since the carrier member 72 is directly connected to the output shaft 74, the rotational speeds of the two 72 and 74 are equal to each other. From the above, the relationship between the rotational speeds of the sun gear St, the first ring gear Rt1, the carrier member 72, the second ring gear Rt2, the second rotor 12*b*, the crankshaft 3*a*, and the output shaft 74 is expressed e.g. as in collinear charts shown in FIGS. 40 to 42. Hereafter, speed change operations executed when the respective speeds of the motive power of the second rotating electric machine 12 and the motive power of the engine 3 are changed by the transmission 71 will be described with reference to the above FIGS. 40 to 42.

First, a description will be given of a speed-changing mode of the transmission 71 for changing the speed of the motive power of the second rotating electric machine 12 (hereinafter referred to as the "MOT speed-changing mode"). In the MOT speed-changing mode, by controlling the first brake 75 to the OFF state, the rotation of the second rotor 12*b* is permitted, and by controlling the second brake 76 to the ON state, the second ring gear Rt2 is held unrotatable. FIG. 40 shows a rotational speed relationship and a torque balance relationship between various types of rotary elements in the MOT speed-changing mode.

In FIG. 40, TM2 represents the above-described second motor output torque (output torque generated by the second rotor 12*b* along with the powering by the second rotating electric machine 12), TO represents torque transmitted to the output shaft 74, and RB2 represents a reaction force torque acting on the second ring gear Rt2 along with transmission of the second motor output torque TM2 to the sun gear St. In this case, the relationship between the second motor output torque TM2 and the torque TO transmitted to the output shaft 74 is expressed by $TO=\{1+(ZRt2/ZSt)\}TM2$. Here, ZRt2 represents the number of the gear teeth of the second ring gear Rt2, and ZSt represents the number of the gear teeth of the sun gear St. As is apparent from FIG. 40, during the MOT speed-changing mode, the motive power of the second rotating electric machine 12 is transmitted to the output shaft 74 in a state largely reduced in speed, and the second motor output torque TM2 is transmitted to the output shaft 74 in a state largely increased in speed.

Figure 41:
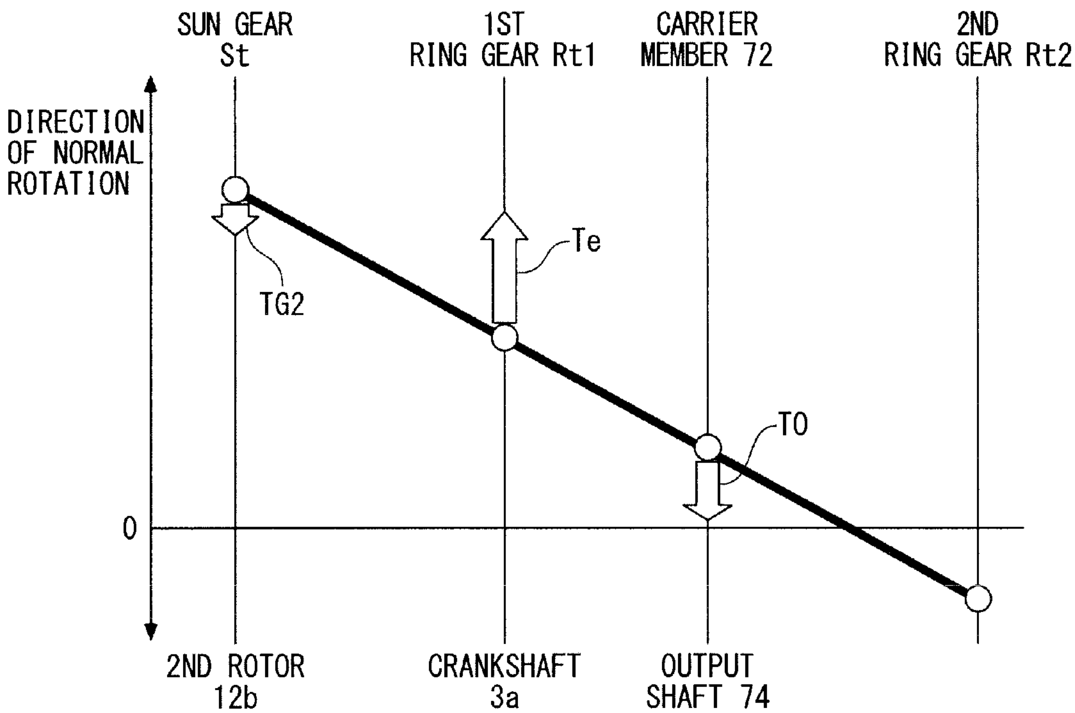
FIG. 41 A collinear chart showing a rotational speed relationship and a torque balance relationship between the various types of rotary elements of the power plant shown in FIG. 38, as to during an ECVT mode.

Further, in the transmission 71, as speed-changing modes for changing the speed of the motive power from the engine 3, there are provided two speed-changing modes, i.e. a speed-changing mode in which the second rotating electric machine 12 is used (hereinafter referred to as the "ECVT mode") and a speed-changing mode in which the first brake 75 is used (hereinafter referred to as the "ENG speed-increasing mode"). First, a description is given of the ECVT mode. In the ECVT mode, both the first and second brakes 75 and 76 are controlled to the OFF state to thereby permit rotation of the second rotor 12*b* of the second rotating electric machine 12 and the second ring gear Rt2. Further, regeneration is performed by the second rotating electric machine 12 using motive power transmitted from the engine 3 to the second rotating electric machine 12 via the transmission 71. Regenerated electric power is supplied to the first stator 11*a*, whereby powering is performed by the first rotating electric machine 11, and the motive power of the first rotating electric machine 11 is transmitted to the front and rear output shafts SF and SR via the differential gear unit GS. FIG. 41 shows a rotational speed relationship and a torque balance relationship between the various types of rotary elements in the ECVT mode.

In FIG. 41, Te represents torque of the engine 3, TG2 represents the above-described second motor braking torque (braking torque generated by the second rotor 12*b* along with the regeneration by the second rotating electric machine 12). The other parameters are the same as shown in FIG. 40. The relationship between the torque TE of the engine 3 and the torque TO transmitted to the output shaft 74 in the ECVT mode is expressed by TO={1−(ZSt/ZRt1)}TE. Here, ZSt represents the number of the gear teeth of the sun gear St, as mentioned above, and ZRt1 represents the number of the gear teeth of the first ring gear Rt1. Further, as is apparent from FIG. 41, in the ECTV mode, by controlling the rotational speed of the second rotating electric machine 12, it is possible to freely control the rotational speed of the output shaft 74. In other words, it is possible to freely control motive power transmitted from the engine 3 to the output shaft 74 to thereby freely change the speed of the motive power of the engine 3 and output the motive power changed in speed from the output shaft 74.

Figure 42:
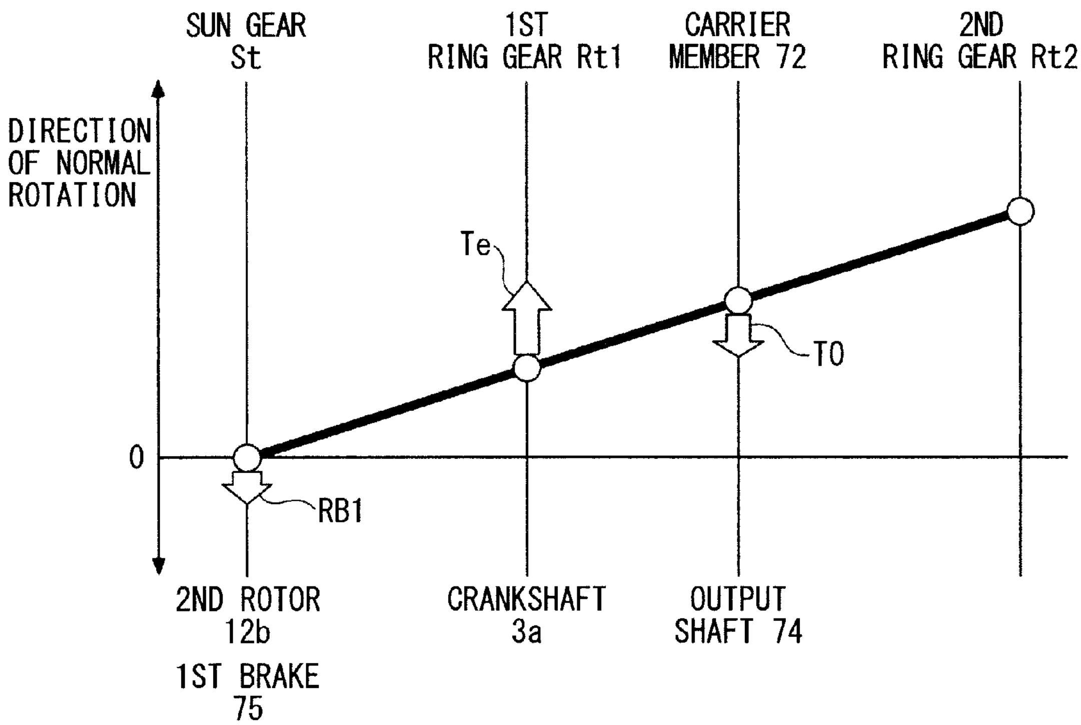
FIG. 42 A collinear chart showing a rotational speed relationship and a torque balance relationship between the various types of rotary elements of the power plant shown in FIG. 38, as to during an ENG speed-increasing mode.

Next, a description will be given of the ENG speed-increasing mode (speed-changing mode using the first brake 75). In the ENG speed-increasing mode, by controlling the first brake 75 to the ON state, the second rotor 12*b* is held unrotatable together with the sun gear St, and by controlling the second brake 76 to the OFF state, the rotation of the second ring gear Rt2 is permitted. FIG. 42 shows a rotational speed relationship and a torque balance relationship between the various types of rotary elements in the ENG speed-increasing mode. In FIG. 12, RB1 represents a reaction force torque acting on the second rotor 12*b* and the sun gear St along with transmission of torque of the engine 3 to the first ring gear Rt1. The other parameters are the same as shown in FIG. 41. In the ENG speed-increasing mode, similarly to the case of the ECVT mode, the relationship between the torque TE of the engine 3 and the torque TO transmitted to the output shaft 74 is expressed by TO={1−(ZSt/ZRt1)}TE. Further, as is apparent from FIG. 42, in the ENG speed-increasing mode, the motive power of the engine 3 is transmitted to the output shaft 74 in a state increased in speed.

Further, the distribution system DS6 according to the sixth embodiment is disposed between the transmission 71 and the rear output shaft SR. Further, the first sun gear S1, the first pinion gears P1, and the first ring gear R1 are arranged on a side closer to the rear output shaft SR, and the second sun gear S2, the second pinion gears P2, and the second ring gear R2 of the differential gear unit GS are arranged on a side closer to the crankshaft 3*a*. Furthermore, similarly to the fifth embodiment, by engagement and disengagement of the first and second clutches 42 and 43, the first and second sun gears S1 and S2 are connected to and disconnected from the first rotor 11*b* of the first rotating electric machine 11, respectively. Further, by engagement and disengagement of the third clutch 61, the first rotor 11*b* and the second rotor 12*b* are connected to and disconnected from each other. Furthermore, a second root portion 13*f* of the carrier member 13 of the differential gear unit GS is disk-shaped, and is integrally mounted on the other end of the above-described output shaft 74. This makes it possible for the carrier member 13 to rotate in unison with the above-described carrier member 72 of the transmission 71.

Further, the fourth rotating shaft 17 integrally formed with the second ring gear R2 of the differential gear unit GS is relatively rotatably disposed inward of the first rotor 11*b*. A hollow cylindrical rotating shaft 77 is connected to the fourth rotating shaft 17 via a flange, and an annular gear 77*a* is integrally mounted on the rotating shaft 77 via a flange. Further, the rear output shaft SR is relatively rotatably disposed inward of the fourth rotating shaft 17, the rotating shaft 77, and the gear 77*a*. The gear 77*a* is in mesh with an idler gear 78, and the idler gear 78 is in mesh with a gear 79 integrally mounted on the front output shaft SF. As described above, the second ring gear R2 is connected to the front output shaft SF via the fourth rotating shaft 17, the rotating shaft 77, the gear 77*a*, the idler gear 78, and the gear 79.

The second rotating shaft 15 integrally formed with the first ring gear R1 is relatively rotatably disposed inward of the above-mentioned fourth rotating shaft 17. The second rotating shaft 15 is connected to one end of the rear output shaft SR via a flange, whereby the first ring gear R1 is rotatable in unison with the rear output shaft SR.

Figure 43:
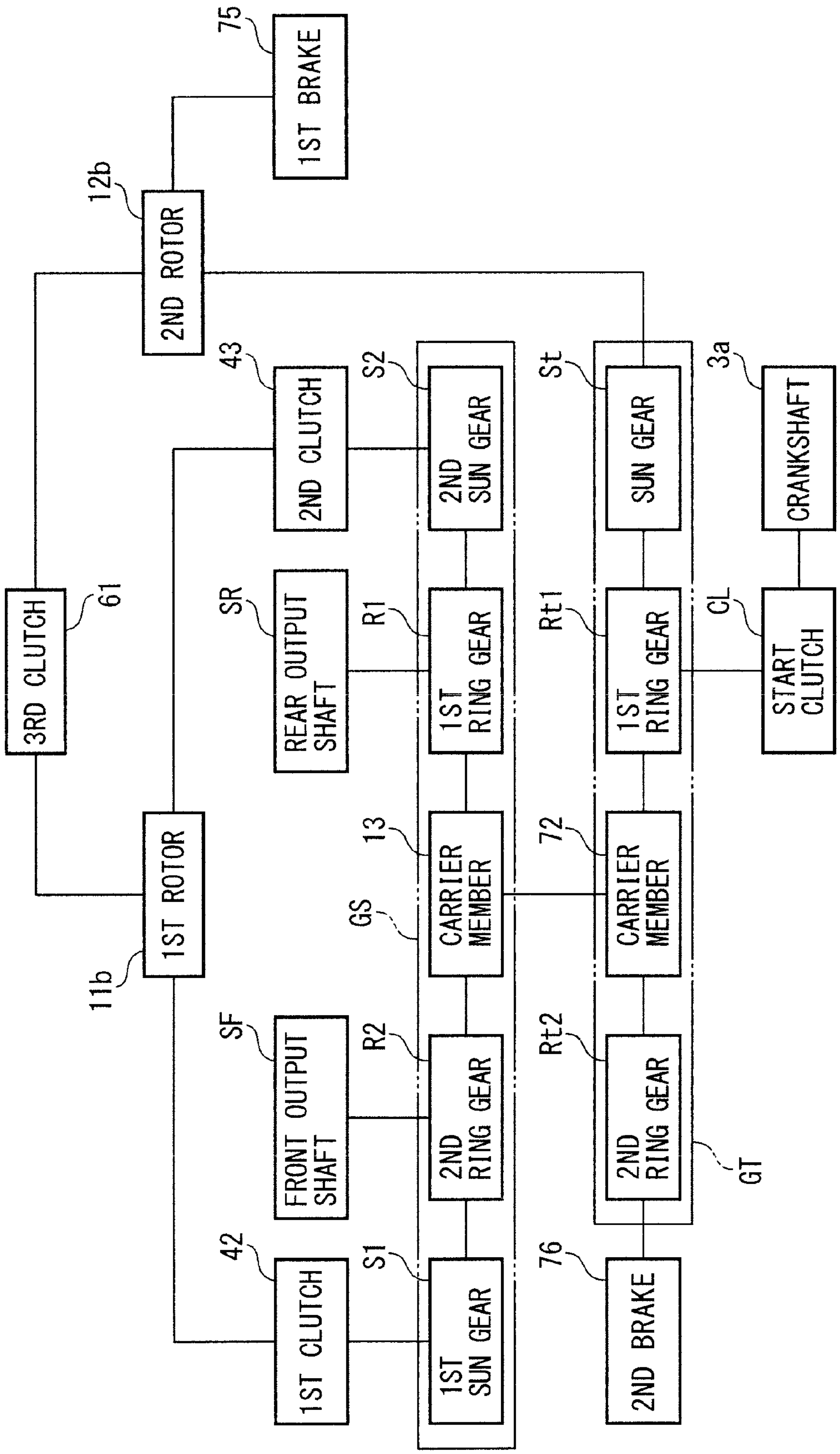
FIG. 43 A diagram showing a relationship of connections between the various types of rotary elements of the power plant shown in FIG. 38.

With the above arrangement, the relationship of connections between the various types of rotary elements of the power plant is as shown e.g. in FIG. 43. In the power plant, similarly to the fifth embodiment, the 1-MOT drive mode and the 2-MOT drive mode are provided as operation modes thereof, and further, a motive power split mode, an ENG drive mode, and a speed-reducing regeneration mode are provided as operation modes of the power plant. Hereinafter, operations executed in these modes will be sequentially described with reference to FIGS. 43 to 56.

[1-MOT Drive Mode]

During the 1-MOT drive mode, basically, all the first to third clutches 42, 43, and 61 are disengaged to thereby disconnect the first rotor 11*b* from both the first and second sun gears S1 and S2, and the first rotor 11*b* from the second rotor 12*b*. Further, the engine 3 is disconnected from the first ring gear Rt1 using the start clutch CL, and the transmission 71 is driven in the above-described MOT speed-changing mode (see FIG. 40) (the first brake 75: off; the second brake 76: on), and powering is performed by the second rotating electric machine 12.

With the above operations, as shown in FIG. 44, the second motor output torque TM2 is transmitted to the differential gear unit GS (carrier member 13) via the speed change gear unit GT, and is further transmitted to the front and rear output shafts SF and SR. In this case, as described with reference to FIG. 40, the motive power of the second rotating electric machine 12 is transmitted to the front and rear output shafts SF and SR in a state reduced in speed by the transmission 71 comprised of the speed change gear unit GT. Further, in the collinear chart (see FIG. 5, and replace the left and right output shafts SRL and SRR by the front and rear output shafts SF and SR), the distance from the carrier member 13 of the differential gear unit GS to the front output shaft SF and the distance from the carrier member 13 to the rear output shaft SR are equal to each other. For this reason, the torque distribution ratio of torque distributed from the carrier member 13 to the front and rear output shafts SF and SR is 1:1, and torques distributed to the front and rear output shafts SF and SR (hereinafter referred to as the "front output shaft-transmitted torque" and the "rear output shaft-transmitted torque", respectively) are equal to each other.

[Torque Distribution Control During 1-MOT Drive Mode]

Figure 45:
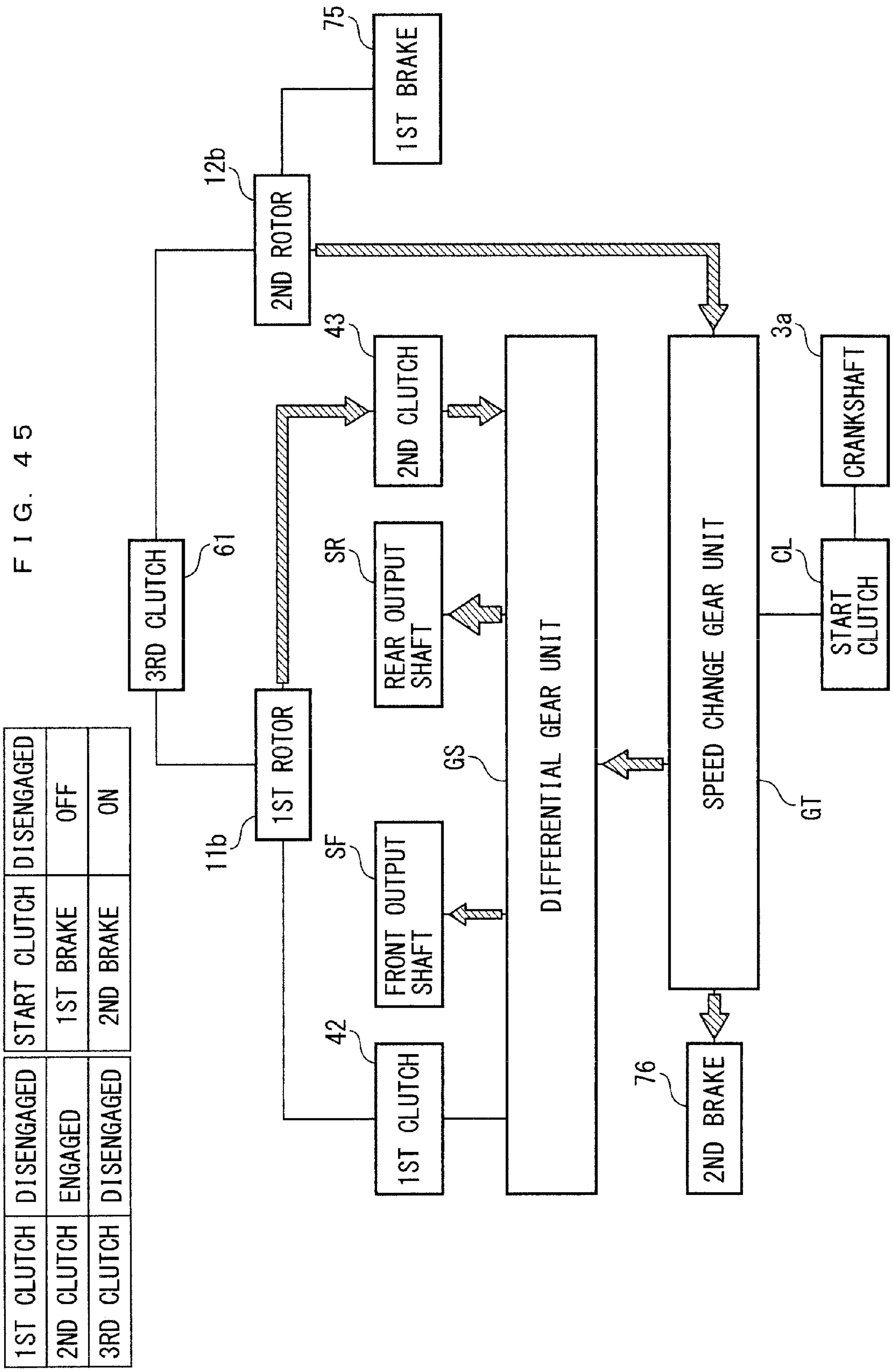
FIG. 45 A diagram showing a state of transmission of torque between the various types of rotary elements of the power plant shown in FIG. 38, as to during torque distribution control in the 1-MOT drive mode.

Further, during the 1-MOT drive mode, it is possible to control the torques distributed to the front and rear output shafts SF and SR using the first rotating electric machine 11. In this case, one of the first and second clutches 42 and 43 which have been disengaged by that time is selectively engaged to thereby selectively connect the first rotor 11*b* to one of the first and second sun gears S1 and S2, and powering or regeneration is performed by the first rotating electric machine 11. FIG. 45 shows a state of transmission of torque in a case where the second clutch 43 is engaged to thereby connect the first rotor 11*b* to the second sun gear S2, the first clutch 42 is held disengaged to thereby hold the first rotor 11*b* and the first sun gear S1 in a disconnected state, and powering is performed by the first rotating electric machine 11. As shown in FIG. 45, the first motor output torque TM1 is transmitted to the differential gear unit GS (second sun gear S2), whereby the rear output shaft-transmitted torque becomes larger than the front output shaft-transmitted torque.

Further, during the 1-MOT drive mode, differently from the case shown in FIG. 45, when the first clutch 42 is engaged to thereby connect the first rotor 11*b* to the first sun gear S1, the second clutch 43 is disengaged to thereby disconnect the first rotor 11*b* from the second sun gear S2, and powering is performed by the first rotating electric machine 11, a state of transmission of torque between the various types of rotary elements is as shown in FIG. 46. As shown in FIG. 46, the first motor output torque TM1 is transmitted to the differential gear unit GS (first sun gear S1), whereby the front output shaft-transmitted torque becomes larger than the rear output shaft-transmitted torque.

Note that differently from the cases shown in FIGS. 45 and 46, in a case where regeneration is performed by the first rotating electric machine 11, a magnitude relationship between the front and rear output shaft-transmitted torques is only inverted from the case where powering is performed, and approximately the same operations as in the cases shown in FIGS. 45 and 46 are performed, and hence detailed description thereof is omitted. Further, the differential limit control during the 1-MOT drive mode will be described hereinafter.

[2-MOT Drive Mode]

Figure 47:
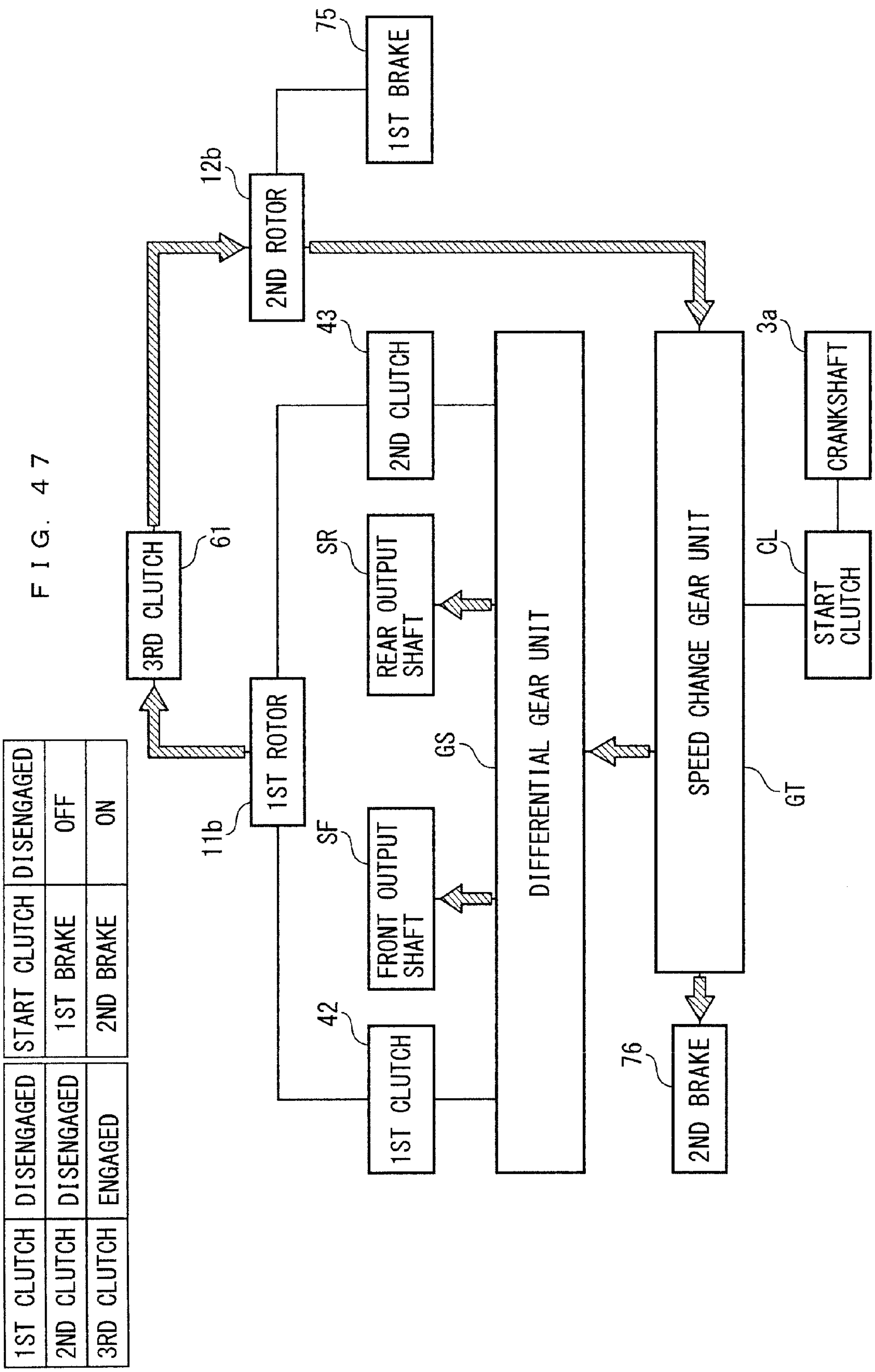
FIG. 47 A diagram showing a state of transmission of torque between the various types of rotary elements of the power plant shown in FIG. 38, as to during the 2-MOT drive mode.

During the 2-MOT drive mode, basically, the first and second clutches 42 and 43 are disengaged to thereby disconnect the first rotor 11*b* from both the first and second sun gears S1 and S2, the third clutch 61 is engaged to thereby connect the first rotor 11*b* to the second rotor 12*b*, and the start clutch CL is disengaged to thereby disconnect the engine 3 from the first ring gear Rt1. Further, the transmission 71 is driven in the above-described MOT speed-changing mode (the first brake 75: off; the second brake 76: on), and powering is performed by both the first and second rotating electric machines 11 and 12. With the above operations, as shown in FIG. 47, the first and second motor output torques TM1 and TM2 are transmitted to the differential gear unit GS (carrier member 13) via the transmission 71, and is further transmitted to the front and rear output shafts SF and SR. In this case, the motive powers of the first and second rotating electric machines 11 and 12 are transmitted to the front and rear output shafts SF and SR in a state reduced in speed by the transmission 71. Further, the torque distribution ratio of torque distributed from the carrier member 13 to the front and rear output shafts SF and SR is 1:1, and the front output shaft-transmitted torque and the rear output shaft-transmitted torque are equal to each other.

[Torque Distribution Control During 2-MOT Drive Mode]

Figure 48:
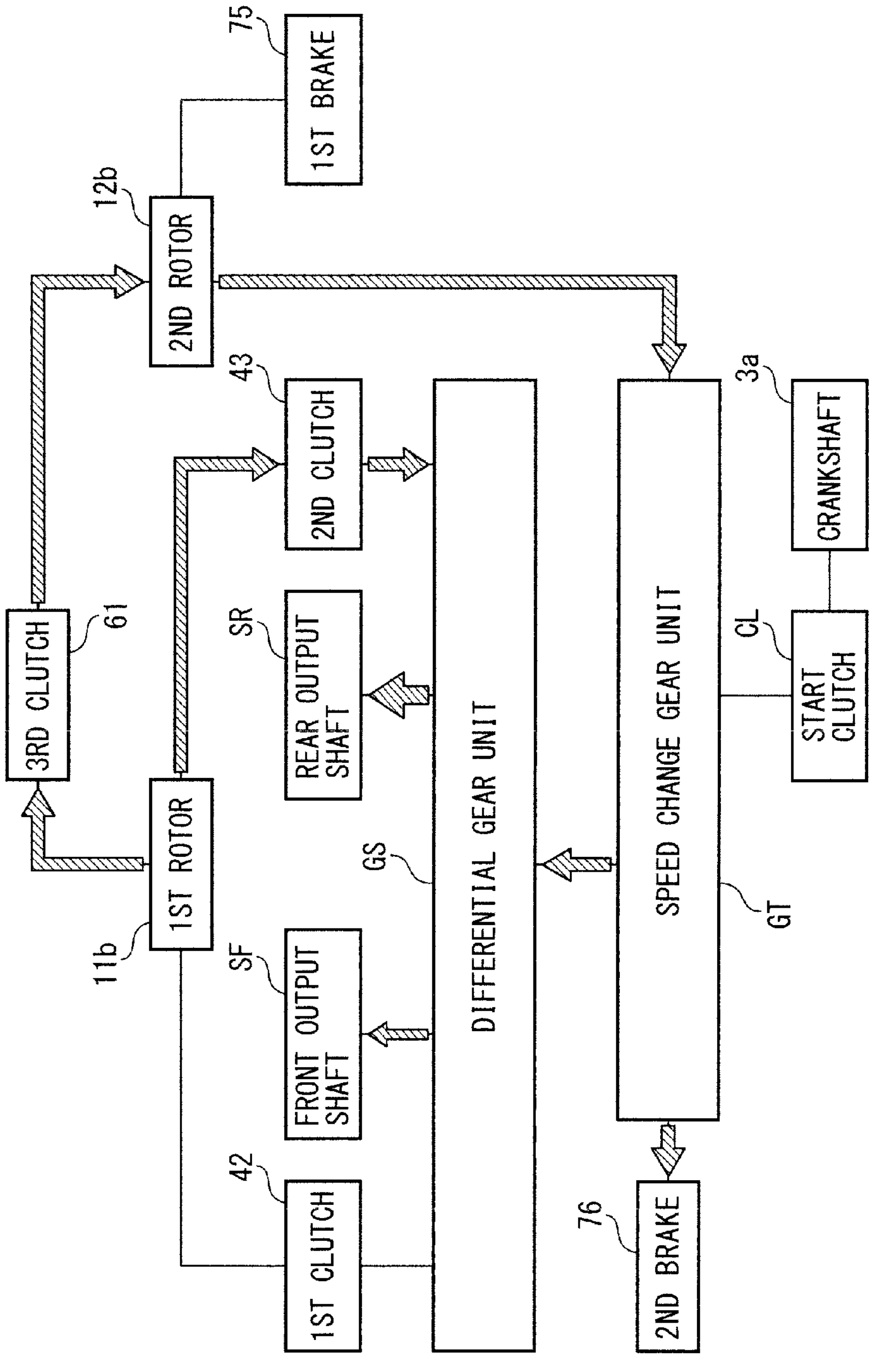
FIG. 48 A diagram showing a state of transmission of torque between the various types of rotary elements of the power plant shown in FIG. 38, as to during torque distribution control in the 2-MOT drive mode.

Further, during the 2-MOT drive mode, similarly to the fourth and fifth embodiments, by selectively controlling the degree of engagement of one of the first and second clutches 42 and 43 which have been disengaged by that time, it is possible to control the torques distributed to the front and rear output shafts SF and SR. FIG. 48 shows a state of transmission of torque in a case where, during the 2-MOT drive mode, the degree of engagement of the second clutch 43 is controlled to cause the second clutch 43 to slide, and the first clutch 42 is held disengaged to thereby hold the first rotor 11*b* and the first sun gear S1 in a disconnected state.

In this case as well, the motive powers of the first and second rotating electric machines 11 and 12 are transmitted to the carrier member 13 in a state largely reduced in speed by the transmission 71 (see FIG. 40), and hence similarly to the third embodiment, the rotational speed of the first rotor 11*b* has become higher than the rotational speed of the carrier member 13, and further has become higher than the rotational speed of the second sun gear S2. For this reason, the reaction force torque RC1, which acts from the second clutch 43 on the second sun gear S2 as the second clutch 43 is caused to slide, acts such that the rotational speed of the second sun gear S2 is increased, and accordingly the drive torque acts on the rear output shaft SR, and the braking torque acts on the front output shaft SF. As a consequence, as shown in FIG. 48, the rear output shaft-transmitted torque becomes larger than the front output shaft-transmitted torque.

Figure 49:
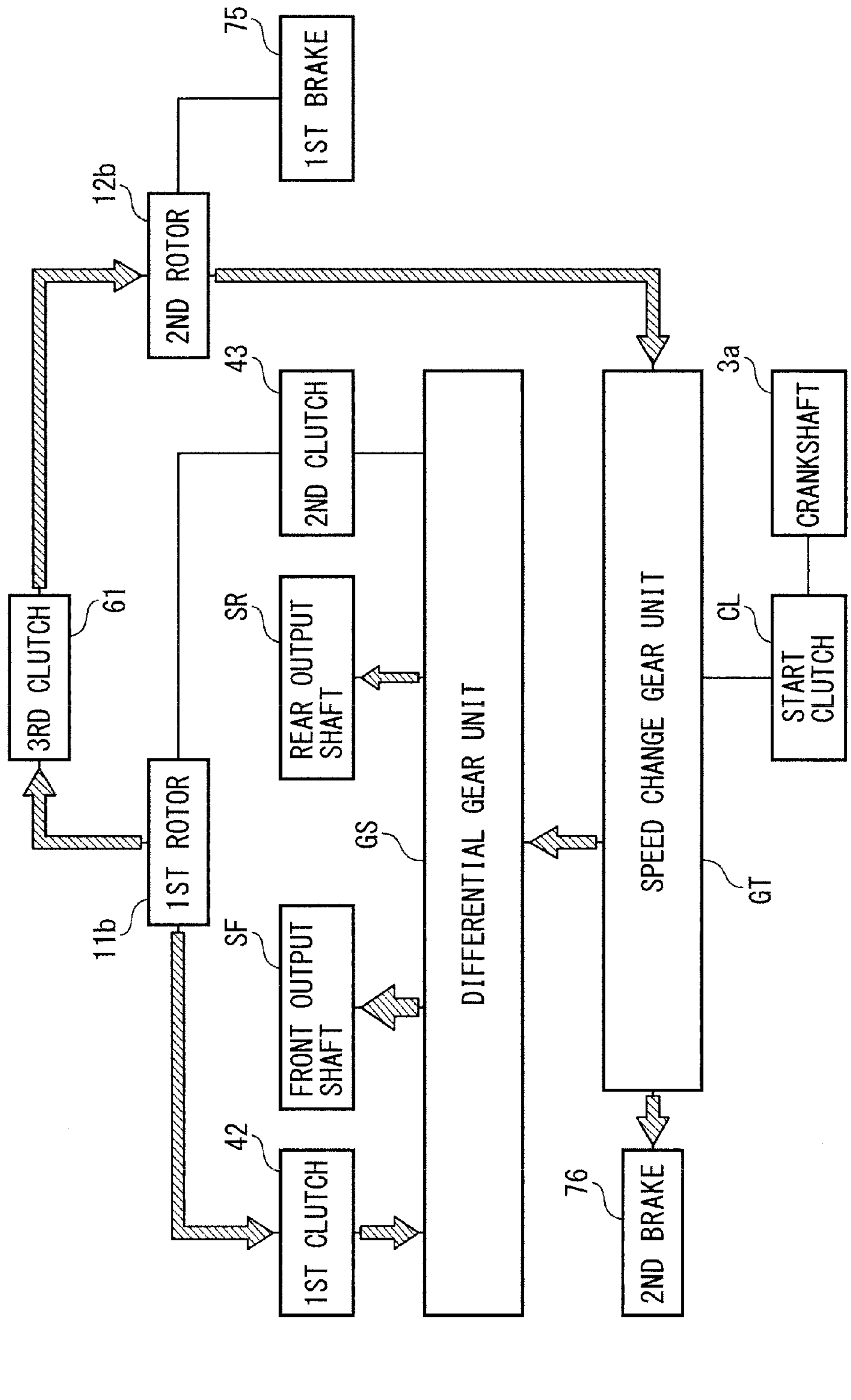
FIG. 49 A diagram showing a state of transmission of torque between the various types of rotary elements of the power plant shown in FIG. 38, as to an operation different from FIG. 48 during the torque distribution control in the 2-MOT drive mode.

Further, FIG. 49 shows a state of transmission of torque in a case where, during the 2-MOT drive mode, inversely to the case shown in FIG. 48, the degree of engagement of the first clutch 42 that has been disengaged by that time is controlled to cause the first clutch 42 to slide, and the second clutch 43 is held disengaged to thereby hold the first rotor 11*b* and the second sun gear S2 in a disconnected state. Similarly to the above-described case shown in FIG. 48, the rotational speed of the first rotor 11*b* has become higher than the rotational speed of the carrier member 13, and further has become higher than the rotational speed of the first sun gear S1. Therefore, the reaction force torque RC1, which acts from the first clutch 42 on the first sun gear S1 as the first clutch 42 is caused to slide, acts such that the rotational speed of the first sun gear S1 is increased, and accordingly the drive torque acts on the front output shaft SF, and the braking torque acts on the rear output shaft SR. As a consequence, as shown in FIG. 49, the front output shaft-transmitted torque becomes larger than the rear output shaft-transmitted torque.

[Differential Limit Control During 2-MOT Drive Mode]

Furthermore, during the 2-MOT drive mode, a differential rotation between the front and rear output shafts SF and SR can be limited. In this case, basically, all the first to third clutches 42, 43, and 61 are engaged to thereby connect the first rotor 11*b* to both the first and second sun gears S1 and S2, and the first rotor 11*b* to the second rotor 12*b*, and the start clutch CL is disengaged to thereby disconnect the engine 3 from the first ring gear Rt1. Further, both the first and second brakes 75 and 76 of the transmission 71 are controlled to the OFF state, to thereby permit rotation of both the second rotor 12*b* and the second ring gear Rt2. Further, powering is performed by the first and second rotating electric machines 11 and 12.

With the above operations, as shown in FIG. 50, the first and second motor output torques TM1 and TM2 are transmitted to the differential gear unit GS, and is further transmitted to the front and rear output shafts SF and SR. Note that in the speed change gear unit GT, the sun gear St, the first ring gear Rt1, the carrier member 72, and the second ring gear Rt2 only idly rotate, and hence the first and second motor output torques TM1 and TM2 are not transmitted to the differential gear unit GS via the speed change gear unit GT. Further, the above-described first and second clutches 42 and 43 are engaged to thereby connect the first and second sun gears S1 and S2 to each other via the first rotor 11*b*, so that when a differential rotation occurs between the two S1 and S2, reaction forces act from the first and second clutches 42 and 43 on the first and second sun gears S1 and S2, respectively. These reaction forces act such that the first and second sun gears S1 and S2 are caused to rotate in unison with each other, whereby the differential rotation between the front and rear output shafts SF and SR connected to the respective second and first ring gears R2 and R1 is limited.

Note that as described above, in the case where the motive powers of the first and second rotating electric machines 11 and 12 are transmitted to the differential gear unit GS via the first and second clutches 42 and 43, when the degrees of engagement of the first and second clutches 42 and 43 are not controlled to the same magnitude, but the degree of engagement of the first clutch 42 is controlled such that it becomes larger than that of the second clutch 43, torque transmitted to the first sun gear S1 becomes accordingly larger than torque transmitted to the second sun gear S2, whereby the front output shaft-transmitted torque becomes larger than the rear output shaft-transmitted torque. Inversely, when the degree of engagement of the second clutch 43 is controlled such that it becomes larger than that of the first clutch 42, the torque transmitted to the second sun gear S2 becomes accordingly larger than that to the first sun gear S1, whereby the rear output shaft-transmitted torque becomes larger than the front output shaft-transmitted torque. As described above, by controlling the degrees of engagement of the first and second clutches 42 and 43, it is possible to control the torques distributed to the front and rear output shafts SF and SR.

[Torque Distribution Control During Motive Power Split Mode]

Figure 51:
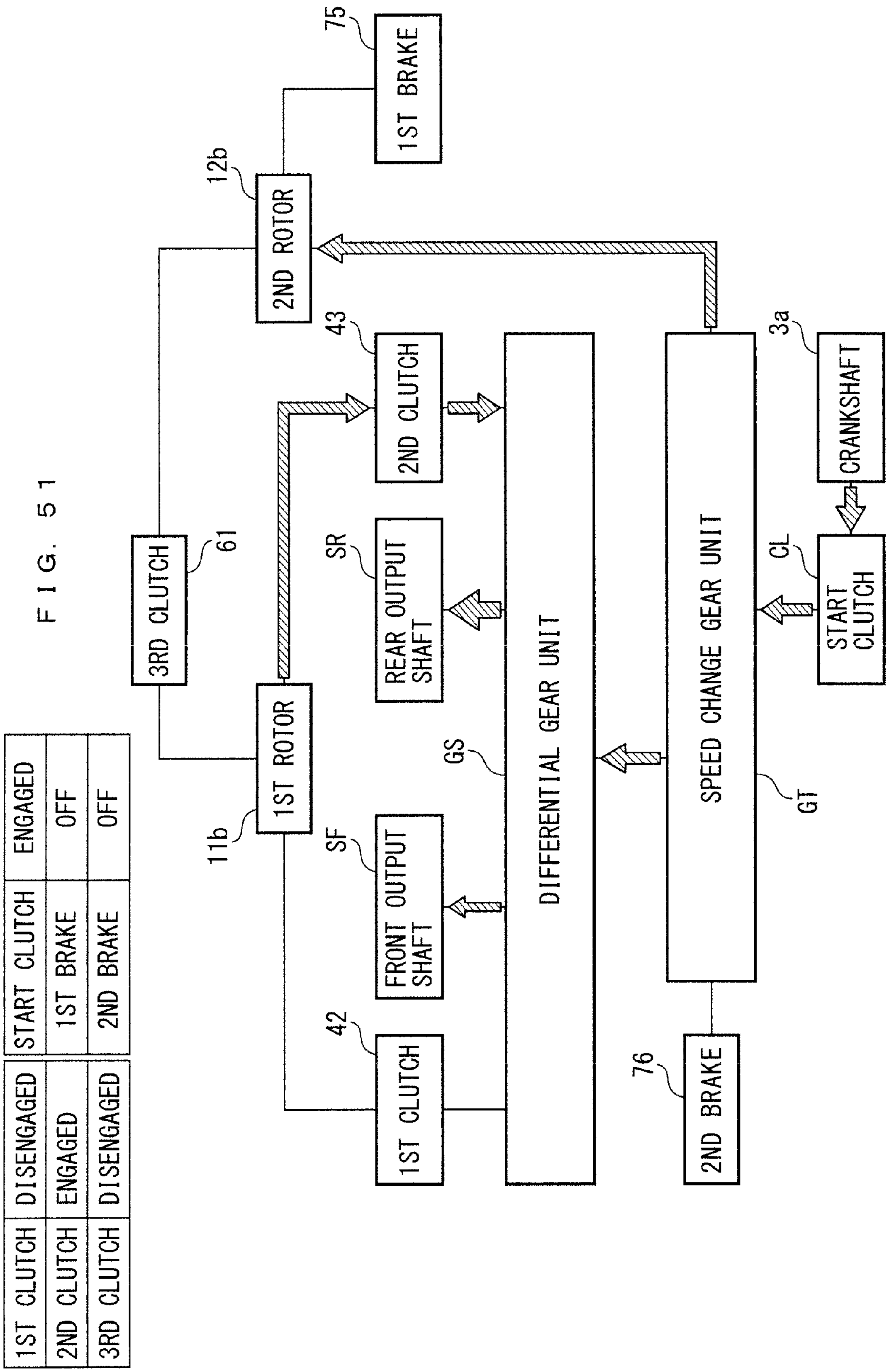
FIG. 51 A diagram showing a state of transmission of torque between the various types of rotary elements of the power plant shown in FIG. 38, as to during torque distribution control in a motive power split mode.

The motive power split mode is an operation mode in which the motive power of the engine 3 is divided by the speed change gear unit GT, and the resulting motive powers are transmitted to the front and rear output shafts SF and SR via two transmission paths parallel to each other. During execution of the motive power split mode, the torque distribution control or the differential limit control is performed. In the torque distribution control during the motive power split mode, basically, the start clutch CL is engaged to thereby connect the engine 3 to the first ring gear Rt1 of the speed change gear unit GT, and the transmission 71 is driven in the above-described ECVT mode (see FIG. 41) (both the first and second brakes 75 and 76: off). Further, the third clutch 61 is disengaged to thereby disconnect the first rotor 11*b* from the second rotor 12*b*, and regeneration is performed by the second rotating electric machine 12 using part of the motive power of the engine 3 transmitted via the speed change gear unit GT. Further, regenerated electric power is supplied to the first stator 11*a* via the second and first PDUs 22 and 21, whereby powering is performed by the first rotating electric machine 11, and the first and/or second clutch(es) 42 and/or 43 are/is engaged and disengaged to thereby connect and disconnect the first rotor 11*b* to and from the first and/or second sun gear(s) S1 and/or S2. FIG. 51 shows a state of transmission of torque between the various types of rotary elements in a case where the first clutch 42 is disengaged to thereby disconnect the first rotor 11*b* from the first sun gear S1, and the second clutch 43 is engaged to thereby connect the first rotor 11*b* to the second sun gear S2.

As shown in FIG. 51, the torque of the engine 3 is divided by the speed change gear unit GT, and via the differential gear unit GS, part of the divided torques of the engine 3 is transmitted to the front and rear output shafts SF and SR. Further, the remainder of the divided torques of the engine 3 is transmitted to the second rotor 12*b*, and is temporarily converted to electric energy by regeneration by the second rotating electric machine 12. The electric energy obtained by the conversion is supplied to the first stator 11*a*, and after being converted to the first motor output torque TM1 by powering by the first rotating electric machine 11, the electric energy is transmitted to the differential gear unit GS (second sun gear S2). With the above operations, the rear output shaft-transmitted torque becomes larger than the front output shaft-transmitted torque. Further, as described with reference to FIG. 41, the motive power of the engine 3 is transmitted to the front and rear output shafts SF and SR in a state changed in speed.

As described above, during the motive power split mode, the motive power of the engine 3 is transmitted to the front and rear output shafts SF and SR via the following first transmission path and second transmission path:

The first transmission path: the speed change gear unit GT→the differential gear unit GS→the front and rear output shafts SF and SR The second transmission path: the speed change gear unit GT→the second rotating electric machine 12→the second PDU 22→the first PDU 21→the first rotating electric machine 11→the differential gear unit GS→the front and rear output shafts SF and SR In the second transmission path, part of the motive power of the engine 3 is once converted to electric power, and is then converted back to motive power to be transmitted via a so-called electrical path.

Further, during the motive power split mode, inversely to the case shown in FIG. 51, when the second clutch 43 is disengaged to thereby disconnect the first rotor 11*b* from the second sun gear S2, and the first clutch 42 is engaged to thereby connect the first rotor 11*b* to the first sun gear S1, electric energy obtained through conversion by regeneration by the second rotating electric machine 12 is converted to the first motor output torque TM1 by powering by the first rotating electric machine 11, and is then transmitted to the first sun gear S1 via the first clutch 42. With the above operations, the front output shaft-transmitted torque becomes larger than the rear output shaft-transmitted torque.

[Differential Limit Control During Motive Power Split Mode]

Figure 52:
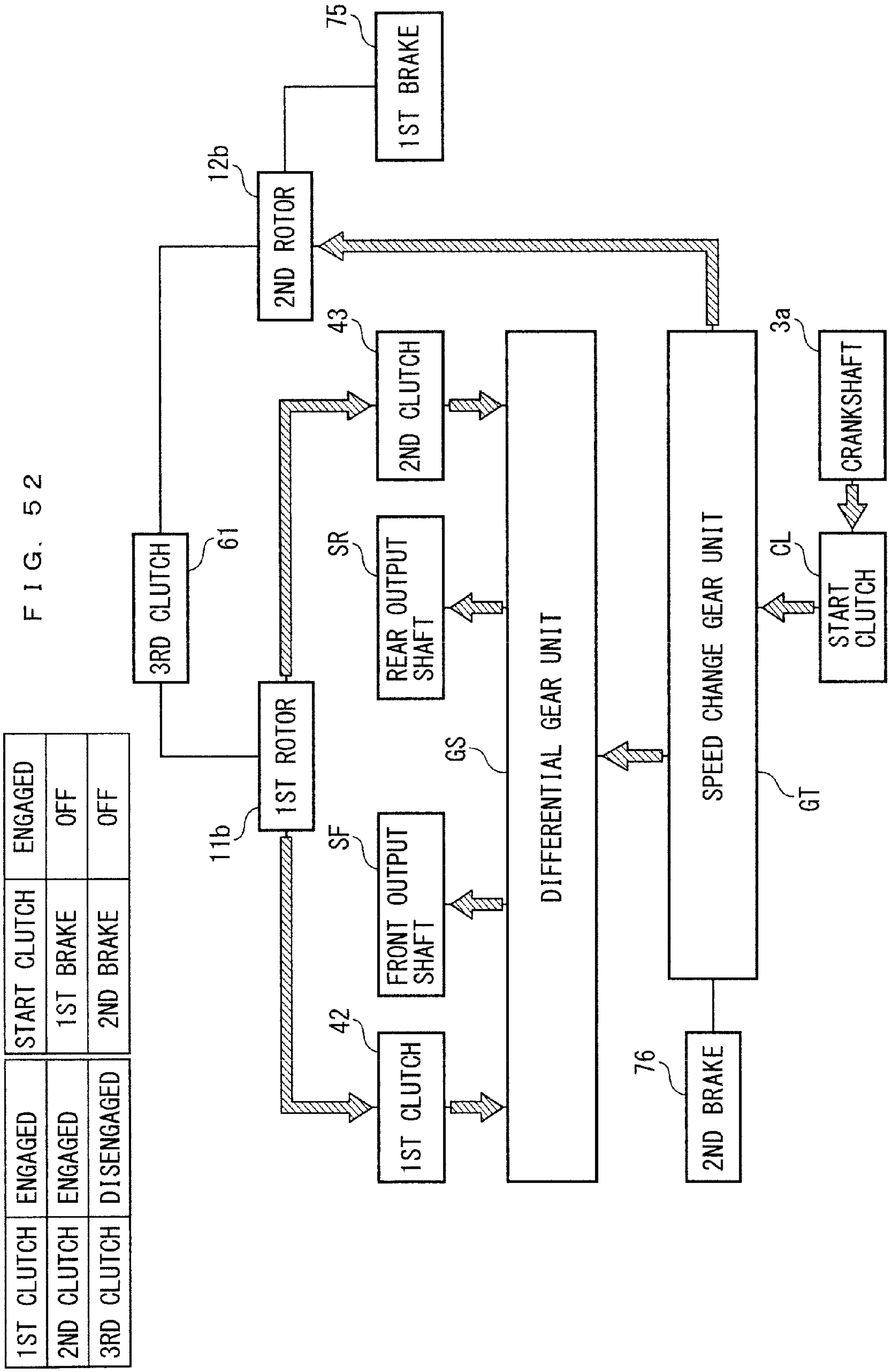
FIG. 52 A diagram showing a state of transmission of torque between the various types of rotary elements of the power plant shown in FIG. 38, as to during differential limit control in the motive power split mode.

Furthermore, during the motive power split mode, by controlling the degrees of engagement of the first and second clutches 42 and 43 to the same magnitude, the magnitudes of torques transmitted from the first rotor 11*b* to the first and second sun gears S1 and S2 become equal to each other. Further, the first and second sun gears S1 and S2 are connected to each other via the first rotor 11*b*, so that when a differential rotation occurs between the two S1 and S2, reaction forces act from the first and second clutches 42 and 43 on the first and second sun gears S1 and S2, respectively. These reaction forces act such that the first and second sun gears S1 and S2 are caused to rotate in unison with each other, whereby a differential rotation between the front and rear output shafts SF and SR connected to the second and first ring gears R2 and R1, respectively, is limited. FIG. 52 shows a state of transmission of torque between the various types of rotary elements in this case.

Note that during the motive power split mode, by controlling the degrees of engagement of the first and second clutches 42 and 43 to magnitudes different from each other, it is possible to control the torques distributed to the front and rear output shafts SF and SR. In this case, by controlling the degree of engagement of the first clutch 42 to a value larger than that of the second clutch 43, torque transmitted from the first rotor 11*b* to the first sun gear S1 is further increased than torque transmitted from the first rotor 11*b* to the second sun gear S2, whereby the front output shaft-transmitted torque becomes larger than the rear output shaft-transmitted torque. Inversely to the above, by controlling the degree of engagement of the second clutch 43 to a value larger than that of the first clutch 42, torque transmitted from the first rotor 11*b* to the second sun gear S2 is further increased than torque transmitted from the first rotor 11*b* to the first sun gear S1, whereby the rear output shaft-transmitted torque becomes larger than the front output shaft-transmitted torque.

[ENG Drive Mode]

During the ENG drive mode, basically, all the first to third clutches 42, 43, and 61 are disengaged to thereby disconnect the first rotor 11*b* from both the first and second sun gears S1 and S2, and the first rotor 11*b* from the second rotor 12*b*. Further, the start clutch CL is engaged to thereby connect the engine 3 to the first ring gear Rt1, and the transmission 71 is driven in the above-described ENG speed-increasing mode (see FIG. 42) (the first brake 75: on, the second brake 76: off).

Figure 53:
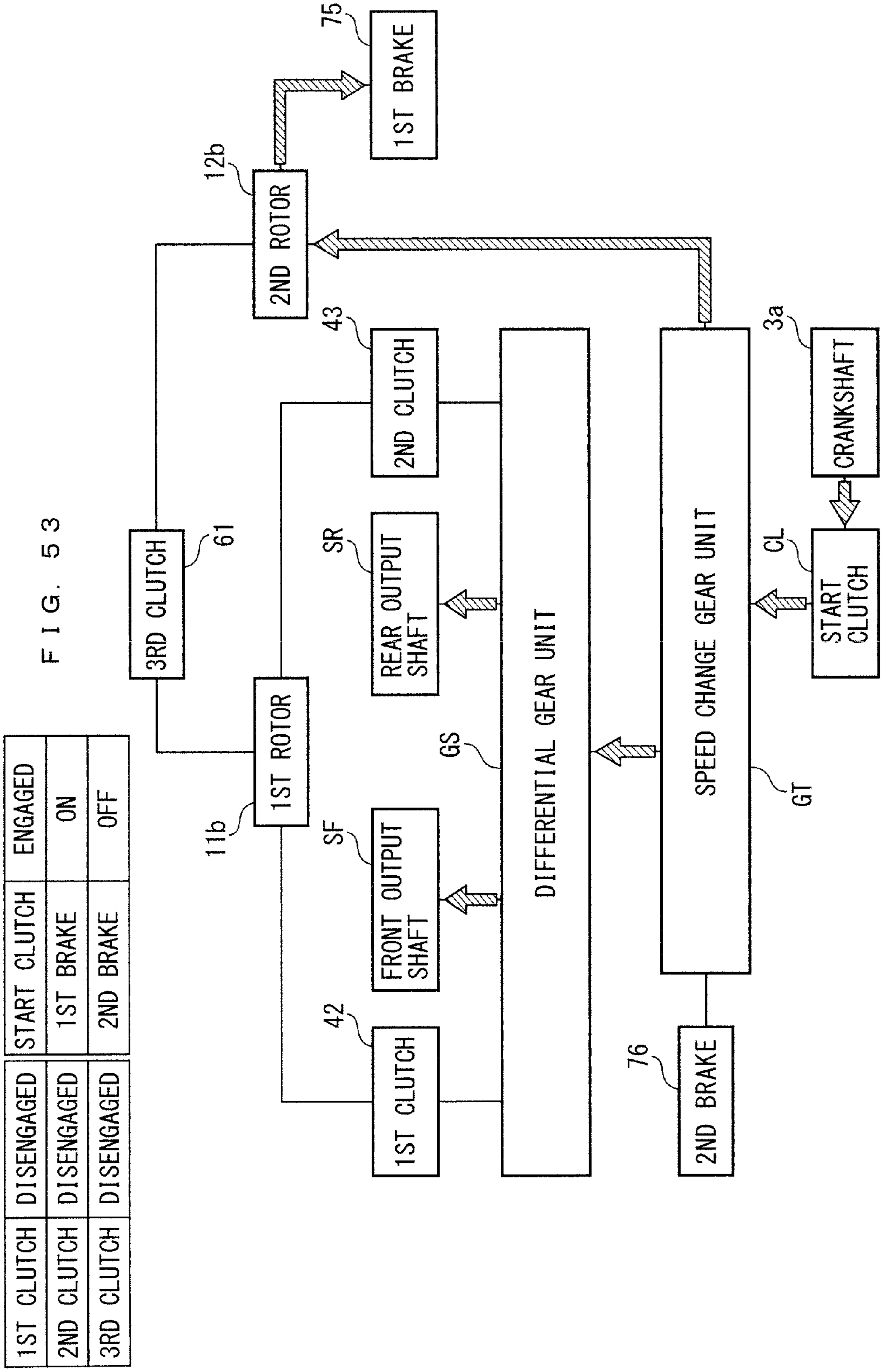
FIG. 53 A diagram showing a state of transmission of torque between the various types of rotary elements of the power plant shown in FIG. 38, as to during ENG drive mode.

With the above operations, as shown in FIG. 53, the torque of the engine 3 is transmitted to the front and rear output shafts SF and SR via the speed change gear unit GT and the differential gear unit GS (the carrier member 13, and the second and first ring gears R2 and R1). In this case, as described with reference to FIG. 42, the motive power of the engine 3 is transmitted to the differential gear unit GS in a state increased in speed, and is further transmitted to the front and rear output shafts SF and SR. Further, the torque distribution ratio of torque distributed from the carrier member 13 to the front and rear output shafts SF and SR is 1:1, and the front output shaft-transmitted torque and the rear output shaft-transmitted torque are equal to each other.

[Torque Distribution Control During ENG Drive Mode]

Further, during the ENG drive mode, it is possible to control the torques distributed to the front and rear output shafts SF and SR using the first rotating electric machine 11. In this case, one of the first and second clutches 42 and 43 which have been disengaged by that time is selectively engaged to thereby selectively connect the first rotor 11*b* to one of the first and second sun gears S1 and S2, and powering or regeneration is performed by the first rotating electric machine 11. FIG. 54 shows a state of transmission of torque in a case where during the ENG drive mode, the second clutch 43 is engaged to thereby connect the first rotor 11*b* to the second sun gear S2, the first clutch 42 is held disengaged to thereby hold the first rotor 11*b* and the first sun gear S1 in a disconnected state, and powering is performed by the first rotating electric machine 11. As shown in FIG. 54, the first motor output torque TM1 is transmitted to the differential gear unit GS (second sun gear S2), whereby the rear output shaft-transmitted torque becomes larger the front output shaft-transmitted torque.

Although not shown, during the ENG drive mode, inversely to the case shown in FIG. 54, when the first clutch 42 is engaged to thereby connect the first rotor 11*b* to the first sun gear S1, the second clutch 43 is held disengaged to thereby hold the first rotor 11*b* and the second sun gear S2 in a disconnected state, and powering is performed by the first rotating electric machine 11, the front output shaft-transmitted torque becomes larger the rear output shaft-transmitted torque. Further, in a case where regeneration is performed by the first rotating electric machine 11, a magnitude relationship between the front and rear output shaft-transmitted torques is only inverted from the case where powering is performed, and it is possible to perform torque distribution control for controlling distribution of torque to the front and rear output shafts SF and SR in the same manner. Note that differential limit control during the ENG drive mode will be described hereinafter.

[Speed-Reducing Regeneration Mode]

The speed-reducing regeneration mode is an operation mode mainly executed during deceleration traveling of the vehicle VFR, and in this mode, regeneration is performed by the second and/or first rotating electric machines 12 and/or 11 using inertia energy of the vehicle VFR. During the speed-reducing regeneration mode, basically, all the first to third clutches 42, 43, and 61 are disengaged to thereby disconnect the first rotor 11*b* from the first and second sun gears S1 and S2, and the first rotor 11*b* from the second rotor 12*b*. Further, the start clutch CL is disengaged to thereby disconnect the engine 3 from the first ring gear Rt1, the transmission 71 is driven in the MOT speed-changing mode (the first brake 75: off, the second brake 76: on), and powering is performed by the second rotating electric machine 12.

With the above operations, as shown in FIG. 55, torque from the front and rear output shafts SF and SR is transmitted to the second rotor 12*b* via the differential gear unit GS and the speed change gear unit GT, so that the second motor braking torque TG2 acts on the front and rear output shafts SF and SR. In this case, in the collinear chart, the distance from the carrier member 13 of the differential gear unit GS to the front output shaft SF and the distance from the carrier member 13 to the rear output shaft SR are equal to each other. For this reason, in the carrier member 13, the combination ratio between torques of the front and rear output shafts SF and SR is 1:1, and braking torques acting from the second rotating electric machine 12 on the front and rear output shafts SF and SR are equal to each other.

[Braking Torque Distribution Control During Speed-Reducing Regeneration Mode]

Further, during the speed-reducing regeneration mode, it is possible to control the braking torques acting on (distributed to) the front and rear output shafts SF and SR using the first rotating electric machine 11. In this case, one of the first and second clutches 42 and 43 which have been disengaged by that time is selectively engaged to thereby selectively connect the first rotor 11*b* to one of the first and second sun gears S1 and S2, and powering or regeneration is performed by the first rotating electric machine 11. FIG. 56 shows a state of transmission of torque in a case where the second clutch 43 is engaged to thereby connecting the first rotor 11*b* to the second sun gear S2, the first clutch 42 is held disengaged to thereby hold the first rotor 11*b* and the first sun gear S1 in a disconnected state, and regeneration is performed by the first rotating electric machine 11.

As shown in FIG. 56, torque is transmitted from the second sun gear S2 of the differential gear unit GS to the first rotor 11*b*, i.e. the first motor braking torque TG1 is transmitted to the second sun gear S2, whereby torque transmitted from the rear output shaft SR to the differential gear unit GS becomes larger than torque transmitted from the front output shaft SF to the differential gear unit GS. In other words, braking torque acting on the rear output shaft SR becomes larger than braking torque acting on the front output shaft SF.

Although not shown, during the speed-reducing regeneration mode, inversely to the case shown in FIG. 56, when the first clutch 42 is engaged to thereby connect the first rotor 11*b* to the first sun gear S1, the second clutch 43 is held disengaged to thereby hold the first rotor 11*b* and the second sun gear S2 in a disconnected state, and regeneration is performed by the first rotating electric machine 11, torque transmitted from the front output shaft SF to the differential gear unit GS becomes larger than torque transmitted from the rear output shaft SR to the differential gear unit GS. In other words, braking torque acting on the front output shaft SF becomes larger than braking torque acting on the rear output shaft SR. Further, in a case where powering is performed by the first rotating electric machine 11, a magnitude relationship between the braking torques acting on the front and rear output shafts SF and SR is only inverted from the case where regeneration is performed, and it is possible to perform braking torque distribution control for controlling distribution of the braking torques to the front and rear output shafts SF and SR in the same manner. Note that differential limit control during the speed-reducing regeneration mode will be described hereinafter.

[Differential Limit Control]

During the 1-MGT drive mode (FIG. 44), during the ENG drive mode (FIG. 53) and during the speed-reducing regeneration mode (FIG. 55), similarly to the second to fifth embodiments, it is possible to limit the differential rotation between the front and rear output shafts SF and SR. In this case, basically, the third clutch 61 is disengaged to thereby disconnect the first rotor 11*b* from the second rotor 12*b*, the zero torque control is performed on the first rotating electric machine 11, and the degrees of engagement of both the first and second clutches 42 and 43 are controlled to thereby connect the first rotor 11*b* to both the first and second sun gears S1 and S2. With the above operations, the first and second sun gears S1 and S2 are connected to each other via the first rotor 11*b*, so that when a differential rotation occurs between the two S1 and S2, reaction forces act from the first and second clutches 42 and 43 on the first and second sun gears S1 and S2, respectively. These reaction forces act such that the first and second sun gears S1 and S2 are caused to rotate in unison with each other, whereby the differential rotation between the front and rear output shafts SF and SR connected to the second and first ring gears R2 and R1, respectively, is limited.

In this case as well, similarly to the second embodiment, by adjusting the reaction force torques of the first and second clutches 42 and 43 through controlling the degrees of engagement of the first and second clutches 42 and 43, it is possible to control total differential limiting torque (the sum total of differential limiting torques acting on the front and rear output shafts SF and SR), and hence it is possible to control the degree of limiting the differential rotation between the front and rear output shafts SF and SR.

Note that during the 1-MOT drive mode, during the ENG drive mode, and during the speed-reducing regeneration mode, as described above, in the case where both the first and second clutches 42 and 43 are engaged (the third clutch 61 is disengaged), when the powering or regeneration is performed by the first rotating electric machine 11, it is possible to control torques (braking torques) distributed to the front and rear output shafts SF and SR, through controlling the degrees of engagement of the first and second clutches 42 and 43.

In this case, e.g. when powering is performed by the first rotating electric machine 11 during the 1-MOT drive mode and during the ENG drive mode, and the degree of engagement of the first clutch 42 is controlled such that it becomes larger than that of the second clutch 43 (e.g. when the first clutch 42 is completely engaged, and the second clutch 43 is caused to slide), torque transmitted from the first rotating electric machine 11 to the first sun gear S1 of the differential gear unit GS becomes accordingly larger than torque transmitted to the second sun gear S2, whereby the front output shaft-transmitted torque becomes larger than the rear output shaft-transmitted torque. Inversely, when the degree of engagement of the second clutch 43 is controlled such that it becomes larger than that of the first clutch 42, torque transmitted from the first rotating electric machine 11 to the second sun gear S2 becomes accordingly larger than torque transmitted to the first sun gear S1, whereby the rear output shaft-transmitted torque becomes larger than the front output shaft-transmitted torque.

Figure 57:
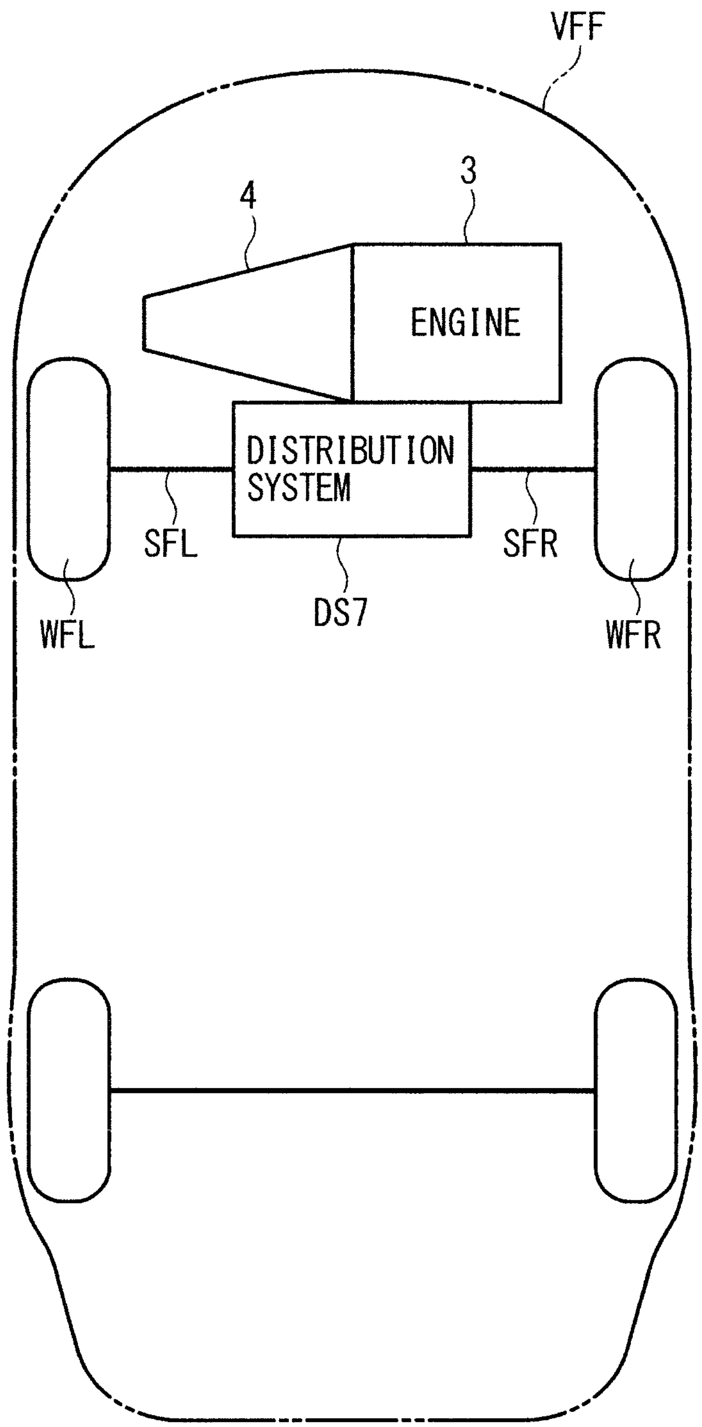
FIG. 57 A diagram schematically showing a power plant according to a seventh embodiment of the present invention together with a vehicle to which the power plant is applied.

Next, a power plant according to a seventh embodiment of the present invention will be described with reference to FIGS. 57 to 59. The power plant shown in FIG. 57 is for driving the left and right output shafts SFL and SFR of the four-wheel vehicle VFR. These left and right output shafts SFL and SFR are arranged coaxially with each other, and are connected to the left and right front wheels WFL and WFR, respectively. Further, compared with the above-described first embodiment, a distribution system DS7 shown in FIG. 58 is mainly different in that the first and second rotating electric machines 11 and 12 are connected to the first and second sun gears S1 and S2 via reduction gears, respectively, and the first and second rotors 11*b* and 12*b* are connected to and disconnected from each other by engagement and disengagement of the third clutch 61. In FIGS. 57 to 59, the same component elements as those of the first embodiment are denoted by the same reference numerals. The following description is given mainly of different points from the first embodiment.

A first gear 81 and a second gear 82 are integrally mounted on the first rotor 11*b* and the first rotating shaft 14, respectively. These gears 81 and 82 are in mesh with each other. The number of the gear teeth of the first gear 81 is set to a value smaller than the number of the gear teeth of the second gear 82, whereby the motive power of the first rotating electric machine 11 is transmitted to the first sun gear S1 in a state reduced in speed by the two gears 81 and 82. Further, a third gear 83 and a fourth gear 84 are integrally mounted on the second rotor 12*b* and the third rotating shaft 16, respectively. These gears 83 and 84 are in mesh with each other. The number of the gear teeth of the third gear 83 is set to a value smaller than the number of the gear teeth of the fourth gear 84, whereby the motive power of the second rotating electric machine 12 is transmitted to the second sun gear S2 in a state reduced in speed by the two gears 83 and 84.

The inner 61*a* and the outer 61*b* of the third clutch 61 are integrally mounted on the first rotor 11*b* and the second rotor 12*b*, respectively. The degree of engagement of the third clutch 61 is controlled by the ECU 2 (FIG. 59), whereby the first and second rotors 11*b* and 12*b* are connected to and disconnected from each other. Further, a gear 13*g* is integrally formed on the second root portion 13*b* of the carrier member 13. The gear 13*g* is in mesh with a gear 4*a* integrally formed on the transmission output shaft of the first transmission 4. Further, the first ring gear R1 is connected to the right output shaft SFR via the second rotating shaft 15 and a flange, and is rotatable in unison with the right output shaft SFR. The second ring gear R2 is connected to the left output shaft SFL via the fourth rotating shaft 17 and a flange, and is rotatable in unison with the left output shaft SFL.

In the power plant according to the seventh embodiment constructed as above, the relationship of connections of the first rotor 11*b*, the left output shaft SFL, the transmission output shaft, the right output shaft SFR, and the second rotor 12*b*, to the first sun gear S1, the second ring gear R2, the carrier member 13, the first ring gear R1, and the second sun gear S2 of the differential gear unit GS is the same as in the first embodiment (see FIG. 2, FIG. 5, and the like) provided that the front-side left and right output shafts SFL and SFR are replaced by the rear-side left and right output shafts SRL and SRR. Therefore, according to the power plant of the seventh embodiment, it is possible to obtain the same advantageous operations and effects as provided by the first embodiment.

Further, the first rotor 11*b* is connected to the first sun gear S1 via a reduction gear comprised of the first and second gears 81 and 82, and the second rotor 12*b* is connected to the second sun gear S2 via a reduction gear comprised of the third and fourth gears 83 and 84. This makes it possible to transmit the first and second motor output torques TM1 and TM2 and the first and second motor braking torques TG1 and TG2 to the first and second sun gears S1 and S2 in increased states, respectively, so that it is possible to attain downsizing of the first and second rotating electric machines 11 and 12.

Further, the third clutch 61 is engaged to thereby connect the first and second sun gears S1 and S2 to each other via the first and second rotors 11*b* and 12*b*, whereby similarly to the above-described second embodiment (see FIG. 15), it is possible to limit a differential rotation between the left and right output shafts SFL and SFR. In this case as well, by controlling the degree of engagement of the third clutch 61, it is possible to control the degree of limiting the differential rotation between the left and right output shafts SFL and SFR.

Furthermore, the third clutch 61 is connected to the first sun gear S1 via the first and second gears 81 and 82, and to the second sun gear S2 via the third and fourth gears 83 and 84, respectively. As is apparent from the description of the second embodiment, the total differential limiting torque becomes larger as the reaction force torques acting from the third clutch 61 on the first and second sun gears S1 and S2 are larger. According to the seventh embodiment, the reaction force torques from the third clutch 61 can be transmitted to the first and second sun gears S1 and S2, in increased states, by the first to fourth gears 81 to 84, so that it is possible to reduce the reaction force torques required of the third clutch 61 so as to limit the differential rotation between the left and right output shafts SFL and SFR, whereby it is possible to attain further downsizing of the third clutch 61.

Next, a power plant according to an eighth embodiment of the present invention will be described with reference to FIG. 60. Compared with the second embodiment, a distribution system DS8 of this power plant is mainly different in that a reduction gear RG is provided between the rotating electric machine 41 and the first and second clutches 42 and 43. In FIG. 60, the same component elements as those of the second and seventh embodiments are denoted by the same reference numerals. The following description is given mainly of different points from the second embodiment.

The reduction gear RG is a planetary gear mechanism of a single planetary type, and includes a sun gear Sr, a ring gear Rr provided around an outer periphery of the sun gear Sr, a plurality of pinion gears Pr in mesh with the two gears Sr and Rr, and a carrier Cr rotatably supporting the pinion gears Pr. The sun gear Sr is connected to the rotor 41*b* via a hollow cylindrical rotating shaft, and is rotatable in unison with the rotor 41*b*. The outer 42*b* of the first clutch 42 and the outer 43*b* of the second clutch 43 are integrally mounted on the carrier Cr. Further, the ring gear Rr is fixed to the immovable casing CA. The motive power of the rotating electric machine 41 is transmitted to the first and/or second sun gear(s) S1 and/or S2 in a state reduced in speed by the reduction gear RG.

Further, the gear 13*g* is integrally formed on the second root portion 13*b* of the carrier member 13. The gear 13*g* is in mesh with the gear 4*a* integrally formed on the transmission output shaft of the first transmission 4. Furthermore, the first ring gear R1 is connected to the right output shaft SFR via the second rotating shaft 15 and the flange, and is rotatable in unison with the right output shaft SFR. The second ring gear R2 is connected to the left output shaft SFL via the fourth rotating shaft 17 and the flange, and is rotatable in unison with the left output shaft SFL.

In the power plant according to the eighth embodiment constructed as above, the relationship of connections of the rotor 41*b*, the left output shaft SFL, the transmission output shaft, and the right output shaft SFR, to the first sun gear S1, the second ring gear R2, the carrier member 13, the first ring gear R1, and the second sun gear S2 of the differential gear unit GS is the same as the second embodiment (see FIG. 9, FIG. 11, etc.), provided that the front-side left and right output shafts SFL and SFR are replaced by the rear-side left and right output shafts SRL and SRR. Therefore, according to the power plant of the eighth embodiment, it is possible to obtain the same advantageous operations and effects as provided by the second embodiment.

Further, the rotor 41*b* is connected to the first and second sun gears S1 and S2 via the reduction gear RG. This makes it possible to transmit the motor output torque TM and the motor braking torque TG to the first and second sun gears S1 and S2 in increased states, respectively, so that it is possible to attain downsizing of the rotating electric machine 41.

Figure 62:
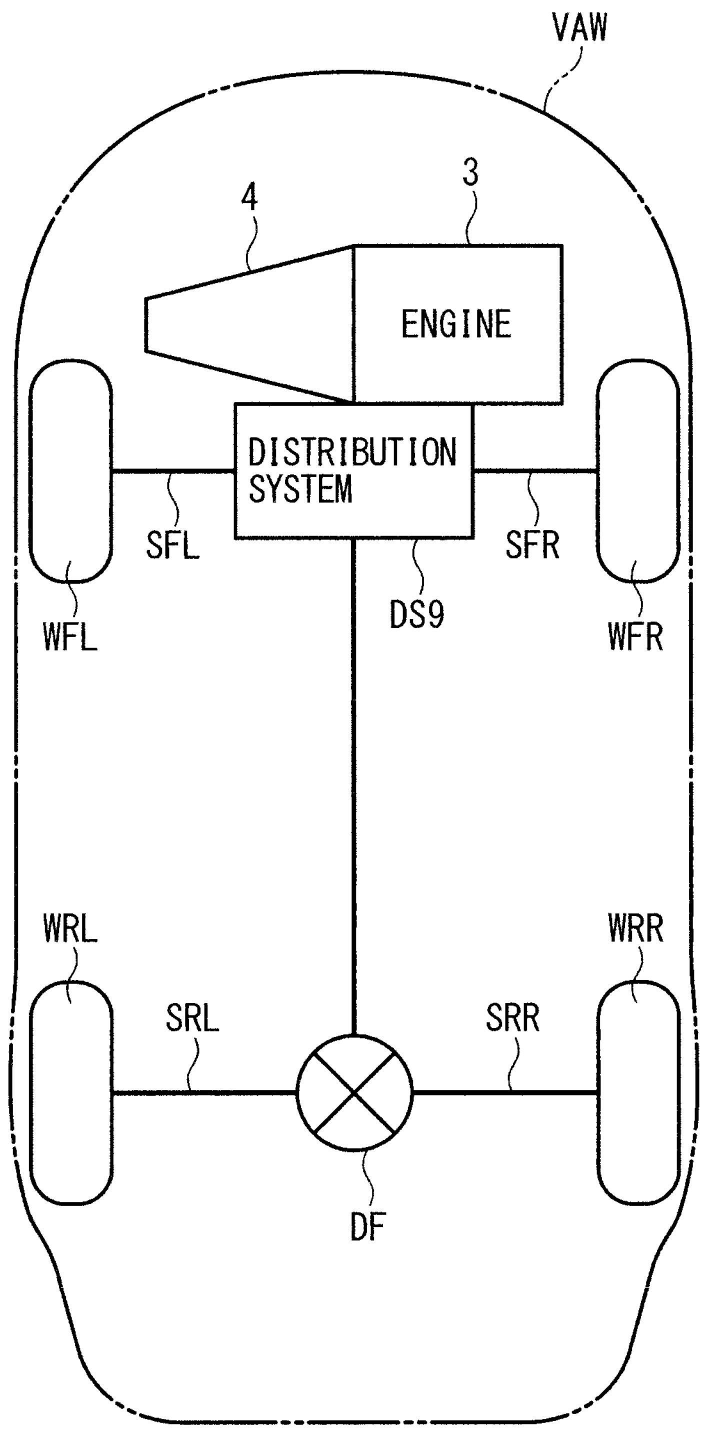
FIG. 62 A schematic diagram of the power plant shown in FIG. 61 together with a vehicle to which the power plant is applied.

Next, a power plant according to a ninth embodiment of the present invention will be described with reference to FIG. 61. A distribution system DS9 of the power plant shown in FIG. 61 is mounted on a vehicle VAW of an all-wheel drive type shown in FIG. 62, and uses a differential gear unit GSA in place of the differential gear unit GS according to the first embodiment, and is configured to drive the front and rear output shafts SF and SR. The front output shaft SF is connected to the left and right front wheels WFL and WFR via the left and right front output shaft SFL and SFR. The rear output shaft SR is connected to the left and right rear wheels WRL and WRR via the propeller shaft, a final reduction gear box DF, and the rear-side left and right output shafts SRL and SRR. In FIG. 61, the same component elements as those of the first embodiment are denoted by the same reference numerals. The following description is sequentially given mainly of different points of the power plant according to the ninth embodiment from the first embodiment.

The differential gear unit GSA shown in FIG. 61 is a combination of a first planetary gear mechanism of a single planetary type and a second planetary gear mechanism of a double planetary type, in which the same carrier is commonly used and pinion gears of the two planetary gear mechanisms are brought into mesh with each other. Compared with the differential gear unit GS, the differential gear unit GSA is mainly different in that it further includes pinion gears PA, and in the construction of each of a carrier member 91 and a second ring gear R2A. In the differential gear unit GSA, the above-mentioned first planetary gear mechanism is formed by the first sun gear S1, the first pinion gears P1, the first ring gear R1, and the carrier member 91, and the above-mentioned second planetary gear mechanism is formed by the second sun gear S2, the second pinion gears P2, the pinion gears PA, the second ring gear R2A, and the carrier member 91. The front and rear output shafts SF and SR, and the differential gear unit GSA are arranged coaxially with each other.

The carrier member 91 is comprised of a disk-shaped first root portion 91*a*, a second root portion 91*b* having an annular plate shape, four first support shafts 91*c* (only two of which are shown) and four second support shafts 91*d* (only two of which are shown), which are integrally formed on the two root portions 91*a* and 91*b*, respectively, and four third support shafts 91*e* (only two of which are shown), which are integrally formed on the second root portion 91*b*. Further, the carrier member 91 is rotatably supported by a bearing (not shown), and the first and third rotating shaft 14 and 16 are relatively rotatably disposed inward of the carrier member 91.

The first and second root portions 91*a* and 91*b* are arranged coaxially with the front and rear output shafts SF and SR, and are opposed to each other in an axial direction of the front and rear output shafts SF and SR. Further, the first root portion 91*a* is disposed on a side closer to the rear output shaft SR than the second root portion 91*b* (on the left side, as viewed in FIG. 61), and is integrally mounted on the front output shaft SF. With this, the carrier member 91 is rotatable in unison with the front output shaft SF.

The first and second support shafts 91*c* and 91*d* are arranged between the first and second root portions 91*a* and 91*b*, and extend in the axial direction of the front and rear output shafts SF and SR. Further, the first and second support shafts 91*c* and 91*d* are located at a radially inner end of the second root portion 91*b*. Furthermore, the first and second support shafts 91*c* and 91*d* are arranged alternately at equally-spaced intervals in a circumferential direction of the first root portion 91*a*. The third support shafts 91*e* are located at a radially outer end of the second root portion 91*b*, and extend in the axial direction of the rear output shaft SR toward the rear output shaft SR. Further, the four third support shafts 91*e* are located at equally-spaced intervals in a circumferential direction.

The first sun gear S1, the first pinion gears P1, and the first ring gear R1 of the differential gear unit GSA are radially arranged from inside in this order. Similarly to the first embodiment, the first sun gear S1 is connected to the first rotor 11*b* via the first rotating shaft 14, and is rotatable in unison with the first rotor 11*b*. Further, the number of the first pinion gears P1 is four which is equal to the number of the first support shafts 91*c* (only two of which are shown). Each first pinion gear P1 is rotatably supported on an associated one of the first support shafts 91*c* via a bearing (not shown), and is in mesh with both the first sun gear S1 and the first ring gear R1. The first ring gear R1 is connected to the rear output shaft SR via the second rotating shaft 15 and a flange, and is rotatable in unison with the rear output shaft SR. Note that the number of the first pinion gears P1 and the number of the first support shafts 91*c* are not limited to four but they can be set as desired.

Figure 63:
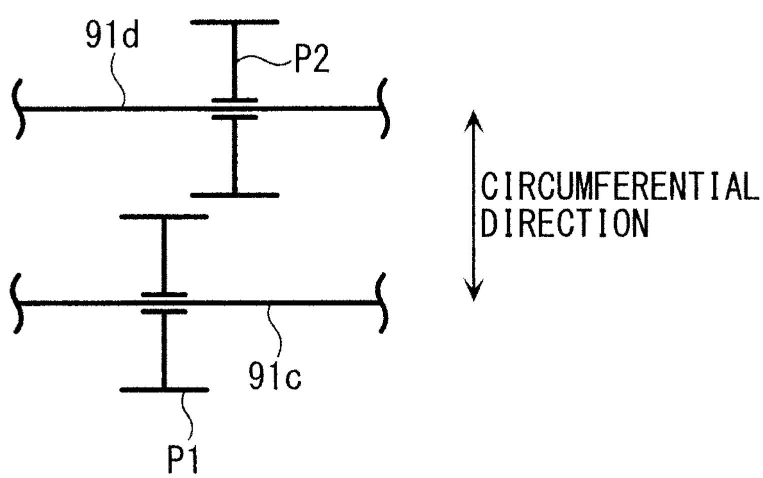
FIG. 63 A skeleton diagram of first pinion gears, second pinion gears, and a carrier member of a differential gear unit shown in FIG. 61, in plan view.

Further, the second sun gear S2, the second pinion gears P2, the pinion gears PA, and the second ring gear R2A of the differential gear unit GSA are radially arranged from inside in this order. Similarly to the first embodiment, the second sun gear S2 is connected to the second rotor 12*b* via the third rotating shaft 16. Further, the number of the second pinion gears P2 is four which is equal to the number of the second support shafts 91*d*. Each second pinion gear P2 is rotatably supported on an associated one of the second support shafts 91*d* via a bearing (not shown), and is in mesh with the second sun gear S2. Further, as shown in FIG. 63, the second pinion gears P2 are disposed such that they partially overlap associated ones of the first pinion gears P1 in a circumferential direction of the second sun gear S2, and are in mesh with the first pinion gears P1. Note that the number of the second pinion gears P2 and the number of the second support shafts 91*d* are not limited to four but they can be set as desired. In FIG. 63, the first and second sun gears S1 and S2, the pinion gears PA, and the first and second ring gears R1 and R2A are omitted, for convenience.

Furthermore, the number of the pinion gears PA is four which is equal to the number of the third support shafts 91*e*. Each pinion gear PA is rotatably supported on an associated one of the third support shafts 91*e* via a bearing (not shown), and is in mesh with both the second pinion gears P2 and the second ring gears R2A. Note that the number of the pinion gears PA and the number of the third support shafts 91*e* are not limited to four but they can be set as desired. The number of the second ring gears R2A is set to a larger value than that of the first ring gears R1. Further, a gear G is formed around an outer periphery of the second ring gear R2A. This gear G is in mesh with the gear 4*a* integrally formed on the above-described transmission output shaft of the first transmission 4.

With the above arrangement, the first sun gear S1, the carrier member 91, the second ring gear R2A, the first ring gear R1, and the second sun gear S2 can transmit motive power therebetween, and the rotational speeds thereof are in a collinear relationship. Further, when the first sun gear S1 is caused to perform normal rotation in a state in which the carrier member 91 is fixed, all the second sun gear S2 and the first and second ring gears R1 and R2A perform reverse rotation. In this case, from the relationship between the tooth numbers of the gears, the relationship of "the rotational speed of the second ring gear R2A>the rotational speed of the first ring gear R1>the rotational speed of the second sun gear S2" holds between the rotational speeds of the second sun gear S2, the first ring gear R1, and the second ring gear R2A. From the above, in a collinear chart indicating the relationship between the rotational speeds, the first sun gear S1, the carrier member 91, the second ring gear R2A, the first ring gear R1, and the second sun gear S2 are depicted in this order.

Further, since the first sun gear S1 and the first rotor 11*b* are connected to each other via the first rotating shaft 14, the rotational speeds of the first sun gear S1 and the first rotor 11*b* are equal to each other. Furthermore, since the carrier member 91 is directly connected to the front output shaft SF, the rotational speed of the carrier member 91 and that of the front output shaft SF are equal to each other. Further, since the second ring gear R2A is connected to the transmission output shaft of the first transmission 4 via the gear G and the gear 4*a*, the rotational speed of the second ring gear R2A and that of the transmission output shaft are equal to each other, provided that a change in speed by these gears G and 4*a* is ignored. Furthermore, since the first ring gear R1 is connected to the rear output shaft SR via the second rotating shaft 15 and the flange, the rotational speed of the first ring gear R1 and that of the rear output shaft SR are equal to each other. Further, since the second sun gear S2 and the second rotor 12*b* is connected to each other via the third rotating shaft 16, the rotational speed of the second sun gear S2 and that of the second rotor 12*b* are equal to each other.

From the above, a rotational speed relationship between various types of rotary elements of the power plant according to the ninth embodiment are represented e.g. in a collinear chart shown in FIG. 64. In FIG. 64, RfM1 and RrM1 represent reaction force torques acting on the front output shaft SF and the rear output shaft SR along with powering by the first rotating electric machine 11, respectively, and RfG2 and RrG1 represent reaction force torques acting on the front output shaft SF and the rear output shaft SR along with regeneration by the second rotating electric machine 12, respectively. Further, RfE and RrE represent reaction force torques acting on the front output shaft SF and the rear output shaft SR along with transmitting the post-speed-change engine torque TE to the second ring gear R2A. The other parameters are as described above in the first embodiment. As is apparent from FIG. 64, the front and rear output shafts SF and SR can be differentially rotated with each other. Further, as is apparent from a comparison between this FIG. 64 and FIG. 5 which shows the rotational speed relationship and the torque balance relationship between the various types of the rotary elements of the power plant according to the first embodiment, the power plant according to the ninth embodiment can provide the same advantageous operations and effects as provided by the first embodiment.

Further, in FIG. 64, αA and βA represent the first lever ratio and the second lever ratio, respectively, and are expressed by the following equations (3) and (4):

$$\alpha A = ZR1/ZS1 \quad (3)$$

$$\beta A = (ZR1 - ZS2)/ZS2 \quad (4)$$

wherein as described in the first embodiment, ZR1 represents the tooth number of the first ring gear R1, ZS1 represents the tooth number of the first sun gear S1, and ZS2 represents the tooth number of the second sun gear S2.

The tooth number ZR1 of the first ring gear R1, the tooth number ZS1 of the first sun gear S1, and the tooth number ZS2 of the second sun gear S2 are set such that the first and second lever ratios αA and βA take relatively large values on condition that one of the first and second rotors 11*b* and 12*b* does not perform reverse rotation within a range in which the front and rear output shafts SF and SR can be differentially rotated with each other. Further, the tooth number ZR1 of the first ring gear R1, the tooth number ZS1 of the first sun gear S1, and the tooth number ZS2 of the second sun gear S2 are set such that the first and second lever ratios αA and βA take the same value, i.e. ZR1/ZS1=(ZR1−ZS2)/ZS2 holds from the above-mentioned equations (3) and (4).

As described hereinabove, in the conventional differential gear unit, to set the first and second lever ratios A1 and A2 (torque ratios) of the differential gear unit to the same value, it is required to set a total of six tooth numbers of the first to third sun gears and the first to third ring gears to different values from each other. On the other hand, in the ninth embodiment, simply by setting a total of three tooth numbers of the first ring gear R1, the first sun gear S1, and the second sun gear S2 as described above, it is possible to easily set the first and second lever ratios αA and βA to the same value. This makes it possible to accurately and easily perform the torque distribution control for controlling distribution of torque to the front and rear output shafts SF and SR using the first and second rotating electric machines 11 and 12, and therefore it is possible to enhance traveling stability of the vehicle VAW.

Further, the five rotary elements formed by the first sun gear S1, the carrier member 91, the second ring gear R2A, the first ring gear R1, and the second sun gear S2, the rotational speeds of which are in a collinear relationship with each other, are formed by the differential gear unit GSA that is formed by combining the first planetary gear mechanism of the single planetary type and the second planetary gear mechanism of the double planetary type with each other. Therefore, compared with the above operations-described conventional differential gear unit formed by combining the three planetary gear mechanisms of the single planetary type with each other, it is possible to reduce the number of component parts, which in turn makes it possible to downsize the differential gear unit GSA. Note that the order of appearance of the first and second ring gears R1 and R2A in the collinear chart shown in FIG. 64 is changed depending on the settings of the tooth numbers thereof.

Further, since the engine 3 is connected to the carrier ember 91, not only the first and second motor output torques TM1 and TM2 from the first and second rotating electric machines 11 and 12 but also the post-speed-change engine torque TE from the engine 3 is transmitted to the front and rear output shafts SF and SR. This makes it possible to reduce torque demanded of the first and second rotating electric machines 11 and 12, whereby it is possible to downsize the two machines 11 and 12.

Furthermore, since general rotating electric machines are used as the first and second rotating electric machines 11 and 12, it is possible to construct the power plant easily and more inexpensively, without using a special apparatus. Further, in the case where distribution of torque to the front and rear output shafts SF and SR is controlled as described above, it is possible to convert motive power to electric power using the first and second rotating electric machines 11 and 12. Therefore, by supplying the electric power obtained by the conversion to an accessory of the vehicle VAW, it is possible to reduce the operating load and operating frequency of a generator (not shown) for charging a power source (not shown) of the accessory.

Further, the first ring gear R1 is connected to the rear output shaft SR, and hence, similarly to the first embodiment, as described with reference to FIGS. 89 and 90, it is possible to set the tooth width of the first ring gear R1 to a relatively small value, whereby it is possible to attain further downsizing of the power plant. For the same reason, it is possible to attain downsizing of the first pinion bearings (bearings supporting the first pinion gears P1), which also makes it possible to attain further downsizing of the power plant.

Further, the correspondence between various elements of the ninth embodiment and the various elements of the present invention is as follows: The vehicle VAW of the ninth embodiment corresponds to the means of transportation of the present invention, the front and rear output shafts SF and SR of the ninth embodiment correspond to one and the other of the two driven parts of the present invention, respectively, and the first and second rotating electric machines 11 and 12 of the ninth embodiment correspond to the first and second energy input/output devices of the present invention, respectively. Further, the engine 3 of the ninth embodiment corresponds to the energy output unit of the present invention.

Furthermore, the carrier member 91 of the ninth embodiment corresponds to the carrier of the present invention, the second sun gear S2, the second ring gear R2A, the first sun gear S1, and the first ring gear R1 of the ninth embodiment correspond to the first gear, the second gear, the third gear, and the fourth gear of the present invention, respectively, and the second pinion gears P2 and the pinion gears PA of the ninth embodiment correspond to first split gears and second split gears of the present invention, respectively. Further, the first and second sun gears S1 and S2 of the ninth embodiment correspond to the first and second outer rotary elements of the present invention, respectively, the carrier member 91 and the first ring gear R1 of the ninth embodiment correspond to the first and second quasi-outer rotary elements of the present invention, respectively, and the second ring gear R2A of the ninth embodiment corresponds to the central rotary element of the present invention.

Note that although in the ninth embodiment, the first pinion gears P1 are brought into mesh with the second pinion gears P2, they may be brought into mesh with the pinion gears PA. In this case, the first sun gear S1, the second sun gear S2, the second ring gear R2A, the carrier member 91, and the first ring gear R1, the rotational speeds of which are in a collinear relationship with each other, are depicted in this order in a collinear chart indicating the relationship between the rotational speeds. Further, the first sun gear is connected to the first rotor 11*b*, the second sun gear S2 is connected to the front output shaft SF, the second ring gear R2A is connected to the transmission output shaft, the carrier member 91 is connected to the rear output shaft SR, and the first ring gear R1 is connected to the second rotor 12*b*.

Next, a power plant according to a tenth embodiment of the present invention will be described with reference to FIG. 65. A distribution system DS10 of the power plant shown in FIG. 65 uses a differential gear unit GSX in place of the differential gear unit GSA of the ninth embodiment. In FIG. 65, the same component elements as those of the first and ninth embodiments are denoted by the same reference numerals. The following description is given mainly of different points from the first and ninth embodiments.

Similarly to the differential gear unit GSA of the ninth embodiment, the differential gear unit GSX shown in FIG. 65 is formed by combining the first planetary gear mechanism of the single planetary type and the second planetary gear mechanism of the double planetary type with each other. Further, compared with the ninth embodiment (FIG. 61), the differential gear unit GSX is mainly different in that the pinion gears PA are provided not between the second pinion gears P2 and the second ring gear R2A but between the second pinion gears P2 and a second sun gear S2X and are in mesh with the two P2 and S2X. Further, the tooth number of a first sun gear S1X is set to a larger value than the tooth number of second sun gear S2X.

In the differential gear unit GSX constructed as above, a first ring gear R1X, the carrier member 91, a second ring gear R2X, the first sun gear SDK, and the second sun gear S2X can transmit motive power therebetween, and the rotational speeds thereof are in a collinear relationship. Further, when the first ring gear R1X is caused to perform normal rotation in a state in which the carrier member 91 is fixed, all the second ring gear R2X, the first sun gear SDK, and the second sun gear S2X perform reverse rotation. In this case, from the relationship between the tooth numbers of the gears, the relationship of "the rotational speed of the second ring gear R2X>the rotational speed of the first sun gear S1X>the rotational speed of the second sun gear S2X" holds. From the above, in a collinear chart indicating the relationship between the rotational speeds, the first ring gear R1X, the carrier member 91, the second ring gear R2X, the first sun gear SDK, and the second sun gear S2X are depicted in this order.

Further, in the differential gear unit GSX, differently from the ninth embodiment, the first ring gear R1X is not connected to the rear output shaft SR but is connected to the first rotor 11*b*, and the carrier member 91 is not connected to the front output shaft SF but is connected to the left output shaft SRL. Further, the second ring gear R2X is connected to the transmission output shaft via a gear GX and the gear 4*a*. Furthermore, the first sun gear S1X is not connected to the first rotor 11*b* but is connected to the right output shaft SRR, and the second ring gear R2X is connected to the second rotor 12*b*, similarly to the ninth embodiment.

Figure 66:
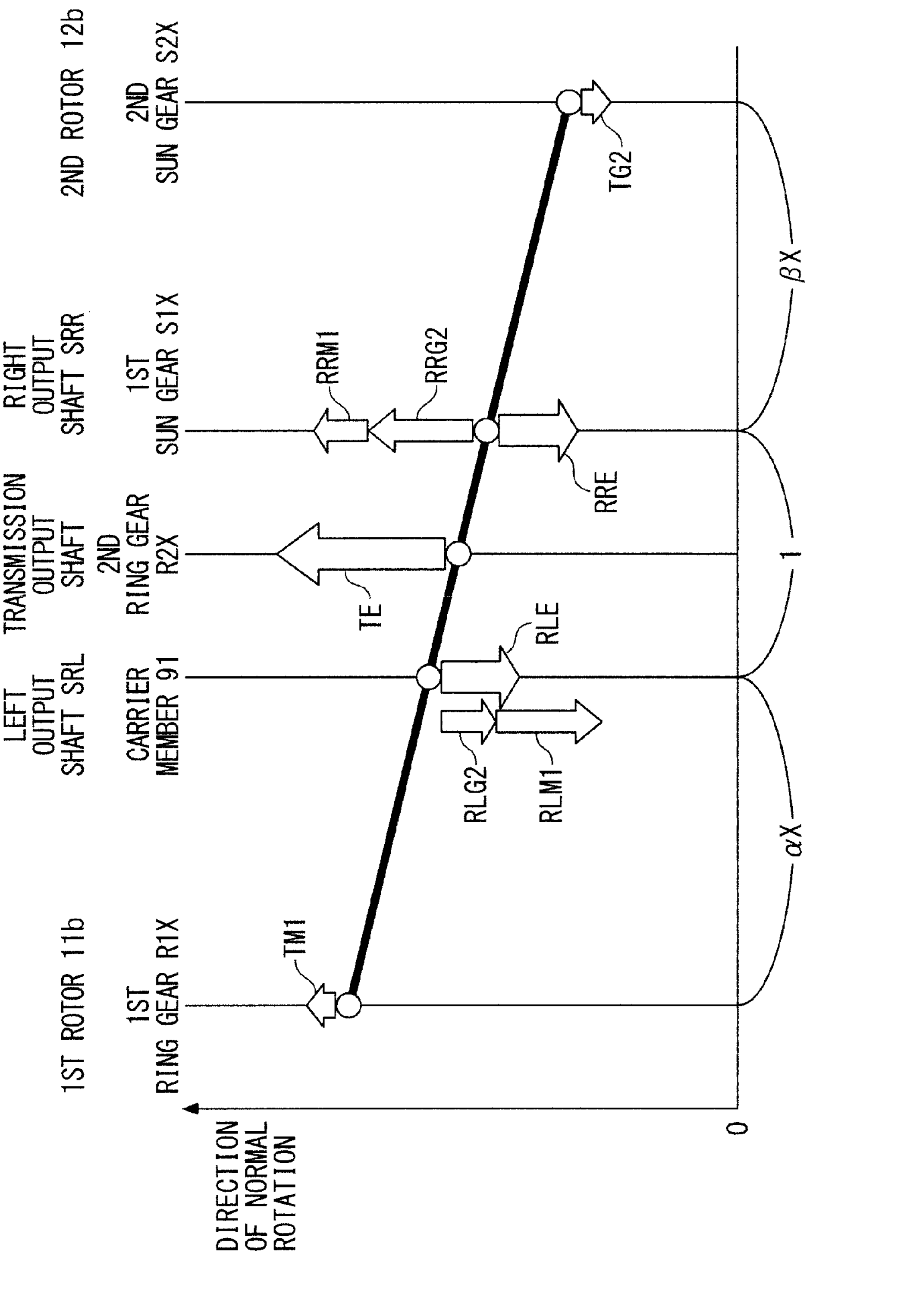
FIG. 66 A collinear chart showing a rotational speed relationship and a torque balance relationship between various types of rotary elements of the power plant shown in FIG. 65.

From the above, a rotational speed relationship between various types of rotary elements of the power plant according to the tenth embodiment are represented e.g. in a collinear chart shown in FIG. 66. As is apparent from FIG. 66, the left and right output shafts SRL and SRR can be differentially rotated with each other. Further, as is apparent from a comparison between this FIG. 66 and FIG. 5 which shows the rotational speed relationship and the torque balance relationship between the various types of the rotary elements of the power plant according to the first embodiment, the power plant according to the tenth embodiment can provide the same advantageous operations and effects as provided by the power plant according to the first and ninth embodiments.

Further, in FIG. 66, αX and βX represent the first lever ratio and the second lever ratio, respectively, and are expressed by the following equations (5) and (6):

$$\alpha X = ZS1X/ZR1X \tag{5}$$

$$\beta X = (ZS1X/ZS2X) - 1 \tag{6}$$

wherein ZS1X represents the tooth number of the first sun gear S1X, ZR1X represents the tooth number of the first ring gear R1X, and ZS2X represents the tooth number of the second sun gear S2X.

The tooth number ZS1X of the first sun gear S1X, the tooth number ZR1X of the first ring gear R1X, and the tooth number ZS2X of the second sun gear S2X are set such that the first and second lever ratios αX and βX take relatively large values on condition that one of the first and second rotors 11*b* and 12*b* does not perform reverse rotation within a range in which the left and right output shafts SRL and SRR can be differentially rotated with each other. Further, the tooth number ZS1X of the first sun gear S1X, the tooth number ZR1X of the first ring gear R1X, and the tooth number ZS2X of the second sun gear S2X are set such that the first and second lever ratios αX and βX take the same value, i.e. ZS1X/ZR1X=(ZS1X/ZS2X)−1 holds from the above-mentioned equations (5) and (6).

Note that the order of appearance of the first and second sun gears S1X and S2X in the collinear chart shown in FIG. 66 is changed depending on the settings of the tooth numbers thereof.

Further, the correspondence between various elements of the tenth embodiment and the various elements of the present invention is as follows: the carrier member 91 of the tenth embodiment corresponds to the carrier of the present invention, the first sun gear S1X, the first ring gear R1X, the second sun gear S2X, and the second ring gear R2X of the tenth embodiment correspond to the first gear, the second gear, the third gear, and the fourth gear of the present invention, respectively, and the second pinion gears P2 and the pinion gears PA of the tenth embodiment correspond to the first split gears and the second split gears of the present invention, respectively.

Further, the first ring gear R1X and the second sun gear S2X of the tenth embodiment correspond to the first and second outer rotary elements of the present invention, respectively, the carrier member 91 and the first sun gear S1X of the tenth embodiment correspond to the first and second quasi-outer rotary elements of the present invention, respectively, and the second ring gear R2X of the tenth embodiment corresponds to the central rotary element of the present invention. The other corresponding relations are the same as in the first embodiment.

Figure 67:
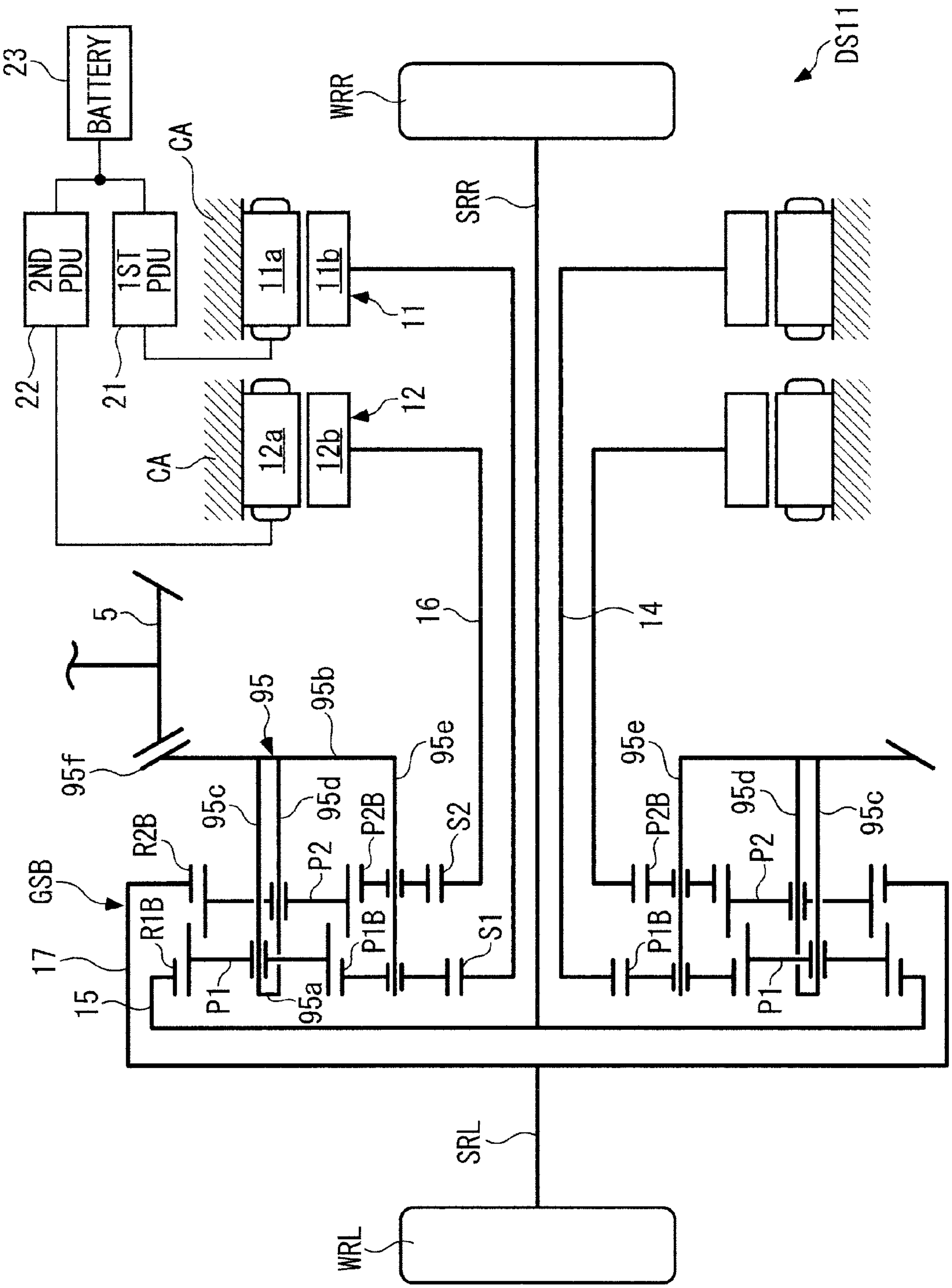
FIG. 67 A skeleton diagram of a power plant etc. according to an eleventh embodiment of the present invention.

Next, a power plant according to an eleventh embodiment of the present invention will be described with reference to FIG. 67. A distribution system DS11 of the power plant shown in FIG. 67 uses a differential gear unit GSB in place of the differential gear unit GS of the first embodiment. In FIG. 67, the same component elements as those of the first embodiment are denoted by the same reference numerals. The following description is given mainly of different points of the power plant according to the eleventh embodiment from the first embodiment.

The differential gear unit GSB is formed by combining two first and second planetary gear mechanisms of the double planetary type with each other, in which the same carrier is commonly used and pinion gears of the two planetary gear mechanisms are brought into mesh with each other. Compared with the differential gear unit GS, the differential gear unit GSB is mainly different in that it further includes pinion gears P1B and P2B, and in the construction of each of a carrier member 95, and first and second ring gears R1B and R2B. In the differential gear unit GSB, the above-described first planetary gear mechanism is formed by the first sun gear S1, the pinion gears P1B, the first pinion gears P1, the first ring gear R1B, and the carrier member 95, and the above-described second planetary gear mechanism is formed by the second sun gear S2, the pinion gears P2B, the second pinion gears P2, the second ring gear R2B, and the carrier member 95. The left and right output shafts SRL and SRR, and the differential gear unit GSB are arranged coaxially with each other.

The carrier member 95 is comprised of a first root portion 95*a* and a second root portion 95*b*, both of which have an annular plate shape, four first support shafts 95*c* (only two of which are shown) and four second support shafts 95*d* (only two of which are shown), which are integrally formed on the root portions 95*a* and 95*b*, respectively, and four third support shafts 95*e* (only two of which are shown), which are integrally formed on the second root portion 95*b*. Further, the carrier member 95 is rotatably supported by a bearing (not shown), and the first and third rotating shaft 14 and 16 are relatively rotatably disposed inward of the carrier member 95. The first and second root portions 95*a* and 95*b* are arranged coaxially with the left and right output shafts SRL and SRR, respectively, and are opposed to each other in an axial direction of the left and right output shafts SRL and SRR. Further, the second root portion 95*b* is disposed on a side closer to the right rear wheel WRR than the first root portion 95*a*, and has an annular gear 95*f* integrally formed thereon. This gear 95*f* is in mesh with the gear 5 connected to the transmission output shaft of the above-described first transmission 4.

The first and second support shafts 95*c* and 95*d* are arranged between the first and second root portions 95*a* and 95*b*, and extend in the axial direction of the left and right output shafts SRL and SRR. Further, the first and second support shafts 95*c* and 95*d* are located at a radially central portion of the second root portion 95*b*. Furthermore, the first and second support shafts 95*c* and 95*d* are arranged alternately at equally-spaced intervals in a circumferential direction of the first root portion 95*a*. The third support shafts 95*e* are located at a radially inner end of the second root portion 95*b*, and extend in the axial direction of the left and right output shafts SRL and SRR toward the left rear wheel WRL. Further, the four third support shafts 95*e* are located at equally-spaced intervals in a circumferential direction.

The first sun gear S1, the pinion gears P1B, the first pinion gears P1, and the first ring gear R1B of the differential gear unit GSB are radially arranged from inside in this order. Similarly to the first embodiment, the first sun gear S1 is connected to the first rotor 11*b* via the first rotating shaft 14, and is rotatable in unison with the first rotor 11*b*. Further, the number of the pinion gears P1B is four which is equal to the number of the third support shafts 95*e* (only two of which are shown). Each pinion gear P1B is rotatably supported on an associated one of the third support shafts 95*e* via a bearing (not shown), and is in mesh with the first sun gear S1.

Further, the number of the first pinion gears P1 is four which is equal to the number of the first support shafts 95*c* (only two of which are shown). Each first pinion gear P1 is rotatably supported on an associated one of the first support shafts 95*c* via a bearing (not shown), and is in mesh with both of an associated one of the pinion gears P1B and the first ring gear R1B. The first ring gear R1B is connected to the right output shaft SRR via the second rotating shaft 15 and a flange, and is rotatable in unison with the right output shaft SRR. Note that the number of the pinion gears P1B, the number of the first pinion gears P1, the number of the third support shafts 95*e*, and the number of the first support shafts 95*c* are not limited to four but they can be set as desired.

Further, the second sun gear S2, the pinion gears P2B, the second pinion gears P2, and the second ring gear R2B of the differential gear unit GSB are radially arranged from inside in this order. Similarly to the first embodiment, the second sun gear S2 is connected to the second rotor 12*b* via the third rotating shaft 16. Further, the number of the pinion gears P2B is four which is equal to the number of the third support shafts 95*e* (only two of which are shown). Each pinion gear P2B is rotatably supported on an associated one of the third support shafts 95*e* via a bearing (not shown), and is in mesh with the second sun gear S2.

Figure 68:
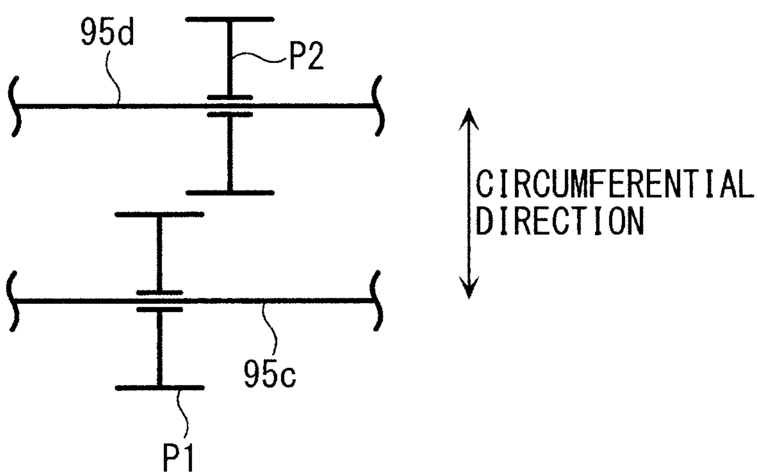
FIG. 68 A skeleton diagram of first pinion gears, second pinion gears, and a carrier member of a differential gear unit shown in FIG. 67, in plan view.

Further, the number of the second pinion gears P2 is four which is equal to the number of the second support shafts 95*d* (only two of which are shown). Each second pinion gear P2 is rotatably supported on an associated one of the second support shafts 95*d* via a bearing (not shown), and is in mesh with both of an associated one of the pinion gears P2B and the second ring gear R2B. Further, as shown in FIG. 68, the second pinion gears P2 are disposed such that they partially overlap associated ones of the first pinion gears P1 in the circumferential direction of the second sun gear S2, and are in mesh with the first pinion gears P1. In FIG. 68, the first and second sun gears S1 and S2, and the first and second ring gears R1B and R2B are omitted, for convenience.

Further, the second ring gear R2B is connected to the left output shaft SRL via the fourth rotating shaft 17 and a flange, and is rotatable in unison with the left output shaft SRL. Note that the number of the pinion gears P2B, the number of the second pinion gears P2, and the number of the second support shafts 95*d* are not limited to four but they can be set as desired.

Furthermore, the first pinion gear P1 and the second pinion gear P2, and the pinion gear P1B and the pinion gear P2B have the same diameters and the same tooth numbers, respectively, and accordingly the diameters of the first and second sun gears S1 and S2, and the diameters of the first and second ring gears R1B and R2B are set to the same values, respectively. Further, the respective first and second pinion gears P1 and P2, and the respective pinion gears P1B and P2B have the same tooth shapes and the same tooth widths. As described above, the diameters, the tooth numbers, the tooth shapes, and the tooth widths of the first and second pinion gears P1 and P2 are set to be equal to each other, respectively. That is, the two gears P1 and P2 are set to be equal to each other, in specifications. The same applies to the pinion gears P1B and P2B.

In the differential gear unit GSB constructed as above, the first sun gear S1, the first ring gear R1B, the carrier member 95, the second ring gear R2B, and the second sun gear S2 can transmit motive power therebetween, and the rotational speeds thereof are in a collinear relationship. Further, when the first sun gear S1 is caused to perform normal rotation in a state in which the carrier member 95 is fixed, the first ring gear R1B performs normal rotation, and the second sun gear S2 and the second ring gear R2B perform reverse rotation. In this case, from the relationship between the tooth numbers of the gears, the rotational speed of the first sun gear S1 becomes higher than that of the first ring gear R1B, and the rotational speed of the second sun gear S2 becomes lower than that of the second ring gear R2B. From the above, in a collinear chart indicating the relationship between the rotational speeds, the first sun gear S1, the first ring gear R1B, the carrier member 95, the second ring gear R2B, and the second sun gear S2 are depicted in this order.

Further, since the first sun gear S1 and the first rotor 11*b* are connected to each other via the first rotating shaft 14, the rotational speed of the first sun gear S1 and that of the first rotor 11*b* are equal to each other. Furthermore, since the first ring gear R1B is connected to the right output shaft SRR via the second rotating shaft 15 and the flange, the rotational speed of the first ring gear R1B and that of the right output shaft SRR are equal to each other. Further, since the carrier member 95 is connected to the transmission output shaft of the first transmission 4 via the gear 95*f* and the gear 5, the rotational speed of the carrier member 95 and that of the transmission output shaft are equal to each other, provided that a change in speed by the gears 95*f* and 5 is ignored. Furthermore, since the second ring gear R2B is connected to the left output shaft SRL via the fourth rotating shaft 17 and the flange, the rotational speeds of the second ring gear R2B and that of the left output shaft SRL are equal to each other. Further, since the second sun gear S2 and the second rotor 12*b* is connected to each other via the third rotating shaft 16, the rotational speed of the second sun gear S2 and that of the second rotor 12*b* are equal to each other.

From the above, a rotational speed relationship between various types of rotary elements of the power plant according to the eleventh embodiment are represented e.g. in a collinear chart shown in FIG. 69. As is apparent from FIG. 69, the left and right output shafts SRL and SRR can be differentially rotated with each other. Further, as is apparent from a comparison between this FIG. 69 and FIG. 5 which shows the rotational speed relationship and the torque balance relationship between the various types of the rotary elements of the power plant according to the first embodiment, the power plant according to the eleventh embodiment can provide the same advantageous operations and effects as provided by the power plant according to the first embodiment.

Further, in FIG. 69, αB and βB represent the first lever ratio and the second lever ratio, respectively, and are expressed by the following equations (7) and (8):

$$\alpha B=\{ZR1B(ZR2B-ZS2)\}/\{ZS2(ZR1B+ZR2B)\} \quad (7)$$

$$\beta B=\{ZR2B(ZR1B-ZS1)\}/\{ZS1(ZR1B+ZR2B)\} \quad (8)$$

wherein ZS1B represents the tooth number of the first ring gear R1B, ZR2B represents the tooth number of the second ring gear R2B, ZS2 represents the tooth number of the second sun gear S2, and ZS1 represents the tooth number of the first sun gear S1.

The tooth number ZR1B of the first ring gear R1B, the tooth number ZR2B of the second ring gear R2B, the tooth number ZS2 of the second sun gear S2, and the tooth number ZS1 of the first sun gear S1 are set such that the first and second lever ratios αB and βB take relatively large values on condition that one of the first and second rotors 11*b* and 12*b* does not perform reverse rotation within a range in which the left and right rear wheels WRL and WRR can be differentially rotated with each other. Further, the tooth numbers ZR1B and ZR2B of the first and second ring gears R1B and R2B, and the tooth numbers ZS1 and ZS2 of the first and second sun gears S1 and S2 are set to the same values, respectively. With this, as is apparent from the aforementioned equations (7) and (8), the first and second lever ratios αB and βB are set to the same value.

In addition to this, in the collinear chart (FIG. 69), the distance from the carrier member 95 to the left output shaft SRL and the distance from the carrier member 95 to the right output shaft SRR are equal to each other, and hence the torque distribution ratio of torque distributed from the carrier member 95 to the left and right output shafts SRL and SRR is 1:1.

Thus, according to the eleventh embodiment, simply by setting the tooth numbers ZR1B and ZR2B of the first and second ring gears R1B and R2B, and the tooth numbers ZS1 and ZS2 of the first and second sun gears S1 and S2 to the same values, respectively, it is possible to easily set the first and second lever ratios αB and βB to the same value. This makes it possible to accurately and easily perform torque distribution control for controlling distribution of torque to the left and right output shafts SRL and SRR using the first and second rotating electric machines 11 and 12, and hence it is possible to enhance the turnability of the vehicle VFR.

Furthermore, the tooth numbers ZR1B and ZR2B of the first and second ring gears R1B and R2B are set to the same value. For this reason, for example, when both the first and second ring gears R1B and R2B are formed by spur gears, both the gears R1B and R2B can be machined by the same cutter, whereas when they are formed by helical gears, they can be machined by cutters which are the same in specifications but different only in the direction of torsion, and hence the first and second ring gears R1B and R2B are excellent in productivity. The same applies to the first and second sun gears S1 and S2.

Further, since the distribution ratio of torque distributed from the carrier member 95 to the left and right output shafts SRL and SRR is 1:1, it is possible to obtain excellent straight-advancing performance of the vehicle VFR during traveling of the vehicle VFR using only the engine 3 as a motive power source.

Further, the five rotary elements formed by the second sun gear S2, the second ring gear R2B, the carrier member 95, the first ring gear R1B, and the first sun gear S1, the rotational speeds of which are in a collinear relationship with each other, are formed by the differential gear unit GSB that is formed by combining the first and second planetary gear mechanisms of the double planetary type with each other. Therefore, compared with the conventional differential gear unit formed by combining the three planetary gear mechanisms of the single planetary type with each other, it is possible to reduce the number of component parts, which in turn makes it possible to downsize the differential gear unit GSB.

Furthermore, the first and second pinion gears P1 and P2, and the pinion gears P1B and P2B have the same diameters and the same tooth numbers, respectively, and accordingly the diameters of the first and second sun gears S1 and S2, and the diameters of the first and second ring gears R1B and R2B are set to the same values, respectively. This makes it possible to reduce a radial dead space of the differential gear unit GSB. Further, the diameters, the tooth numbers, the tooth shapes, and the tooth widths of the first and second pinion gears P1 and P2 are set to be equal to each other, respectively. That is, the two gears P1 and P2 are set to be equal to each other, in specifications. Therefore, it is possible to commonly use the same mold and the same cutter for manufacturing the first and second pinion gears P1 and P2, and hence the productivity thereof can be improved. The same applies to the pinion gears P1B and P2B.

Further, since the engine 3 is connected to the carrier member 95, not only the first and second motor output torques TM1 and TM2 from the first and second rotating electric machines 11 and 12 but also the post-speed-change engine torque TE from the engine 3 are transmitted to the left and right output shafts SRL and SRR. This makes it possible to reduce torque demanded of the first and second rotating electric machines 11 and 12, whereby it is possible to attain downsizing of the two rotating electric machines 11 and 12.

Furthermore, since the first and second rotating electric machines 11 and 12, which are general rotating electric machines, are used, it is possible to construct the power plant easily and more inexpensively, without using a special apparatus. Further, in the case where distribution of torque to the left and right output shafts SRL and SRR is controlled as described above, it is possible to convert motive power to electric power using the first and second rotating electric machines 11 and 12. Therefore, by supplying the electric power obtained by the conversion to the accessory of the vehicle VFR, it is possible to reduce the operating load and operating frequency of the generator for charging the power source of the accessory.

Further, similarly to the first embodiment, the second and first ring gears R2B and R1B are connected to the left and right output shafts SRL and SRR, so that as described with reference to FIGS. 89 and 90, it is possible to set the tooth widths of the first and second ring gears R1 and R2 to relatively small values, whereby it is possible to attain further downsizing of the power plant. For the same reason, it is possible to downsize the first and second pinion bearings (bearings supporting the first and second pinion gears P1 and P2, respectively), which also makes it possible to attain further downsizing of the power plant.

Note that although in the above-described eleventh embodiment, the first and second pinion gears P1 and P2 are brought into mesh with each other, this is not limitative, but in place of or in combination with this, the pinion gears P1B and P2B may be brought into mesh with each other.

Further, the correspondence between various elements of the eleventh embodiment and the various elements of the present invention is as follows: The left and right output shafts SRL and SRR of the eleventh embodiment correspond to the other and one of the two driven parts of the present invention, respectively. Further, the carrier member 95 of the eleventh embodiment corresponds to the carrier of the present invention, and the first sun gear S1, the first ring gear R1B, the second sun gear S2, and the second ring gear R2B of the eleventh embodiment correspond to the first gear, the second gear, the third gear, and the fourth gear of the present invention, respectively. Furthermore, the first pinion gears P1, the pinion gears P1B, the second pinion gears P2, and the pinion gears P2B of the eleventh embodiment correspond to the first split gears, the second split gears, the third split gears, and the fourth split gears of the present invention, respectively.

Further, the first and second sun gears S1 and S2 of the eleventh embodiment correspond to the first and second outer rotary elements of the present invention, respectively, and the first and second ring gear R1B and R2B of the eleventh embodiment correspond to the first and second quasi-outer rotary elements of the present invention, respectively. Further, the carrier member 95 of the eleventh embodiment corresponds to the central rotary element of the present invention. The other corresponding relations are the same as in the first embodiment.

Next, a power plant according to a twelfth embodiment of the present invention will be described with reference to FIG. 70. A distribution system DS12 of the power plant shown in FIG. 70 uses a differential gear unit GSC in place of the differential gear unit GSB of the eleventh embodiment. In FIG. 70, the same component elements as those of the first and eleventh embodiments are denoted by the same reference numerals. The following description is given mainly of different points from the first and eleventh embodiments.

Similarly to the differential gear unit GSB of the eleventh embodiment, the differential gear unit GSC shown in FIG. 70 is formed by combining a first planetary gear mechanism of the double planetary type and a second planetary gear mechanism of the double planetary type with each other. Further, compared with the eleventh embodiment, the differential gear unit GSC is different only in the following points: The pinion gears P1B are provided not between the first sun gear S1 and the first pinion gears P1 but between the first pinion gears P1 and the first ring gear R1B, and are in mesh with the two P1 and R1B. Further, the pinion gears P2B are provided not between the second sun gear S2 and the second pinion gears P2 but between second pinion gears P2 and the second ring gears R2B, and are in mesh with the two P2 and R2B.

In the differential gear unit GSC constructed as above, similarly to the eleventh embodiment, the first sun gear S1, the first ring gear R1B, the carrier member 95, the second ring gear R2B, and the second sun gear S2 can transmit motive power therebetween, and the rotational speeds thereof are in a collinear relationship. In a collinear chart indicating the relationship between the rotational speeds, the first sun gear S1, the first ring gear R1B, the carrier member 95, the second ring gear R2B, and the second sun gear S2 are depicted in this order. Further, the relationship of connections of the first rotor 11*b*, the right output shaft SRR, the transmission output shaft, the left output shaft SRL, and the second rotor 12*b*, to the first sun gear S1, the first ring gear R1B, the carrier member 95, the second ring gear R2B, and the second sun gear S2 is the same as in the eleventh embodiment.

From the above, a rotational speed relationship and a torque balance relationship between various types of rotary elements of the power plant according to the twelfth embodiment is the same as in the eleventh embodiment (FIG. 69). Therefore, the power plant according to the twelfth embodiment can provide the same advantageous operations and effects as provided by the power plant according to the eleventh embodiment.

Further, the correspondence between the various elements of the twelfth embodiment and the various elements of the present invention is as follows: The first ring gear R1B, the first sun gear S1, the second ring gear R2B, and the second sun gear S2 of the twelfth embodiment correspond to the first gear, the second gear, the third gear, and the fourth gear of the present invention, respectively. The other corresponding relations are the same as in the eleventh embodiment.

Next, a power plant according to a thirteenth embodiment of the present invention will be described with reference to FIG. 71. A distribution system DS13 of the power plant shown in FIG. 71 uses a differential gear unit GSD in place of the differential gear unit GS of the first embodiment. In FIG. 71, the same component elements as those of the first embodiment are denoted by the same reference numerals. The following description is given mainly of different points of the power plant according to the thirteenth embodiment from the first embodiment.

Similarly to the tenth and eleventh embodiments, the differential gear unit GSD shown in FIG. 71 is formed by combining first and second planetary gear mechanisms of the double planetary type with each other. In the differential gear unit GSD, the above-mentioned first planetary gear mechanism is formed by a first sun gear S1D, the first pinion gears P1, pinion gears P1D, a first ring gear R1D, and a carrier member 101, and the above-mentioned second planetary gear mechanism is formed by a second sun gear S2D, pinion gears P2D, the second pinion gears P2, a second ring gear R2D, and the carrier member 101. The left and right output shafts SRL and SRR, and the differential gear unit GSD are arranged coaxially with each other.

The carrier member 101 is comprised of a first root portion 101*a* and a second root portion 101*b* each having an annular plate shape, four first support shafts 101*c* (only two of which are shown), four second support shafts 101*d* (only two of which are shown), four third support shafts 101*e* (only two of which are shown), and four fourth support shafts 101*f* (only two of which are shown), which are integrally formed on the two root portions 101*a* and 101*b*. Further, the carrier member 101 is rotatably supported by a bearing (not shown), and the first rotating shaft 14 is relatively rotatably disposed inward of the carrier member 101. The first and second root portions 101*a* and 101*b* are arranged coaxially with the left and right output shafts SRL and SRR. The second root portion 101*b* is disposed radially inward of the first root portion 101*b*, and on a side closer to the right rear wheel WRR than the first root portion 101*a*, and is integrally mounted one end of the third rotating shaft 16. The first rotor 11*b* is integrally formed on the other end of the third rotating shaft 16.

The first support shafts 101*c* are mounted on a radially inner end of the second root portion 101*b*, and extend toward the left rear wheel WRL in the axial direction of the left and right output shafts SRL and SRR. The second support shafts 101*d* and the third support shafts 101*e* are provided between the first and second root portions 101*a* and 101*b*, and extend in the axial direction of the left and right output shafts SRL and SRR. The second and third support shafts 101*d* and 101*e* are arranged alternately at equally-spaced intervals in a circumferential direction of the first root portion 101*a*. The fourth support shafts 101*f* are mounted on a radially outer end of the first root portion 101*a*, and extend in the axial direction of the left and right output shafts SRL and SRR, toward the right rear wheel WRR, i.e. in a direction opposite to a direction in which the first support shafts 101*c* extends.

The above-mentioned first sun gear S1D, first pinion gears P1, pinion gears P1D, and first ring gear R1D are radially arranged from inside in this order. The first sun gear S1D is integrally formed on the right output shaft SRR, and is rotatable in unison with the right output shaft SRR. Further, the number of the first pinion gears P1 is four (only two of which are shown) which is equal to the number of the second support shafts 101*d* of the carrier member 101. Each first pinion gear P1 is rotatably supported on an associated one of the second support shafts 101*d* via a bearing (not shown), and is in mesh with the first sun gear S1D.

Furthermore, the number of the pinion gears P1D is four (only two of which are shown) which is equal to the number of the fourth support shafts 101*f*. Each pinion gear P1D is rotatably supported on an associated one of the fourth support shafts 101*f* via a bearing (not shown), and is in mesh with both of an associated one of the first pinion gears P1 and the first ring gear R1D. The first ring gear R1D is connected to the left output shaft SRL via the second rotating shaft 15 and the flange, and is rotatable in unison with the left output shaft SRL. Note that the numbers of the first pinion gears P1, the pinion gears P1D, the second support shafts 101*d*, and the fourth support shafts 101*f* are not limited to four but they can be set as desired.

Further, the above-mentioned second sun gear S2D, pinion gears P2D, second pinion gears P2, and second ring gear R2D are radially arranged from inside in this order. The number of the gear teeth of the second sun gear S2D is set to a value smaller than the number of the gear teeth of the first sun gear S1D. The second sun gear S2D is connected to the second rotor 12*b* via the first rotating shaft 14. Further, the number of the pinion gears P2D is four (only two of which are shown) which is equal to the number of the first support shafts 101*c*. Each pinion gear P2D is rotatably supported on an associated one of the first support shafts 101*c* via a bearing (not shown), and is in mesh with second sun gear S2D.

Figure 72:
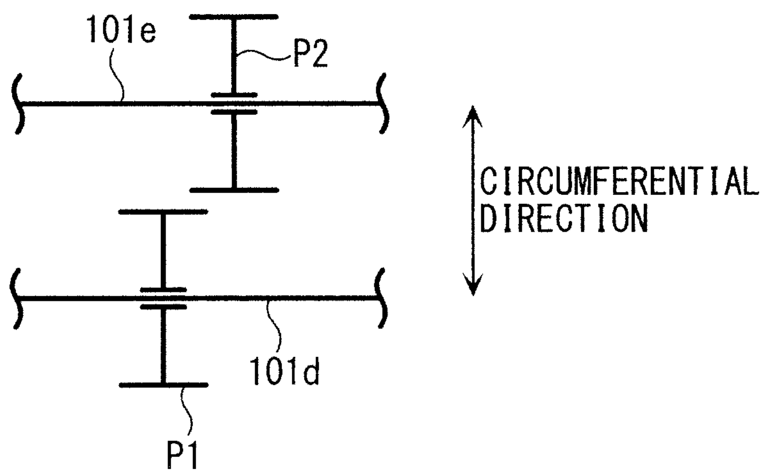
FIG. 72 A skeleton diagram of first pinion gears, second pinion gears, and a carrier member of a differential gear unit shown in FIG. 71, in plan view.

Furthermore, the number of the second pinion gears P2 is four (only two of which are shown) which is equal to the number of the third support shafts 101*e*. Each second pinion gear P2 is rotatably supported on an associated one of the third support shafts 101*e* via a bearing (not shown), and is in mesh with both of an associated one of the pinion gears P2D and the second ring gear R2D. Further, as shown in FIG. 72, the second pinion gears P2 are disposed such that they partially overlap associated ones of the first pinion gears P1 in a circumferential direction of the second sun gear S2D, and are in mesh with the first pinion gears P1. Note that the numbers of the second pinion gears P2, the pinion gears P2D, the first support shafts 101*c*, and the third support shafts 101*e* are not limited to four but they can be set as desired. In FIG. 72, the first and second sun gears S1D and S2D, and the first and second ring gears R1D and R2D are omitted, for convenience.

The second ring gear R2D has a tooth number smaller than that of the first ring gear R1D. Further, a gear GD is formed around an outer periphery of the second ring gear R2D. This gear GD is in mesh with the gear 4*a* integrally formed on the transmission output shaft of the first transmission 4.

In the differential gear unit GSD constructed as above, the carrier member 101, the first ring gear R1D, the second ring gear R2D, the first sun gear S1D, and the second sun gear S2D can transmit motive power therebetween, and the rotational speeds thereof are in a collinear relationship. Further, when the second sun gear S2D is caused to perform normal rotation in a state in which the carrier member 101 is fixed, all the first ring gear R1D, the second ring gear R2D, and the first sun gear S1D perform normal rotation. In this case, from the relationship between the tooth numbers of the gears, the relationship of "the rotational speed of the first ring gear R1D<the rotational speed of the second ring gear R2D<the rotational speed of the first sun gear S1D<the rotational speed of the second sun gear S2D" holds. From the above, in a collinear chart indicating the relationship between the rotational speeds, the carrier member 101, the first ring gear R1D, the second ring gear R2D, the first sun gear S1D, and the second sun gear S2D are depicted in this order.

Further, since the carrier member 101 and the first rotor 11*b* are connected to each other via the third rotating shaft 16, the rotational speed of the carrier member 101 and that of the first rotor 11*b* are equal to each other. Furthermore, since the first ring gear R1D is connected to the left output shaft SRL via the second rotating shaft 15, the rotational speed of the first ring gear R1D and that of the left output shaft SRL are equal to each other. Further, since the second ring gear R2D is connected to the transmission output shaft of the first transmission 4 via the gear GD and the gear 4*a*, the rotational speed of the second ring gear R2D and that of the transmission output shaft are equal to each other, provided that a change in speed by the gears GD and 4*a* is ignored. Further, since the first sun gear S1D is directly connected to the right output shaft SRR, the rotational speed of the first sun gear S1D and that of the right output shaft SRR are equal to each other. Further, since the second sun gear S2D and the second rotor 12*b* are connected to each other via the third rotating shaft 16, the rotational speed of the second sun gear S2D and that of the second rotor 12*b* are equal to each other.

Figure 73:
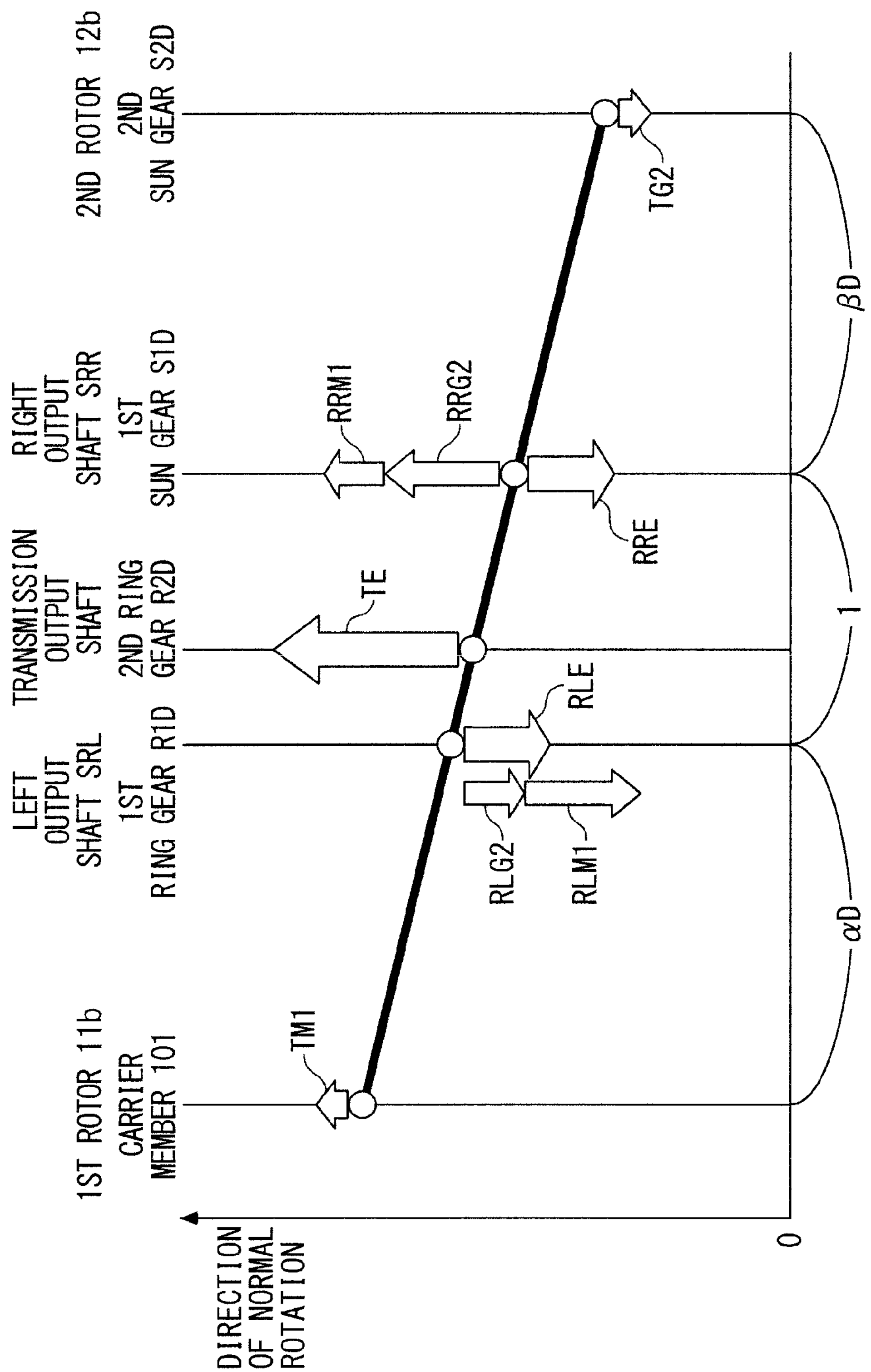
FIG. 73 A collinear chart showing a rotational speed relationship and a torque balance relationship between various types of rotary elements of the power plant shown in FIG. 71.

From the above, a rotational speed relationship between various types of rotary elements of the power plant according to the thirteenth embodiment are represented e.g. in a collinear chart shown in FIG. 73. As is apparent from FIG. 73, the left and right output shafts SRL and SRR can be differentially rotated with each other. Further, the various types of parameters shown in FIG. 73 are as described in the first embodiment. As is apparent from a comparison between this FIG. 73 and FIG. 5 which shows the rotational speed relationship and the torque balance relationship between the various types of the rotary elements of the power plant according to the first embodiment, the power plant according to the thirteenth embodiment can provide approximately the same advantageous operations and effects as provided by the power plant according to the first embodiment.

Further, in FIG. 73, αD and βD represent the first lever ratio and the second lever ratio, respectively, and are expressed by the following equations (9) and (10):

$$\alpha D = ZS1D/(ZR1D - ZS1D) \tag{9}$$

$$\beta D = \{ZR1(ZS1D - ZS2D)\}/\{ZS2D(ZR1D - ZS1D)\} \tag{10}$$

wherein ZS1D represents the tooth number of the first sun gear S1D, ZR1D represents the tooth number of the first ring gear R1D, and ZS2D represents the tooth number of the second sun gear S2D.

Further, the correspondence between various elements of the thirteenth embodiment and the various elements of the present invention is as follows: the carrier member 101 of the thirteenth embodiment corresponds to the carrier of the present invention, and the first ring gear R1D, the first sun gear S1D, the second sun gear S2D, and the second ring gear R2D of the thirteenth embodiment correspond to the first gear, the second gear, the third gear, and the fourth gear of the present invention, respectively. Further, the first pinion gears P1, the pinion gears P1D, the second pinion gears P2, and the pinion gears P2D of the thirteenth embodiment correspond to the first split gears, the second split gears, the third split gears, and the fourth split gears of the present invention, respectively.

Furthermore, the carrier member 101 and the second sun gear S2D of the thirteenth embodiment correspond to the first and second outer rotary elements of the present invention, respectively, and the first ring gear R1D and the first sun gear S1D of the thirteenth embodiment correspond to the first and second quasi-outer rotary elements of the present invention, respectively. Further, the second ring gear R2D of the thirteenth embodiment corresponds to the central rotary element of the present invention. The other corresponding relations are the same as in the first embodiment.

Note that although in the thirteenth embodiment, the pinion gears P1D are provided between the first pinion gears P1 and the first ring gear R1D, and the pinion gears P2D are provided between the second sun gear S2D and the second pinion gears P2, the pinion gears P1D may be provided between the first sun gear S1D and the first pinion gears P1, and the pinion gears P2D may be provided between the second pinion gears P2 and the second ring gear R2D. That is, the pinion gears P1D may be brought into mesh with both the first sun gear S1D and the first pinion gears P1, and the pinion gears P2D may be brought into mesh with the second pinion gears P2 and the second ring gear R2D.

Further, FIGS. 74 to 87 show power plants according to fourteenth to twentieth embodiments of the present invention. Compared with the power plants according to the first and ninth embodiments, these power plants are commonly different in that distribution systems DS14 to DS18 are not connected to the engine. This engine is connected to the left and right front wheels of the vehicle via the first transmission, and the motive power of the engine is transmitted to the left and right front wheels. The following description is sequentially given mainly of different points of the power plants according to fourteenth to twentieth embodiments from the first embodiment and the like.

Figure 74:
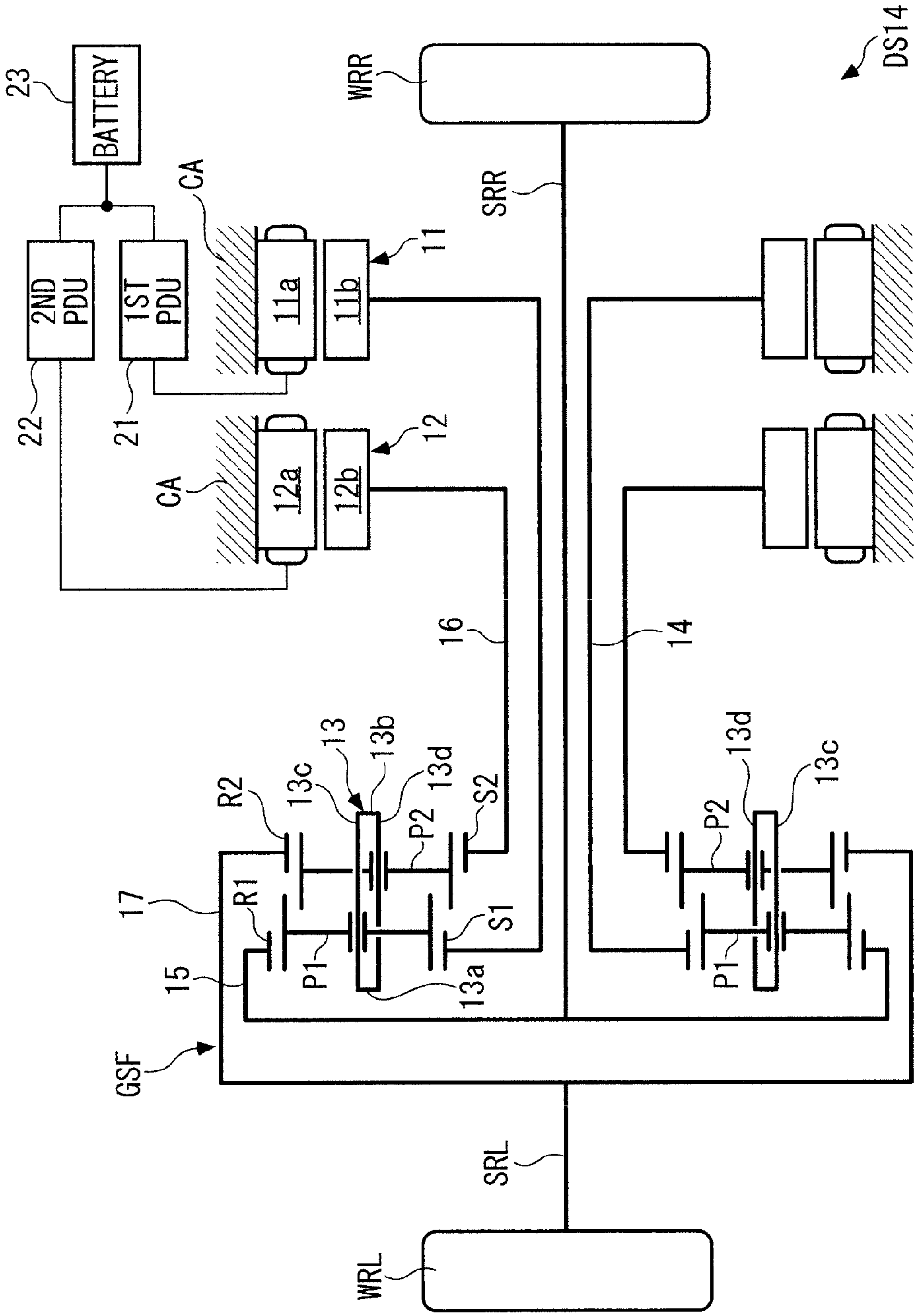
FIG. 74 A skeleton diagram of a power plant etc. according to a fourteenth embodiment of the present invention.

Compared with the first embodiment (FIG. 2), the distribution system DS14 according to the fourteenth embodiment shown in FIG. 74 is different only in that the carrier member 13 of a differential gear unit GSF is not connected to the engine. In FIG. 74, the same component elements as those of the first embodiment are denoted by the same reference numerals. As is apparent from a comparison between FIG. 74 and FIG. 2 which shows the distribution system DS1 according to the first embodiment, a rotational speed relationship and a torque balance relationship between various types of rotary elements of the power plant according to the fourteenth embodiment is shown e.g. in FIG. 75.

Figure 75:
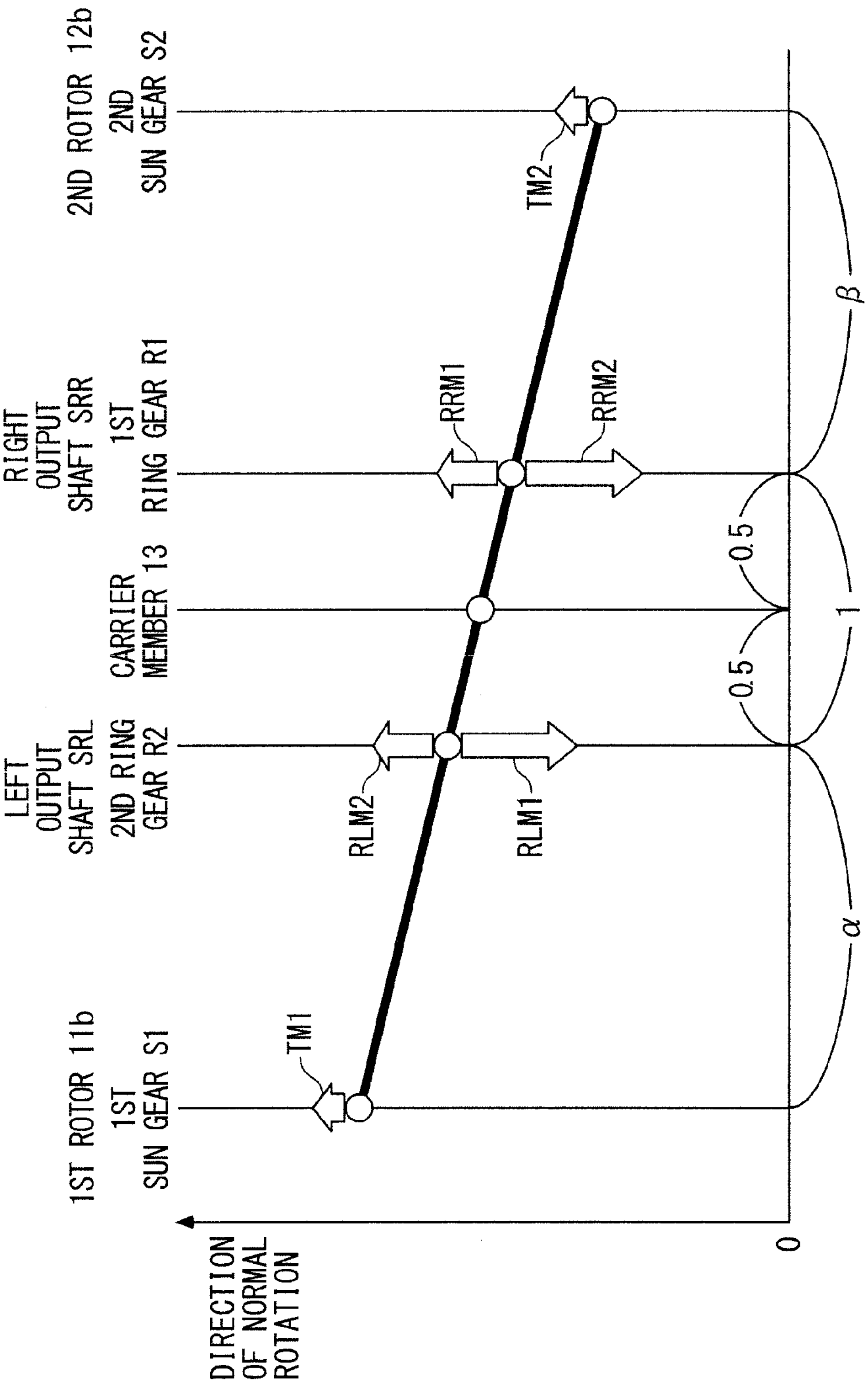
FIG. 75 A collinear chart showing a rotational speed relationship and a torque balance relationship between various types of rotary elements of the power plant shown in FIG. 74.

As is apparent from a comparison between FIG. 75 and FIG. 5 which shows the rotational speed relationship and the torque balance relationship between the various types of the rotary elements of the power plant according to the first embodiment, compared with the first embodiment, the fourteenth embodiment is different only in that the post-speed-change engine torque TE, the reaction force torque RLE, and the reaction force torque RRE do not act. Therefore, similarly to the first embodiment, by controlling the first and second motor output torques TM1 and TM2, and the first and second motor braking torques TG1 and TG2, it is possible to control torques distributed to the left and right output shafts SRL and SRR. In addition to this, it is possible to obtain the same advantageous effects as provided by the first embodiment, that is, it is possible to downsize the differential gear unit GS, easily set the first and second lever ratios α and β of the differential gear unit GS to the same value, and obtain like other effects.

Next, a description will be given of a power plant according to a fifteenth embodiment. In the fifteenth embodiment, a differential gear unit having four rotary elements, the rotational speeds of which are in a collinear relationship with each other, is formed by omitting one of the four rotary elements other than the carrier member 13, from the five rotary elements (the first sun gear S1, the second ring gear R2, the carrier member 13, the first ring gear R1, and the second sun gear S2 (see FIG. 5)), described in the first embodiment, the rotational speeds of which are in the collinear relationship with each other. Further, the first and second rotors 11*b* and 12*b* are connected to two of the above four rotary elements, which are positioned on opposite outer sides of the collinear chart indicating the relationship between the rotational speeds, and the front and rear output shafts SF and SR (or the left and right output shafts SRL, SRR, SFL, and SFR) are connected to two of the four rotary elements, which are positioned at inner locations.

Figure 76:
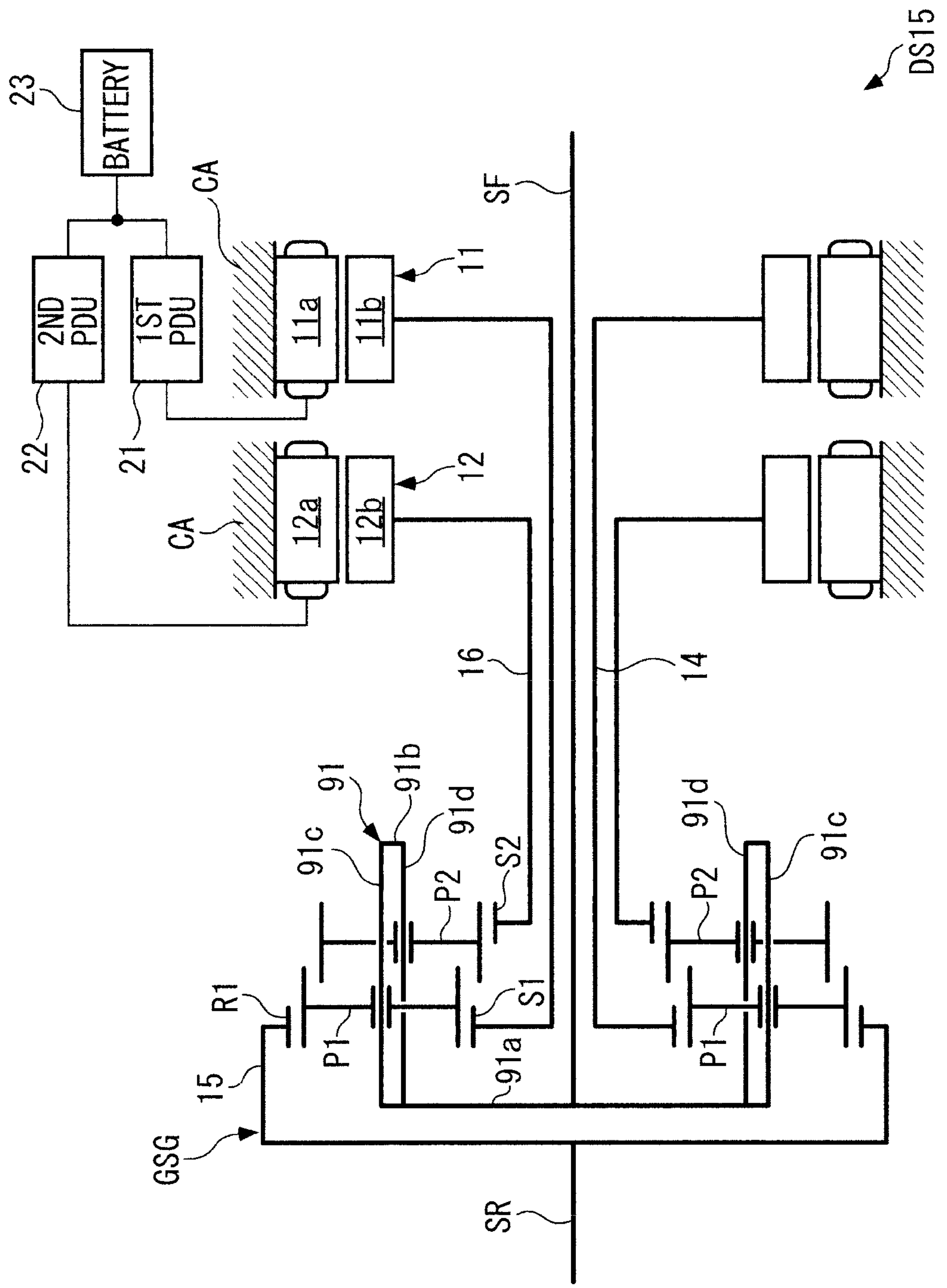
FIG. 76 A skeleton diagram of a power plant etc. according to a fifteenth embodiment of the present invention.

FIG. 76 shows an example of a distribution system DS15 according to the fifteenth embodiment. This distribution system DS15 includes a differential gear unit GSG formed by omitting the second ring gear R2 of the above-mentioned four rotary elements other than the carrier member 13. In FIG. 76, the same component elements as those of the first and ninth embodiments are denoted by the same reference numerals.

As shown in FIG. 76, the first and second sun gears S1 and S2 are mechanically connected to the first and second rotors 11*b* and 12*b*, respectively, and the carrier member 91 and the first ring gear R1 are mechanically connected to the front and rear output shafts SF and SR, respectively. Further, the differential gear unit GSG is not connected to the engine. Furthermore, as is apparent from a comparison between FIG. 76 and FIG. 61 which shows the distribution system DS9 according to the ninth embodiment, a rotational speed relationship and a torque balance relationship between the various types of rotary elements according to the fifteenth embodiment are expressed as in a collinear chart shown e.g. in FIG. 77.

Figure 77:
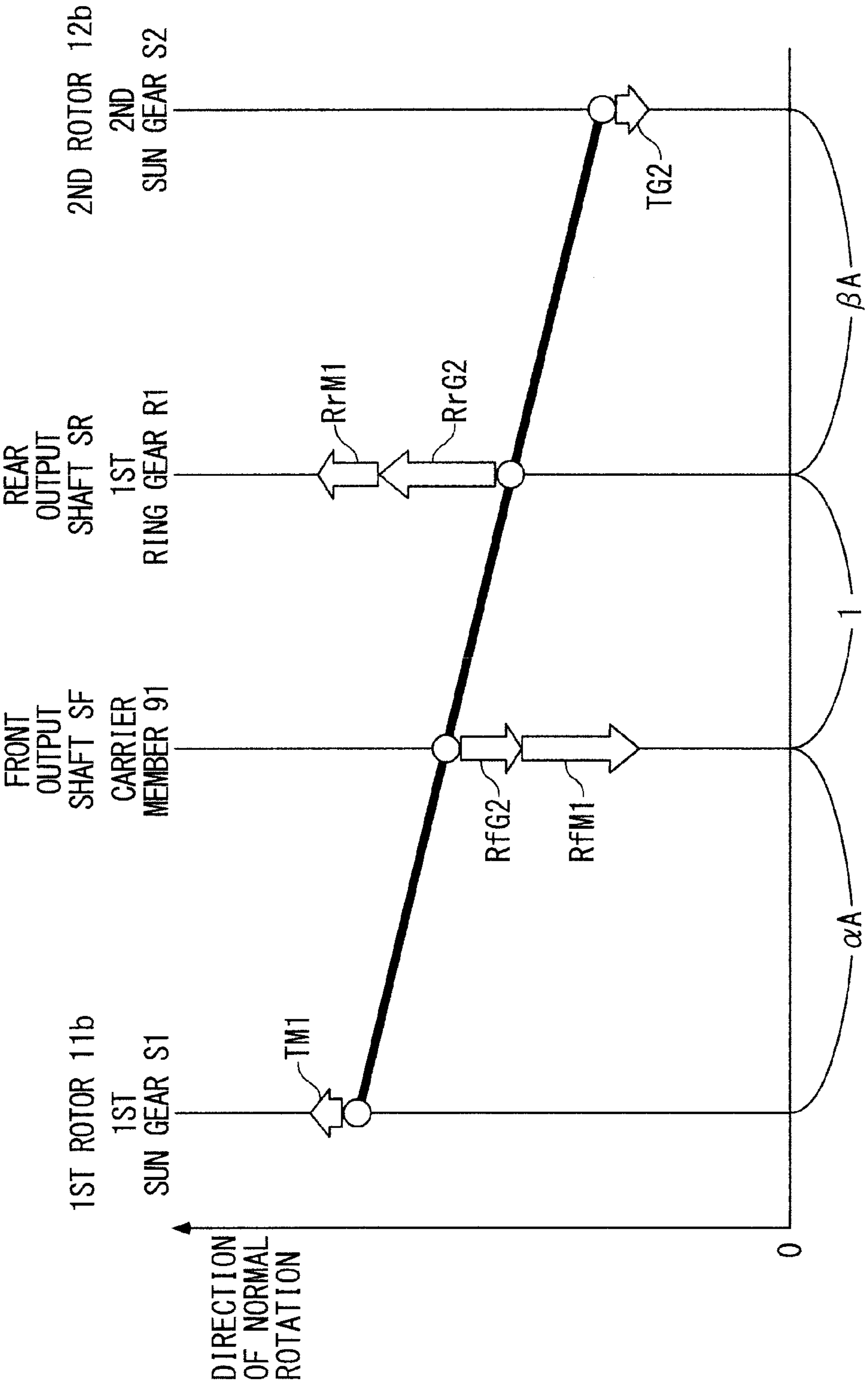
FIG. 77 A collinear chart showing a rotational speed relationship and a torque balance relationship between various types of rotary elements of the power plant shown in FIG. 76.

As is apparent from a comparison between FIG. 77 and FIG. 64 which shows the rotational speed relationship and the torque balance relationship between the various types of the rotary elements according to the ninth embodiment, similarly to the ninth embodiment, by controlling the first and second motor output torques TM1 and TM2, and the first and second motor braking torques TG1 and TG2, it is possible to control torques distributed to the front and rear output shafts SF and SR. Note that the various types of parameters shown in FIG. 77 are as described in the ninth embodiment.

As described above, according to the fifteenth embodiment, simply by bringing the first and second pinion gears P1 and P2 into mesh with each other, and bringing the first sun gear S1 and the first ring gear R1 into mesh with the first pinion gears P1, respectively, and bringing the second sun gear S2 into mesh with the second pinion gears P2, it is possible to easily form the four rotary elements, the rotational speeds of which are in a collinear relationship with each other. Therefore, it is possible to reduce the number of component parts of the whole power plant, thereby making it possible to attain downsizing, weight reduction, and manufacturing cost reduction of the power plant. Further, similarly to the ninth embodiment, it is possible to similarly obtain the effects of the first and second lever ratios αA and βA. Furthermore, since the first ring gear R1 is connected to the rear output shaft SR, it is possible to set the tooth width of the first ring gear R1 to a relatively small value, whereby it is possible to attain further downsizing of the power plant. For the same reason, it is possible to downsize the first pinion bearings (bearings supporting the first pinion gears P1), which also makes it possible to attain further downsizing the power plant.

Note that although in the example illustrated in FIG. 76, the second ring gear R2 is omitted, it is to be understood that a differential gear unit having four rotary elements, the rotational speeds of which are in a collinear relationship with each other, may be formed by omitting one of the first sun gear S1, the first ring gear R1, and the second sun gear S2, in place of the second ring gear R2.

Further, the correspondence between the various elements of the fifteenth embodiment and the various elements of the present invention is as follows: The first sun gear S1, the first ring gear R1, and the second sun gear S2 correspond to the first gear, the second gear, and the third gear, respectively of the present invention. The other corresponding relations are the same as in the ninth embodiment.

Next, a description will be given of a power plant according to a sixteenth embodiment. In the sixteenth embodiment, a differential gear unit having four rotary elements, the rotational speeds of which are in a collinear relationship with each other, is formed by omitting one of the first ring gear R1 and the first and second sun gears S1 and S2 from the five rotary elements (the first sun gear S1, the carrier member 91, the second ring gear R2A, the first ring gear R1, and the second sun gear S2 (see FIG. 64)), described in the ninth embodiment, the rotational speeds of which are in the collinear relationship with each other.

FIG. 78 shows an example of a distribution system DS16 according to the sixteenth embodiment. This distribution system DS16 includes a differential gear unit GSH formed by omitting the first sun gear S1 from the above-mentioned first ring gear R1, and first and second sun gears S1 and S2. In FIG. 78, the same component elements as those of the ninth embodiment are denoted by the same reference numerals.

Compared with the ninth embodiment (FIG. 61), the distribution system DS16 shown in FIG. 78 is different not only in that the first sun gear S1 is omitted but in the following points (a) to (c):

(a) The differential gear unit GSH is not connected to the engine.

(b) The carrier member 91 is connected to the first rotor 11*b* in place of the front output shaft SF.

(c) The second ring gear R2A is connected to the front output shaft SF via the fourth rotating shaft 17 and the flange, in place of the engine (transmission output shaft).

Figure 79:
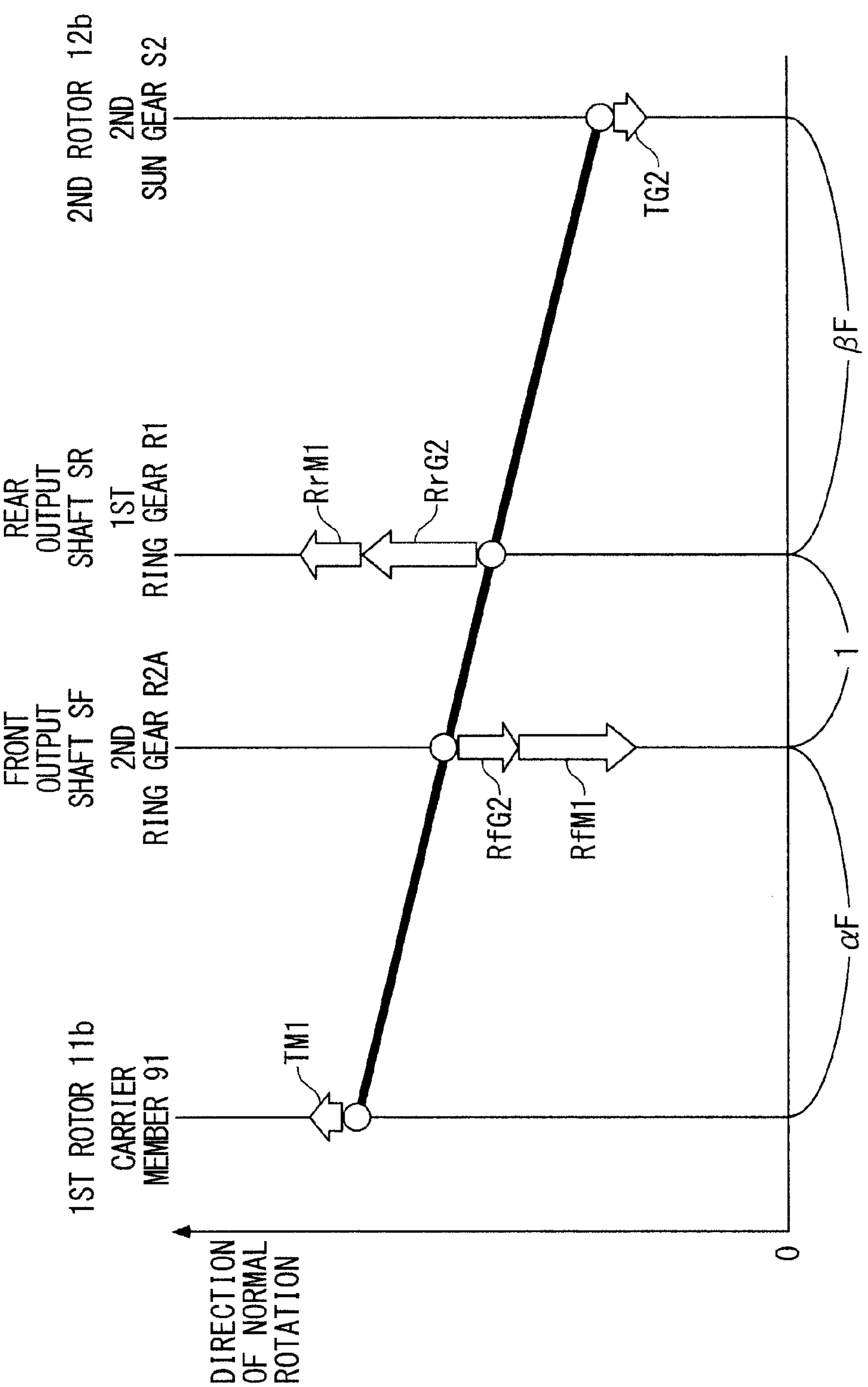
FIG. 79 A collinear chart showing a rotational speed relationship and a torque balance relationship between various types of rotary elements of the power plant shown in FIG. 78.

With the above arrangement, a rotational speed relationship and a torque balance relationship between the various types of rotary elements according to the sixteenth embodiment are expressed as in a collinear chart shown e.g. in FIG. 79. As is apparent from a comparison between this FIG. 79 and FIG. 64 which shows the rotational speed relationship and the torque balance relationship between the various types of the rotary elements according to the ninth embodiment, similarly to the ninth embodiment, by controlling the first and second motor output torques TM1 and TM2, and the first and second motor braking torques TG1 and TG2, it is possible to control torques distributed to the front and rear output shafts SF and SR.

Further, in FIG. 79, αF and βF represent the first lever ratio and the second lever ratio, respectively, and are expressed by the following equations (11) and (12):

$$\alpha F = ZR1/(ZR2A - ZR1) \tag{11}$$

$$\beta F = \{ZR2A(ZR1 - ZS2)\}/\{ZS2(ZR2A - ZR1)\} \tag{12}$$

wherein as described in the ninth embodiment, ZR1 represents the tooth number of the first ring gear R1, ZR2A represents the tooth number of the second ring gear R2A, and ZS2 represents the tooth number of the second sun gear S2.

Further, in recent years, as disclosed e.g. in Japanese Laid-Open Patent Publication No. 2011-237019, there has been known a differential gear unit that uses double-pinion gears in which two pinion gears are integrally formed with each other. To machine each double-pinion gear, it is required to align the phases of two pinion gears, and it is very troublesome to make settings therefor. When the diameters of the gears of the double-pinion gear are different from each other, such inconveniences become more conspicuous. Further, when the differential gear unit is constructed using another pinion gear in addition to the double-pinion gear, it is required to manufacture this pinion gear separately from the double-pinion gear, and two types of gears different from each other are required as the pinion gear and the double-pinion gear.

In contrast, according to the above-described sixteenth embodiment, the pinion gear PA, and the first and second pinion gears P1 and P2 can be formed by gears which are the same in specifications (the tooth number, the diameter, etc.), so that it is only required to prepare the same one type of gears as the pinion gear PA, and the first and second pinion gears P1 and P2, and hence it is possible to easily form the differential gear unit. In addition to this, it is possible to obtain the same advantageous effects as provided by the fifteenth embodiment.

Note that although in the example illustrated in FIG. 78, the first sun gear S1 is omitted, it is to be understood that by omitting one of the first ring gear R1 and the second sun gear S2 in place of the first sun gear S1, a differential gear unit having four rotary elements, the rotational speeds of which are in a collinear relationship with each other, may be formed.

Further, the correspondence between the various elements of the sixteenth embodiment and the various elements of the present invention is as follows: The carrier member 91 of the sixteenth embodiment corresponds to the carrier of the present invention, the second ring gear R2A, the second sun gear S2, the first ring gear R1 of the sixteenth embodiment correspond to the first gear, the second gear, and the third gear of the present invention, respectively, and the second pinion gears P2 and the pinion gears PA of the sixteenth embodiment correspond to the first split gears and the second split gears of the present invention, respectively. Furthermore, the carrier member 91 and the second sun gear S2 of the sixteenth embodiment correspond to the first and second outer rotary elements of the present invention, respectively, and the second ring gear R2A and the first ring gear R1 of the sixteenth embodiment correspond to the first and second quasi-outer rotary elements of the present invention, respectively. The other corresponding relations are the same as in the ninth embodiment.

Next, a description will be given of a power plant according to a seventeenth embodiment. In the seventeenth embodiment, a differential gear unit having four rotary elements, the rotational speeds of which are in a collinear relationship with each other, is formed by omitting one of the three rotary elements other than the carrier member 91 and the second sun gear S2X, i.e. one of the first sun gear S1X, and the first and second ring gears R1X and R2X, from the five rotary elements (the first ring gear R1X, the carrier member 91, the second ring gear R2X, the first sun gear S1X, and the second sun gear S2X (see FIG. 66)), described in the tenth embodiment, the rotational speeds of which are in the collinear relationship with each other.

Figure 80:
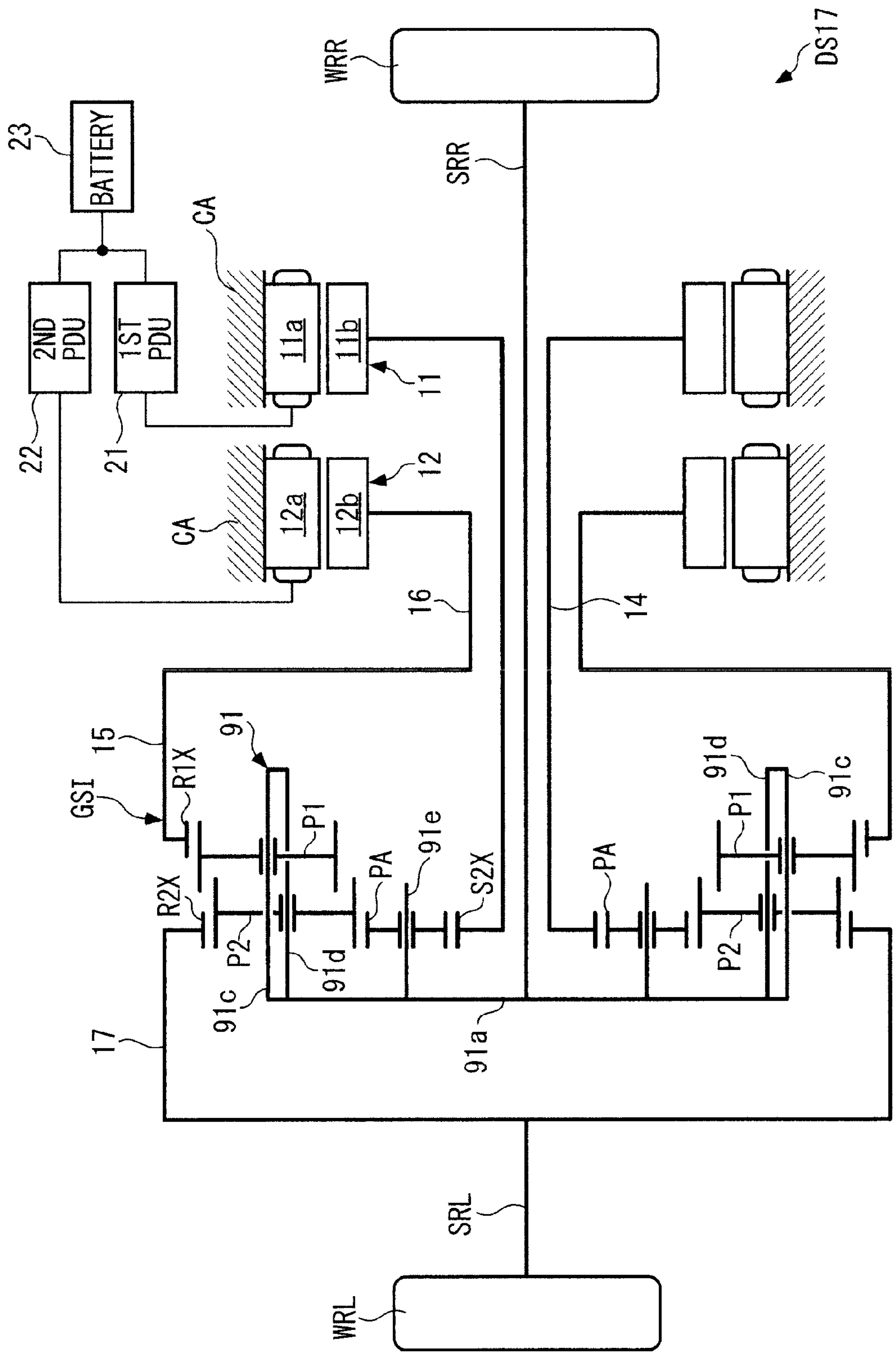
FIG. 80 A skeleton diagram of a power plant etc. according to a seventeenth embodiment of the present invention.

FIG. 80 shows an example of a distribution system DS17 according to the seventeenth embodiment. This distribution system DS17 includes a differential gear unit GSI formed by omitting the first sun gear S1X of the above-mentioned three rotary elements. In FIG. 80, the same component elements as those of the first and tenth embodiments are denoted by the same reference numerals. The following description is given mainly of different points from the first and tenth embodiments. Note that in FIG. 80, differently from the tenth embodiment, a first planetary gear mechanism comprised of the first ring gear R1X, and a second planetary gear mechanism comprised of the second ring gear R2X are arranged on opposite sides in the left-right direction. That is, the first planetary gear mechanism is disposed on a side closer to the right rear wheel WRR, and the second planetary gear mechanism is disposed on a side closer to the left rear wheel WRL.

Compared with the tenth embodiment (FIG. 65), the distribution system DS17 shown in FIG. 80 is different not only in that the first sun gear S1X is omitted but in the following points (a) to (e):

(a) The differential gear unit GSI is not connected to the engine.

(b) The second sun gear S2X is connected to the first rotor 11*b* in place of the second rotor 12*b*.

(c) The second ring gear R2X is connected to the left output shaft SRL in place of the engine (transmission output shaft).

(d) The carrier member 91 is connected to the right output shaft SRR in place of the left output shaft SRL.

(e) The first ring gear R1X is connected to the second rotor 12*b* in place of the first rotor 11*b*.

Figure 81:
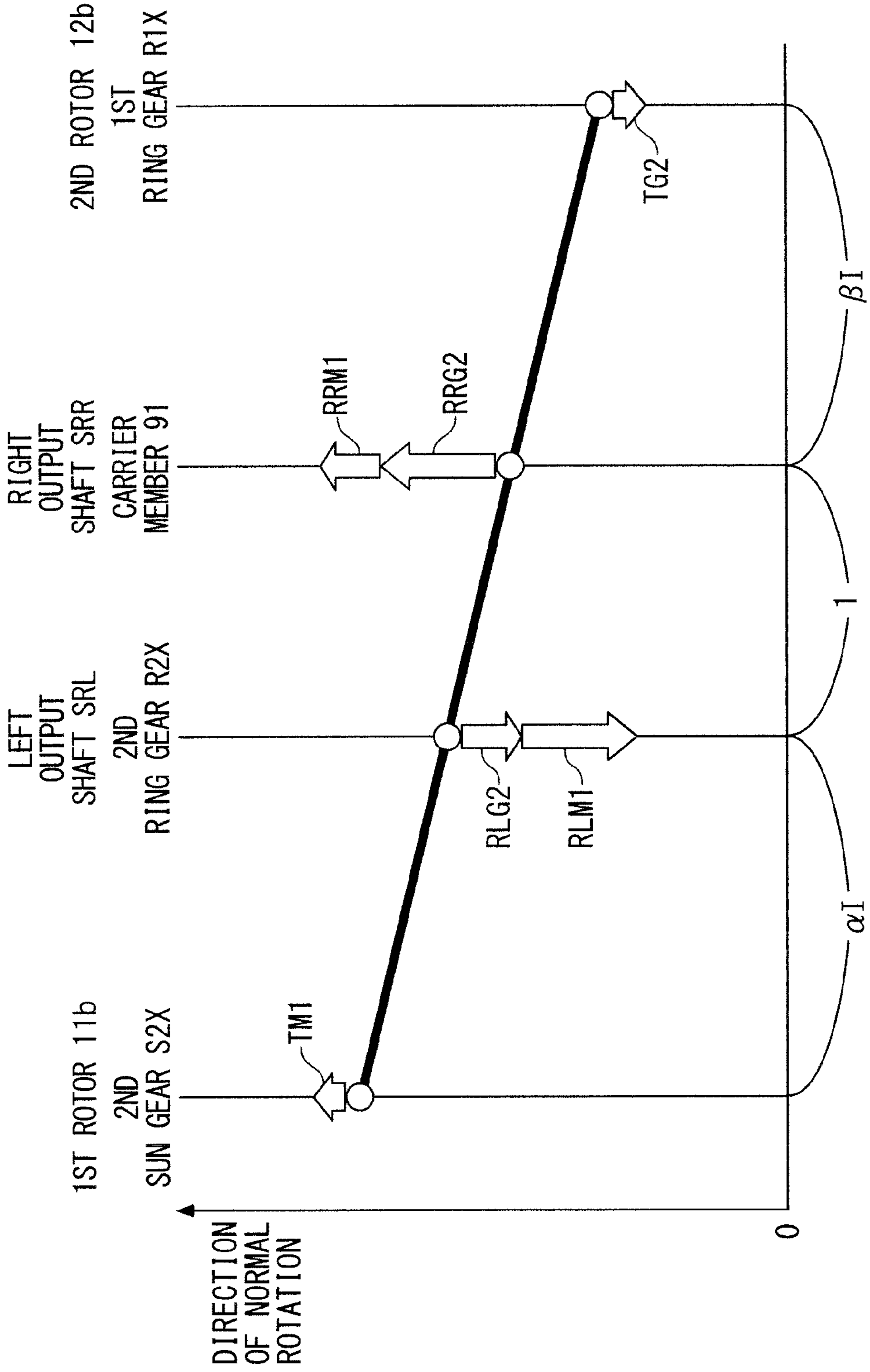
FIG. 81 A collinear chart showing a rotational speed relationship and a torque balance relationship between various types of rotary elements of the power plant shown in FIG. 80.

With the above arrangement, a rotational speed relationship and a torque balance relationship between the various types of rotary elements according to the seventeenth embodiment are expressed as in a collinear chart shown e.g. in FIG. 81. As is apparent from a comparison between this FIG. 81 and FIG. 66 which shows the rotational speed relationship and the torque balance relationship between the various types of the rotary elements according to the tenth embodiment, similarly to the tenth embodiment, by controlling the first and second motor output torques TM1 and TM2, and the first and second motor braking torques TG1 and TG2, it is possible to control torques distributed to the left and right output shafts SRL and SRR.

Further, in FIG. 81, αI and βI represent the first lever ratio and the second lever ratio, respectively, and are expressed by the following equations (13) and (14):

$$\alpha I = (ZR2X/ZS2X) - 1 \tag{13}$$

$$\beta I = ZR2 - X/ZR1X \tag{14}$$

wherein ZR2X represents the tooth number of the second ring gear R2X, ZS2X represents the tooth number of the second sun gear S2X, and ZR1X represents the tooth number of the first ring gear R1X.

The tooth number ZR2X of the second ring gear R2X, the tooth number ZS2X of the second sun gear S2X, and the tooth number ZR1X of the first ring gear R1X are set such that the first and second lever ratios $\alpha I$ and $\beta I$ take relatively large values on condition that one of the first and second rotors 11*b* and 12*b* does not perform reverse rotation within a range in which the left and right output shafts SRL and SRR can be differentially rotated with each other. Further, the tooth number ZR2X of the second ring gear R2X, the tooth number ZS2X of the second sun gear S2X, and the tooth number ZR1X of the first ring gear R1X are set such that the first and second lever ratios $\alpha I$ and $\beta I$ take the same value, i.e. (ZR2X/ZS2X)−1=ZR2X/ZR1X holds from the above-mentioned equations (13) and (14).

Further, since not the first and second ring gears R1X and R2X but the first sun gear S1X is omitted from the above-described three rotary elements, the second ring gear R2X and the carrier member 91 can be connected to the left and right output shafts SRL and SRR, respectively, as described above. From the above, according to the seventeenth embodiment, it is possible to obtain the same advantageous effects as provided by the fifteenth embodiment.

Note that although in the example illustrated in FIG. 80, the first sun gear S1X is omitted, it is to be understood that by omitting one of the first and second ring gears R1X and R2X in place of the first sun gear S1X, a differential gear unit having four rotary elements, the rotational speeds of which are in a collinear relationship with each other, may be formed.

Further, the correspondence between the various elements of the seventeenth embodiment and the various elements of the present invention is as follows: The carrier member 91 of the seventeenth embodiment corresponds to the carrier of the present invention, and the second sun gear S2X, the second ring gear R2X, and the first ring gear R1X of the seventeenth embodiment correspond to the first gear, the second gear, and the third gear of the present invention, respectively. Further, the second pinion gears P2 and the pinion gears PA of the seventeenth embodiment correspond to the first split gears and the second split gears of the present invention, respectively. Further, the second sun gear S2X and the first ring gear R1X of the seventeenth embodiment correspond to the first and second outer rotary elements of the present invention, respectively, and the second ring gear R2X and the carrier member 91 of the seventeenth embodiment correspond to the first and second quasi-outer rotary elements of the present invention, respectively. The other corresponding relations are the same as in the first embodiment.

Next, a description will be given of a power plant according to an eighteenth embodiment. In the eighteenth embodiment, a differential gear unit having four rotary elements, the rotational speeds of which are in a collinear relationship with each other, is formed by omitting one of the two rotary elements other than the carrier member 95 and the first and second sun gears S1 and S2 from the five rotary elements (the second sun gear S2, the second ring gear R2B, the carrier member 95, the first ring gear R1B, and the first sun gear S1 (see FIG. 69)), described in the eleventh embodiment, the rotational speeds of which are in the collinear relationship with each other. Further, the first and second rotors 11*b* and 12*b* are connected to two of the above four rotary elements, which are positioned on opposite outer sides of the collinear chart indicating the relationship between the rotational speeds, and the left and right output shafts SRL and SRR (or the left and right output shafts SFL and SFR, or the above-described output shafts SF and SR) are connected to two of the four rotary elements, which are positioned at inner locations.

Figure 82:
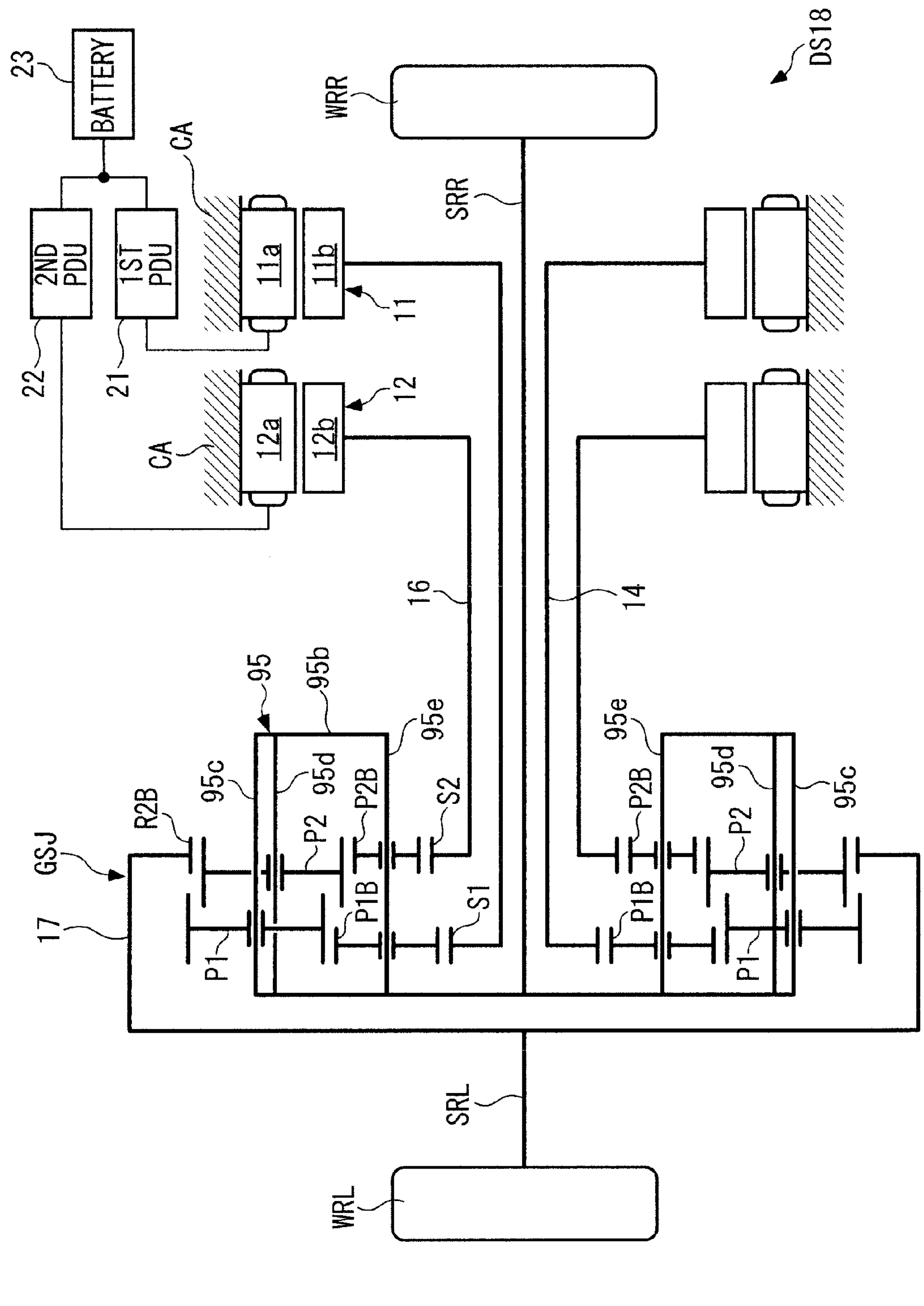
FIG. 82 A skeleton diagram of a power plant etc. according to an eighteenth embodiment of the present invention.

FIG. 82 shows an example of a distribution system DS18 according to the eighteenth embodiment. This distribution system DS18 includes a differential gear unit GSJ formed by omitting the first ring gear R1B of the above-mentioned two rotary elements, i.e. the first and second ring gear R1B and R2B. In FIG. 82, the same component elements as those of the first and eleventh embodiments are denoted by the same reference numerals.

Compared with the eleventh embodiment, the distribution system DS18 shown in FIG. 82 is different not only in that the first ring gear R1B is omitted but in the following points (a) and (b):

(a) The differential gear unit GSJ is not connected to the engine.

(b) The carrier member 95 is connected to the right output shaft SRR in place of the engine (transmission output shaft).

Figure 83:
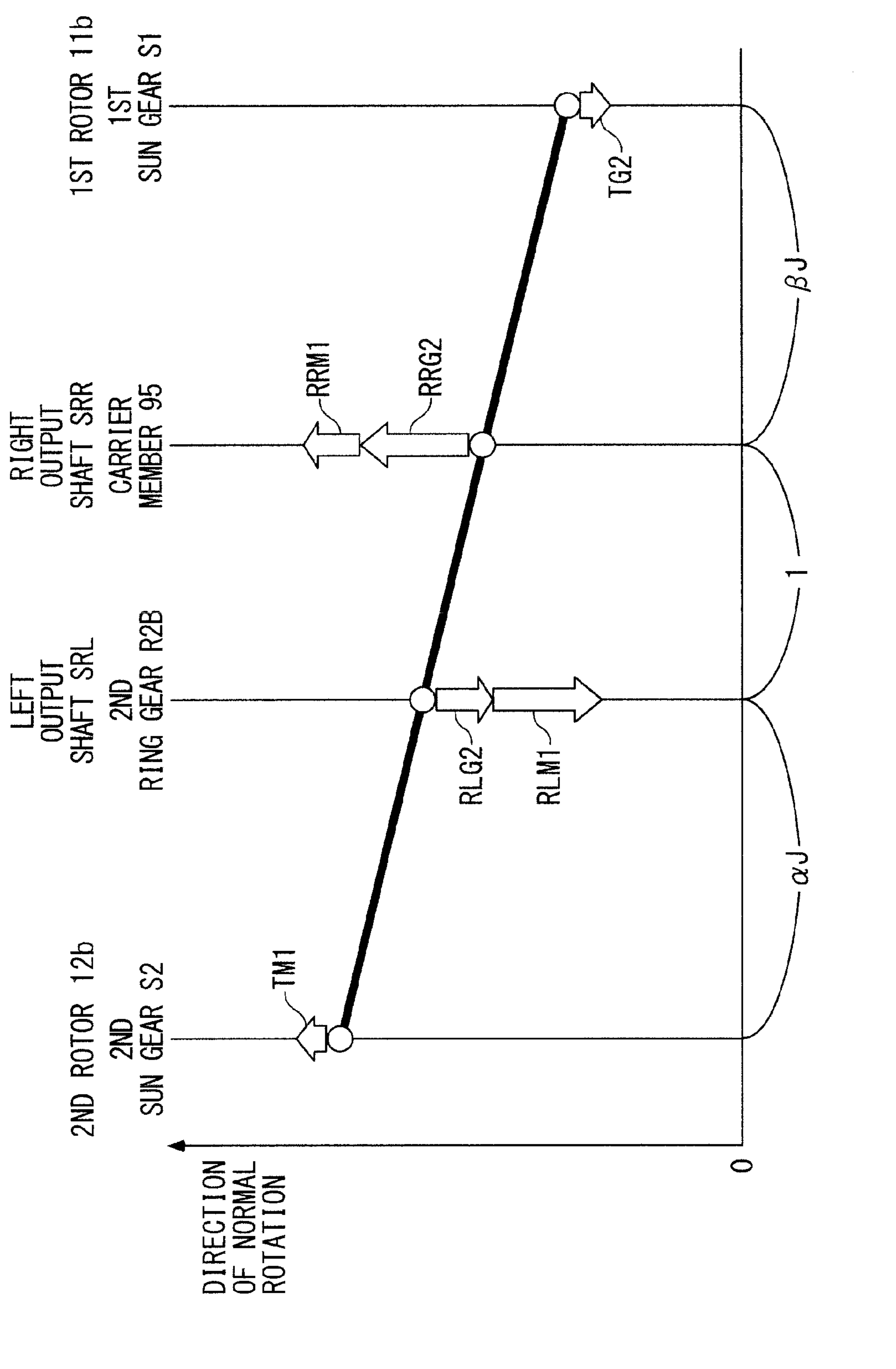
FIG. 83 A collinear chart showing a rotational speed relationship and a torque balance relationship between various types of rotary elements of the power plant shown in FIG. 82.

With the above arrangement, a rotational speed relationship and a torque balance relationship between the various types of rotary elements according to the eighteenth embodiment are expressed as in a collinear chart shown e.g. in FIG. 83. As is apparent from a comparison between this FIG. 83 and FIG. 69 which shows the rotational speed relationship and the torque balance relationship between the various types of the rotary elements according to the eleventh embodiment, similarly to the eleventh embodiment, by controlling the first and second motor output torques TM1 and TM2 and the first and second motor braking torques TG1 and TG2, it is possible to control torques distributed to the left and right output shafts SRL and SRR.

Further, in FIG. 83, $\alpha J$ and $\beta J$ represent the first lever ratio and the second lever ratio, respectively, and are expressed using the tooth number ZR2B of the second ring gear R2B, the tooth number ZS2 of the second sun gear S2, and the tooth number ZS1 of the first sun gear S1, by the following equations (15) and (16):

$$\alpha J=(ZR2B/ZS2)-1 \quad (15)$$

$$\beta J=ZR2B/ZS1 \quad (16)$$

The tooth number ZR2B of the second ring gear R2B, the tooth number ZS2 of the second sun gear S2, and the tooth number ZS1 of the first sun gear S1 are set such that the first and second lever ratios $\alpha J$ and $\beta J$ take relatively large values on condition that one of the first and second rotors 11*b* and 12*b* does not perform reverse rotation within a range in which the left and right output shafts SRL and SRR can be differentially rotated with each other. Further, the tooth number ZR2B of the second ring gear R2B, the tooth number ZS2 of the second sun gear S2, and the tooth number ZS1 of the first sun gear S1 are set such that the first and second lever ratios $\alpha J$ and $\beta J$ take the same value, i.e. (ZR2B/ZS2)−1=ZR2B/ZS1 holds from the above-mentioned equations (15) and (16). From the above, according to the eighteenth embodiment, it is possible to obtain the same advantageous effects as provided by the fifteenth embodiment.

Note that although in the example illustrated in FIG. 82, the first ring gear R1B is omitted, it is to be understood that by omitting the second ring gear R2B in place of the first ring gear R1B, a differential gear unit having four rotary elements, the rotational speeds of which are in a collinear relationship with each other, may be formed.

Further, the correspondence between the various elements of the eighteenth embodiment and the various elements of the present invention is as follows: The carrier member 95 of the eighteenth embodiment corresponds to the carrier of the present invention, and the second sun gear S2, the second ring gear R2B, and the first sun gear S1 of the eighteenth embodiment correspond to the first gear, the second gear, and the third gear of the present invention, respectively, and the second pinion gears P2, the pinion gears P2B, the first pinion gears P1, and the pinion gears P1B of the eighteenth embodiment correspond to the first split gears, the second split gears, the third split gears, and the fourth split gears of the present invention, respectively.

Further, the carrier member 95 and the second ring gear R2B of the eighteenth embodiment correspond to the first and second quasi-outer rotary elements of the present invention, respectively. The other corresponding relations are the same as in the eleventh embodiment.

Next, a description will be given of a power plant according to a nineteenth embodiment. In the nineteenth embodiment, a differential gear unit having four rotary elements, the rotational speeds of which are in a collinear relationship with each other, is formed by omitting one of two rotary elements other than the carrier member 95 and the first and second ring gears R1B and R2B, i.e. one of the first and second sun gears S1 and S2, from the five rotary elements (the first sun gear S1, the first ring gear R1B, the carrier member 95, the second ring gear R2B, and the second sun gear S2), described in the twelfth embodiment, the rotational speeds of which are in the collinear relationship with each other.

Figure 84:
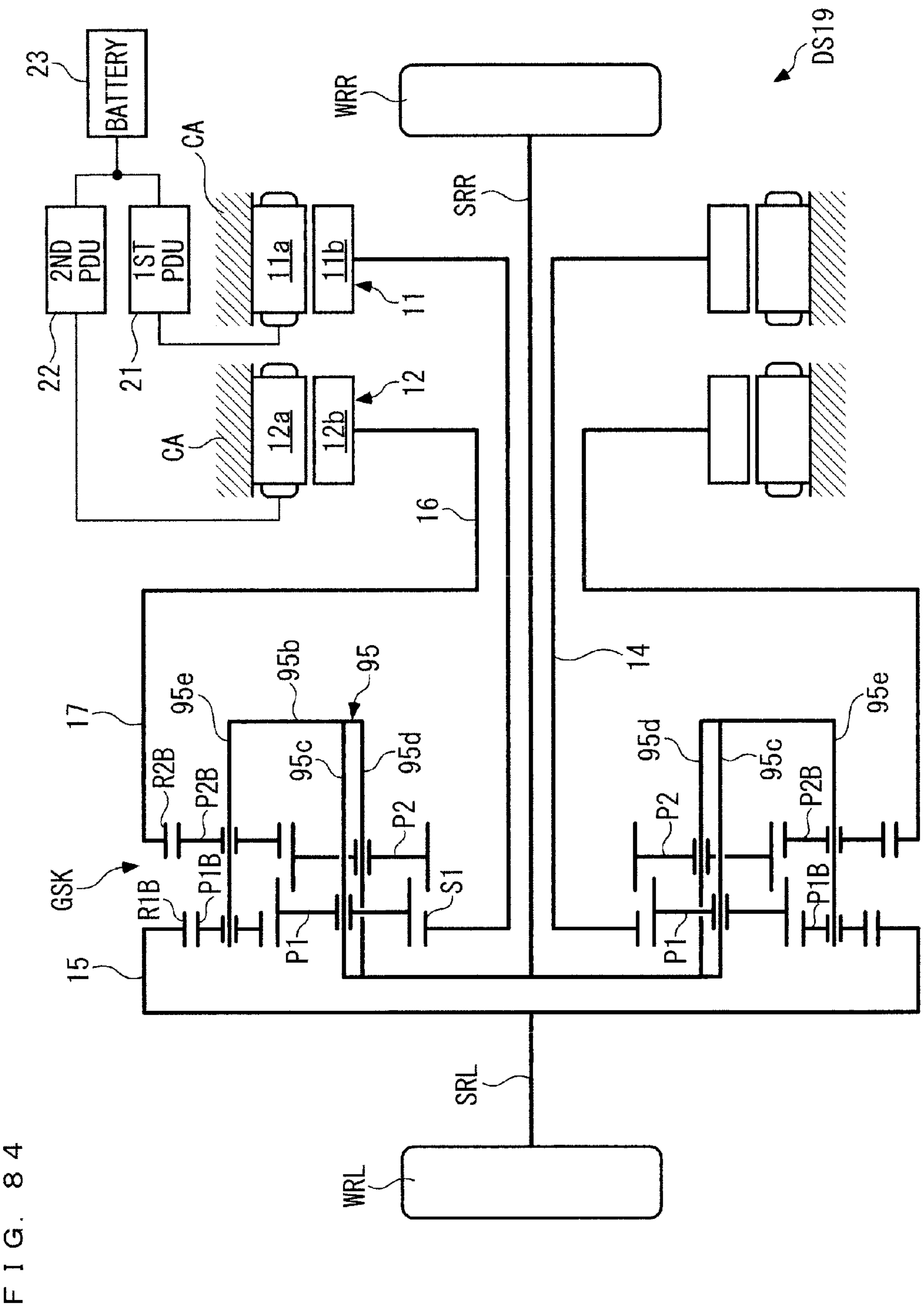
FIG. 84 A skeleton diagram of a power plant etc. according to a nineteenth embodiment of the present invention.

FIG. 84 shows an example of a distribution system DS19 according to the nineteenth embodiment. This distribution system DS19 includes a differential gear unit GSK formed by omitting the second sun gear S2 of the above-mentioned two rotary elements. In FIG. 84, the same component elements as those of the first and twelfth embodiments are denoted by the same reference numerals. The following description is given mainly of different points from the first and twelfth embodiments.

Compared with the twelfth embodiment (FIG. 70), the distribution system DS19 shown in FIG. 84 is different not only in that the second sun gear S2 is omitted but also in the following points (a) to (d):

(a) The differential gear unit GSK is not connected to the engine.

(b) The first ring gear R1B is connected to the left output shaft SRL in place of the right output shaft SRR.

(c) The carrier member 95 is connected to the right output shaft SRR in place of the engine (transmission output shaft).

(d) The second ring gear R2B is connected to the second rotor 12*b* in place of the left output shaft SRL.

Figure 85:
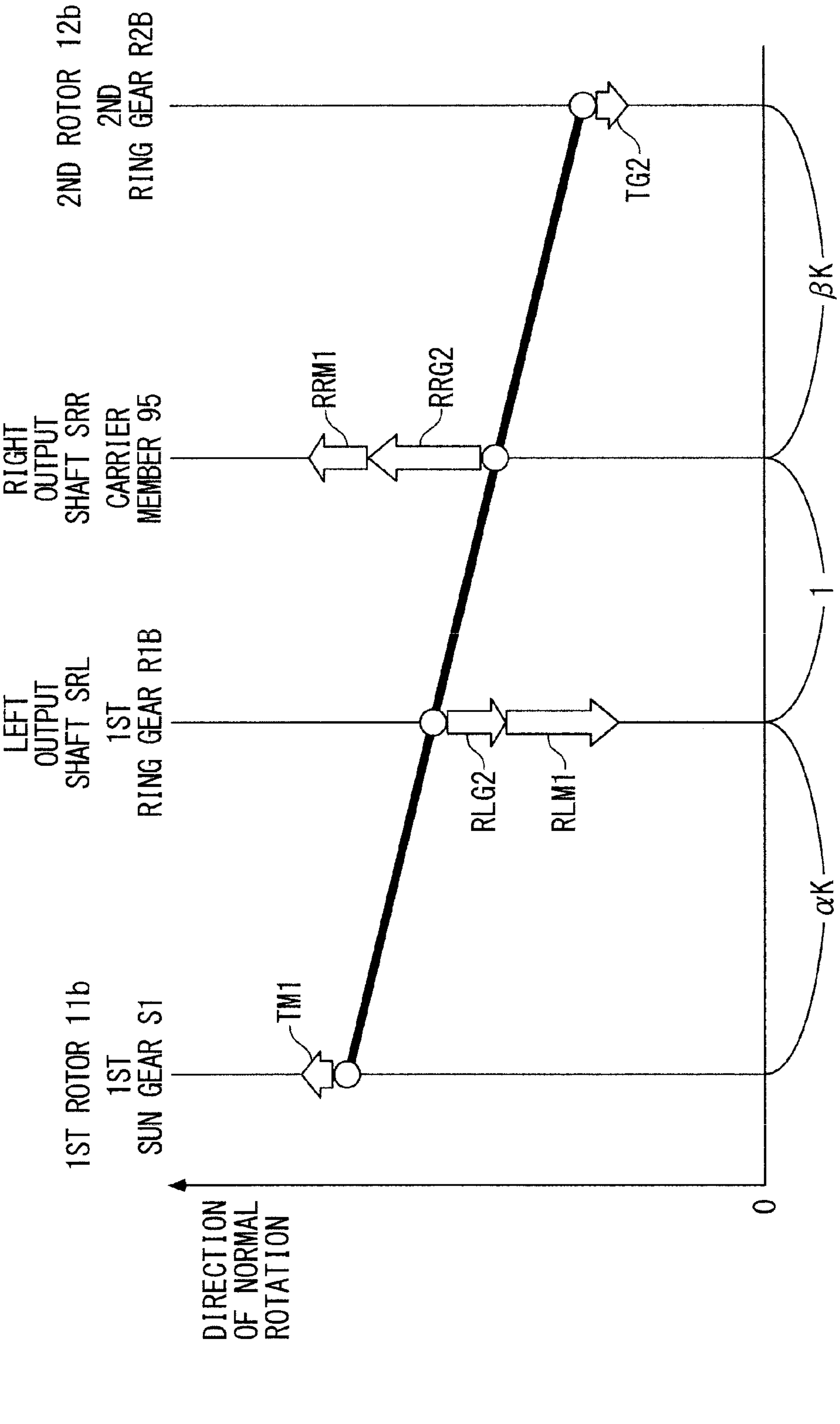
FIG. 85 A collinear chart showing a rotational speed relationship and a torque balance relationship between various types of rotary elements of the power plant shown in FIG. 84.

With the above arrangement, a rotational speed relationship and a torque balance relationship between the various types of rotary elements according to the nineteenth embodiment are expressed as in a collinear chart shown e.g. in FIG. 85. As is apparent from a comparison between this FIG. 85 and FIG. 69 which shows the rotational speed relationship and the torque balance relationship between the various types of the rotary elements according to the twelfth embodiment, similarly to the twelfth embodiment, by controlling the first and second motor output torques TM1 and TM2 and the first and second motor braking torques TG1 and TG2, it is possible to control torques distributed to the left and right output shafts SRL and SRR.

Further, in FIG. 85, αK and βK represent the first lever ratio and the second lever ratio, respectively, and are expressed using the tooth number ZR1B of the first ring gear R1B, the tooth number ZS1 of the first sun gear S1, and the tooth number ZR2B of the second ring gear R2B, by the following equations (17) and (18):

$$\alpha K=(ZR1B/ZS1)-1 \tag{17}$$

$$\beta K=ZR1B/ZR2B \tag{18}$$

The tooth number ZR1B of the first ring gear R1B, the tooth number ZS1 of the first sun gear S1, and the tooth number ZR2B of the second ring gear R2B are set such that the first and second lever ratios αK and βK take relatively large values on condition that one of the first and second rotors 11*b* and 12*b* does not perform reverse rotation within a range in which the left and right output shafts SRL and SRR can be differentially rotated with each other. Further, the tooth number ZR1B of the first ring gear R1B, the tooth number ZS1 of the first sun gear S1, and the tooth number ZR2B of the second ring gear R2B are set such that the first and second lever ratios αK and βK take the same value, i.e. (ZR1B/ZS1)−1=ZR1B/ZR2B holds from the above-mentioned equations (17) and (18). From the above, according to the nineteenth embodiment, it is possible to obtain the same advantageous effects as provided by the fifteenth embodiment.

Note that although in the example illustrated in FIG. 84, the second sun gear S2 is omitted, it is to be understood that by omitting the first sun gear S1 in place of the second sun gear S2, a differential gear unit having four rotary elements, the rotational speeds of which are in a collinear relationship with each other, may be formed.

Further, the correspondence between the various elements of the nineteenth embodiment and the various elements of the present invention is as follows: The carrier member 95 of the nineteenth embodiment corresponds to the carrier of the present invention, and the first ring gear R1B, the first sun gear S1, and the second ring gear R2B of the nineteenth embodiment correspond to the first gear, the second gear, and the third gear of the present invention, respectively. Further, the first pinion gears P1, the pinion gears P1B, the second pinion gears P2, and the pinion gears P2B of the nineteenth embodiment correspond to the first split gears, the second split gears, the third split gears, and the fourth split gears of the present invention, respectively.

Further, the first sun gear S1 and the second ring gear R2B of the nineteenth embodiment correspond to the first and second outer rotary elements of the present invention, respectively, and the first ring gear R1B and the carrier member 95 of the nineteenth embodiment correspond to the first and second quasi-outer rotary elements of the present invention, respectively. The other corresponding relations are the same as in the first embodiment.

Next, a description will be given of a power plant according to a twentieth embodiment. In the twentieth embodiment, a differential gear unit having four rotary elements, the rotational speeds of which are in a collinear relationship with each other, is formed by omitting one of rotary elements other than the carrier member 101, the first ring gear R1D, and the second sun gear S2D, i.e. one of the first sun gear S1D and the second ring gear R2D, from the five rotary elements (the carrier member 101, the first ring gear R1D, the second ring gear R2D, the first sun gear S1D, and the second sun gear S2D), described in the thirteenth embodiment, the rotational speeds of which are in the collinear relationship with each other.

Figure 86:
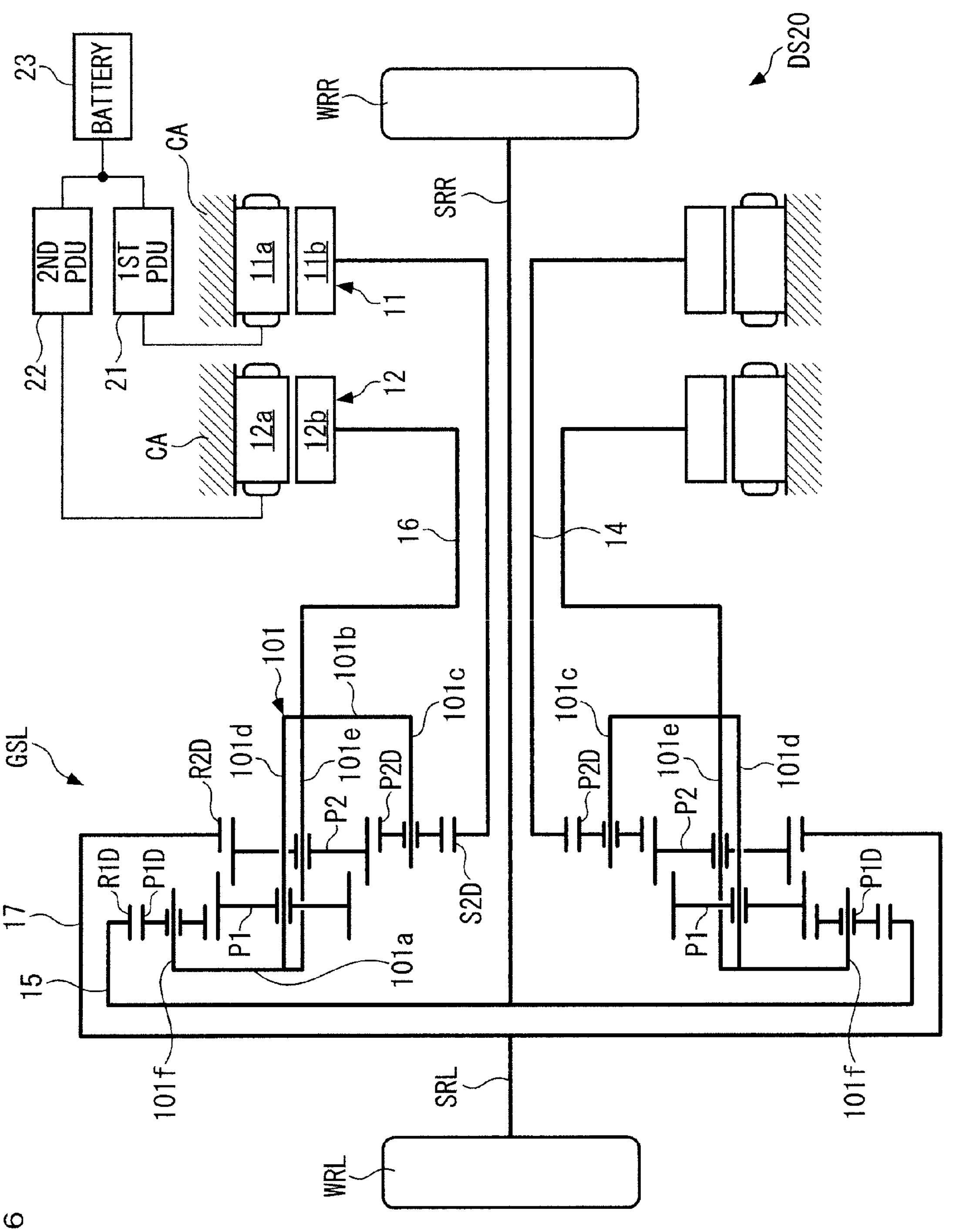
FIG. 86 A skeleton diagram of a power plant etc. according to a twentieth embodiment of the present invention.

FIG. 86 shows an example of a distribution system DS20 according to the twentieth embodiment. This distribution system DS20 includes a differential gear unit GSL formed by omitting the first sun gear S1D of the above-mentioned two rotary elements. In FIG. 86, the same component elements as those of the first and thirteenth embodiments are denoted by the same reference numerals. The following description is given mainly of different points from the first and thirteenth embodiments.

Compared with the thirteenth embodiment (FIG. 71), the distribution system DS20 shown in FIG. 86 is different not only in that the first sun gear S1D is omitted but also in the following points (a) to (e):

(a) The differential gear unit GSL is not connected to the engine.

(b) The second sun gear S2D is connected to the first rotor 11*b* in place of the second rotor 12*b*.

(c) The second ring gear R2D is connected to the left output shaft SRL in place of the engine (transmission output shaft).

(d) The first ring gear R1D is connected to the right output shaft SRR in place of the left output shaft SRL.

(e) The carrier member 101 is connected to the second rotor 12*b* in place of the first rotor 11*b*.

Figure 87:
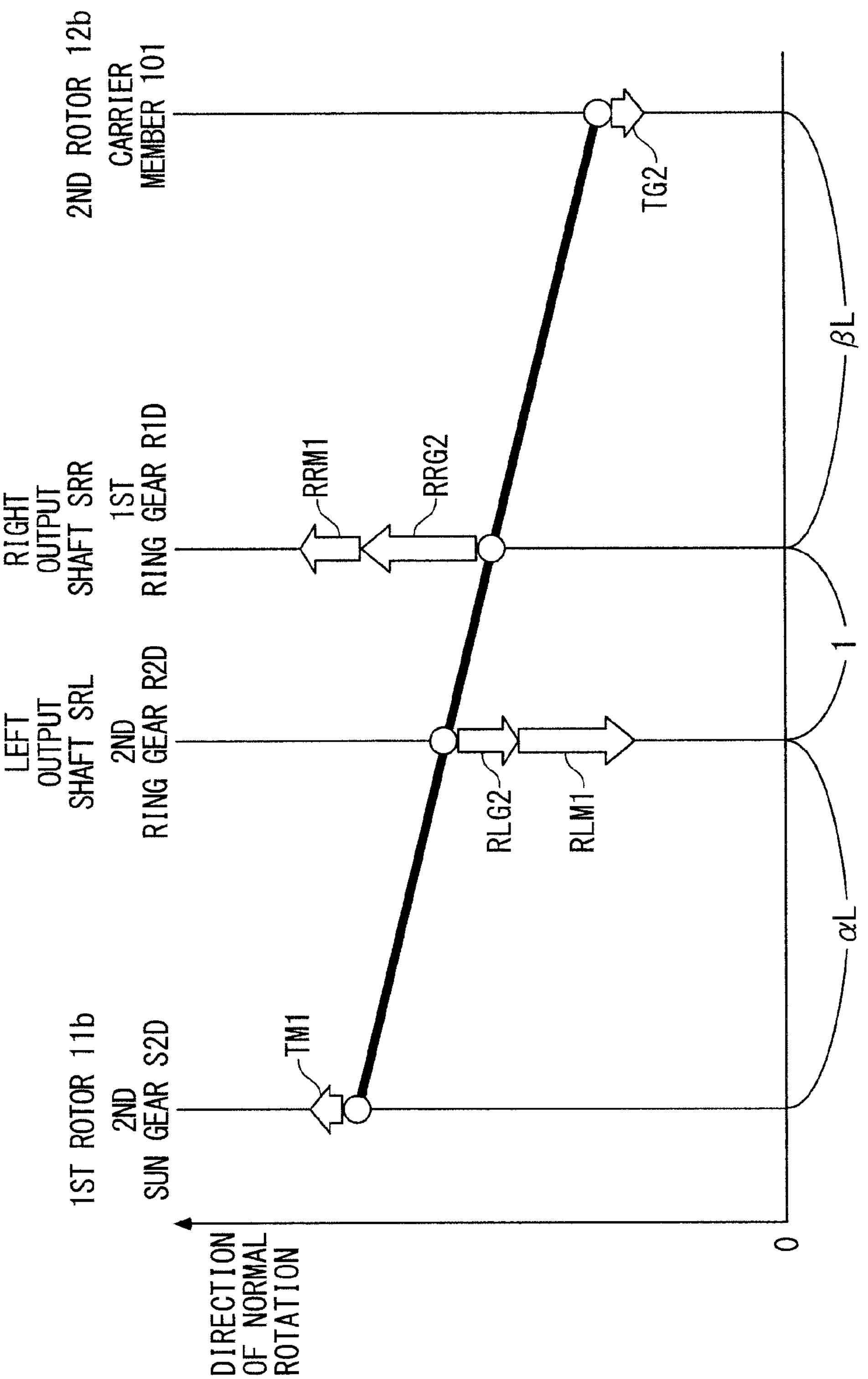
FIG. 87 A collinear chart showing a rotational speed relationship and a torque balance relationship between various types of rotary elements of the power plant shown in FIG. 86.

With the above arrangement, a rotational speed relationship and a torque balance relationship between the various types of rotary elements according to the twentieth embodiment are expressed as in a collinear chart shown e.g. in FIG. 87. As is apparent from a comparison between this FIG. 87 and FIG. 73 which shows the rotational speed relationship and the torque balance relationship between the various types of the rotary elements according to the thirteenth embodiment, similarly to the thirteenth embodiment, by controlling the first and second motor output torques TM1 and TM2 and the first and second motor braking torques TG1 and TG2, it is possible to control torques distributed to the left and right output shafts SRL and SRR.

Further, in FIG. 87, αL and βL represent the first lever ratio and the second lever ratio, respectively, and are expressed by the following equations (19) and (20):

$$\alpha L=\{ZR1D(ZR2D-ZS2D)\}/\{ZS2D(ZR1D-ZR2D)\} \quad (19)$$

$$\beta L=ZR2D/(ZR1D-ZR2D) \quad (20)$$

wherein as described in the thirteenth embodiment, ZR1D represents the tooth number of the first ring gear R1D, ZR2D represents the tooth number of the second ring gear R2D, and ZS2D represents the tooth number of the second sun gear S2D. From the above, according to the twentieth embodiment, it is possible to obtain the same advantageous effects as provided by the fifteenth embodiment.

Note that although in the example illustrated in FIG. 86, the first sun gear S1D is omitted, it is to be understood that by omitting the second ring gear R2D in place of the first sun gear S1D, a differential gear unit having four rotary elements, the rotational speeds of which are in a collinear relationship with each other, may be formed.

Further, the correspondence between the various elements of the twentieth embodiment and the various elements of the present invention is as follows: The carrier member 101 of the twentieth embodiment corresponds to the carrier of the present invention, and the second sun gear S2D, the second ring gear R2D, and the first ring gear R1D of the twentieth embodiment correspond to the first gear, the second gear, and the third gear of the present invention, respectively. Further, the second pinion gears P2, the pinion gears P2D, the first pinion gears P1, and the pinion gears P1D of the twentieth embodiment correspond to the first split gears, the second split gears, the third split gears, and the fourth split gears of the present invention, respectively.

Further, the second sun gear S2D and the carrier member 101 of the twentieth embodiment correspond to the first and second outer rotary elements of the present invention, respectively, and the second and first ring gears R2D and R1D correspond to the first and second quasi-outer rotary elements of the present invention, respectively. The other corresponding relations are the same as in the first embodiment.

Note that as described in the thirteenth embodiment, when the pinion gears P1D are provided between the first sun gear S1D and the first pinion gears P1, and the pinion gears P2D are provided between the second pinion gears P2 and the second ring gear R2D, one of the rotary elements other than the carrier member 101, the first sun gear S1D, and the second ring gear R2D, i.e. one of the first ring gear R1D and the second sun gear S2D is omitted from the five rotary elements (the carrier member 101, the first ring gear R1D, the second ring gear R2D, the first sun gear S1D, and the second sun gear S2D).

Note that although in the first to thirteenth embodiments, the engine 3 is connected to one of the differential gear units GS, GSA, GSX, GSB to GSD, and GSF, it is to be understood that the engine 3 is not necessarily required to be connected to any of them. Further, it is to be understood that the differential gear units GSA, GSX, GSB to GSD, and GSF according to the ninth to thirteenth embodiments may be applied to the power plants according to the second to eighth embodiments. Furthermore, although in the power plants according to the fourteenth to twentieth embodiments, the first and second rotating electric machines 11 and 12 are used, the two 11 and 12 may be replaced by the rotating electric machine 41, and the first and second clutches 42 and 43, described in the second embodiment.

Note that the present invention is by no means limited to the above-described first to twentieth embodiments (hereinafter, collectively referred to as the "embodiments"), but can be practiced in various forms. For example, although in the embodiments, the power plant of the present invention is configured to drive a pair of output shafts of the three pairs of output shafts of the left and right output shafts SRL and SRR, the front and rear output shafts SF and SR, and the left and right output shafts SFL and SFR, it may be configured to drive a pair of output shafts other than the three pairs of output shafts to be driven in the respective embodiments: For example, although in the first embodiment, the power plant of the present invention is configured to drive the rear-side left and right output shafts SRL and SRR, it may be configured to drive the front and rear output shafts SF and SR, similarly to the sixth embodiment, or to drive the front-side left and right output shafts SFL and SFR, similarly to the seventh embodiment. Further, in this case, the relationship of connections of the left and right output shafts SRL and SRR, the front and rear output shafts SF and SR, and the left and right output shafts SFL and SFR, to the respective gears may be inverted: For example, although in the first to fifth embodiments, the first and second ring gears R1 and R2 are connected to the left output shaft SRL and the right output shaft SRR, respectively, inversely, they may be connected to the right output shaft SRR and the left output shaft SRL, respectively.

Further, although in the embodiments, the first and second energy input/output units of the present invention are the first and second rotating electric machines 11 and 12, they may be replaced by any other suitable device, such as a hydraulic motor, which can input and output rotational energy. Furthermore, although in the embodiments, AC motors are used as the first and second rotating electric machines 11 and 12, any other suitable device, such as a DC motor, may be used which can perform energy conversion between rotational energy and electric energy.

Further, although in the embodiments, the battery 23 is shared by the first and second rotating electric machines 11 and 12, batteries may be provided separately. Furthermore, although in the embodiments, electric power regenerated by the first and second rotating electric machines 11 and 12 is charged into the battery 23, the electric power may be charged into a capacitor. Alternatively, any other rotating electric machine than the first and second rotating electric machines 11 and 12, and a flywheel connected to the other rotating electric machine may be used to convert the electric power regenerated by the first and second rotating electric machines 11 and 12 to motive power using the other rotating electric machine, and accumulate the motive power obtained by the conversion in the flywheel as kinetic energy. Alternatively, the electric power regenerated by the first and second rotating electric machines 11 and 12 may be directly supplied to another rotating electric machine or an actuator. Alternatively, a hydraulic motor capable of converting rotational energy to pressure energy as described above may be used in place of the first and second rotating electric machines 11 and 12, and the pressure energy obtained by the conversion by the hydraulic motor may be accumulated in the accumulator.

Further, although in the embodiments, the engine (3), which is a gasoline engine, is used as an energy output device of the present invention, any other suitable device which can output rotational energy, such as a diesel engine, an LPG engine, a CNG (Compressed Natural Gas) engine, an external combustion engine, or a hydraulic motor, may be used. Alternatively, any other suitable device which can not only output rotational energy but also input rotational energy, such as a rotating electric machine, may be used. Further, although in the embodiments, the engine (3) is used as a motive power source of the power plant, it is to be understood that the engine may be omitted. Further, although the embodiments are examples in which the power plant of the present invention is applied to a vehicle, the present invention is not limited to this, but it may be applied e.g. to boats or aircrafts. It is to be further understood that various changes and modifications may be made without departing from the spirit and scope thereof.

INDUSTRIAL APPLICABILITY

The present invention is very useful for achieving not only simple configuration of an apparatus but also downsizing, reduction of the weight, and manufacturing costs, of the apparatus.

REFERENCE SIGNS LIST

VFR vehicle (means of transportation)
VFF vehicle (means of transportation)
VAW vehicle (means of transportation)
WRL left rear wheel (left drive wheel)
WRR right rear wheel (right drive wheel)
WFL left front wheel (left drive wheel)
WFR right front wheel (right drive wheel)
SRL left output shaft (one of two driven parts, the other of two driven parts)
SRR right output shaft (the other of two driven parts, one of two driven parts)
SFL left output shaft (one of two driven parts)
SFR right output shaft (the other of two driven parts)
SF front output shaft (the other of two driven parts, one of two driven parts)
SR rear output shaft (one of two driven parts, the other of two driven parts)
3 engine (energy output unit)
11 first rotating electric machine (first energy input/output unit)
12 second rotating electric machine (second energy input/output unit)
GS differential gear unit
GSA differential gear unit
GSB differential gear unit
GSC differential gear unit
GSD differential gear unit
GSF differential gear unit
GSG differential gear unit
GSH differential gear unit
GSI differential gear unit
GSJ differential gear unit
GSK differential gear unit
GSL differential gear unit
GSX differential gear unit
S1 first sun gear (first gear, second gear, third gear, first outer rotary element)
R1 first ring gear (second gear, third gear, fourth gear, second quasi-outer rotary element)
P1 first pinion gear (first split gear, third split gear)
S2 second sun gear (third gear, fourth gear, second gear, first gear, second outer rotary element)
R2 second ring gear (fourth gear, first quasi-outer rotary element)
P2 second pinion gear (first split gear, third split gear)
13 carrier member (carrier)
PA pinion gear (second pinion gear, second split gear)
R2A second ring gear (second gear, first gear, central rotary element, first quasi-outer rotary element)
91 carrier member (carrier, first quasi-outer rotary element, first outer rotary element, second quasi-outer rotary element)
95 carrier member (carrier, central rotary element, first quasi-outer rotary element, second quasi-outer rotary element)
101 carrier member (carrier, first outer rotary element, second outer rotary element)
P1B pinion gear (second split gear, fourth split gear)
P2B pinion gear (fourth split gear, second split gear)
R1B first ring gear (second gear, first gear, first quasi-outer rotary element)
R2B second ring gear (fourth gear, third gear, second gear, second quasi-outer rotary element, second outer rotary element)
S1D first sun gear (second gear, second quasi-outer rotary element)
R1D first ring gear (first gear, third gear, first quasi-outer rotary element, second quasi-outer rotary element)
S2D second sun gear (third gear, first gear, second outer rotary element, first outer rotary element)
R2D second ring gear (fourth gear, second gear, central rotary element, first quasi-outer rotary element)
P1D pinion gear (second split gear, fourth split gear)
P2D pinion gear (fourth split gear, second split gear)
S1X first sun gear (first gear, first quasi-outer rotary element)

R1X first ring gear (second gear, third gear, first quasi-outer rotary element, second outer rotary element)

S2X second sun gear (third gear, first gear, second outer rotary element, first outer rotary element)

R2X second ring gear (fourth gear, second gear, central rotary element, first quasi-outer rotary element)

The invention claimed is:

1. A power plant for driving two driven parts for propelling a vehicle, comprising:

a first energy input/output unit that is capable of inputting and outputting rotational energy;

a second energy input/output unit that is capable of inputting and outputting rotational energy;

a differential gear unit that includes a carrier rotatably supporting a first pinion gear and a second pinion gear that are in mesh with each other, a first gear and a second gear that are in mesh with one of said first and second pinion gears, and a third gear that is in mesh with the other of said first and second pinion gears, in reference to a first outer rotary element, a first quasi-outer rotary element, a second quasi-outer rotary element and a second outer rotary element as four rotary elements formed by said carrier and said first to third gears, said differential gear unit being configured such that in case where said first and second quasi-outer rotary elements, and said second outer rotary element are rotating in a state in which said first outer rotary element is fixed, a rotational speed of said second outer rotary element becomes higher than a rotational speed of said second quasi-outer rotary element, and the rotational speed of said second quasi-outer rotary element becomes higher than a rotational speed of said first quasi-outer rotary element, wherein said first and second outer rotary elements are mechanically connected to said first and second energy input/output units, respectively, and said first and second quasi-outer rotary elements are mechanically connected to one and the other of the two driven parts, respectively.

2. The power plant according to claim 1, wherein said differential gear unit further includes a fourth gear that is in mesh with said other of said first and second pinion gears, and wherein in reference to said first outer rotary element, said first quasi-outer rotary element, a central rotary element, said second quasi-outer rotary element and said second outer rotary element as five rotary elements formed by said fourth gear, said carrier, and said first to third gears, said differential gear unit is configured such that in case where said first quasi-outer rotary element, said central rotary element, said second quasi-outer rotary element and said second outer rotary element are rotating in a state in which said first outer rotary element is fixed, the rotational speed of said second outer rotary element becomes higher than the rotational speed of said second quasi-outer rotary element, and the rotational speed of said second quasi-outer rotary element becomes higher than a rotational speed of said central rotary element, and the rotational speed of said central rotary element becomes higher than the rotational speed of said first quasi-outer rotary element, and wherein said first and second outer rotary elements are mechanically connected to said first and second energy input/output units, respectively, and said first and second quasi-outer rotary elements are mechanically connected to the one and the other of the two driven parts, respectively.

3. The power plant according to claim 2, further including an energy output unit that is capable of outputting rotational energy and is provided separately from said first and second energy input/output units, and wherein said central rotary element is mechanically connected to said energy output unit.

4. The power plant according to claim 1, wherein said first gear is a first sun gear that is provided on an inner periphery of said first pinion gear and is in mesh with said first pinion gear, wherein said second gear is a first ring gear that is provided on an outer periphery of said first pinion gear and is in mesh with said first pinion gear, and wherein said third gear is one of a second sun gear that is provided on an inner periphery of said second pinion gear and is in mesh with said second pinion gear, and a second ring gear that is provided on an outer periphery of said second pinion gear and is in mesh with said second pinion gear.

5. The power plant according to claim 2, wherein said first gear is a first sun gear that is provided on an inner periphery of said first pinion gear and is in mesh with said first pinion gear, wherein said second gear is a first ring gear that is provided on an outer periphery of said first pinion gear and is in mesh with said first pinion gear, wherein said third gear is a second sun gear that is provided on an inner periphery of said second pinion gear and is in mesh with said second pinion gear, and wherein said fourth gear is a second ring gear that is provided on an outer periphery of said second pinion gear and is in mesh with said second pinion gear.

6. The power plant according to claim 1, wherein said second pinion gear is a double pinion gear comprising a first split gear that is in mesh with said first pinion gear, and a second split gear that is not in mesh with said first pinion gear but is in mesh with said first split gear, wherein said first gear is a second sun gear that is provided on an inner periphery of said second pinion gear and is in mesh with said second split gear of said second pinion gear, wherein said second gear is a second ring gear that is provided on an outer periphery of said second pinion gear and is in mesh with said first split gear of said second pinion gear, and wherein said third gear is one of a first sun gear that is provided on an inner periphery of said first pinion gear and is in mesh with said first pinion gear, and a first ring gear that is provided on an outer periphery of said first pinion gear and is in mesh with said first pinion gear.

7. The power plant according to claim 2, wherein said second pinion gear is a double pinion gear comprising a first split gear that is in mesh with said first pinion gear, and a second split gear that is not in mesh with said first pinion gear but is in mesh with said first split gear, wherein said first gear is a first sun gear that is provided on an inner periphery of said first pinion gear and is in mesh with said first pinion gear, wherein said second gear is a first ring gear that is provided on an outer periphery of said first pinion gear and is in mesh with said first pinion gear, wherein said third gear is a second sun gear that is provided on an inner periphery of said second pinion gear and is in mesh with said second split gear of said second pinion gear, and wherein said fourth gear is a second ring gear that is provided on an outer periphery of said second pinion gear and is in mesh with said first split gear of said second pinion gear.

8. The power plant according to claim 1, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is a first ring gear that is provided on an outer periphery of said first pinion gear and is in mesh with said second split gear of said first pinion gear, wherein said second gear is a first sun gear that is provided on an inner periphery of said first pinion gear and is in mesh with said first split gear of said first pinion gear, and wherein said third gear is one of a second ring gear that is provided on an outer periphery of said second pinion gear and is in mesh with said fourth split gear of said second pinion gear, and a second sun gear that is provided on an inner periphery of said second pinion gear and is in mesh with said fourth split gear of said second pinion gear.

9. The power plant according to claim 2, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is one of a first sun gear that is provided on an inner periphery of said first pinion gear and is in mesh with said second split gear of said first pinion gear, wherein said second gear is a first ring gear that is provided on an outer periphery of said first pinion gear and is in mesh with said first split gear of said first pinion gear, wherein said third gear is one of a second sun gear that is provided on an inner periphery of said second pinion gear and is in mesh with said fourth split gear of said second pinion gear, and wherein said fourth gear is a second ring gear that is provided on an outer periphery of said second pinion gear and is in mesh with said third split gear of said second pinion gear.

10. The power plant according to claim 1, wherein said second pinion gear is a double pinion gear comprising a first split gear that is in mesh with said first pinion gear, and a second split gear that is not in mesh with said first pinion gear but is in mesh with said first split gear, wherein said first gear is a second ring gear that is provided on an outer periphery of said second pinion gear and is in mesh with said second split gear of said second pinion gear, wherein said second gear is a second sun gear that is provided on an inner periphery of said second pinion gear and is in mesh with said first split gear of said second pinion gear, and wherein said third gear is one of a first sun gear that is provided on an inner periphery of said first pinion gear and is in mesh with said first pinion gear, and a first ring gear that is provided on an outer periphery of said first pinion gear and is in mesh with said first pinion gear.

11. The power plant according to claim 2, wherein said second pinion gear is a double pinion gear comprising a first split gear that is in mesh with said first pinion gear, and a second split gear that is not in mesh with said first pinion gear but is in mesh with said first split gear, wherein said first gear is a first sun gear that is provided on an inner periphery of said first pinion gear and is in mesh with said first pinion gear, wherein said second gear is a first ring gear that is provided on an outer periphery of said first pinion gear and is in mesh with said first pinion gear, wherein said third gear is a second ring gear that is provided on an outer periphery of said second pinion gear and is in mesh with said second split gear of said second pinion gear, and wherein said fourth gear is a second sun gear that is provided on an inner periphery of said second pinion gear and is in mesh with said first split gear of said second pinion gear.

12. The power plant according to claim 1, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is a second sun gear that is provided on an inner periphery of said second pinion gear and is in mesh with said fourth split gear of said second pinion gear, wherein said second gear is a second ring gear that is provided on an outer periphery of said second pinion gear and is in mesh with said third split gear of said second pinion gear, and wherein said third gear is a first sun gear that is provided on an inner periphery of said first pinion gear and is in mesh with said second split gear of said first pinion gear.

13. The power plant according to claim 1, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is a second sun gear that is provided on an inner periphery of said second pinion gear and is in mesh with said fourth split gear of said second pinion gear, wherein said second gear is a second ring gear that is provided on an outer periphery of said second pinion gear and is in mesh with said third split gear of said second pinion gear, and wherein said third gear is a first ring gear that is provided on an outer periphery of said first pinion gear and is in mesh with said second split gear of said first pinion gear.

14. The power plant according to claim 2, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is a first ring gear that is provided on an outer periphery of said first pinion gear and is in mesh with said second split gear of said first pinion gear, wherein said second gear is a first sun gear that is provided on an inner periphery of said first pinion gear and is in mesh with said first split gear of said first pinion gear, wherein said third gear is a second ring gear that is provided on an outer periphery of said second pinion gear and is in mesh with said fourth split gear of said second pinion gear, and wherein said fourth gear is a second sun gear that is provided on an inner periphery of said second pinion gear and is in mesh with said third split gear of said second pinion gear.

15. The power plant according to claim 2, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is a first ring gear that is provided on an outer periphery of said first pinion gear and is in mesh with said second split gear of said first pinion gear, wherein said second gear is a first sun gear that is provided on an inner periphery of said first pinion gear and is in mesh with said first split gear of said first pinion gear, wherein said third gear is a second sun gear that is provided on an inner periphery of said second pinion gear and is in mesh with said fourth split gear of said second pinion gear, and wherein said fourth gear is a second ring gear that is provided on an outer periphery of said second pinion gear and is in mesh with said third split gear of said second pinion gear.

16. The power plant according to claim 3, wherein said second pinion gear is a double pinion gear comprising a first split gear that is in mesh with said first pinion gear, and a second split gear that is not in mesh with said first pinion gear but is in mesh with said first split gear, wherein said first gear is a first sun gear that is provided on an inner periphery of said first pinion gear and is in mesh with said first pinion gear, wherein said second gear is a first ring gear that is provided on an outer periphery of said first pinion gear and is in mesh with said first pinion gear, wherein said third gear is a second ring gear that is provided on an outer periphery of said second pinion gear and is in mesh with said second split gear of said second pinion gear, and wherein said fourth gear is a second sun gear that is provided on an inner periphery of said second pinion gear and is in mesh with said first split gear of said second pinion gear.

17. The power plant according to claim 3, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is a first ring gear that is provided on an outer periphery of said first pinion gear and is in mesh with said second split gear of said first pinion gear, wherein said second gear is a first sun gear that is provided on an inner periphery of said first pinion gear and is in mesh with said first split gear of said first pinion gear, wherein said third gear is a second ring gear that is provided on an outer periphery of said second pinion gear and is in mesh with said fourth split gear of said second pinion gear, and wherein said fourth gear is a second sun gear that is provided on an inner periphery of said second pinion gear and is in mesh with said third split gear of said second pinion gear.

18. The power plant according to claim 3, wherein said first pinion gear is a double pinion gear comprising a first split gear, and a second split gear that is not in mesh with said second pinion gear but is in mesh with said first split gear, wherein said second pinion gear is a double pinion gear comprising a third split gear that is in mesh with said first split gear, and a fourth split gear that is not in mesh with said first or second split gear but is in mesh with said third split gear, wherein said first gear is a first ring gear that is provided on an outer periphery of said first pinion gear and is in mesh with said second split gear of said first pinion gear, wherein said second gear is a first sun gear that is provided on an inner periphery of said first pinion gear and is in mesh with said first split gear of said first pinion gear, wherein said third gear is a second sun gear that is provided on an inner periphery of said second pinion gear and is in mesh with said fourth split gear of said second pinion gear, and wherein said fourth gear is a second ring gear that is provided on an outer periphery of said second pinion gear and is in mesh with said third split gear of said second pinion gear.

* * * * *